United States Patent [19]
Larson

[11] Patent Number: 5,867,649
[45] Date of Patent: Feb. 2, 1999

[54] DANCE/MULTITUDE CONCURRENT COMPUTATION

[75] Inventor: Brian Ralph Larson, Mpls., Minn.

[73] Assignee: Multitude Corporation, Bayport, Minn.

[21] Appl. No.: 589,933

[22] Filed: Jan. 23, 1996

[51] Int. Cl.⁶ .................................................... G06F 15/16
[52] U.S. Cl. ...................................................... 395/200.31
[58] Field of Search ........................ 364/DIG. 1 MS File, 364/DIG. 2 MS File; 395/377, 376, 379, 382, 385, 390, 391, 561, 800, 705, 706, 712, 200.31, 800.28, 800.3, 800.36; 340/825.8

[56] References Cited

U.S. PATENT DOCUMENTS

| 4,814,978 | 3/1989 | Dennis ..................................... 395/377 |
| 4,833,468 | 5/1989 | Larson et al. ......................... 340/825.8 |
| 5,029,080 | 7/1991 | Otsuki ..................................... 395/377 |

OTHER PUBLICATIONS

Reference Manual for the ADA Programming Language, US Dept. of Defense, Jul. 1980.
Communicating Sequential Processes, C.A.R. Hoare, Comm. of the ACM, Aug. 1978, vol. 21, No. 8.
An Optimum Algorithm for Mutual Exclusion in Computer Networks, Glen Ricant et al. Comm. of the ACM, Jan. 1981, vol. 21, No. 1.
An Algorithm for Mutual Exclusion in Decentralized Systems, M. Maekawa, CAM Transactions on Computer Systems, vol. 3, No. 2, May 1985.
The Information Structure of Distributed Mutual Exclusion Algorithms, Sanders, ACM Transactions on Computer Systems, vol. 5, No. 3, Aug. 1987.
A Tree–Based Algorithm for Distributed Mutal Exclusion, K. Raymond, ACM Transactions on Computer Systems, vol. 2, #1, Feb. 1989.
Algorithms for Scalable Synchronization on Shaved Memory Multiprocessors, J. Mollor–Crumley, ACM Transactions on Computer Systems, vol. 9, No. 1, Feb. 1991.
Verification of Sequential and Concurrent Programs, Apt. & Olderog; Springer–Verlag, 1991.
The Science of Programming, D. Gries Springer–Verlag, 1981.
Computer Architecture R. Karin Prentice–Hall (1989) (CPT. 5).
The Design and Analysis of Parallel Algorithms, S. Akl, Prentice–Hall, 1989.
Executing Temporal Logic Programs, B.C. Moszkowski, Cambridge University Press, Copyright 1986, pp. 1–125.

Primary Examiner—Robert B. Harrell
Attorney, Agent, or Firm—Haugen and Nikolai, P.A.

[57] ABSTRACT

This invention computes by constructing a lattice of states. Every lattice of states corresponding to correct execution satisfies the temporal logic formula comprising a Definitive Axiomatic Notation for Concurrent Execution (DANCE) program. This invention integrates into a state-lattice computational model: a polymorphic, strong type system; visibility-limiting domains; first-order assertions; and logic for proving a program correctness. This invention includes special hardware means for elimination of cache coherency among other things, necessary to construct state-lattices concurrently. The model of computation for the DANCE language consisting of four, interrelated, logical systems describing state-lattices, types, domains, and assertions. A fifth logical system interrelates the other four systems allowing proofs of program correctness. The method of the present invention teaches programs as temporal formulas satisfied by lattices of states corresponding to correct execution. State-lattices that are short and bushy allow application of many processors simultaneously thus reducing execution time.

7 Claims, 41 Drawing Sheets

Figure 14 — Prior Art unsorted_employees=[Johnson, Swenson, Anderson, Larson, Carlson, Jackson, Henderson, and Peterson]
sorted_employees=[nil,nil,nil,nil,nil,nil,nil,nil]
number_of_employees=8

33 | orig=[Johnson, Swenson, Anderson, Larson, Carlson, Jackson, Henderson, Peterson]
final=[nil,nil,nil,nil,nil,nil,nil,nil]
low = 1, high = 8

Figure 16

LIST OF REFERENCE NUMERALS

| numeral denotes | figure(s) | |
|---|---|---|
| 101 | initial state | 1,2 |
| 102 | final state | 1,2 |
| 103 | intermediate state | 1,2 |
| 201 | process | 3 |
| 202 | active computation | 3 |
| 203 | process waiting | 3 |
| 204 | barrier synchronization | 3 |
| 301 | a and b have no value | 4 |
| 302 | a becomes ten | 4 |
| 303 | b becomes twenty | 4 |
| 304 | a becomes one hundred | 4 |
| 305 | synchronization point | 4 |
| 306 | a becomes one hundred-twenty | 4 |
| 307 | state transition | 4 |
| 310 | state s | 6 |
| 311 | state t | 6 |
| 312 | state u | 6 |
| 313 | state v | 6 |
| 314 | state w | 6 |
| 315 | state x | 6 |
| 316 | transition (s,t) | 6 |
| 317 | transition (s,v) | 6 |
| 318 | transition (t,u) | 6 |
| 319 | transition (v,w) | 6 |
| 320 | transition (u,x) | 6 |
| 321 | transition (w,x) | 6 |

Figure 44

DANCE/MULTITUDE CONCURRENT COMPUTATION

BACKGROUND OF THE INVENTION

1. Field of the Invention

This invention relates to a method for the execution of plural computer programs being executed by a multiplicity of processors in a parallel configuration, and more specifically to performing multiple state transitions simultaneously.

2. Discussion of the Prior Art

New Parallel Language Needed

I surveyed ways to program parallel machines. Despite contentions to the contrary, I do not consider SIMD (single-instruction, multiple-datastream) machines like the Connection Machine (CM-2) to be parallel processors. SIMD machines are restricted to performing the same operation in many cells and thus can perform only a narrow range of applications. Most applications require much data-dependent branching that degrades performance on SIMD machines, such as the Cray YMP-8 and CM-2 alike. FORTRAN, with a vectorizing compiler, is appropriate for SIMD machines. Every attempt to wring efficient, massive parallelism from conventional FORTRAN programs has failed. Only programs expressed with a language embodying an inherently parallel model of computation can execute efficiently in parallel.

The challenge to those wishing to exact optimum performance from highly parallel processors is to coordinate activities in processing nodes that are doing different things. Modifications to special-purpose languages like LISP and PROLOG to incorporate futures and guards, respectively, are problematic, addressing restricted application domains of largely academic interest.

Then there are the many extensions of sequential languages. Such extensions fall into two classes: "processes" and "doall". Ada is perhaps the best example of a process-based language. Each Ada task (i.e. process) represents a single thread of control that cooperates with other tasks through message passing. Communicating Sequential Processes described in "Communicating Sequential Processes," C. A. R. Hoare, *Communications of the ACM*, Vol. 21, No. 8, August 1978 forms the underlying model of computation for message-passing, process-based languages. However, deciding whether an arbitrary collection of processes is deadlock-free is undecidable and proving that a particular collection of processes is deadlock-free is onerous. Furthermore, such pairwise communication and synchronization is unnecessarily restrictive thus limiting the degree of parallelism. Finally, a programmer writes (essentially) a plurality of sequential programs, rather than a single, parallel program. The "doall" is just a FORTRAN do-loop in which all the iterations are instead performed concurrently; again a collection of sequential programs.

Current, Conventional, Concurrent Computing

Traditional, sequential computing causes a sequence of states to be created so that the last state holds the data desired. FIG. 1 illustrates sequential computing starting at an initial state (101), proceeding through intermediate states (103), and terminating in a final state (102). The values of program variables at a particular instant of time comprise a state, depicted as circles. In state diagrams, time always flows down the page, that is, the state at the top of the figure occurs first followed by the state(s) connected by a line. Broken lines indicate repetition or "more of the same."

In "parallel" execution several sequences of state transitions occur concurrently. FIG. 2 depicts parallel execution in doall style. The state diagram shows state transitions occurring as "parallel" sequences. The conception of parallel processing as a collection of sequential executions characterizes the prior art that this invention supersedes.

Two mechanisms allow communication between sequential processes: message-passing or shared-memory. Load balancing and problem partitioning have produced many academic papers for either message-passing or shared-memory paradigms—nearly all yielding poor performance.

Mutual exclusion (MutEx) via message passing (i.e. for distributed systems, no shared state) is horribly inefficient. If the application needs MutEx often, performance will suffer. "An Algorithm for Mutual Exclusion in Computer Networks," Glenn Ricart & Ashok K. Agrawala, *Communications of the ACM*, Vol. 24, No. 1, January 1981, for a discussion of prior art O(N) request/reply algorithm, which really needs $O(N^2)$ messages when everyone wants the lock. "A√N Algorithm for Mutual Exclusion in Decentralized Systems," Mamoru Maekawa, *ACM Transactions on Computer Systems*, Vol. 3, No. 2, May 1985, reduces messages to $O(\sqrt{N})$ with an elegant multidimensional geometry. Sanders' generalized MutEx algorithm in more convoluted terms in her article, "The Information Structure of Distributed Mutual Exclusion Algorithms," Beverly A. Sanders, *ACM Transactions on Computer Systems*, Vol. 5, No. 1, August 1987. She considers deadlock freedom (absence of possibility that computation ceases because every process is waiting to acquire a lock held by a different process), but the basic model which she proposes needs further augmentation to detect and recover from deadlock. Of course, only a wordy explanation substitutes for correctness proof. Therefore the desired interference freedom provided by MutEx is not achieved. Raymond in "A Tree-Based Algorithm for Distributed Mutual Exclusion," *ACM Transactions on Computer Systems*, Vol. 7, No. 1, February 1989, further reduced the number of messages to O(logN) by increasing the latency, which could easily become a significant burden if processes need the lock briefly.

Controlling access to shared variables is so difficult that designers have resorted to the message-passing model in which all state variables are local to some process and processes interact exclusively, via exchange of messages. Inevitably, two different kinds of system-wide operations barrier synchronization and remote state acquisition are required by the algorithm or application. They are notoriously inefficient. Barrier synchronization ensures that all the parallel computations in one phase are completed before the next phase is begun. Remote state acquisition occurs when the application's data cannot be partitioned disjointly so that all processes use values exclusively from its partition held in local memory. For example, advanced magnetic resonance imaging (MRI) research seeks to analyze brain scans and call to the attention of the radiologist any anomalies. Three-dimensional fast Fourier transform (FFT) is necessary for filtering and extraction of interesting features. The data consists of a 1 k by 1 k by 1 k array of floating point intensities. The first phase of the algorithm maps nicely by putting a 1 k by 1 k plane in each of 1 k processors. However integrating the third dimension finds the data in the worst possible distribution—every computation needs values that are possessed by each of the 1 k processors!

Barriers are an artifact of the popular yet problematic process paradigm. A static collection of sequential processes alternately work independently and wait for laggards. FIG. 3 depicts four processes (201) synchronized with barriers (204). Each process is actively computing (202) and then wait idly (203) until all other processes reach the barrier. The best known algorithms for barrier-synchronization take O(logP) time (with a large constant) for both message-passing and shared-memory models. This corresponds with the depth of a tree using either messages or flags.

A large body of academic work has been produced for both message-passing and parallel, random-access machine (PRAM) models, i.e. shared memory. Barrier synchronization in a message-passing model requires O(logP) time where P is number of processors, with a big constant proportional to message transmission latency. See "Algorithms for Scalable Synchronization on Shared-Memory Multiprocessors," John M. Mellor-Crummey and Michael L. Scott, *ACM Transactions on Computer Systems*, Vol. 9, No. 1, February 1991.

Consider an ideally parallelizable application that requires synchronization. A single processor would require N steps (time, $T_S$) to perform the application with L iterations of a single loop each requiring N/L steps. When parallelized, barrier synchronization is required at the end of each iteration taking logP steps. Real systems take many steps for each level of the synchronization tree. So the parallel time for each iteration, $T_i$ is N/(L*P)+logP and the whole application $T_p$, is $T_i$*L or N/P+L*logP steps. Speedup, S, is the ratio of sequential time to parallel time, $T_s/T_p$. Efficiency, E, is the speedup obtained divided by the number of processors used, S/P. In this case, $E=T_s/T_p*P=$ N/(N+P*L*logP).

| | |
|---|---|
| Total work to be done (sequential) | $T_s$ = N steps |
| Number of loop iterations | L |
| Sequential time per iteration | N/L |
| Parallel time per iteration | $T_i$ = N/(L*P) + logP |
| Total parallel time | $T_p$ = $T_i$*L = N/P + L*logP |
| Speedup | S = $T_s/T_p$ = N*P/(N + P*L*logP) |
| | S = P/(1 + (L/N)*P*logP) |
| Efficiency | E = S/P = N/(N + P*L*logP) |
| | E = 1/(1 + (L/N)*P*logP) ~ O(1/logP) |

When the number of processors is small, N>>P*L*logP, the efficiency can be quite good, close to 1. But as more processors are used (N≈P) the barrier synchronization overhead begins to dominate even when only a single barrier is needed.

Therefore, an application needing barrier synchronization on any conceivable message-passing architecture (N≈P), the minimum time of execution will be O(logP), the best speedup possible is O(P/logP), the efficiency can be no better than O(1/logP). Little wonder that efficiencies of even 10% are hard to achieve on parallel processors like CM-2, CM-5, NCube, Paragon, and T3D. They can perform no better than their theoretical model.

| | |
|---|---|
| Order parallel time | $T_p$ = O(logP) |
| Order speedup | S = O(P/logP) |
| Order efficiency | E = O(1/logP) |

Parallel Random-Access Machines (PRAMs) suffer similar fate. When most people think of "shared-memory" they imagine a PRAM—a bunch of sequential processors that can read and write the same memory locations. Many PRAM variations exist. Whether the memory locations can be accessed concurrently or exclusively and what happens for concurrent accesses constitute most of the PRAM model differences. Even unrealistic operations like storing the median or geometric mean of all concurrent writes still inflicts an O(logP) penalty for barrier synchronization same as message-passing.

Sequential algorithms have been traditionally analyzed using Turing machines. Both the time (number of steps) and the space (number of tape squares) are used to measure the complexity of a computation. Additionally whether the Turing machine has a unique next action (deterministic) or a set of possible next actions (nondeterministic) substantially affects the complexity measure of a computation.

The following paragraphs summarize three chapters of a recent book on parallel algorithms entitled "Synthesis of Parallel Algorithms", John H. Reif, editor, Morgan Kaufmann, 1993, that I believe is state-of-the-art computer science theory for shared-memory computers. The following sections quote heavily those authors (Faith E. Fich, Raymond Greenlaw, and Phillip B. Gibbons) and will be indented to indicate quotation.

PRAMs attempt to model the computational behavior of a shared-memory parallel processor. The alternative is shared-nothing, message-passing parallel processors, which are popular these days. PRAMs have many variations and have a large body of published scholarship. Fich, Greenlaw, and Gibbons cover the main kinds of PRAMs, which I deem represent the conventional wisdom about how to think about parallel computation. This paradigm has, so far, not yielded efficient, general-purpose, parallel processing. Thus the motive for the present invention.

Fich's chapter begins with a concise definition of a "synchronous" PRAM.

"The PRAM is a synchronous model of parallel computation in which processors communicate via shared memory. It consists of m shared memory cells $M_1$ . . . , $M_m$ and p processors $P_1$, . . . , $P_p$. Each processor is a random access machine (RAM) with a private local memory. During every step of a computation a processor may read from one shared memory cell perform a local operation, and write to one memory cell. Reads, local operations, and writes are viewed as occurring during three separate phases. This simplifies analysis and only changes the running time of an algorithm by a constant factor." (Underline mine.)

Throughout Fich's paper she assumes a synchronous PRAM: single-instruction, multiple-datastream (SIMD). This allows her to ignore synchronization costs and hassles in her analyses. The synchronous PRAM cannot model MIMD machines with their independent, data-dependent branching is and uncertain timing. Having all processors read-execute-write each step sidesteps sticky issues like what happens when a memory cell is read and written simultaneously. Furthermore the execute part of a step can perform any calculation whatsoever! So the lower bounds derived for various algorithms concentrate solely on shared-memory accesses while totally ignoring the real computation—data transformation in the execute part of the step.

Fich describes "forking" PRAM in which new processors are created with a fork operation (as in Unix). A forking PRAM can dynamically describe parallel activities at run-time. (Regular PRAMs have a fixed set of processes/processors.) But a forking PRAM still is a collection of sequential execution streams, not a single, parallel program.

"A forking PRAM is a PRAM in which a new processor is created when an existing processor executes a fork operation. In addition to creating the new processor, this operation specifies the task that the new processor is to perform (starting at the next time step)."

After defining a forking PRAM Fich never mentions it again. But she does make claims for PRAMs about "programmer's view," "ignoring lower level architectural details such as . . . synchronization," and "performance of algorithms on the PRAM can be a good predictor of their relative performance on real machines," that I completely disagree with. Since PRAMs exemplify the process paradigm (collection of sequential executions) they may adequately predict performance of algorithms and architectures similarly afflicted (all machines built so far), but certainly not what's possible.

Most distinctions between PRAMs involve memory access restrictions. The most restrictive is called exclusive-read exclusive-write (EREW). Ensuring that two processors don't write to the same memory cell simultaneously is trivial with a synchronous PRAM since all operations are under central control. The other four memory access restrictions are: concurrent-read exclusive write (CREW), COMMON, ARBITRARY, and PRIORITY. The last three restrictions differ in how concurrent writes are handled. With COMMON, values written at the same time to the same cell must have the same value. With ARBITRARY, any value written in the same step may be stored in the memory cell. With PRIORITY, the value written by the highest priority process (lowest process number) is stored in the memory cell.

Obviously an EREW program would run just fine on a CREW machine; the concurrent read hardware would not be used. The five memory restrictions Fich uses nest nicely in a power hierarchy:

PRIORITY>ARBITRARY>COMMON>CREW>EREW

Fich then spends much of her chapter showing how many steps it takes one PRAM to simulate a single step of another.

Proving that EREW can simulate a step of PRIORITY using O(log p) steps and p*m memory cells takes Fich two pages of wordy prose. Essentially the simulation takes three phases:

Phase 1: Each processor that wants to write marks its dedicated cell from the p EREW cells used for each PRIORITY cell.

Phase 2: By evaluating (in parallel) a binary tree of all processors that want to write the highest priority processor is found.

Phase 3: The winning processor writes the "real" memory cell.

Since the height of the binary tree is O(log p) it takes O(log p) steps for an EREW PRAM to emulate a PRIORITY PRAM. Much of Fich's chapter is devoted to convoluted schemes by which one model simulates another without mentioning any applications that benefit from a more powerful and expensive model.

Gibbons finally provides a reasonable PRAM model in the very last chapter of this 1000 page book. None of the other authors constrain themselves to reasonable models, thus limiting the value of their work. In Gibbons' PRAM model:

"Existing MIMD machines are asynchronous, i.e., the processors are not constrained to operate in lock-step. Each processor can proceed through its program at its own speed, constrained by the progress of other processors only at explicit synchronization points. However in the (synchronous) PRAM model, all processors execute a PRAM program in lock-step with one another. Thus in order to safely execute a PRAM program on an asynchronous machine, there must be a synchronization point after each PRAM instruction. Synchronizing after each instruction is inherently inefficient since the ability of the machine to run asynchronously is not fully exploited and there is a (potentially large) overhead in performing the synchronization. Therefore our first modification to the PRAM model will be to permit the processors to run asynchronously and then charge for any needed synchronization." (underline mine)

Additionally shared memory accesses are charged more than local accesses: "To keep the model simple we will use a single parameter, d, to quantify the communication delay to memory. This parameter is intended to capture the ratio of the median time for global memory accesses to the median time for a local operation."

I invented the Layered class of multistage interconnection networks [U.S. Pat. No. 4,833,468, LAYERED NETWORK, Larson et al., May 23, 1989] specifically to keep d small. For the Multitude architecture (interconnected by a Layered network) the ratio of time for global memory accesses to local memory accesses is about 3 to 4. This compares with a ratio of local memory access time to cache hit time of 20 to 30.

Gibbons' asynchronous PRAM model uses four types of instructions: global read, global write, local operation, and synchronization step. The cost measures are:

| Instruction | Cost |
| --- | --- |
| local operation | 1 |
| global read or write | d |
| k global reads or writes | d + k − 1 |
| synchronization barrier | B |

The parameter B=B(p), the time to synchronize all the processors, is a nondecreasing function of the number of processors, p, used by the program. In the Asynchronous PRAM model, the parameters are assumed to obey the following constraints: $2 \leq d \leq B \leq p$. However a reasonable assumption for modeling most machines is that $B(p) \in O(d/\log p)$ or $B(p) \in O(d/\log p/\log d)$.

Here again is evidence of a logP performance hit for barrier synchronization.

A synchronous EREW PRAM can be directly adapted to run on an asynchronous PRAM by inserting two synchronization barriers, one after the read phase and write phase of the synchronous PRAM time step. Thus a single step of a synchronous PRAM can be simulated in 2B+2d+1 time on an asynchronous PRAM. Therefore a synchronous EREW PRAM algorithm running in t time using p processors will take t(2B+2d+1) time on an asynchronous PRAM—a significant penalty. Gibbons shows how to maintain the O(Bt) running time but use only p/B processors by bunching the operations of B synchronous processors into a single asynchronous processor thus getting more work done for each barrier synchronization.

Gibbons transforms an EREW algorithm for the venerable "all prefix sums" operation for an asynchronous PRAM yielding an O(B log n/log B) time algorithm which isn't too bad. Gibbons presents asynchronous versions of descaling lemmas (performing the same application with fewer processors) which tack on a term for the barrier synchronizations. Still he uses many barriers in order to obtain behavior similar to synchronous PRAMs. Only when applications are synchronized just when they need it, and those needed synchronizations are really fast, $B \approx d \approx 1$, will scaled-up parallel processing be possible, which is the contribution of this invention and Layered networks.

Gibbons considers several algorithms that run in $O(B \log n/\log B)$ time. In particular, he proves an interesting theorem about summing numbers:

> Given n numbers stored one per global memory location, and the following four types of instructions: L:=G, L:=L+L, G:=L and "barrier," where L is a local cell and G is a global cell, then the sum of n numbers on an Asynchronous PRAM with this instructions set requires $\Omega(B \log n/\log B)$ regardless of the number of processors. This is interesting because Multitude can sum n integers in $O(1)$ time! Gibbons concludes with "subset synchronization" in which only a subset of processors in the machine need synchronize. Since the barriers involve fewer processors, and thus are shorter, summing numbers runs marginally faster.

So the best PRAM model I could find charges PRAM algorithms for their "cheating," but still offers no insights about how to efficiently compute on an MIMD machine.

Temporal Logic

Moszkowski in his Executing Temporal Logic Programs [Cambridge University Press, 1986] presented a temporal-logic programming language. His language, Tempura, allows description of parallel execution (unsatisfactorily) within a single program expression. The foundation for Tempura is interval temporal logic. A Tempura interval is a non-empty sequence of states. A state is determined by the values of program variables at a particular instant of time. The sequence of states that form an interval provide a discrete notion of time.

The semantics of Tempura were much different than any I had previously encountered. Instead of programs being a step-by-step recipe for how to do the computation, they were logical formulas that are "satisfied" by constructing a "model" that makes the formula "true." Unfortunately the models constructed are simply sequences of states—the process model underlying PRAMs.

The semantics of what is referred to herein as DANCE programs, although also temporal logic formula based, are satisfied by constructing models with a different and superior mathematical structure that allows efficient execution on a plurality of computational engines. It is this mathematical structure that forms the core of this invention.

BACKGROUND—MATHEMATICAL FOUNDATIONS

In this section of the specification, we explain the notation used throughout this document and some necessary elementary notions from mathematical logic. Although these notations are fairly standard, this presentation is adapted from Apt and Olderog's book [Verification of Sequential and Concurrent Programs, Krzysztof R. Apt, and Ernst-Ruidiger Olderog, Springer-Verlag, 1991].

Sets

It is assumed that the reader is familiar with the notion of a set, a collection of elements. Finite sets may be specified by enumerating their elements between curly brackets. For example $\{T, F\}$ denotes the set consisting of the Boolean constants T (true) and F (false). When enumerating the elements of a set, I sometimes use ". . . " as a notation. For example, $\{1, \ldots, n\}$ denotes the set consisting of the natural numbers from 1 to n where the upper bound, n, is a natural number that is not further specified.

More generally, sets are specified by referring to some property of their elements:

$$\{x | P\}$$

denotes the set consisting of all elements x that satisfy the property P. The bar, |, can be read "such that." For example, $$\{x | x \text{ is an integer and x is divisible by 2}\}$$

denotes the infinite set of all even integers.

We write a A to denote that a is an element of the set A, and b A to denote that b is not an element of A. Often it is convenient to refer to a given set when defining a new set. We write $$\{x \mathring{A} A | P\}$$

as an abbreviation for $\{x | x \in A \text{ and } P\}$.

Some sets have standard names ø denotes the empty set, Z denotes the set of all integers, and $N_0$ denotes the set of all natural numbers including zero.

In a set one does not distinguish repetitions of elements. Thus $\{T, F\}$ and $\{T, T, F\}$ are the same set. Similarly, the order of elements is irrelevant. In general, two sets A and B are equal if-and-only-if the have the same elements; in symbols: $A=B$.

Let A and B be sets. Then $A \subseteq B$ (and $B \supseteq A$) denotes that A is a subset of B, $A \cap B$ denotes the intersection of A and B, $A \cup B$ denotes the union of A and B, and $A-B$ denotes the set difference of A and B. Symbolically, $A \subseteq B$ if $a \in B$ for every $a \in A$, $A \cap B = \{a | a \in A \text{ and } a \in B\}$, $A \cup B = \{a | a \in A \text{ or } a \in B\}$, $A - B = \{a | a \in A \text{ and } a \notin B\}$.

Note that $A=B$ if both $A \subseteq B$ and $B \subseteq A$. A and B are disjoint if they have no element in common that is $A \cap B = \emptyset$.

The definitions of intersection and union can be generalized to more than two sets. Let $A_i$ be a set for every element i of some other set J. Then $\cap_{i \in J} A_i = \{a | a \in A_i \text{ for all } i \in J\}$ $\cap_{i \in J} A_i = \{a | a \in A_i \text{ for some } i \in J\}$ For a finite set A, card(A) denotes the cardinality, or the number of elements of A. For a non-empty, finite set $A \subseteq Z$, min(A) denotes the minimum of all integers in A.

Tuples

In sets the repetition of elements and their order is irrelevant. If ordering matters, we use ordered pairs and tuples. For elements a and b, not necessarily distinct, (a,b) is an ordered pair or simply pair. Then a and b are called components of (a,b). Two pairs (a,b) and (c,d) are identical (a,b)=(c,d), if-and-only-if a=c and b=d.

More generally, let n be any natural number, $n \in N_0$. Then if a1, . . . , an are any n elements then (a1, . . . , an) is an n-tuple. The element ai, where $i \{1, \ldots, n\}$ is called the i-th component of (a1, . . . , an). An n-tuple (a1, . . . , an) is equal to an m-tuple (b1, . . . , bm) if-and-only-if n=m and ai=bi for all i $\{1, \ldots, n\}$. More generally, let n be any natural number, $n \in N_0$. Then if $a_1, \ldots, a_n$ are any n elements, then $(a_1, \ldots, a_n)$ is an n-tuple. The element $a_i$, where $i \in \{1, \ldots, n\}$ is called the i-th component of $(a_1, \ldots, a_n)$. An n-tuple $(a_1, \ldots, a_n)$ is equal to an m-tuple $(b_1, \ldots, b_m)$ if-and-only-if n=m and $a_i=b_i$ for all $i \in \{1, \ldots, n\}$. Note that 2-tuples are pairs. Additionally, a 0-tuple is written as (), and a 1-tuple as (a) for any element a.

The Cartesian product $A \times B$ of sets A and B consists of all pairs (a,b) with $a \in A$ and $b \in B$. The n-fold Cartesian product $A_1 \times \ldots \times A_n$ of sets $A_1, \ldots, A_n$ consists of all n-tuples $(a_1, \ldots, a_n)$ with $a_i \in A_i$ for $i \in \{1, \ldots, n\}$. If all $A_i$ are the same set A, then the n-fold Cartesian product $A \times \ldots \times A$ is also written $A^n$.

Relations

A binary relation R between sets A and B is a subset of the Cartesian product $A \times B$, that is, $R \subseteq A \times B$. If $A = B$ then R is called a relation on A. For example, $$\{(a,1),(b,2),(c,2)\}$$

is a binary relation between $\{a,b,c\}$ and $\{1,2\}$. More generally, for any natural number n an n-ary relation R between $A_1, \ldots, A_n$ is a subset of the n-fold Cartesian product $A_1 \times \ldots \times A_n$, that is, $R \subseteq A_1 \times \ldots \times A_n$. Note that 2-ary relations are the same as binary relations. Instead of 1-ary and 3-ary relations one usually uses unary and ternary instead.

Consider a relation R on a set A. R is called reflexive if $(a,a) \in R$ for all $a \in A$; it is called irreflexive if $(a,a) \notin R$ for all $a \in A$. R is called symmetric if for all $a,b \in A$ whenever $(a,b) \in R$ then also $(b,a) \in R$; it is called antisymmetric if for all $a,b \in A$ whenever $(a,b) \in R$ and $(b,a) \in R$, then $a = b$. R is called transitive if for all $a,b,c \in A$ whenever $(a,b) \in R$ and $(b,c) \in R$, then also $(a,c) \in R$.

The transitive, reflexive closure $R^*$ of a relation R on a set A is the smallest transitive and reflexive relation on A that contains R as a subset. The transitive, irreflexive closure $R^+$ of a relation R on a set A is the smallest transitive and irreflexive relation on A that contains R as a subset. The transitive, irreflexive closure is necessary because the graphs considered later do not have self-loops. The "plus" superscript may not be standard.

The relational composition $R_1 \circ R_2$ of relations $R_1$ and $R_2$ on a set A is defined as follows:

$$R_1 \circ R_2 = \{(a,c) | \text{there exists } b \in A \text{ with } (a,b) \in R_1 \text{ and } (b,c) \in R_2\}.$$

For any natural number n the n-fold relational composition $R^n$ of of a relation R on a set A is defined inductively as follows:

$$R^0 = \{(a,a) | a \in A\},$$

$$R^{n+1} = R_n \circ R.$$

Note that $$R^* = \bigcup_{n \in N_0} R^n$$

and that $$R^* = \bigcup_{n \in N_0 - \{0\}} R^n = R^* - R^0$$

where $R^1 = R$.

Membership of pairs in a binary relation R is mostly written in infix notation, so instead of $(a,b) \in R$ one usually writes aRb.

Any binary relation $R \subseteq A \times B$ has an inverse $R^{-1} \subseteq B \times A$ defined as:

$$bR^{-1}a \text{ iff } aRb.$$

Functions

Let A and B be sets. A function or mapping from A to B is a binary relation $f$ between A and B with the following special property: for each element $a \in A$ there is exactly one element $b \in B$ with $afb$. Mostly we use prefix notation for function application and write $f(a) = b$ instead of $afb$. For some functions, however, we use postfix notation and write $af = b$. In both cases b is called the value of $f$ applied to the argument a. To indicate that $f$ is a function from A to B we write $$f: A \rightarrow B.$$

The set A is called the domain of $f$ and the set B is the co-domain of $f$.

Consider a function $f: A \rightarrow B$ and some set $X \subseteq A$. Then the restriction of $f$ to X is denoted by $f[X]$ and defined as the Intersection of $f$ (which is a subset of $A \times B$) with $X \times B$:

$$f[X] = f \cap (X \times B).$$

We are sometimes interested in functions with special properties. A function $f: A \rightarrow B$ is called one-to-one or injective if $f(a_1) = f(a_2)$ for any two distinct elements $a_1, a_2 \in A$; it is called onto or surjective if for every element $b \in B$ there exits an element $a \in A$ with $f(a) = b$; it is called bijective if it is both injective and surjective.

Consider a function whose domain is a Cartesian product, say $f: A_1 \times \ldots \times A_n \rightarrow B$. Then it is customary to drop one pair of parentheses when applying $f$ to an element $(a_1, \ldots, a_n) \in A_1 \times \ldots \times A_n$. We also say $f$ if an n-ary function.

Consider a function whose domain and co-domain coincide, say $f: A \rightarrow A$. An element $a \in A$ is called a fixed point of $f$ if $f(a) = a$.

Sequences

In the following let A be a set. A sequence of elements from A of length $n \geq 0$ is a function $f: \{1, \ldots, n\} \rightarrow A$. We write a sequence $f$ by listing the values of $f$ without punctuation in the order of ascending arguments, that is, as $$a_1 \ldots a_n$$

where $a_1 = f(1), \ldots, a_n = f(n)$. Then $a_i, i \in \{1, \ldots, n\}$ is referred to as the i-th element in the sequence $a_1 \ldots a_n$. A finite sequence is a sequence of any length $n \geq 0$. A sequence of length 0 is called the empty sequence and is denoted by $\epsilon$.

We also allow countably infinite sequences. An infinite sequence of elements from A is a function $\xi: N_0 \rightarrow A$. To exhibit the general form of an infinite sequence $\xi$ we typically write $$\xi: a_0 \, a_1 \, a_2 \ldots$$

if $a_i = \xi(i)$ for all $i \in N_0$. Then i is called the index of the element $a_i$.

Consider now relations $R_1, R_2, \ldots$ on a set A. For any finite sequence $a_0 \ldots a_n$ of elements from A with $$a_0 \, R_1 \, a_1, \, a_1 \, R_2 \, a_2, \ldots, a_{n-1} \, R_n \, a_n$$

we write a finite chain $$a_0 \, R_1 \, a_1 \, R_2 \, a_2 \ldots a_{n-1} \, R_n \, a_n.$$

For example, using the relations $=$ and $<$ on Z, we may write $$a_0 = a_1 < a_2 < a_3 = a_4.$$

We apply this notion also to infinite sequences. Thus for any infinite sequence $a_0 \, a_1 \, a_2 \ldots$ of elements of A with $$a_0 \, R_1 \, a_1, \, a_1 \, R_2 \, a_2, \, a_2 \, R_3 \, a_3, \ldots$$

we write an infinite chain $$a_0 \, R_1 \, a_1 \, R_2 \, a_2 \, R_3 \, a_3 \ldots$$

Such a chain stabilizes if from some index n onwards all elements $a_i$ with $i \geq n$ are identical $$a_0 \; R_1 \; a_1 \; R_2 \; a_2 \ldots a_{n-1} \; R_n \; a_n = a_{n+1} = a_{n+2} = \ldots$$

Apt and Olderog use chains to describe the computations of programs. This invention does not. Chains represent the sequential paradigm of computation that permeates computer science. It is the fundamental limiting factor for both the kind of programs Apt and Olderog can handle, and the efficiency with which those programs can be executed.

Strings

A set of symbols is often called an alphabet. A string over an alphabet A is a finite sequence of symbols from A. For example 1+2 is a string over the alphabet {1,2,+}. The syntactic objects considered in this treatise are strings. We shall introduce several classes of strings: expressions, assertions, temporal predicates, programs, and correctness formulas.

We use $\equiv$ for the syntactic identity of strings. For example 1+2≡1+2 but not 1+2≡2+1. The symbol = will be used for the semantic equality of objects. Thus 1+2=2+1.

The concatenation of strings $s_1$ and $s_2$ yields the string $s_1 s_2$ formed by first writing $s_1$ and then $s_2$ without intervening spaces. A string t is called a substring of a string s if there exist strings $s_1$ and $s_2$ such that $s = s_1 t s_2$. Since $s_1$ and $s_2$ may be empty, s is always a substring of itself.

Partial Orders

A partial order is a pair $(A, \sqsubseteq)$ consisting of a set A and reflexive, antisymmetric, and transitive relation $\sqsubseteq$ on A. If $x \sqsubseteq y$ for some $x, y \in A$, we say that x is less than or equal to y or y is greater than or equal to x. Since $\sqsubseteq$ is reflexive, $x \sqsubseteq x$. Sometimes we consider irreflexive partial orders. These are pairs $(A, \sqsubseteq)$ consisting of a set A and an irreflexive and transitive relation $\sqsubseteq$ on A.

Consider now a partial order $(A, \sqsubseteq)$. Let $a \in A$ and $X \subseteq A$. Then a is called the least element of X if $a \in X$ and $a \sqsubseteq x$ for all $x \in X$. The element a is called an upper bound of X if $x \sqsubseteq a$ for all $x \in X$. Note that upper bound of X need not be elements of X. Let U be the set of all upper bounds of X. Then a is called the least upper bound of X if a is the least element of U. Similarly for greatest lower bound.

A partial order is called complete if A contains a least element and if for every ascending chain $$a_0 \sqsubseteq a_1 \sqsubseteq a_2 \ldots$$

of elements from A the set $$\{a_0, a_1, a_2, \ldots\}$$

has a least upper bound.

Graphs

A graph is a pair (V, E) where V is a finite set of vertices $$\{v_1, v_2, \ldots, v_n\}$$

and E is a finite set of edges where each edge is a pair of vertices $$\{(v_1, v_2), (v_1, v_3), \ldots, (b_i, v_j)\}.$$

All graphs we consider are directed in that the order of vertices within the pair describing an edge is significant.

The set of edges E forms a relation on the set of vertices:

$$E \subseteq V \times V.$$

The transitive, irreflexive closure of E, namely $E^+$, is especially important. In the temporal logic created for DANCE (i.e. this invention) $E^+$ is a partial order that corresponds to the concept of precedes.

A graph (V, E) is a lattice if $E^+$ is an irreflexive partial order, $\sqsubseteq$ it has a least element $1 \in V$, and an upper bound $u \in V$. All executions of DANCE programs will create a lattice of states.

Lattices may be combined to form new lattices in two ways. Consider two lattices $(V_1, E_1)$ and $(V_2, E_2)$ that have no vertices in common, $V_1 \cap V_2 = \emptyset$, least elements $1_1 \in V_1$ and $1_2 \in V_2$, and upper bounds $u_1 \in V_1$ and $u_2 \in V_2$. Their sequential combination may be performed as follows: substitute $u_1$ for $1_2$ in $V_2$ and $E_2$ and form the union of the vertices and edges, $(V_1 \cup V_2, E_1 \cup E_2)$. Their insertion combination may be performed as follows: choose an edge $e \in E_1$, $e = (v_i, v_j)$, remove it from $E_1$, substitute $v_i$ for $1_2$ and $v_j$ for $u_2$ in $V_2$ and $E_2$ and form the union of the vertices and edges, $(V_1 \cup V_2, E_1 \cup E_2)$. We assert, without proof, that sequential and insertion combination of lattices results in a lattice.

Proofs

A mathematical proof is a sequence of statements formulas or expressions, each of which is an axion of the logical system used, a given assumption, or a theorem derived by an inference rule from statements earlier in the sequence. The last theorem is usually the desired truth to be established such as the program meets its specifications and therefore is correct. We will exhibit proofs in the following form:

---

(1) theorem 1
⇒ [explanation why theorem 2 is derived from theorem 1]
(2) theorem 2
⇒
.
.
.
⇒
(n−1) theorem n−1
⇒ [explanation why theorem n is derived from theorems 1 to n−1]
(n) theorem n

---

Sometimes the parenthetical theorem numbers or obvious explanations may be omitted. The symbol iff will be used for if-and-only-if. The symbol ∃ will be used for there exists. The symbol ∀ will be used for for all.

Induction

Proofs frequently rely on induction. Usually this involves proving some property P that has a natural number parameter, say n. To prove that P holds for all $n \in N_0$, it suffices to proceed by induction on n, organizing the proof as follows:

induction basis: Prove that P holds for n=0.

Induction step: Prove that P holds for n+1 from the induction hypothesis that P holds for n.

The induction principle for natural numbers is based on the fact that the natural numbers can be constructed by beginning with the number 0 and repeatedly adding 1. By allowing more general construction methods, one obtains the principle of structural induction, enabling the use of more than one case at the induction basis and the induction step.

Grammars

To facilitate parsing as well as defining attributes to be synthesized or inherited, the grammar for DANCE has been written in Larson normal form or LNF.

LNF production rules:

Non-terminals are enclosed in angle brackets: <module>.

A production consists of a single non-terminal followed by ::= and then an expression in LNF describing what can be substituted for the non-terminal. Production expressions have have only three forms:

1) A single terminal.

<command>::="skip"

2) A pair of non-terminals.

<expression>::=<function_name><arguments>

3) A single nonterminal.

<declaration>::=<package>

Literals are strings enclosed by quotation marks e.g. "MODULE"; the quote character itself is represented by """".

For convenience, the language subset that is used for explaining this invention (simple DANCE) will use a more liberal notation.
Productions within <>
Literals within ""
One or More +
Zero or more *
Choice I
Grouping []
Zero or One ()

<expression>::=<function_name>"("<expression>+")"

<anything_name> is just an identifier grammatically, but is helpful to know when a "function" name is expected, that must have a function of that name declared somewhere.

Data, States, and Meaning

A model is a triple (T, S, $\mathcal{M}$) containing a set of data types T, a set of domains containing states S, and an interpretation $\mathcal{M}$ giving meaning to every symbol used in the language. For now, consider the data type domain, T, to be the integers. A state is a function mapping variables to values in T. For n state s in S and a variable X, let $\mathcal{M}$ s [[X]] denote X's value in state s. Each k-place function symbol f has an interpretation $\mathcal{M}$ s[[f]] which is a function mapping k elements in T to a single value:

$$\mathcal{M}\ s[[f]]\ [(T^k \rightarrow T)]$$

What this means is that every function symbol (like "plus") has a "meaning" (like $\mathcal{M}$ [[plus]]) that is a mapping from zero or more numbers (in this case two) to a single number.

$$\mathcal{M}\ s[[plus]]\ [(T^2 \rightarrow T)]$$

The line above doesn't say how "plus" works, just that it takes two numbers and returns one. Meanings aren't rigorously defined in this application for common arithmetic functions. Rather than develop axioms for number theory, the meanings of function symbols rely on intuition.

Moszkowski uses temporal predicates to affect side effects (cause state change). This may cause confusion since for correctness proofs we need assertions made with first-order predicate calculus. Keep the distinction clear between the text that represents executable program (temporal predicates) and text used to assert some property of state variables (assertions). Interpretations of predicate symbols are similar but map to truth values:

$$\mathcal{M}\ s[[p]]\ [(T^k \rightarrow \{true, false\})$$

Commands in the DANCE language are temporal predicates. Program execution tries to construct a model that makes all the temporal predicates "true." A model is a lattice or states that satisfies the temporal formula represented by program text.

OBJECTS AND ADVANTAGES

Several objects and advantages of my invention, the model of computation devised for the Definitive, Axiomatic Notation for Concurrent Execution (DANCE) computer programming language are:

Execution of many parts of the same program simultaneously, such that, hundreds, thousands, or more processors may be efficiently used;

program correctness may be proved;

special data structures may be created that allow many elements within the data structure to be simultaneously accessed without locking, blocking, or semaphores;

the meaning of every language construct is precisely and mathematically defined; and during program execution, processors may simultaneously self-schedule or post work for other processors to do.

Expanding and explaining the objects and advantages:

"Execution of many parts of the same program simultaneously"

The fundamental concern of this invention is reducing the time of program execution by using may processors (i.e. speedup). Existing computer architectures and computational models underlying parallel programming languages encounter fundamental, theoretical limitations of speedup. I invented the "Layered" class of multistage interconnection networks to permit construction of parallel computers comprising thousands of processors connected with a Layered network to create a fundamentally different computer architecture I called "Multitude." Unfortunately, the models of computation embodied explicitly or implicitly in programming languages adapted for parallel computers (e.g. Ada) would not allow full exploitation of the Multitude architecture computer's power and efficiency. Therefore, I invented a new computational model that allows a programmer to describe, and the machine to utilize, maximal opportunities for simultaneous execution of many parts of the same program. I endeavored to create an embodiment, the DANCE language, whose form is familiar (patterned after Ada) but whose semantics (i.e. meaning, or computational model) are radically different.

"hundreds, thousands, or more processors may be efficiently used"

Techniques that allow a dozen or two processors to cooperate effectively generally do not work for hundreds or thousands of processors. That is, the techniques don't "scale." Efficiency is of utmost importance; keeping the processors busy (almost) always doing something useful economically employs expensive equipment. Machines that use 512 processors to deliver speedup around 25 have not been, and will not be, purchased by savvy, private-sector users. Speedup greater than one thousand for a broad range of applications requires all aspects of an application to scale from description in an inherently-parallel language down to the topology of the network physically interconnecting the processors.

"program correctness may be proved"

Poor quality software is endemic today. No other product's flaws are so tolerated by society. Buggy programs inevitably result from the "group hack" methodology: code-test-fix-test-fix-release-get bug reports from users-fix-testrelease-get more bug reports-etc.-etc.-etc. Testing can only show the presence of errors, not their absence. Only when a proof that a program meets its specifications has been exhibited and confirmed can we be sure that a program does what we say it does and nothing more. Correctness proofs are even more important for parallel programs; debuggers that rely on a single locus of control to step through program executions cannot be extended for debugging of parallel programs. Furthermore, parallel programs must assure noninterference—one part of the execution doesn't adversely modify the values of variables needed by another part of the execution. This invention is precise, mathematical semantics for parallel programming languages which necessarily permits formal correctness proofs.

"special data structures may be created that allow many elements within the data structure to be simultaneously accessed without locking, blocking, or semaphores"

Achieving efficiency requires existing applications to be reprogrammed using data structures that can be accessed in parallel. Constructs that ensure exclusive use of some object by forcing other users to wait inevitably impede execution thus destroying efficiency. Many such constructs have been proposed or tried: critical sections, monitors, semaphores, locks, spin waiting, snoopy caches, message passing, etc. This invention incorporates semantics for combinable operations in which many or all of the processors can access the same variable at the same clock cycle yielding results as if the accesses occurred one-at-a-time. Provision by Layered networks of combinable operations for Multitude architecture computers is crucial for efficient program execution. Automatic conversion of existing, sequential programs for parallel execution is futile. Efficient parallel execution demands data structures, and their method of access, be radically different from their sequential counterparts.

"the meaning of every language construct is precisely and mathematically defined"

The semantics of most programming languages are defined in a "natural" language, usually English. Therefore a program compiled by different compilers for the same machine may not behave the same, though both compilers are "correct." In reality the compiler defines language semantics; compiler bugs are language features. Only when language and program semantics are precisely (formally, mathematically) defined can an implementation be deemed "correct." Furthermore, proof of program correctness demands formal language semantics.

"during program execution, processors may simultaneously self-schedule or post work for other processors to do"

When an idle processor can fetch its own work to do simultaneously with many other processors processors, can be kept busy doing useful work. Self-scheduling is essential for good efficiency. In addition anonymous processor scheduling greatly facilitates fault-tolerance; permanent failure of a processor, switch, or memory requires checkpoint/restart of the program and on-the-fly hardware reconfiguration to allow graceful degradation. Clever, but brittle, mapping schemes of applications onto architectures generally implode with the loss of a single processor or link.

Additional objects and advantages such as elimination of cache coherency, concurrent memory allocation cache writeback and others will become apparent from the specification and drawings.

DESCRIPTION OF DRAWINGS

FIG. 15 is a graph of a single node showing an initial state condition. The "first" node contains the values for variables at the beginning of the program, before any computation occurs;

FIG. 16 illustrates the initial state of procedure "sort". Because the actual parameter names (what the caller calls the variables) and the formal parameter names (used within a procedure) usually differ we show two nodes rather than just one. Since there is no state change the two nodes can be collapsed into one;

FIG. 44 is an instruction-set architecture table for Multitude architecture processors. It describes the functionality of every instruction and defines it in terms of temporal logic.

SUMMARY

Figure 1:
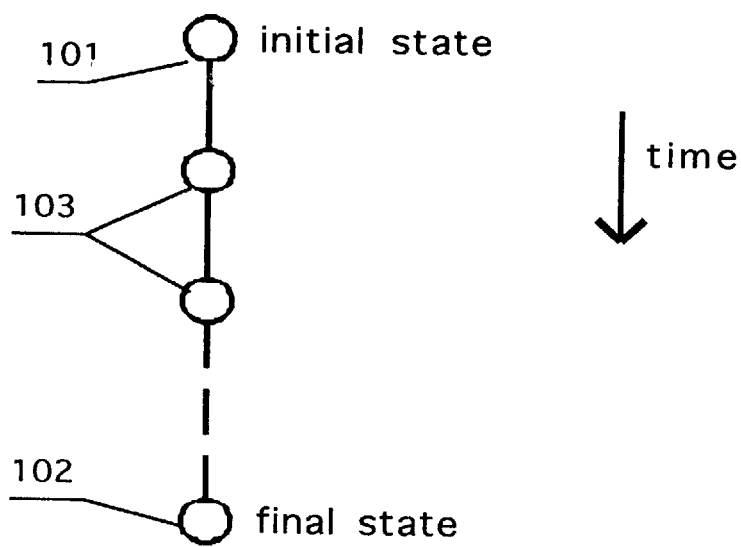
FIG. 1 is a diagram showing convention sequential execution and has one edge from every node except the final state and one edge to every node except the initial state; the final state is reachable from any state in the graph and any node is reachable from the initial state.
Figure 2:
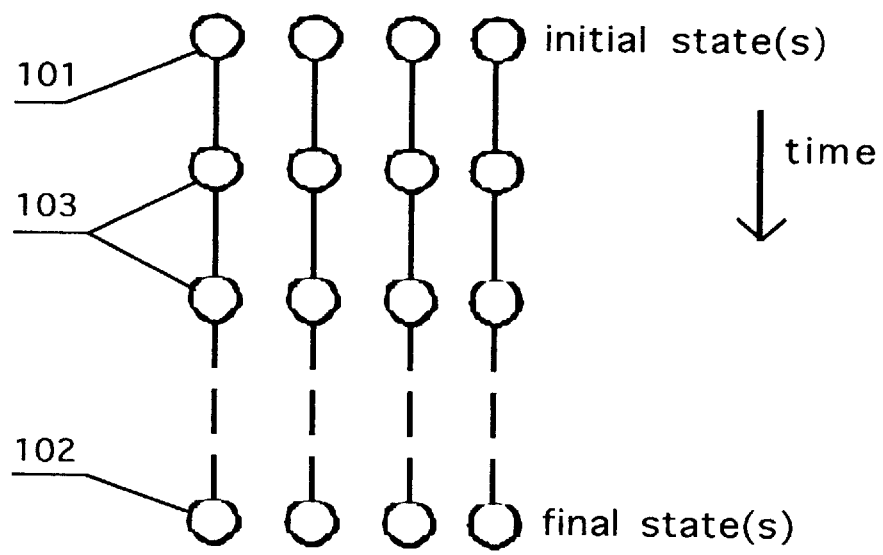
FIG. 2 is a diagram showing convention parallel execution as several (or many) sequential executions.
Figure 3:
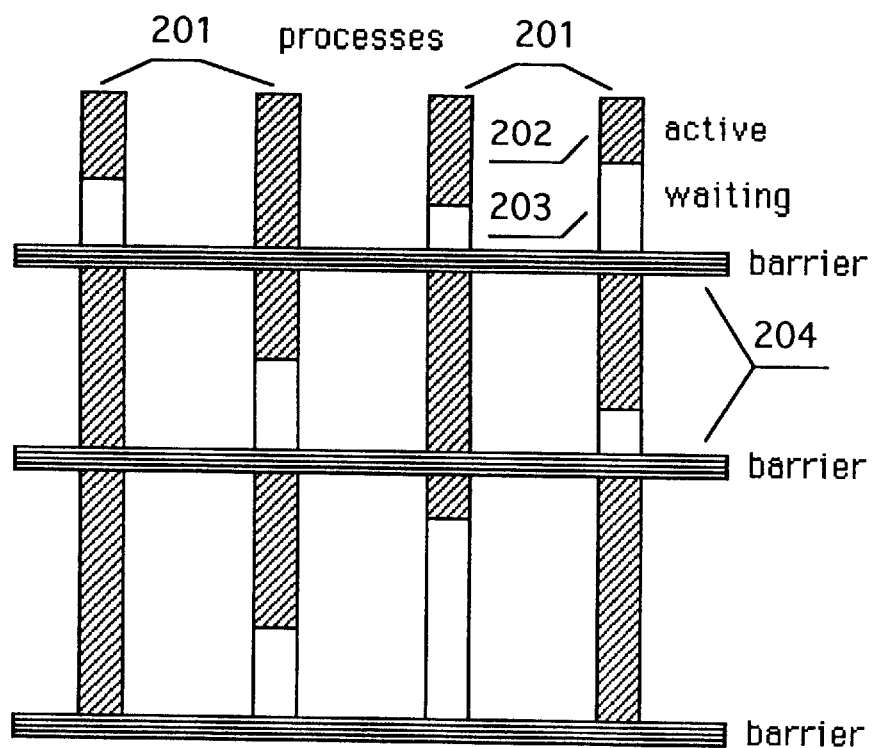
FIG. 3 is a diagram illustrating barrier synchronization which ensures that every process has completed a particular computation before any process may start its next computation.

Efficient, massively-parallel computing requires work scheduling that keeps every processor busy almost all the time. The dismal 3% to 5% efficiency found by the Army High-Performance Computing Research Center at the University of Minnesota (AHPCRC) across a broad range of applications results from inherent limitations in currently-available massively-parallel computers.

This is not for lack of trying.

A new class of multistage interconnection networks to provide rapid, voluminous communication between RISC processors is disclosed in my earlier U.S. Pat. No. 4,833,468 entitled "LAYERED NETWORK". The shared-memory, multiprocessor architecture based on my "Layered" class of networks has been dubbed "Multitude". Although Multitude nicely supports Ada [ANSI/MIL-STD-1815A] tasking and rendezvous are both difficult to use and retain an inherent sequential paradigm. Therefore, I tried to define a new language, "Samantha", that would allow programmers to define applications without circumscribing opportunities for parallel execution.

The objective of efficient computing with 1000s of processors has daunted computer architects for two decades. Achieving the objective requires major changes in the operation of virtually every aspect of hardware and software, with the important exception of fabrication technology. Sub-micron CMOS from any of a dozen silicon foundries will do fine. The trick to making a faster machine with slower parts is to buy more of those parts for less money, and then actually use a much bigger fraction of the parts doing something useful. Additionally, as fabrication technology improves, it can readily be incorporated without changing the architecture or the software.

The sequential paradigm is so powerful that it is difficult to think otherwise. It is natural to think of parallel computing as a plurality of sequential execution streams. Sometimes they cooperate by exchanging messages; sometimes they cooperate by sharing state variables; sometimes they wait until all other processors have finished a phase before proceeding to the next phase. Sequential languages have been augmented with means to fork off nearly identical copies of themselves, with hints how to use the data in parallel, and with libraries of pre-compiled procedures for message passing or shared-memory access. In all of these cases the paradigm is still replicated sequential control flow.

Virtually all of today's computer science theory deals with sequentiality or replicated sequentiality. Huge tomes of algorithms have been published and studied that are either sequential control flows or replicated sequential control flows. Regular expressions are recognized by finite-state machines; programs are parsed using a push-down automation coupled with a handle-recognizing finite-state machine. The compiler-construction tool, yacc, known and generally loathed by computer science students can only parse a subset of context-free grammars: LALR(1). The very definition of the LALR(1) class of languages has sequentiality built into it—those languages which can be parsed by push-down automata coupled with a handle-recognizing finite-state machines. The pull of sequentiality is so strong many people will not be able set it aside to consider a different way of computing.

DESCRIPTION OF A PREFERRED EMBODIMENT OF THE INVENTION

A mathematical model of computation is presented with the salient advantage that the computation may be performed by hundreds or thousands of microprocessors simultaneously and efficiently. Five mathematical systems interrelate in special ways. The five systems are: temporal logic, domains, type theory, assertions and proofs. Representing programs as special temporal logic formulae that are satisfied (executed) by lattices of state transitions form the core of this invention and provide the simultaneity and efficiency desired. Domains contain variable-value bindings that restrict visibility of variables allowing necessary proofs of non-interference, but without the locks, semaphores, or messages that hobble the prior art attempts. The type theory adapts an elegant, lambda-calculus-based, polymorphic, object-oriented type system for the temporal logic execution espoused here. Assertions in first-order predicate calculus define specifications and allowable intermediate states for programs. Since only proofs can assure program correctness, a proof system called BPL associates inference rules and/or weakest-precondition predicate transformers with each language production. A proof of soundness for BPL is presented; a logic is sound if it infers true fact from true facts.

Computational Model

A model of computation provides a mathematical foundation for the meaning of programs and their execution.

Hopcraft and Ullman [*Introduction to Automata Theory, Languages, and Computation*, Addison-Wesley, 1979] present a series of increasingly complex sequential machines and their models. Hopcraft and Ullman show correspondences between the machines and classes of languages recognized by those machines. State transitions are defined for an input character, the current state, and perhaps some internal data structure such as a stack. All the machines are sequential. Hoare ["Communicating Sequential Processes," C. A. R. Hoare, *Communications of the ACM*, Vol. 21, No. 8, August 1978] expands the sequential model by allowing multiple sequential machines. Others use models such as dataflow (Petri nets), logic programming (Horn clauses), or functional (lambda calculus) without much greater utility.

None of these models of computation adequately expresses parallel execution. Therefore I invented the state-lattice temporal logic model for DANCE.

Temporal Logic

Moszkowski in his *Executing Temporal Logic Programs* treats programs as temporal logic formulae. His language, "Tempura", allows description of traditional, process-based, parallel execution within a single program expression. The foundation for Tempura is interval temporal logic. A Tempura interval is a non-empty sequence of states. A state is determined by the values of program variables at a particular instant of time. The sequence of states that form an interval provide a discrete notion of time.

The formal model for DANCE presented here differs significantly from the formal model for Tempura:

States form a lattice not a sequence.

The domains visible at a particular state are both restricted and explicit.

Later a sophisticated, polymorphic type system will be substituted for the simple integer types presented here. Again later a first-order predicate calculus for describing sets of states very similar to those used by Apt/Dijkstra/Gries/Hoare for states in a guarded command language program is presented. A logical system for reasoning about the behavior of programs in terms of interval temporal logic lattices forms another significant, original contribution of this exposition.

Each DANCE interval may be thought of as a non-empty lattice of states partially ordered by their occurrence in time. A state is the values of a set of variables at an instant in time. The set of variables visible by a particular state is its domain.

An interval can have many intervening states between any pair of states. An interval may also be split but the subintervals must have a starting and ending state in common (i.e. every subinterval is itself a lattice, combinations of lattice must form lattices). Intervals are strung end-to-end by sequential composition invoked by the semicolons in the above program. Intervals are strung side-by-side by parallel composition invoked the ampersand.

Consider the following DANCE program fragment:

$a := 10$

;

$b := a + a \& a := a*a$

;

$a := b + a$

First 'a' is assigned the value ten. Then the values of 'b' and 'a' are computed in parallel. Finally 'a' is assigned the sum of 'a' and 'b'.

Figure 4:
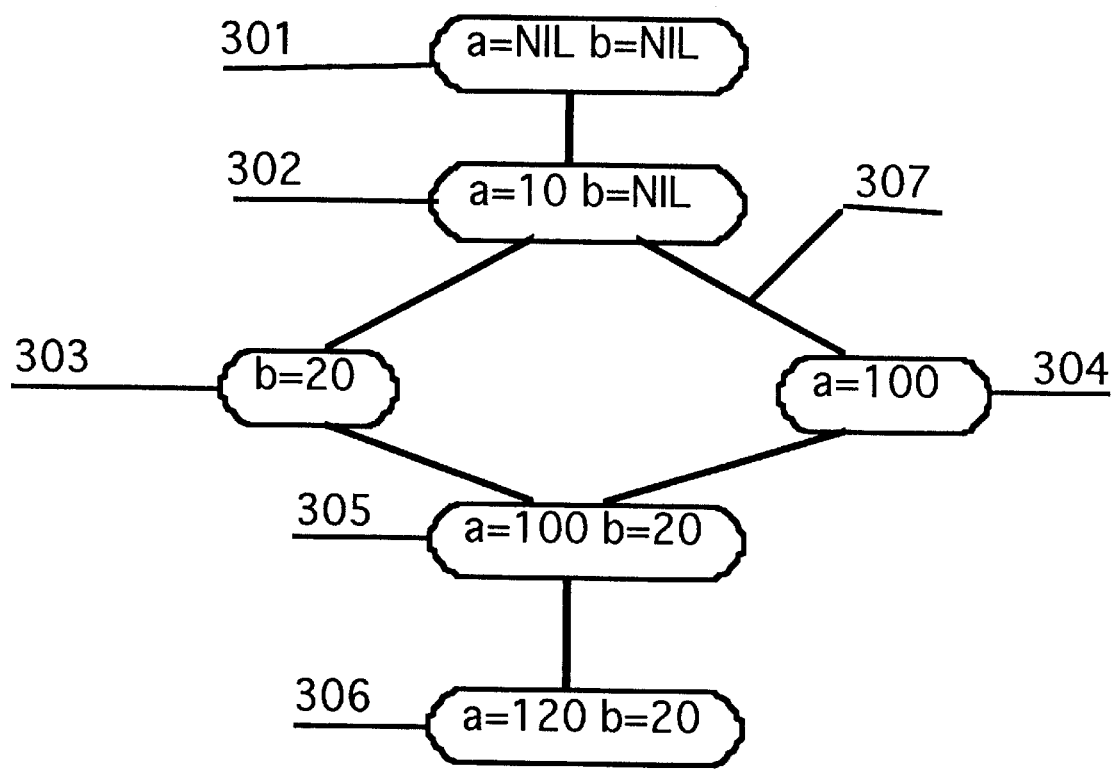
FIG. 4 represents a simple execution in which the values of b and a may be computed concurrently.

In this paper, interval lattices will be depicted as a set of circles (or stretched circles) connected by undirected edges. However those edges do have direction in that time flows down the page. FIG. 4 illustrates the lattice corresponding to the previous example.

In state 301 both a and b have no value. State 302 has a assigned 10. States 303 and 304 are independently determined and may occur simultaneously. State 305 is the synchronization point for the independent computations of 303 and 304. Finally state 306 is computed. The heavy lines between states like 307 are state transitions. The actual computation occurs during state transitions like 307 and are shown as arcs between the nodes holding state.

Please note that this model explicitly rejects the notion of some "universal" sequence of states comprised of states of individual processes in "some" sequential order. Such models although popular provide poor paradigms for programming parallel processors.

Commands in the DANCE language are really temporal predicates. Program execution tries to construct a model that makes all the temporal predicates true. A model is a lattice of states that satisfies the temporal formula represented by program text. The use of the word "model" here refers to creation of a lattice of states that satisfies a particular temporal logic formula embodied in a DANCE program. The "model" of computation for DANCE refers to the general method of constructing lattices of states concurrently.

Expressions and Predicates

This section starts to use all the mathematical machinery in the "Background—Mathematical Foundations" section hereof to define the meaning of DANCE programs, which is the model of execution that forms the core of this invention. Obviously, one could merely change the grammar and symbols used in the DANCE language, but if the underlying meaning of such languages and programs is based on temporal logic formulae satisfied by lattices of states, it would not depart from the spirit and scope of the invention.

Expressions in DANCE are built inductively as follows:

Variable names or constants X, Y, Z, 5, 1509, 0

Functions: $f(e_1, \ldots, e_k)$, where f is a function symbol defined by M, $k \geq 0$, and $e_1, \ldots, e_k$ are expressions.

DANCE grammar for expressions:

<expression>::=<function_name>"("<expression>+")"

<expression>::=<expression><function_symbol><expression>

<expression>::="("<expression>")"

<expression>::=<variable_name>

<expression>::=<literal>

The following are expressions:

X

X+Y (X+Y)/Z somefunction(X Y Z)

Formulas (constructions of temporal predicates) are built inductively as follows:

Predicates $p(e_1, \ldots, e_k)$, where p is a predicate symbol defined by M, $k \geq 0$, and $e_1, \ldots, e_k$ are expressions.

Like functions, we assume a basic set of relations complete with syntax.

Logical connectives: $w_1$ & $w_2$ and $w_1$, $w_2$ where $w_1$ and $w_2$ are predicates. The ampersand corresponds to "and." The semicolon corresponds to "after." One more logical connective (bounded universal quantification) will be added in a following section.

Parentheses may be used for grouping expressions. Predicates may be grouped with BEGIN-END.

DANCE programs are temporal logic formulas. Execution of a program seeks to construct an interval (e.g. model) that makes the formula true.

DANCE grammar for temporal logic formulas:

<command>::=<procedure_name>"("<expression>+")"

<command>::=<command>";" <command>

<command>::=<command>"&" <command>

<command>::="BEGIN" <command>"END"

The following are examples of formulas:

someprocedure(X Y Z)

dothis ; beforethat dothis & together

BEGIN dothis ; beforethat END & someprocedure(X Y Z)

Intervals

From the states in S, intervals are constructed from S+, the set of all nonempty, finite lattices of states. A state is the values assigned to variables at a particular point in time. FIG. 4 depicts a lattice of states of which 305 is a state.

For example, suppose the state variables are X and Y and states s, t, and u are:

s=(X=1, Y=2) t=(X=0, Y=3) u=(X=0, Y=6)

Sequential intervals can be represented as a string of state names enclosed in <>. Some examples are <s>::=<(X=1, Y=2)>

<sttus>::=<(X=1, Y=2) (X=0, Y=3) (X=0, Y=3) (X=0, Y=6) (X=1, Y=2)>

<ttt>::=<(X=0, Y=3) (X=0, Y=3) (X=0, Y=3)>

Figure 5:
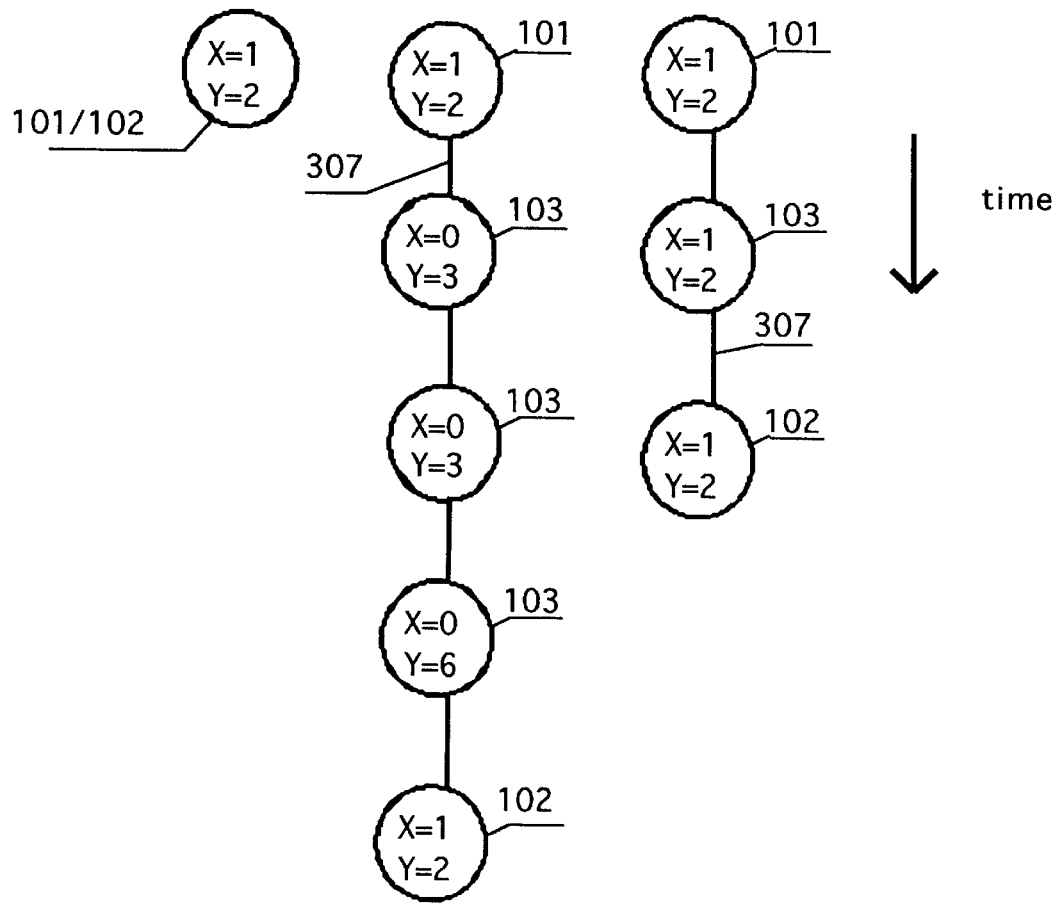
FIG. 5 diagrammatically show sequential intervals <s>, <sttus>, and <ttt>. Sequential intervals may be represented with either text or a graph.

FIG. 5 shows these sequential intervals in graph form.

DANCE expands the definition of an interval to a finite lattice instead of a sequence of states. This provides the mathematical machinery upon which correct, efficient, parallel execution will be based.

Figure 6:
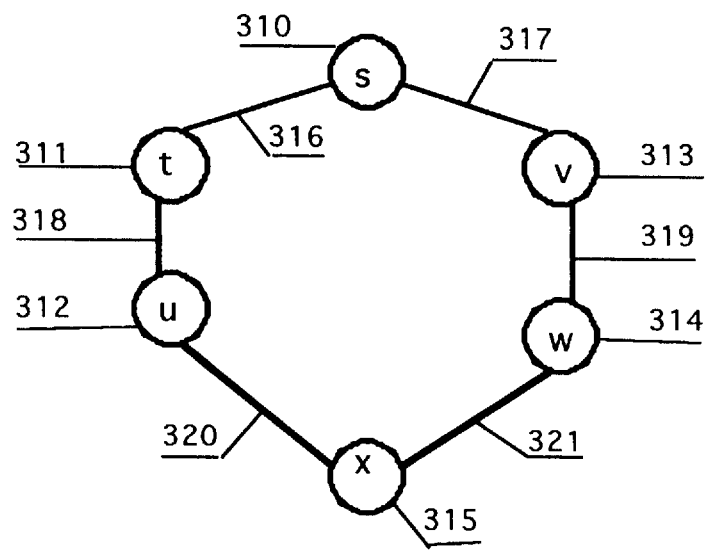
FIG. 6 illustrates a simple state lattice in accordance with the invention.

FIG. 6 depicts a simple lattice interval containing states s, t, u, v, w, and x. A textual representation could be:

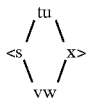

but notation good for sequential intervals becomes cumbersome for DANCE lattices so a graphical representation will be used instead.

A lattice of states, L, is a graph whose nodes are states, $S_L$, and arcs are state transitions, $T_L$, that must have the following properties:

An irreflexive partial order relation, $\sqsubset_L$, such that $$a \sqsubset_L b = \exists n > 0: \exists t_1, \ldots, t_n \in T_L: [t_1 = (a, s_1) \text{ and } t_n = (s_{n-1}, b) \text{ and}$$

$$\forall 1 < j < n: t_j = (s_{j-1}, s_j)]$$

A least upper bound (lub) and greatest lower bound (glb) functions are defined for any pair of states in $S_L$ as lub(a,b)=c ≡ a $\sqsubset_L$ c and b ≡$_L$ c and not ∃ d ∈ $S_L$:
  [a $\sqsubset_L$ d and b $\sqsubset_L$ d and d $\sqsubset_L$ c].
glb(a,b)=c ≡ c $\sqsubset_L$ a and c $\sqsubset_L$ b and not ∃ d ∈ $S_L$:
  [d $\sqsubset_L$ a and d $\sqsubset_L$ b and c $\sqsubset_L$ d]

There exists a distinguished states "start" and "end" defined as start(L)=∀ s ∈L:glb(s,start)=start, end(L)=∀ s ∈L:lub(s,end)=end.

Since time flows downward in interval graphs, the start state (which is the greatest lower bound of every state in the interval) is actually at the top of the graph. Conversely, the end state is at the bottom of the graph.

Construction of a lattice state graph is the act of computing. At the end, the values bound to variables are the results. State lattices may be hierarchically structured and composed.

FIG. 6 is a simple temporal lattice. In this case the lattice, L, is composed of states $S_L$={s,t,u,v,w,x}, (reference numbers 310, 311, 312, 313, 314, and 315 respectively) and state transitions $T_L$={(s,t), (s,v), (t,u), (v,w), (u,x), (w,x)}, (reference numbers 316, 317, 318, 319, 320, and 321). The partial order relation ⊏L corresponds to the notion of before. State s, 310, occurs before state w, 314, s⊏L w, because state transitions $t_1$=(s,v) 317 and $t_2$=(v,w) 319 are in $T_L$. The transitions form a chain from s 310 to w 314. Least upper bound (lub) and greatest lower bound (glb) are defined for all pairs of nodes. For example, the lub of u 312, and v 313 is node x 315. Similarly the glb of u 312, and v 313 is node s 310. The distinguished states start(L) and end(L) are s 310 and x 315.

Being a "partial" order provides opportunities for parallelism. Since neither u$\sqsubset_L$ w nor W⊏Lu, the transitions (t,u) 318, and (v,w) 319 may occur independently, even simultaneously. Good DANCE programs create execution lattices that are short and broad.

Temporal Meaning

Figure 7:
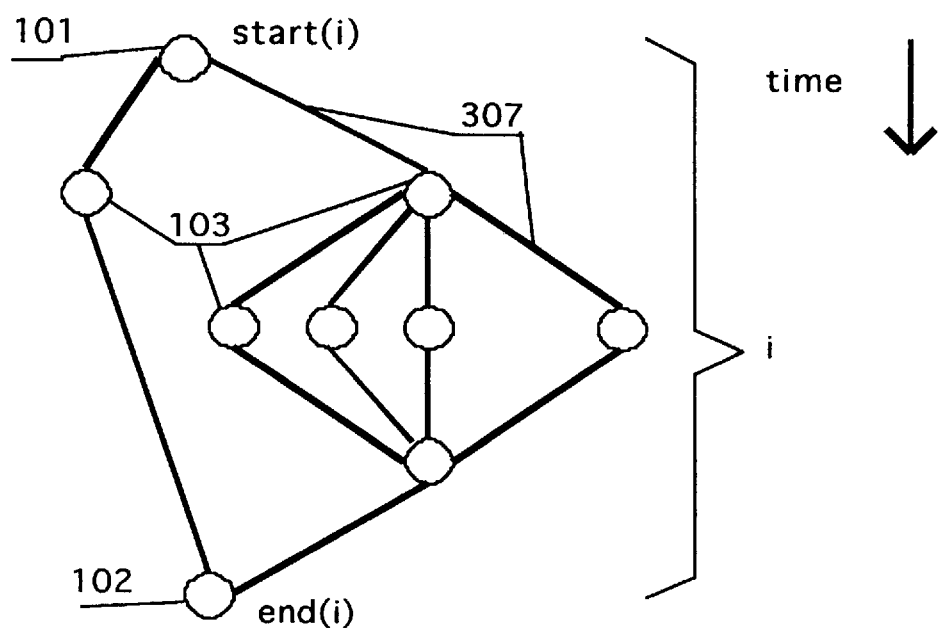
FIG. 7 diagrammatically illustrates an arbitrary interval. The interval, i, has multiple, concurrent computations.

Let I denote the set of all possible intervals. Consider an arbitrary interval i⊏I, composed of a lattice of states with distinguished states start(i) 101 and end(i) 102 with intermediate states 103 and state transitions 307 as depicted in FIG. 7.

In defining meaning for DANCE language constructs over interval will be denoted by a capital M subscripted with an interval or state designator, the language construct in double brackets, [[ ]], the equality-by-definition symbol, ≡, followed by some expression as to the meaning of the construct:

$M_{interval}$[[construct]]≡definition

Meaning of Variables
The meaning of variable names is defined by:

$\mathcal{M}_i$[[X]]= $\mathcal{M}_s$[[X]] where X is a variable name, X∈s, and s∈$S_i$.

This says "the meaning of X for the interval, i, is defined as the value of X in each state, s, in the interval." If X is not a state variable of s, or s is not a state in the interval i, then X's meaning is undefined.

Meaning of Functions

Where f is a function name and $e_1, \ldots, e_k$ are expressions or variable names, the meaning of function symbol, f, is defined by:

$$\mathcal{M}_i[[f(e_1, \ldots, e_k)]] = \mathcal{M}_i[[f]](\mathcal{M}_i[[e_1]], \ldots, \mathcal{M}_i[[e_k]])$$

This says "the meaning of an expression in the interval (i) is the meaning of the function symbol (f) applied to the meaning of each of the subexpressions f uses as its operands."

DANCE grammar for functions:

<expression>::=<function_name>"("<expression>+")"

<expression>::=<expression><binary_function_name><expression>

<declaration>::="FUNCTION" <function_name>"("[<variable_name>+":"<type>]+")" "RETURN" <type>("IS" <command>)";"

Meaning of Temporal Predicates

Where p is a temporal predicate name (i.e. a procedure name) and $e_1, \ldots, e_k$ are expressions:

$$\mathcal{M}_i[[p(e_1, \ldots, e_k)]] = \mathcal{M}_i[[p]](\mathcal{M}_i[[e_1]], \ldots, \mathcal{M}_i[[e_k]])$$

This says "the meaning of a temporal predicate in the interval (i) is the meaning of the predicate symbol (p) in the interval applied to the meaning of each of the subexpressions p uses as its operands."

Simple DANCE grammar for procedures:

<command>::=<procedure_name>"(" <expression>+")"

<declaration>::="PROCEDURE" <procedure_name>"(" [<variable_name>+":" <type>]+")" ("IS" <command>)";"

Temporal Formulas

Formulas are compositions of temporal predicates. Such compositions will be covered in the later sections. For now consider that a formula is a simple temporal predicate.

A formula w is satisfied by an interval i iff the meaning of w on i is true:

$$\mathcal{M}_i[[w]] = \text{true}.$$

"iff" means "if and only if".

Execution of a program constructs an interval so that the interval satisfies the formula that expresses the program. If all intervals satisfy a formula that formula is deemed valid. However, valid formulas (tautologies) are rather uninteresting programs. Constructing an interval, a lattice of states, is the execution of the program. The predicates in interval temporal logic become commands in DANCE; they affect side effects.

The simplest temporal formula (and the first one to be defined) is "skip." The predicate "skip" is always true.

$$\mathcal{M}_i[[SKIP]] = \text{true}.$$

Simple DANCE grammar for skip temporal formula:

<command>::="SKIP"

Sequential Composition

Moszkowski emphasizes about his "chop" operator. It is simply a sequential composition indicated by semicolon:

$$w_1; w_2$$

where $w_1$ and $w_2$ are formulas means $$\mathcal{M}_i[[w_1; w_2]] = \text{true iff}$$

$$\exists j,k: j \subset i \text{ and } k \subset i: (\mathcal{M}_j[[w_1]] = \text{true}) \text{ and } (\mathcal{M}_k[[w_2]] = \text{true}) \text{ and } (\text{end}(j) = \text{start}(k))$$

Figure 8:
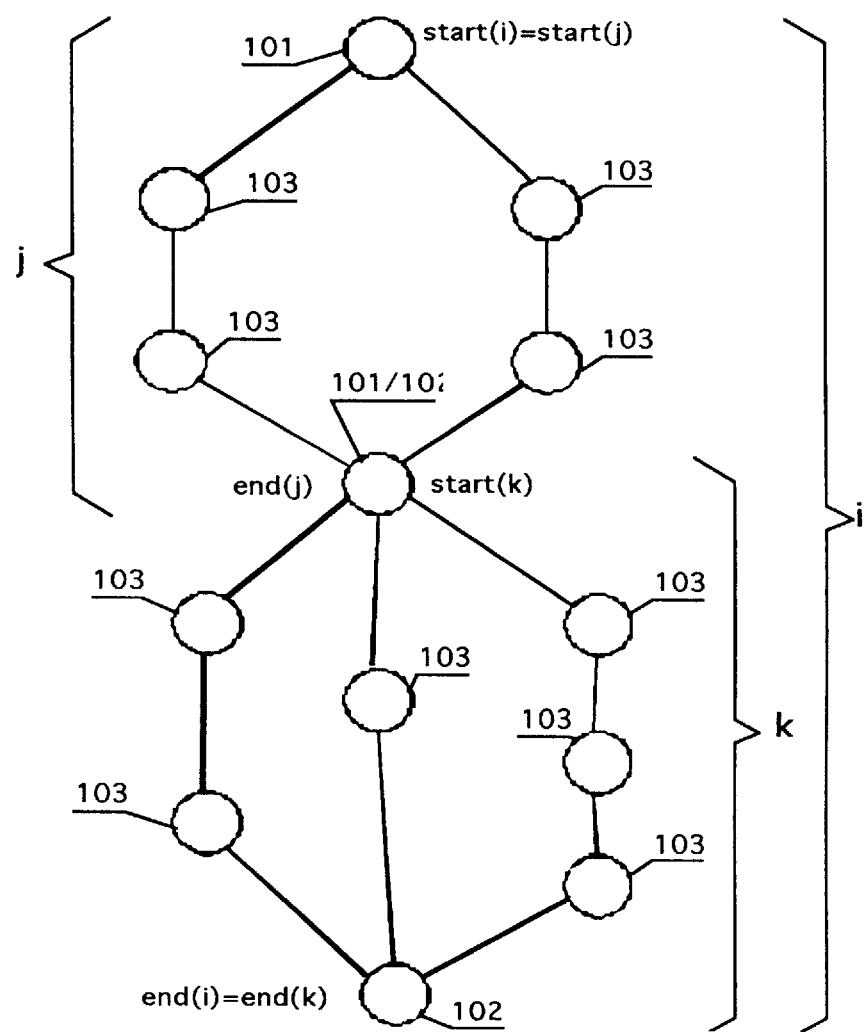
FIG. 8 represents a sequential composition in which two intervals are composed sequentially by fusing the "end" of one interval with the "start" of another.

This says "the meaning of $w_1; w_2$ is true in the interval i if-and-only-if there exists some subintervals of i, namely j and k, such that the meaning of $w_1$ is true during j and the meaning of $w_2$ is true during k, and k starts at the end of j." Fig. 8 depicts sequential composition of intervals.

Note that the two subintervals of i share the state end(j) =start(k), and $w_1$ is true on the first part of the interval and $w_2$ is true on the last part.

Simple DANCE grammar for sequential composition:

<command>::=<command>";" <command>

Parallel Composition

Conjunction of formulae provides the parallelism of DANCE:

$$w_1 \ \& \ w_2$$

where $w_1$ and $w_2$ are formulas means $$\mathcal{M}_i[[w_1 \ \& \ w_2]] = \text{true iff}$$

there exist two subintervals of i, $j \subset i$ and $k \subset i$, such that $$\mathcal{M}_j[[w_1]] = \text{true}, \ \mathcal{M}_k[[w_2]] = \text{true},$$

start(j)=start(k)=start(i), and end(j)=end(k)=end(i).

Figure 9:
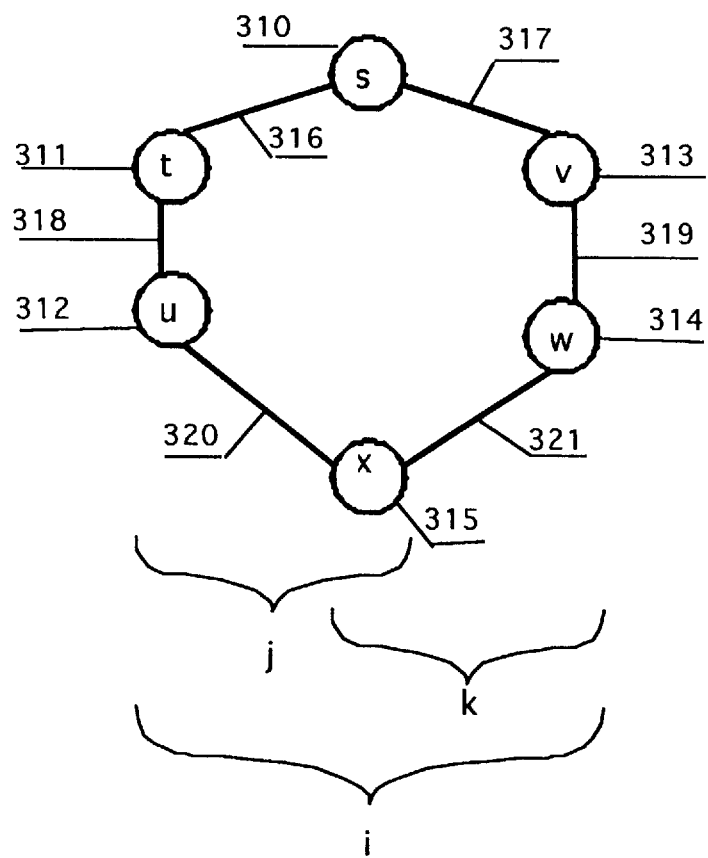
FIG. 9 illustrates a simple parallel composition in which two intervals may be composed in parallel by fusing their "start" states together and fusing their "end" states together.

This says "the meaning of $w_1 \ \& \ w_2$ over the interval i is true if-and-only-if the meaning of $w_1$ is true over some path of states, j, from start(i) to end(i) in the interval i and the meaning of $w_2$ is concurrently true over some different path, k, of states from start(i) to end(i) in the interval i."

Where $w_1$ is true on <svwx> ad $w_2$ is true on <stux> as in FIG. 9. Therefore $w_1 \ \& \ w_2$ is true over the whole interval.

Moszkowski doesn't recognize such bifurcation. Rather he uses the more traditional arbitrary interleaving of states. Though he makes reference to parallel computing, his intervals are always sequences, it's just that several predicates must be true over the same sequence of states. In this example the states v, and w contain variables seen only by $w_1$. Similarly the states t and u contain variables seen only by $w_2$. This is the essential, paradigmatic difference in DANCE from other models. Thus the importance of local variables and limited scoping in DANCE provided by domains.

Simple DANCE grammar for parallel composition:

<command>::=<command>"&" <command>

Temporal Existential Quantification

For many computations additional, local variables are needed. Temporal Existential quantification allows introduction of such local variables whose scope is limited. The keyword DECLARE (instead of ∃) introduces such variables as in:

DECLARE X=c begin w end where X is any variable, c is a constant, and w is a formula in which X occurs free.

$$\mathcal{M}_i[[\text{DECLARE X=c begin w end}]] = \text{true iff}$$

$$\mathcal{M}_{start(i)}[[X]] = c, \text{ and } \mathcal{M}_i[[w]] = \text{true}.$$

The definition of "free variable" is formally quite complex. Suffice to say that variable X is free in formula w iff X occurs in w and nowhere else. The scoping rules of DANCE are more permissive however. Even if X is used outside of the existential quantifier, within w all uses of X refer to the local variable. DANCE uses a syntax similar to Ada; the predicate above comes from the Ada production <block>. Existential quantification provides scoping within the model of computation. Variables introduced in the declaration part of blocks, procedures, and packages (implicitly) invoke existential quantification over their scope. Existential quantification readily generalizes to many variables. Later, we will require such existentially quantified variables to have type declarations.

Simple DANCE grammar for existential quantification:

<command>::="DECLARE" [<variable_name>":" <type>("=" <expression>)]+"BEGIN" <command> "END"

Temporal Bounded Universal Quantification

Bounded universal quantification allows a group of formulae to be executed together, but with different parameters. The keyword FORALL is used instead of $\forall$.

FORALL X IN b DO w where X is any variable, b is a boolean expression or range, and w is a formula means:

(DECLARE X=$x_1$ begin w end) & (DECLARE X=$x_2$ begin w end) & ... & (DECLARE X=$x_n$ begin w end)

where $x_1, x_2, \ldots, x_n$ are values for X that make b true. For now consider b to be a subrange of integers such as $0 \leq X \leq 12$, which would initiate twelve copies of w each having a local constant X ranging from 0 to 11.

$\mathcal{M}_i$[[FORALL X IN b DO w]]=true iff $\exists n:n \geq 0$:

($\forall x_k:1 \leq k \geq n:b^x_{xk}$) and ($\forall y :: b^x_y \Rightarrow y \in \{x_1, x_2, \ldots, x_n\}$) and ($\exists j1 \ldots jn:j1Ci \ldots jnCi$:

$\mathcal{M}_1$[[DECLARE X=$x_1$ begin w end]]=true, and $\mathcal{M}_2$[[DECLARE X=$x_2$ begin w end]]=true, and ... and $\mathcal{M}_{jn}$[[DECLARE X=$x_n$ begin w end]]=true)

Figure 10:
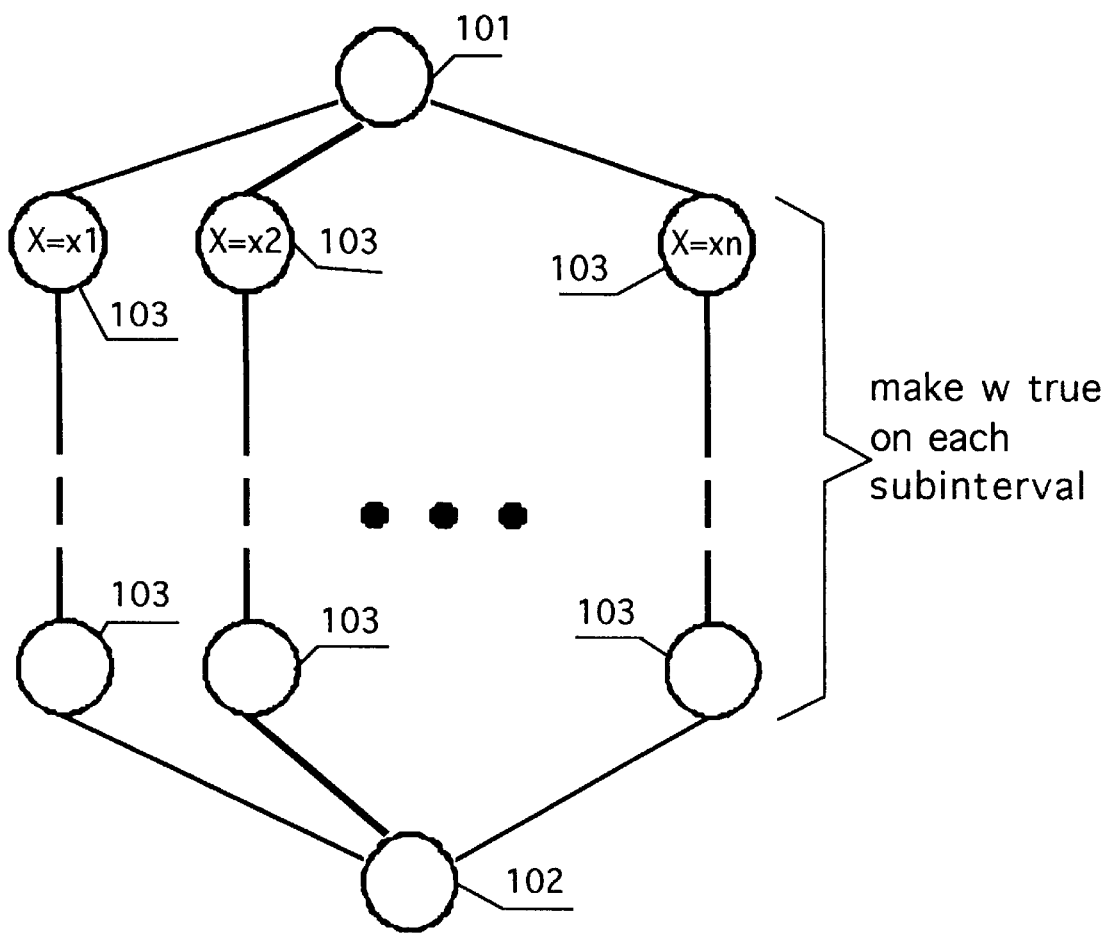
FIG. 10 illustrates universal quantification: Universal, temporal quantification creates many concurrent computations each with a different value for the quantified variable, in this case X.

Bounded universal quantification (FORALL) is the source in DANCE for massively parallel processing opportunities; each subinterval can be executed concurrently. FIG. 10 depicts universal quantification.

All program variables must be introduced with either existential or universal quantification. A range such as [1 ... 10] may substitute for the boolean expression, b, with the understanding that [j ... k] means $j \leq X \leq k$; X takes on all the discrete values from j to k inclusive.

Simple DANCE grammar for universal quantification:

<command>::="FORALL" <variable_name>":" <type>"IN" [<range>|<boolean_expression>]"DO" <command>

Assignment

So far we have no way to modify the values of state variables. Such a language has limited utility! Therefore temporal assignment is needed:

X:=e where X is a variable name and e is an expression. The value of X at the end of the subinterval becomes the value of e evaluated in the state at the beginning of the subinterval. Formally:

$\mathcal{M}_i$[[X:=e]]= $\mathcal{M}_{end(i)}$[[X]]= $\mathcal{M}_{start(i)}$[[e]].

Figure 11:
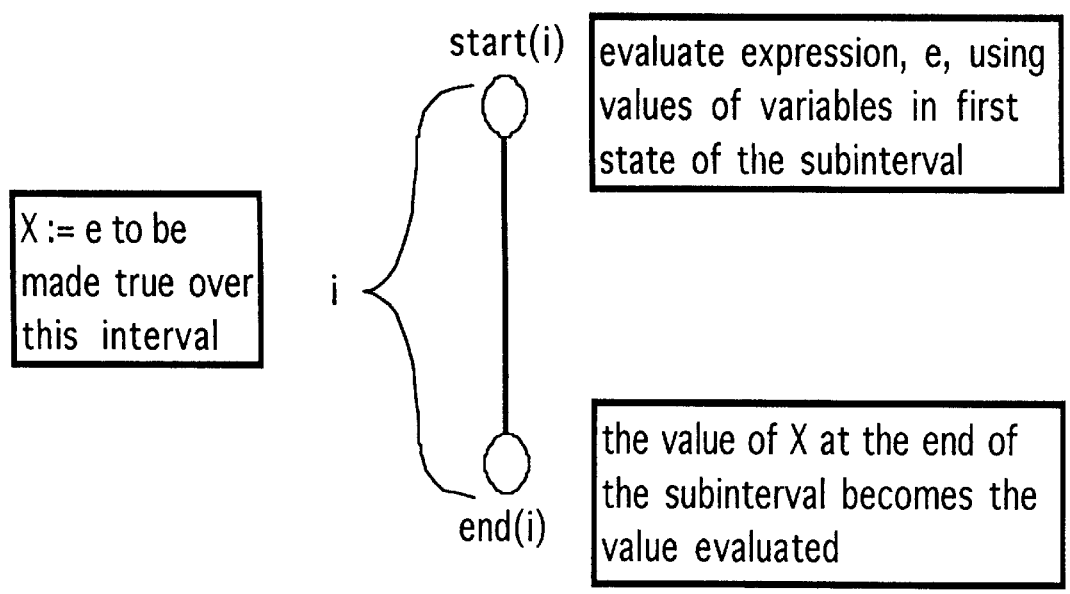
FIG. 11 illustrates diagrammatically an assignmentiInterval which functions to evaluate an expression using the values contained in its "start" node; the end node has the new value as the state of the assigned variable, in this case X.

This says "the meaning of X (its value) at the end of the interval i is the meaning of e evaluated at the beginning of the interval i." FIG. 11 shows an interval satisfying an assignment formula.

Simple DANCE grammar for assignment:

<command>::=<variable_name>":=" <expression>

Alternative Command

The alternative command provides data dependent branching.

$\mathcal{M}_i$[[1F B1$\geq$S1 []B2$\geq$S2 []. . . []Bn$\geq$Sn F1]]=true iff ( $\mathcal{M}_{start(i)}$[[B1]]or $\mathcal{M}_{start(i)}$[[B2]] or ... or $\mathcal{M}_{start(i)}$[[Bn]]) and ( $\mathcal{M}_{start(i)}$[[B1]] $\Rightarrow$ $\mathcal{M}_i$[[S1]]) and ( $\mathcal{M}_{start(i)}$[[B2]] $\Rightarrow$ $\mathcal{M}_i$[[S2]]) and ... and ( $\mathcal{M}_{start(i)}$[[Bn]] $\Rightarrow$ $\mathcal{M}_i$[[Sn]])

Simple DANCE grammar for alternative command:

<command>::="IF" <boolean_expression>"$\geq$" <command>

["[]" <boolean_expression>"$\geq$" <command>]*"FI"

Iterative command:

The iterative command provides data dependent looping:

$\mathcal{M}_i$[[DO B1 => S1 [] B2 => S2 []$_1$...[] Bn => Sn OD]] = true iff
$\exists j1...jc ; j1 \in i ... jc \subset i$:
($\cup_{k \in [1...c]} jk = i$) and
(start(i)=start(j1) and end(j1)=start(j2) and ...and
end(jc)=end(i) ) and
$\forall k : 0 < k <= n$:

( ( $\mathcal{M}_{start(jk)}$[[B1]] $\Rightarrow$ $\mathcal{M}_{jk}$[[S1]]) and ( $\mathcal{M}_{start(jk)}$[[B2]] $\Rightarrow$ $\mathcal{M}_{jk}$[[S2]])

and ... and ( $\mathcal{M}_{start(jk)}$[[Bn]] $\Rightarrow$ $\mathcal{M}_{jk}$[[Sn]]) )

Simple DANCE grammar for iterative command:

<command>::="DO" <boolean_expression>"$\geq$" <command>

["[]" <boolean_expression>"$\geq$" <command>]* "OD"

Combinable Operations

Combinable operations are crucial to obtaining high efficiency in parallel processing. Combinable operations allow access to a broad range of data structures in parallel without mutual exclusion. The meaning of a fetch-add (other combinable operations are similar) is that the value of a shared variable is fetched (read) and its retained value is indivisibly changed to the sum of its previous value and the parameter provided in the fetch-add. If two (or more) processors fetch-add the same variable at the same time, they receive values as if the fetch-adds occur in some sequential order, even though the fetch-adds really occur at the same instant.

Previous language constructs were defined over an interval with some unspecified number of intervening states between the initial state and the final state (e.g. assignment). Originally I had not used the "next" (O) temporal operator, but definition of combinable operations demands it. The meaning of the "next" operator over an interval i is for some state s$\in$i, O(expression) is true if and only if the expression is true in state t$\in$i and no other state occurs between s and t.

$\mathcal{M}_s[[O(e)]]$=true iff $\mathcal{M}_s[[e]]$=true and glb(s,t)=s and lub(s,t)=t and not ($\exists$ u∈i:glb(s,u)=s and lub(u,t)=t).

A single fetch-add where X is the shared variable e is the expression to be added (usually an integer constant) and Y is the variable to receive the fetched value is defined as follows:

$\mathcal{M}_s[[FETCH\_ADD(X,e,Y)]]$=true iff $\mathcal{M}_s[[O(Y=X)]]$=true and $\mathcal{M}_s[[O(X=X+e()]]$=true.

Multiple combinable operations are more difficult to define. The new value held by the shared variable is straightforward the new value is the sum (and, or, xor) of the old value and the sum (and, or, xor) of the values contained in the combinable operations. The returned values are more problematic; they are the result of some, nondeterministic ordering as if they occurred one at a time. The Layered network combines requests and decombines responses for combinable operations. Since which processor executes a part of an interval is unspecified, the apparent sequential order cannot be known. Fortunately it doesn't need to be.

Let ndperm($e_1, \ldots, e_k$) be a nondeterministic permutation of expressions resulting in some scrambling of their order:

$\mathcal{M}_s[[ndperm(e_1, \ldots, e_k)]]=(e_{1s}, \ldots, e_{ks})$ where $\forall j:1 \leq j \leq k:$ $\exists m:e_m=e_{js}$ and $\forall n:1 \leq n \leq k, n=j:not(e_m=e_n).$ Now with ndperm, fetch-add can be defined for simultaneous execution:

$\mathcal{M}_k[[FETCH\_ADD(X,e_1,Y_1)$ & $FETCH\_ADD(X,e_2,Y_2)$ & $\ldots$ & $FETCH\_ADD(X,e_k, Y_k)]]$=true iff there exists some ndperm($e_1, \ldots, e_k$)=($e_{1s}, \ldots, e_{ks}$) such that $\mathcal{M}_{ik}[[O(X=X+e_1+e_2+\ldots+e_k)]]$=true and $\mathcal{M}_{ik}[[O(Y_{1s}=X)]]$= true and $\mathcal{M}_{ik}[[O(Y_{2s}=X+e_{1s})]]$=true and $\mathcal{M}_{ik}[[O(Y_{3s}=X+e_{1s}+e_{2s})]]$=true and ... and $\mathcal{M}_{ik}[[O(Y_{ks}=X+e_{1s}+e_{2s}+\ldots+e_{k-1s})]]$=true.

What the above expressions say is that the shared variable X gets all the values contained in the fetch-ads added to it and the values returned are the original X value plus some subset of other values from other fetch-adds. The reason why this is important is that the behavior is as if the fetch-adds occurred in some sequential order when in fact they occurred at the same instant. Combinable operations are why "interleaving" of states are inappropriate. Any languages or architectures for which interleaving provides an adequate model are doomed to poor efficiency.

The fetch-and, fetch-or, and fetch-xor are defined similarly:

$\mathcal{M}_{ik}[[FETCH\_AND(X,e,Y)]]$=true iff $\mathcal{M}_{ik}[[O(Y=X)]]$=true and $\mathcal{M}_{ik}[[O(X=X$ AND $e)]]$=true.

$\mathcal{M}_{ik}[[FETCH\_AND(X,e_1,Y_1)$ & $FETCH\_AND(X,e_2,Y_2)$ & $\ldots$ & $FETCH\_AND(X,e_k,Y_k)]]$=true iff there exists some ndperm($e_1, \ldots, e_k$)=($e_{1s}, \ldots, e_{ks}$) such that $\mathcal{M}_{ik}[[O(X=X$ AND $e_1$ AND $e_2$ AND $\ldots$ AND $e_k)]]$=true and $\mathcal{M}_{ik}[[O(Y_{1s}=X)]]$=true and $\mathcal{M}_{ik}[[O(Y_{2s}=X$ AND $e_{1s})]]$=true and $\mathcal{M}_{ik}[[O(Y_{3s}=X$ AND $e_{1s}$ AND $e_{2s})]]$=true and ... and $\mathcal{M}_{ik}[[O(Y_{ks}=X$ AND $e_{1s}$ AND $e_{2s}$ AND $\ldots$ AND $e_{k-1s})]]$.

$\mathcal{M}_{ik}[[FETCH\_OR(X,e,Y)]]$=true iff $\mathcal{M}_{ik}[[O(Y=X)]]$=true and $\mathcal{M}_{ik}[[O(X=X$ OR $e)]]$=true.

$\mathcal{M}_{ik}[[FETCH\_AND(X,e_1,Y_1)$ & $FETCH\_OR(X,e_2,Y_2)$ & $\ldots$ & $FETCH\_AND(X,e_k,Y_k)]]$=true iff there exists some ndperm($e_1, \ldots, e_k$)=($e_{1s}, \ldots, e_{ks}$) such that $\mathcal{M}_{ik}[[O(X=X$ OR $e_1$ OR $e_2$ OR $\ldots$ OR $e_k)]]$=true and $\mathcal{M}_{ik}[[O(Y_{1s}=X)]]$=true and $\mathcal{M}_{ik}[[O(Y_{2s}=X$ OR $e_{1s})]]$=true and $\mathcal{M}_{ik}[[O(Y_{3s}=X$ OR $e_{1s}$ OR $e_{2s})]]$=true and ... and $\mathcal{M}_{ik}[[O(Y_{ks}=X$ OR $e_{1s}$ OR $e_{2s}$ OR $\ldots$ OR $e_{k-1s})]]$.

$\mathcal{M}_{ik}[[FETCH\_XOR(X,e,Y)]]$=true iff $\mathcal{M}_{ik}[[O(Y=X)]]$=true and $\mathcal{M}_{ik}[[O(X=X$ XOR $e)]]$=true.

$\mathcal{M}_{ik}[[FETCH\_XOR(X,e_1,Y_1)$ & $FETCH\_XOR(X,e_2,Y_2)$ & $\ldots$ & $FETCH\_XOR(X,e_k,Y_k)]]$=true iff there exists some ndperm($e_1, \ldots, e_k$)=($e_{1s}, \ldots, e_{ks}$) such that $\mathcal{M}_{ik}[[O(X=X$ XOR $e_1$ XOR $e_2$ XOR $\ldots$ XOR $e_k)]]$=true and $\mathcal{M}_{ik}[[O(Y_{1s}=X)]]$=true and $\mathcal{M}_{ik}[[O(Y_{2s}=X$ XOR $e_{1s})]]$=true and $\mathcal{M}_{ik}[[O(Y_{3s}=X$ XOR $e_{1s}$ XOR $e_{2s})]]$=true and ... and $\mathcal{M}_{ik}[[O(Y_{ks}=X$ XOR $e_{1s}$ XOR $e_{2s}$ XOR $\ldots$ XOR $e_{k-1s})]]$=true.

The swap operation behaves differently. When a single swap occurs at a time, the value of the shared variable becomes the parameter of the swap and the value returned is the previous shared variable value.

$\mathcal{M}_{ik}[[SWAP(X,e,Y)]]$=true iff $\mathcal{M}_{ik}[[O(Y=X)]]$=true and $\mathcal{M}_{ik}[[O(X=e)]]$=true.

When many swaps occur simultaneously one processor will get the value of the shared variable the others will get values from some other swap, and the shared variable, the others will get values from some other swap, and the shared variable will get the swap value no processor receives.

$\mathcal{M}_{ik}[[SWAP(X,e_1,Y_1)$ & $SWAP(X,e_2,Y_2)$ & $\ldots$ & $SWAP(X, e_k,Y_k)]]$=true iff there exists some ndperm($e_1 \ldots e_k$)=($e_{1s}, \ldots, e_{ks}$) such that $\mathcal{M}_{ik}[[O(X=e_{ks})]]$=true and $\mathcal{M}_{ik}[[O(Y_{1s}=X)]]$=true and $\mathcal{M}_{ik}[[O(Y_{2s}=e_{1s})]]$=true and $\mathcal{M}_{ik}[[O(Y_{3s}=e_{2s})]]$=true and ... and $\mathcal{M}_{ik}[[O(Y_{ks}=e_{k-1s})]]$=true.

The swap combinable operation is good for manipulating pointers in dynamic data structures. The fetch-add is good for indexing into a shared array. The fetch-and fetch-or and fetch-xor are good for clearing, setting, and toggling flags respectively. Virtually all of the DANCE programs use combinable operations to manipulate shared variables to access data structures in parallel without mutual exclusion. Hardware support for combinable operations is necessary for high efficiency. In addition to combining in the Layered network, I'd like combinable operations in the processor's ISA and memory management unit. Although combinable operations are expected to represent a small percentage of all instructions executed, they (can) eliminate parallelism-destroying mutual exclusion and blocking.

Temporal Domains

Temporal domains hold bindings between identifiers (variables) and values. All state variables occur in some domain and at most one domain. Domains hold not only changeable states, but complete packages which contain procedures and functions as well as state variables.

Domains are essential for proving noninterference—that no other processor is modifying the variables any particular processor is currently using. Noninterference is crucial to showing that parallel activities can occur together correctly ["An Axiomatic Proof Technique for Parallel Programs," Susan Owicki and David Gries, *Acta Informatica* 6, Springer-Verlag 1976].

Domain Trees

All domains for a single parallel program running on a single Multitude computer (which is comprised of many processors) form a rooted, directed tree. Intervals being executed (causing state change) exist in some leaf domain. The temporal predicates (commands) that control the interval can use any variable-value bindings in any domain below it in the tree. The domain tree will dynamically expand an contract as the program is executed. A new domain is created when a block is entered that declares local variables and is deleted when the block is exited.

Domain names are formed by a string of identifiers separated by periods representing the path in the domain tree from the root to the leaf. The local variables immediately declared within a subprogram are contained in a domain whose name is the subprograms identifier prepended (with a period) with the domain name in which it was invoked. Within subprograms, blocks that declare new variables may be encountered; a new domain leaf is grown. Non-nested blocks are assigned numbers starting with 1, in the order in which they are encountered. Nested blocks grow new domain leaves. Automatically numbered blocks cannot be confused with either named domains or subprogram domains since DANCE identifiers cannot start with digits. However domain identifiers and subprogram identifiers may be the same. However, an identifier's position in the name make clear whether it's a domain name or subprogram name.

In the following, d, d1, d2, etc. stand for domains and N(d) stands for the name of domain d. Define the domain operator $\mathcal{D}$, by:

$$\mathcal{D}[[d]] = \{(n,v) | n \in \text{identifier}, v \in \text{Type}(n)\}$$

which means "the domain of d is a set of pairs in which the first element, n, is a program identifier and the second element, v, is a value in the type of n." Types are sets of values. A domain contains the domains of all its ancestors in the domain tree. Ancestor domain names are formed by truncating their descendent's names:

$$\mathcal{D}[[d1]] \subset \mathcal{D}[[d2]] \text{ iff } \exists \, s:\text{string}|N(d1) \,\&\&\, \text{``.''} \,\, \text{SSs}=N(d2)$$

where && is string concatenation. That is that domain d2 call "see" all the values in every domain d1 whose name is a shortened version of d2. All the values visible in domain d2 are either declared in the DANCE program text corresponding to d2, or are declared in some ancestor of d2.

Domains are neighbors if they have some variables they both can see:

$$\text{neighbors}(d1,d2) = \mathcal{D}[[d1]] \cap \mathcal{D}[[d2]] \ne \emptyset.$$

Remote domains have no common variables:

$$\text{remote}(d1,d2) = \mathcal{D}[[d1]] \cap \mathcal{D}[[d2]] = \emptyset.$$

Remote domains are needed to represent programs that span machine boundaries, i.e. distributed processing.

Simple DANCE program fragment:

```
package body ex:example is
    declare
        A:float;
    procedure p is
        declare
            W:integer;
        begin
            command1
        end;
    procedure h is
        declare
            X:float;
        begin
            declare
                Y:bool;
            begin
                command2
            end
            ;
            command5
            ;
            declare
                Z:char;
            begin
                command3
                ;
                declare
                    V:string;
                begin
                    command4
                end
            end
        end;
end package
```

In the above program fragment:

command 1 sees W and A;

command 2 sees A, X, and Y;

command 3 sees A, X, and Z;

command 4 sees A, X, Z, and V;

command 5 sees X and A.

Figure 42:
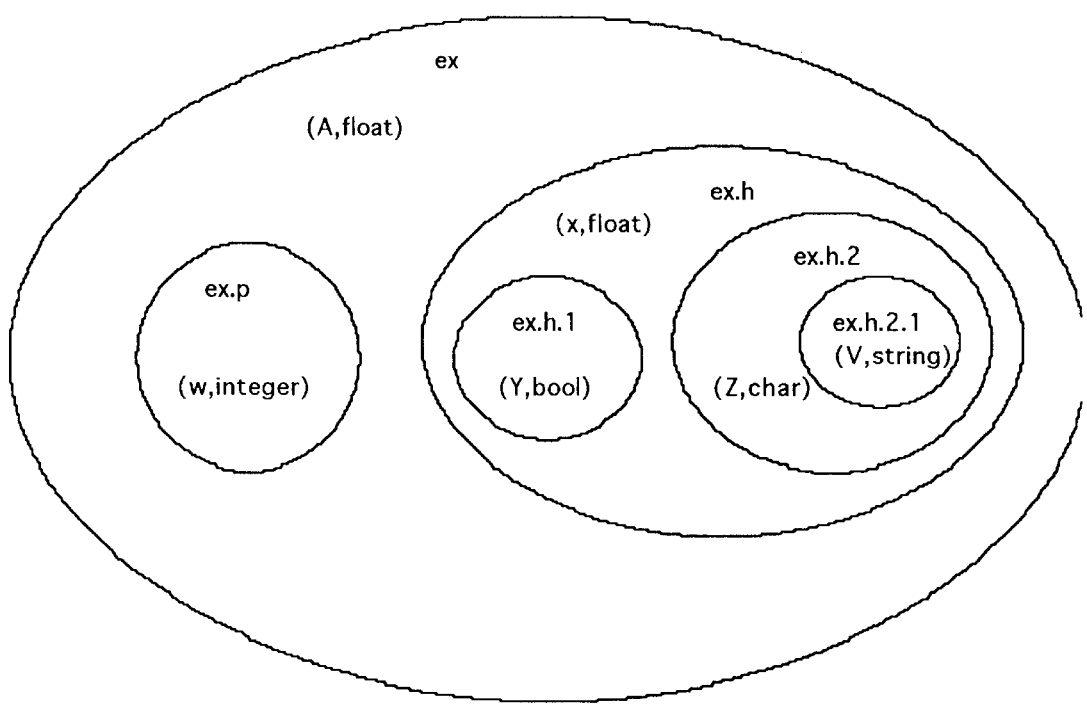
FIG. 42 is a diagram showing nesting of domains in proof of noninterference.
Figure 43:
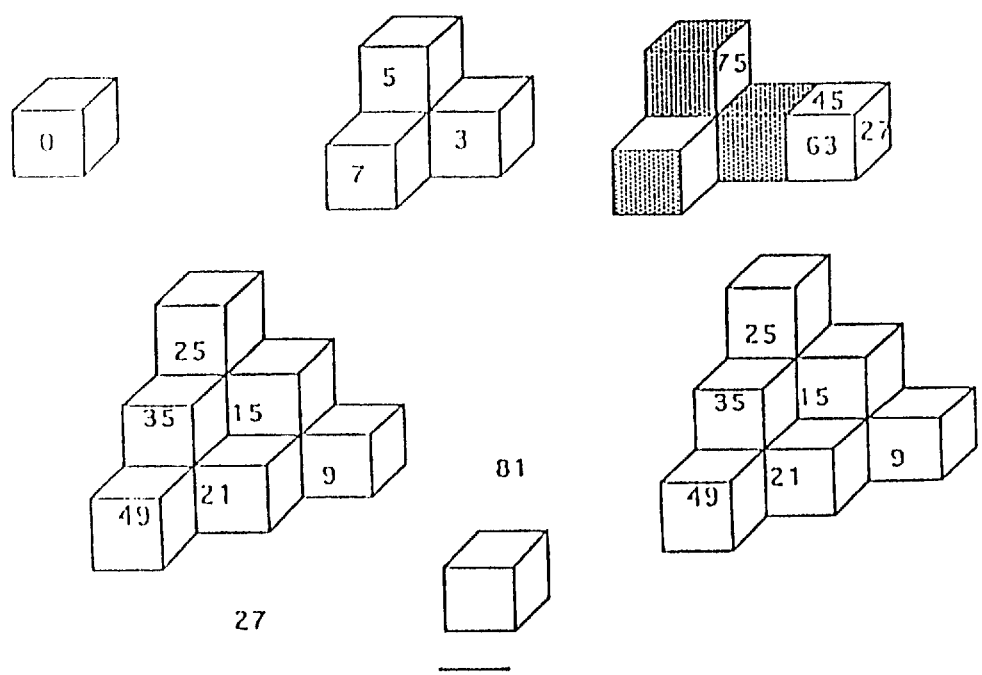
FIG. 43 shows count faces.

FIG. 42 shows the domains for the example above. FIG. 42 is not a set diagram in the usual sense of a subset drawn inside its superset. The set of nameable and therefore usable variables for a particular domain are all the variables declared within the domain, union variables declared in surrounding domains. Domains are necessary for proof of noninterference. The easiest way to assure non-interference is by restricting access to critical variables. Semaphores protect variables by serializing access to critical sections. DANCE protects variables with domains. By relying on the fact that no other interval can "see" critical, local variables, noninterference is assured.

Remote Procedure Call

Distributed systems have domains that do not form a tree—no single domain exists within which all other domains are contained. No shared address space, no combinable operations, just messages, usually point-to-point sans confirmation. Remote procedure call (RPC) works just fine for much of what one would like to do at disparate geographical locations. (Note: I explicitly reject message passing paradigms for parallel processing that have one machine out of many microprocessors, in a single location. Only geography demands distribution.)

However there are worthwhile applications that demand geographical distribution that cannot utilize nested RPCs such as databases. RPCs are great for computation where the duration or lifetime of the domain which contains all accessed variables coincides with the duration of the invoked procedure. Such applications abound, i.e. photorealistic, 3D, animated rendering.

Sometimes the lifetime of state variables must exceed the lifetime of any procedure that uses it. Databases are like this. The traditional means of ensuring noninterference (and thus partial correctness) is with locks, semaphores, monitors or some other form of mutual exclusion which may lead to deadlock. This has caused a colorful consideration of resource allocation and deadlock detection starting with Dijkstra's dining philosophers and ending with global snapshots. Total correctness proofs cannot tolerate even the possibility of a deadlock occurring—the program must terminate! How to ensure noninterference between transactions that may wish to exclusively use the same values without risking deadlock?

Must have noninterference cannot permit deadlock. Noninterference without deadlock. But how?

1) Divide the database into a large number of domains which may reside on machines across the country.

2) Impose a total ordering on the domains.

3) Allow only one RPC to be active in a domain—queue other received RLPC invocations first-in-first-out.

4) Make database accesses that need to maintain consistency between values in different domains use an RPC chain in the order of the domains used.

The proof by induction of totally correct programs that invoke only other (already proven) totally correct subprograms with RPC is direct. Anything that is totally correct and is invoked with RPC will eventually terminate and return with the right value, and the caller will then terminate (the inductive hypothesis). The chains of RPCs that may occur must be finite so that the deepest invocation will terminate without making further invocations (the basis).

An RPC chain is a finite number of nested RPC calls each of which can be on a different machine. During the invocation phase, values of the database domains of interest are "read." During the return phase, values of the database are "written." Therefore any mapping from previous database values to new values is possible, and provide some initiating transaction the answer to, and confirmation of, its query.

The total ordering of domains makes it work. Suppose a single transaction occurs. It will create a chain through the database complete its last RPC and eventually terminate. If a transaction is stalled because its deepest RPC is stalled in a queue at a domain already in use, it will eventually be given access since the currently active RPC (and all RPCs ahead in the queue) will eventually terminate and release the domain (the inductive hypothesis). There is some "deepest" chain that occupies (has an active RPC chain) in the highest numbered domain. It will eventually terminate and release all its domains therefore possibly unblocking other RPC chains (the basis). Therefore all RPC chains will eventually terminate and total correctness can be proven.

This method only works efficiently when the transactions require domains evenly—each processor must know in which domain the value of interest lies. Tree-structured directories save much space and may work well for sequential accesses, but they cause "hot spots" that would substantially degrade the performance when distributed. On the other hand, if the number of domains were large enough so that the probability of any two transactions needing the same domain were small, the system would exhibit latency largely independent of the number of transactions—a blessing to travel agents worldwide.

Type Theory

Type systems are important. Most languages such as Pascal and C only allow types that are basic and constructed. Basic types generally correspond to types supported directly by the hardware like integers, floating point number and characters. Constructed types are built from the basic types to form arrays, lists, and records. Some languages such as Ada allow forms of polymorphism (many types) through operator overloading. Abstract data typing seemed to answer a desire for powerful, reusable, and encapsulated types. A paper by Cardelli and Wegner ["On Understanding Types, Data Abstraction, and Polymorphism," Luca Cardelli and Peter Wegner, Computing Surveys, Vol. 17, No. 4, December 1985.] gave new vistas to my thinking about types. The type system of DANCE has been adapted from Cardelli and Wegner's type expression language Fun. Existentially and universally quantified types are realized through "packages" described in a following section.

Basic Types

The basic types of DANCE are:

Integer, Bool, Rat, Float, and Char short for integer, boolean, rational, floating point, and character. Rational is included because exactness cannot be obtained with floating point numbers. A special value, NIL, is a member of each of the basic types representing no value. Uninitialized variables have the value NIL. Attempts to use variables whose values are NIL in expressions will result in error messages. However NIL can be assigned to variables.

Simple DANCE grammar for simple types:

<type>;;="INTEGER"|"BOOL"|"RAT"|"FLOAT"|"CHAR"

Constructed Types

Types may be constructed from basic types by the use of type expressions. Arrays, function spaces, records, and variant types may be constructed. Arrays are integer indexed and behave like functions as in [*The Science of Programming*, David Gries, Springer-Verlag, 1981]. Accessing an array with an index out of bounds results in NIL. Functions are first-class and so may be passed as parameters. Record and variant types have standard usages.

Simple DANCE grammar for constructed types:

<type> ::= "(" [<identifier>+ | <literal>+]")"
<type> ::= "ARRAY" "[" <range>+ "]" "OF" <type>
<type> ::= <type> "=>" <type>
<type> ::= "RECORD" <label> ":" <type> ["," <label> ":" <type>]*
    "END" "RECORD"
<type> ::= "VARIANT" <discriminant> : <type> ";"
    <label> ":" <type> ["," <label> ":" <type>]* "END" "VARIANT"

Parametric Types

Parametric types are type constructors that take type parameters to build a new type.

For example, a generic list could be defined and then specialized as with:

```
TYPE List[Item] IS --declare a generic list
    VARIANT c: empty, cons;
        empty: NIL;
        cons: RECORD
            head: Item,
            tail : List[Item]
        END RECORD
    END VARIANT;
TYPE IntList : List[Integer];
--bind Integer to item to get IntLst
```

Simple DANCE grammar for parametric types:

```
<declaration> ::= "TYPE" <type_name> ( "[" <type_name>+"]" )
    "IS" <type> ";"
<type> ::= <type_name> "[" <type_name>+"]"
```

Packages are Abstract Data Types

Packages provide program structuring and information hiding. The packages in DANCE are adapted from those in [*Algebraic Specifications in Software Engineering*. Ivo Van Horebeek & Johan Lewi, Springer-Verlag, 1989] and inspired by packages in Ada [*ANSI/MIL-STD-1815A-1983 Reference Manula for the Ada Programming Language*. American National Standard Institute, 1983.].

Packages have two parts: a visible, declaration section, and a hidden body. The body is lot really hidden or secret, just that it is not within the scope that can be seen by other packages. All that a programmer should need to know about the services of a package should be visible in the declaration section.

Those familiar with object oriented languages like Smalltalk will recognize that packages define classes and that these classes are instantiated as objects. Such considerations will be finessed for the time being. The conception of executing a package body is adequate.

Packages have names. The items within a package can be named from other packages similar to records by prefacing the name of the item with the package's name and a period. Packages group together objects and operations that have useful purpose. Packages require lots of declarations. C hackers don't want to be bothered with scoping more sophisticated than "local" and "global." DANCE adds some powerful, yet esoteric declarations to Ada's. These declarations allow generic (polymorphic) programs that are parameterized with type (universal type quantification) and certain requirements for the awaited type (inheritance via bounded universal quantification). Ada's private type declarations serve as existential type quantification. DANCE's type system (including pointers or access types) allows definition of every type in either Ada or Fun, plus exotic types not found in either.

A requirement clause demands passing of a type to tie package. Often this type will be restricted to some form. Cardelli and Wegner's bounded universal quantification is realized through the use of requirement clauses.

An import clause specifies the use of another package's services. Such packages must be visible at compile time.

The private type declaration declares types that are defined within the package but may be used by other packages. The implementation of the types (and operations using such types) are hidden within the body of the package. This corresponds to Cadlelli & Wegner's existential quantification. The private type states that a type exists but does not tell how it works. Other packages may only manipulate existentially quantified types with operations declared by the package.

The package body contains the implementations of the operations. The relationships between each section will become clearer with later examples.

Simple DANCE grammar for packages:

```
<declaration> ::= <package> | <package_body>
<package> ::= "PACKAGE" <package_name> ( "[" <name>+ "]" ) "IS"
    <requirement_clause>*
    <import_clause>*
    <declaration>+ ( "PRIVATE" <declaration>+) "END" "PACKAGE"
<package_body> ::= "PACKAGE BODY" <body_name> ":" <package_name> "IS"
    <declaration>+ "END" "PACKAGE"
<declaration> ::= "PROCEDURE" <procedure_name> "(" [<variable_name>+
    ":" <type>]+")" ( "IS" <command>) ";"
<declaration> ::= "FUNCTION" <function_name>"(" [<variable_name>+
    ":" <type>]+")" "RETURN" <type> ( "IS" <command>) ";"
<import_clause> ::= "IMPORT" [ "ALL" | <name>+]
    "FROM" (<body_name> ":")<package_name>
    ( "[" [formal_parameter "=>" actual_parameter ]+ "]" )
    "END" "IMPORT"
```

Polymorphism

There are two major kinds of universal polymorphism, that is, two major ways in which a value can have many types. In parametric polymorphism, a polymorphic package has an explicit type parameter. In inclusion polymorphism, a package can be viewed as belonging to many different types, which need not be disjoint. So far, I haven't imposed limitations on overloading to avoid ad hoc polymorphism; for example, a programmer may define a new '+' function on a new type that is not associative.

Types are set of values. The universe of all values, V, contains all simple values like integers and strings, and all data structures like pairs, records, variants, and records. A type is a set of elements of V. Moreover, V when ordered by set inclusion forms a lattice (of types not states). The top of this lattice is, the type Top, the set of all values or V itself. The bottom of this lattice is essentially, the empty set. The types used by any given programming language is only a small subset of V. A particular type system is a collection of sets (ideals) of V, which is usually defined by presenting a language of type expressions and a mapping from type expressions to sets of values.

Since types are sets, subtypes are subsets. Moreover, the semantic assertion "T1 is a subtype of T2" corresponds to the mathematical condition $T1 \subseteq T2$ in V. This is the foundation for type checking. For simple types (like integer subranges) this subtype relationship is intuitive. But Cardelli and Wegner add types such as:

$$\text{type } B = \forall T.T \Rightarrow T$$

This means that type B is all junctions whose result type is the same as it operand type. Not just some function but all such functions—universal quantification. For example, the trigonometric function cosine has floating-point valued operand and result:

```
type float_functions = float ⊏float
cosine(x) ∈ float_functions
float_functions ⊆ B
```

Similarly for existential quantification,

```
type C=∃c.t(C)
``` means, for some type, c, C has type t(c) where t(c) is a type expression using c. Every value has type ∃a.a because for every value there exists some type (set) for which the value is a member. Thus the type ∃a.a denotes the set of all values or Top.

Universal quantification yields generic types whereas existential quantification yields abstract data types. Combining these two notions with subtyping yields parametric data abstractions. A package declaration,

```
package p[t] is
    required
        t : r
    end required
    d --declarations
end package
``` creates a type of the form

```
type p=∀t⊆r:∃b:d(b)
```

Which says that package p is a type, such that for any type t which is a subtype of r, there exists some body, b, that implements the declaration(s), d. There may be more than one body b that upholds the declaration(s), d, and the package will operate with any supplied package t, so long as it behaves like r.

Type Checking

Types have been called "armor," protecting data representations from inappropriate manipulation. By requiring explicit declaration of all program variables, the DANCE language supplies redundant information used for checking types. In general the type of a thing must match the use of that thing. Using separate information to determine tiling-type and use-type, allows them to be compared. Like balancing a double-entry bookkeeping system, type checking gives confidence.

Type checking involves (somehow) determining types of an object and its use. That determination is called type inferencing. These type inference rules are adapted from Cardelli and Wegner.

The DANCE type system can be formalized as a set of type inference rules that prescribe how to establish the type of an expression form the type of its subexpressions. These rules can be intended as the specification of a type-checking algorithm.

The inference rules are given in two groups. The first group is for deducing that two types are in the inclusion relation. The second group is for deducing that an expression has a type.

Type expressions are denoted by s, t, and u, type variables by a and b, type constants (e.g. float) by k, expressions by e, and f, variables by x, and labels by L.

Type Inclusion Rules: t⊆s

C is a set of inclusion constraints for type variables. C.a⊆t is the set C extended with the constraint that the type variable a is a subtype of the type t. C⊨t⊆s is an assertion meaning that from C we can infer t⊆s. A horizontal bar is logical implication; if we can infer what is above it, then we can infer what is below it.

[TOP] $\quad C \vDash t \subseteq Top$

[VAR] $\quad C.a \subseteq t \vDash a \subseteq t$

[BAS1] $\quad C \vDash a \subseteq a$

[BAS2] $\quad C \vDash k \subseteq k$

[ARROW] $\quad \dfrac{C \vDash s_1 \subseteq s \text{ and } C \vDash t \subseteq t_1}{C \vDash s \rightarrow t \subseteq s_1 \rightarrow t_1}$

[RECD] $\quad \dfrac{C \vDash s_1 \subseteq t_1 \text{ and } \ldots \text{ and } C \vDash s_n \subseteq t_n}{C \vDash \text{RECORD } L_1 : s_1, \ldots, L_n : s_n, \ldots, L_m : s_m \text{ END RECORD} \subseteq \text{RECORD } L_1 : s_1, \ldots, L_n : s_n \text{ END RECORD}}$

[VART] $\quad \dfrac{C \vDash s_1 \subseteq t_1 \text{ and } \ldots \text{ and } C \vDash s_n \subseteq t_n}{C \vDash \text{VARIANT } L : (L_1 \ldots L_n); L_1 : s_1, \ldots, L_n : s_n \text{ END VARIANT} \subseteq \text{VARIANT } L : (L_1 \ldots L_n); L_1 : s_1, \ldots, L_n : s_n \text{ END VARIANT}}$

[UNI] $\quad \dfrac{C.a \subseteq s \vDash t \subseteq t_1}{C \vDash (\forall a \subseteq s.t) \subseteq (\forall a \subseteq s.t_1)}$ $a$ not free In $C$

[EXI] $\quad \dfrac{C.a \subseteq s \vDash t \subseteq t_1}{C \vDash (\exists a \subseteq s.t) \subseteq (\exists a \subseteq s.t_1)}$ $a$ not free In $C$

[TRANS] $\quad \dfrac{C \vDash s \subseteq t \text{ and } C \vDash u \subseteq u}{C \vDash s \subseteq t}$ Type Rules for Expressions: e A is a set of type assumptions for free program variables. A.x:t is the set A extended with the assumption that variable x has type t. C,A e:t means that from the set of constraints C and the set of assumptions A we can infer that e has type t. $f$ is a function. t{sla} is texual substitution $t^s_a$

[ETOP] $\quad C.A \vDash e : Top$

[EVAR] $\quad C.A.x : t$

[ABS] $\quad \dfrac{f = e \text{ and } C.A.x : s \vDash e : t}{C.A \vDash f : s \rightarrow t}$ $x$ free in $e$

[APPL] $\quad \dfrac{C,A \vDash f : s \rightarrow t \text{ and } C,A \vDash e : s}{C,A \vDash f(e) : t}$ (simple DANCE needs not RECD, record components accessed individually: r.L)

[ERECD] $\quad \dfrac{C,A \vDash e_1 \subseteq t_1 \text{ and } \ldots \text{ and } C,A \vDash e_n \subseteq t_n}{C,A \vDash (L_1 =>e_1, \ldots, L_n=e_n) : \text{RECORD } L_1 : t_1, \ldots, L_n : t_n \text{ END RECORD}}$

[SEL] $\quad \dfrac{C,A \vDash x : \text{RECORD } L_1 : t_1, \ldots, L_n : t_n \text{ END RECORD}}{C,A \vDash x.L_i : t_i \quad i \in 1 \ldots n}$

[VART] $\quad \dfrac{C,A \vDash x : \text{VARIANT } L:(L_1 \ldots L_n); L_1 : s_1, \ldots, L_n : s_n \text{ END VARIANT } C,A \vDash e : (L_1 \ldots L_n)}{C,A.e=L_I \vDash x.e : t_I}$ $$[\text{GEN}] \quad \frac{\begin{array}{c}C.a \subseteq s, A \models e : t\\ \text{PACKAGE } P[a] \text{ IS REQUIRED } a : s \text{ END REQUIRED}\\ e \text{ END PACKAGE}\end{array}}{C, A \models P : \forall a \subseteq s.t}$$

$$[\text{SPEC}] \quad \frac{C, A \models P : \forall a \subseteq s.t \text{ and } C \models s_1 \subseteq s}{C, A \models P.e[s_1] : t\{s_1/a\}}$$

$$[\text{DEFN}] \quad \frac{C, A \models e : t\{s/b\} \text{ TYPE } a[b] \text{ IS } t;}{C, A \models e : a[s]}$$

$$[\text{ETRANS}] \quad \frac{C, A \models e : t \text{ and } C \models t \subseteq u}{C, A \models e : u}$$

$$[\text{HIDE}] \quad \frac{\begin{array}{c}C, A \models a : t\\ \text{PACKAGE } P \text{ IS TYPE } a \text{ IS PRIVATE :}\\ s \text{ END PACKAGE}\end{array}}{C, A \models P : \exists a \subseteq t.s}$$

$$[\text{USE}] \quad \frac{\begin{array}{c}C, A \models P : \forall a \subseteq s.\exists b \subseteq t.u\\ C, A \models c : s\\ \text{IMPORT } u \text{ FROM } p : P[c => a] \text{ END IMPORT}\\ \text{PACKAGE BODY } p : P \text{ IS TYPE } b \text{ IS } t_1:\end{array}}{C, A \models p.u : P\{c/a\}}$$

Correctness Proofs

My attendance at the Institute on Formal Development of Programs and Proofs sponsored by the University of Texas at Austin in 1987 changed my attitude toward correctness proofs. I am now completely convinced of the necessity of correctness proofs. Testing can at best show the presence of program errors. Only proofs can show the absence of program errors. The problems of debugging are greatly magnified by parallelism. Since no single thread of control exists two executions of a parallel program may not yield the same results! Experiments showed that a particular program would execute correctly over 99% of the time but would occasionally seize up in deadlock. However, when run in debug mode to generate trace files to files the bug, the program never deadlocked because generation of trace files changed the timing enough to avoid the problem. Programs for parallel computers simply cannot be developed by those tied to C language. Therefore the necessity for program proofs.

I could plagarize David Gries' excellent book but will refer the reader insteadl [*The Science of Programming*, David Gries, Springer-Verlag, 1981]. In Gries' book, weakest precondition predicate transformers refer to a particular place in the text of the program. In DANCE, the assertions are applied to the states of program variables denoted by interval temporal logic almost always referring to the first or last node of a state lattice. Such states are "between" execution of commands.

Assertions in DANCE are enclosed in curly braces {}. Assertions form pre- and post-conditions for commands. This allows proof of program correctness. The form of DANCE assertions was adapted from [Concurrent Programming: Principles and Practice, Gregory R. Andrews, Benjamin/Cummings, 1991]. Andrews' notation is based on guarded commands like Gries, but from a parallel computing emphasis.

For example an array, b, with length k can be asserted to be in order as:

{Sorted(b):forall i:1 ... k-1:b[i]≦b[i+1]}

An assertion applies to the state of visible variables at the interval(s) when the following command is ready to execute. Andrews views assertions as part of the text of a program.

DANCE shifts the view to the values of variables at a particular instant of time (i.e. state). If one thinks of a parallel program represented by interval temporal logic as a lattice made from threads of state transitions seeing opportunities for parallel execution becomes easier. Each thread has (for the most part) its own private variables that can be manipulated and proven to not affect other threads. Perhaps the word "thread" may be confused with popular "multi-threaded" operating systems such as Mach. Such threads are merely sequential processes. Arbitrary interleaving of sequential process states is a paradigm that clouds parallel conception and requires inspection of the states of all processes, rather than just the variables whose values they share.

Two similar concepts must be kept clear: temporal predicates and assertional predicates. Temporal predicates serve as commands that create a model, in interval temporal logic, making the predicates true over the interval. Assertional predicates have not concept of time, only state. Assertional predicates aren't actually executed (but checking assertions during debugging would be nice). Rather they declare allowable values for state variables and are used for specifying what to do and proving it was done.

Weakest Precondition Predicate Transformers

Any formal logical system consists of rules defined in terms of:

a set of symbols,
a set of formulas constructed from these symbols,
a set of distinguished formulas called axioms, and
a set of inference rules.

Formulas are well-formed sequences of symbols (they are grammatically correct). The axioms are special formula that are assumed to be true. Inference rules specify how to derive additional true formulas from axioms and other true formulas.

Inference rules have the form:

$$\frac{H_1, H_2, \ldots, H_n}{C}$$

Where the $H_i$ are hypotheses, and C is a conclusion. Both the hypotheses and conclusion are formulas. The meaning of an inference rule is that if all the hypotheses are true, then we can infer that the conclusion is also true.

A proof in a formal logic system is a sequence of lines each of which is an axiom or can be derived from previous lines by application of an inference rule. A theorem is any line in a proof. Thus theorems are either axioms or are obtained by applying an inference rule to other theorems.

By itself, a formal logical system is a mathematical abstraction—a collection of symbols and relations between them. A logical system becomes interesting when the formulas represent statements about some domain of discourse and the formulas are theorems that are true. This requires that we provide an interpretation to the formulas. An interpretation of a logical system maps each formula to true (T) or false (F). A logic is sound with respect to an interpretation if all its axioms and inference rules are sound. An axiom is sound if it maps to true; an inference rule is sound if its conclusion maps to true, assuming all the hypotheses are true. Thus, if a logical system is sound, all theorems in the logic are true statements about the domain of discourse. In this case, the interpretation is called a model for the logic.

Earlier we talked about "models" of interval temporal logic. Those models were interpretations that assigned values to state variables to make the temporal predicates true. Generating a model for a temporal predicate is executing a DANCE program. This section defines assertions which are really outside the program, but allow proof that the programs commands (imperative directives, temporal predicates) do what we claim they do.

A logical system is complete with respect to an interpretation if every formula that is mapped to true is a theorem; i.e. every true formula can be proven with the logical system. Unfortunately, parallel programs cannot have both sound and complete axiomatizations as a logical system. This is because program behavior must include arithmetic and a well-known result in number theory, Gödel's incompleteness theorem, states that no formal logical system that axiomatizes arithmetic can be complete. However, a logic that extends another logic can be relatively complete, meaning that it introduces no additional source of incompleteness beyond that already in the logic it extends. Fortunately, relative completeness is good enough since the arithmetic properties that we will employ are certainly true, even if not all of them can be proven formally.

Propositions

Propositional logic is an instance of a formal logical system that formalizes what is often called "common sense" reasoning. The formulas of the logic are called propositions. The axioms are special propositions assumed to be true. The inference rules allow new, true propositions to be formed from existing ones.

In propositional logic the symbols are:

Propositional constants: T and F (for "true" and "false")

Propositional variables: identifiers (p, q, r, ... )

Propositional operators: NOT, AND, OR, $\geq$, and =

The formulas of propositional logic can be single constant or variable symbols, or constructed by using propositional operators to combine two other formulas. There are five propositional operators: negation (NOT), conjunction (AND), disjunction (OR), implication ($\Rightarrow$), and equivalence (=). Their interpretations are given below.

| p | q | NOT p | p AND q | p OR q | p $\Rightarrow$ q | p = q |
|---|---|---|---|---|---|---|
| F | F | T | F | F | T | T |
| F | T | T | F | T | T | F |
| T | F | F | F | T | F | F |
| T | T | T | T | T | T | T |

Given a state s, we interpret a propositional formula P as follows. First replace each propositional variable in P by its value in s. Then use the table to simplify the result. When there are multiple operators in a formula, negation has the highest precedence followed by conjunction, disjunction, implication and finally equivalence. As with arithmetic expressions, parentheses may be used to force a different order of evaluation or to make the formula clearer. For example if p is false and q is true in a state, then the interpretation of the formula p OR ($\Rightarrow$q)

is:

$$p\ \text{OR}(p \Rightarrow q) = F\ \text{OR}(F \Rightarrow T)$$
$$= F\ \text{OR}\ T$$
$$= T$$

A formula P is satisfied in a state if it is true in that state. Formula P is satisfiable if there is some state in which it is satisfied. Formula P is valid if it is satisfiable in every state. A valid proposition is also called a tautology. In a sound propositional logic, an axiom is a tautology since it is assumed to be valid.

There are many tautologies in propositional logic just as there are many identities in trigonometry. The ones that we will use most are listed in the table below. These tautologies are called propositional equivalence laws since they allow a proposition to be replaced by an equivalent one. Applications of the propositional equivalence laws are transitive—in any given state, if P=Q and Q=R, then P=R.

| | |
|---|---|
| Law of Negation: | P NOT(NOT(P)) |
| Law of Excluded Middle: | P OR NOT(P) = T |
| Law of Contradiction: | P AND NOT(P) = F |
| Law of Implication: | P $\Rightarrow$ Q = NOT(P) OR Q |
| Law of Equality: | (P=Q) = (P $\Rightarrow$ Q) OR (Q $\Rightarrow$ P) |
| Laws of OR-simplification: | P OR P = P |
| | P OR T = T |
| | P OR F = P |
| | P OR (P AND Q) = P |
| Laws of AND-simplification: | P AND P = P |
| | P AND T = P |
| | P AND P = F |
| | P AND (P OR Q) = P |
| Computative Laws: | (P AND Q) = (Q AND P) |
| | (P OR Q) = (Q OR P) |
| | (P = Q) = (Q = P) |
| Associative Laws: | P AND (Q AND R) = (P AND Q) AND R |
| | P OR (Q OR R) = (P OR Q) OR R |
| Distributive Laws: | P OR (Q AND R) = (P OR Q) AND (P OR R) |
| | P AND (Q OR R) = (P AND Q) OR (P AND R) |
| DeMorgan's Laws: | NOT(P AND Q) = NOT(P) OR NOT(Q) |
| | NOT(P OR Q) = NOT(P) AND NOT(Q) |
| AND-elimination: | (P AND Q) $\Rightarrow$ P |
| OR-introduction: | P $\Rightarrow$ (P OR Q) |

Both AND-elimination and OR-introduction are examples of weakening a proposition. For example if a state satisfies (makes true) P AND Q, then it satisfies P alone. Thus, P is a weaker proposition than P AND Q since (in general) mare states satisfy just P than satisfy both P and Q. Similarly, in the OR-introduction tautology, P OR Q is a weaker proposition than P. Since F implies anything, F is the strongest proposition (no state satisfies it), and T is the weakest proposition (every state satisfies it).

Predicates

Propositional logic provides the basis for assertional reasoning. However, by itself it is too restrictive since the only propositional constants are T and F. DANCE has additional data types besides just boolean. Thus, we need a way to manipulate any kind of boolean-valued expression. Predicate calculus extends propositional logic to support this generalization. The extensions to propositional logic are:

Any expression that evaluates to T or F can be used in place of a propositional variable; or Existential (EXISTS or ∃) and universal (FORALL or ∀) quantifiers are provided to characterize sets of values.

This is the same reserved word (FORALL) as the parallel command, but within a predicate it is different! Since ∃ and ∀ are not ASCII characters, DANCE programs use instead. ∃ and ∀ are used in mathematical definitions where applicable.

The symbols of predicate calculus formulas are those of propositional logic plus relational operators and quantifiers. The formulas called predicates, are propositional formulas in which relational and quantified expressions may replace propositional variables. To interpret a predicate in some state, we first interpret each relational and quantified expression, and then interpret the resulting propositional formula.

When dealing with sets of values, we will often wait to assert that some or all values of a set satisfy a property. We could do this informally, but quantified expressions provide a more precise and compact method.

The existential quantifier, EXISTS, allows one to assert that some element of a set satisfies a property. It appears in expressions of the form:

(EXISTS $b_1, \ldots, b_n$:R:P)

The $b_i$ following the quantifier are new variables called bound variables; R is a formula that specifies the set of values (the range) of the bound variables: P is a predicate. The interpretation of existential quantification is true if for some combination of values of the bound variables (within range R), predicate P is true.

The universal quantifier, FORALL, allows one to assert that all elements of a set satisfy a property. Universal quantification takes the form:

(FORALL $b_1, \ldots, b_n$:R:P)

Again, the $b_i$ are bound variables, R specifies the range of values of bound variables, and P is a predicate. The interpretation of universal quantification is true if P is true for all combinations of the values of the bound variables.

In a quantified expression, the scope of a bound variable is the expression itself. Thus, a quantified expression is like a nested block. Many quantified expressions will also reference program variables. Thus, confusion could result if the name of ai bound variable conflicts with that of another variable, and should be avoided.

Laws for manipulation of quantified expressions:

DeMorgan's Laws for quantifiers:
    (EXISTS B : R : P) = NOT(FORALL B : R : NOT(P))
    (FORALL B : R : P) = NOT(EXISTS B : R : NOT(P))

-continued

Conjunction Law:
    (FORALL B : R : P AND Q) =
    (FORALL B : R : P) AND (FORALL B : R : Q)
Disjunction Law:
    (EXISTS B : R : P OR Q) =
    (EXISTS B : R : P) OR (EXISTS B : R : Q)
Empty Range Laws:
    (FORALL B : F : P ) = T
    (EXISTS B : F : P) = F
    (NUM B : F : P) = 0
    (SUM B : F : P) = 0
    (PROD B : F : P) = 1

The counting quantifier, NUM, adding quantifier, SUM or Σ, and multiplying quantifier, PROD or Π, can be helpful in describing properties of groups of elements.

Textual substitution is the final concept from predicate calculus employed:

Textual Substitution: If no variable in expression e has the same name as any bound variable in predicate P, then $Px_e$ is defined to be the result of replacing every free occurrence of x with e. Textual substitution is used for the assignment command.

Brian's Programming Logic

A programming logic is a formal system that facilitates making precise, mathematical statements that program behavior. Brian's Programming Logic (hereinafter BPL) derives from Andrews' PL, suitably modified for the DANCE language and its model of computation.

As with any formal logical system BPL contains symbols, formulas, axioms, and inference rules. The symbols of BPL are predicates, curly braces, and DANCE programming language commands. The formulas of BPL are triples of the form:

{P}C{Q}

Above, P and Q are predicates; C is a simple or compound command. P and Q are assertions about the behavior of C. In DANCE, C is a temporal predicate which is made true by construction of an interval. An interval (or subinterval) is a lattice states. The assertion P applies to the first state in the interval; Q applies to the last state.

In P and Q, the free variables (those not bound by a quantifier) are either state variables or logical variables. State variables are introduced explicitly by declarations and are manipulated by execution of DANCE commands. Logical variables are special variables that serve as placeholders for arbitrary values; they appear only in predicates (between braces), not in DANCE commands.

Interpretation of a Triple: Let each logical variable have some value of the correct type. Then the interpretation of a triple {P}C{Q} is true if, whenever execution of C is begun in a state satisfying P, both the execution of S terminates and the resulting state satisfies Q.

Please note: Andrews uses partial correctness in his triple interpretation. He then requires a separate proof of termination to derive total correctness. I prefer a total correctness interpretation which includes the termination requirement.

In a triple, predicates P and Q are called assertions since they assert that the program state must satisfy the predicate in order for the interpretation of the triple to be true. Assertions characterize acceptable program states; they may be considered specifications, as contracts between the implementer (programmer) and the user (customer).

Predicate P is called the precondition of C, denoted pre(C). Predicate P characterizes the states of program variables; P must be satisfied before execution of C begins.

Predicate Q is called the postcondition of C, denoted post (C). Q characterizes the states of program variables after execution of C. Two special assertions are provided: T and F. Predicate T (true) characterizes all program states; predicate F (false) characterizes no program state.

In order for the interpretation of a triple to be a model for programming logic BPL, the axioms and inference rules must be sound. This ensures that all theorems provable in BPL are sound. For example, the following triple should be a theorem:

$$\{x=0\} \; x:=x+1 \; \{x=1\}$$

However the following triple should not be a theorem since assigning a value to x cannot magically set y to 1.

$$\{x=0\} \; x:=x+1 \; \{y=1\}$$

In addition to being sound, BPL is relatively complete so that all triples that are both true and represent useful computation are in fact provable as theorems.

Axioms

This section presents axioms of BPL along with informal justifications of their soundness and relative completeness. Expression evaluation is assumed to be side-effect free; i.e. only functions may be invoked within expressions because they are side-effect free.

The skip command changes no variables. If predicate P is true before execution of skip, it remains true when skip terminates.

Skip Axiom: $\{P\}$ skip $\{P\}$

An assignment command assigns a value (say e) to a variable (say x) and thus in general changes program state. At first glance it might seem that the axiom for assignment should start with the precondition pre(x:=e), and that the postcondition should be pre(x:=e) plus a predicate to indicate that now x has value e. However, going in the other direction results in a much simpler axiom for assignment. Assume that the post condition of an assignment is to satisfy a predicate P. Assignment (with side-effect free expression evaluation) changes only the designated variable x, so all other program variables have the same value before and after the assignment. Second, x has a new value e and thus any relation pertaining to x that is to be true after the assignment has to have been true before with x replaced by e. Textual substitution makes exactly this transformation.

Assignment Axiom: $\{Px_e\}x:=e\{P\}$

To illustrate the use of this axiom consider the following triple:

$$\{T\}x:=5 \; \{x=5\}$$

This is a theorem since:

$$(x=5)x_5=(5=5)=T$$

This indicates that starting in ally state and assigning a value to a variable gives the variable that value. As a second example, consider the triple:

$$\{y=1\}x:=4 \; \{(y=1) \; AND \; (x=4)\}$$

This is also a theorem since:

$$((y=1) \; AND \; (x=4))x_4=((y=1) \; AND \; (4=4))=((y=1) \; AND \; T)=(y=1)$$

This illustrates that relations about variables that are not assigned to are not affected by assignment command execution. The semantics of array and record elements can be tricky but understood that arrays and records are like functions from indices (for arrays) or field selection (for records) to the values of the appropriate element. Assignment to an element returns the whole array or record with only that element changed.

Inference Rules

The program state changes as a result of executing assignment commands. The axioms for these statements use textual substitution to introduce new values into predicates. The inference rules of BPL allow the theorems resulting from these axioms to be manipulated and combined. There is one inference rule for each of the statements that affect the flow of control in a DANCE program: sequential composition (;), parallel composition (& and FORALL), alternation (IF FI), and iteration (DO OD). Each inference rule has two parts separated by a horizontal line. If the statement(s) above the line are true, the statement below the line can be inferred to be true.

The first rule is for sequential composition. If a triple, $\{P\}$ S1 $\{Q\}$ is true and another triple $\{Q\}$ S2 $\{R\}$ is true where $\{Q\}$ is the same assertion in both cases, then the sequential composition of S1 and S2 is true, $$\{P\} \; S1; \; S2 \; \{R\}.$$

Sequential Composition Rule:

$$\frac{\{P\} \; S1 \; \{Q\} \; \text{and} \; \{Q\} \; S2 \; \{R\}}{\{P\} \; S1 \; ; S2 \; \{R\}}$$

Suppose we have are alternative command of the form:

$$\begin{aligned}
& \{P\} \\
IFFY: \quad & IF \\
& B1 => S1 \\
& [] \\
& B2 => S2 \\
& [] \\
& \ldots \\
& [] \\
& Bn => Sn \\
& FI \\
& \{Q\}
\end{aligned}$$

Where each of the B's are boolean valued expressions and the S's are DANCE commands. By the DANCE semantics at least one of the B's (guards) must be true. Then if whenever both P and Bi are true $\{P$ and $Bi\}$ and the statement Si is executed and Q is true of the state that results $\{Q\}$ then we call infer that the whole alternative command is true.

Alternative Rule:

$$\frac{FORALL \; i:i \; IN \; (1 \ldots n): \; \{P \; \text{and} \; B_i\} \; S_i \; \{Q\}}{\{P\} \; IFFY \; \{Q\}}$$

Suppose we have an iterative command of the form:

$$\{I\}$$
DOIT: DO
$$B1 => S1$$
$$[]$$
$$B2 => S2$$
$$[]$$
$$\ldots$$
$$[]$$
$$Bn => Sn$$
OD
$$\{I \text{ AND NOT}(B1 \text{ OR } B2 \text{ OR} \ldots \text{OR } Bn)\}$$

Where the B's are boolean-valued expressions and the S's are commands. The predicate I is the loop invariable; it is true before and after each evaluation of the loop. For one of the commands to be executed (Si) its guard (Bi) must evaluate to true. Therefore, if each triple of the form {I and Bi} Si {I} is true (i.e. execution of commands Si when Bi=true keeps the loop invariant true), then when the loop terminates (all the guards are false) we can infer that {I} DOIT {I and not ($B_1$ or ... or $B_n$)} is true.

Iterative Rule:

$$\frac{\text{forall } i : i \text{ IN } (1 \ldots n) : \{I \text{ and } B_i\} \, S_i \, \{I\}}{\{I\} \text{ DOIT } \{I \text{ and not}(B_1 \text{ or} \ldots \text{or } B_n)\}}$$

The iterative rule, as stated, has a problem partial correctness. For an iterative command to terminate, eventually all the guards must be false. To prove termination an integer bound function must be included as discussed in the later section on weakest precondition predicate transformers.

$$\frac{\forall i: i \in [1 \ldots n] : B_i => (\text{bound} > 0) \text{ and}}{\{I \text{ and } B_i \text{ and bound}=bd\} \, S_i \, \{I \text{ and bound}<bd\}}$$
$$\{I\} \text{ DOIT } \{I \text{ and not } (B_1 \text{ or} \ldots \text{or } B_n) \text{ and not (bound} > 0)\}$$

The rule of consequence allows us to strengthen a precondition, weaken a postcondition, or both. This rule is not really necessary since it follows from the underlying predicate calculus, it is handy in proofs, and will later be used to understand weakest-precondition predicate transformers. Suppose predicate P1 implies predicate P, predicate Q implies predicate Q1, and the triple {P} S {Q} is true. Then we can infer that {P1} S {Q1} is true.

Rule of Consequence:

$$\frac{P1 => P, \{P\} \, S \, \{Q\}, Q => Q1}{\{P\} \, S \, \{Q1\}}$$

Parallel composition (&) and the parallel command (FORALL) are much more difficult to make rules for. The problem is "interference."Interference occurs when more than one intervals reference the same variables. Sometimes interference is desired. Accessing shared variables with combinable operations allows access to data structures in parallel. Andrews insists on "interference freedom." Consequently his programs are littered with "await" statements that block execution until some boolean expression is true. By dumping any operation that may read or write a variable used by a different process into an appropriately guarded await statement, Andrews achieves interference freedom. Furthermore, Andrews makes an unwarranted assumption that assignment commands are executed atomically. Assumptions of atomicity (a command or group of commands are executed indivisibly) pervade Andrews' book by placing angle brackets around whatever is to be atomic. To achieve atomicity some form of critical section must be enforced, which, of course, destroys efficiency.

For DANCE we need an inference rule something like: for all intervals that may be executed concurrently all the variables that each interval accesses (either read or write) are either
1) Read-only constant values,
2) Variables no other interval accesses, or
3) Shared variables properly accessed with combinable operations.

Read-only constants and private variables are obviously O.K., but what are "properly accessed" shared variables? Remember that the combinable operations have hardware-enforced atomicity; they are both indivisible and can be performed simultaneously. The result of combinable operations (even if they occur at the same clock cycle) is the same as if they occurred in some sequential order. The shared variables are properly accessed if-and-only-if the correctness of the accesses is order-independent. Now we are ready to form the parallel rule for DANCE.

Parallel Composition Rule $$\frac{\{P1\} \, S1 \, \{Q1\}, \{P2\} \, S2 \, \{Q2\}, \text{ and AccessOK}(S1, S2)}{\{P1 \text{ and } P2\} \, S1 \, \& \, S2 \, \{Q1 \text{ and } Q2\}}$$

where AccessOK(S1,S2) is defined as:
forall variables Vi occurring in S1 or S2
neither S1 nor S2 changes the value of Vi,
only one of S1 or S2 accesses (read or write) V1, or
S1 and S2 access Vi solely via combinable operations and the truth of Q1 and Q2 is independent of the result of the combinable operations;
or more formally:

```
AccessorOK(S1,S2) =
    ∀ Vi: Vi ∈ S1 ∪ S2:
        (Vi ∉ lhs(S1) ∪ lhs(S2) ) or
        (Vi ∈ S1 and Vi ∉ S2) or (Vi ∈ S2 and Vi ∉ S1) or
        ( (Vi ∈ co(S1) and Vi ∈ co(S2) ) =>
            (co(S1) ⊑ co(S2) and co(S2) ⊑ co(S1) )
    lhs(S) = { v|v := e ∈ S }
    co(S) = { v| fetch_add(v,e,v2) ∈ S or swap(v,e,v2) ∈ S or ... }
```

Since the parallel command (FORALL) is merely a parameterized generalization of parallel composition, the parallel composition rule may be simply extended.

Parallel Command Rule:

$$\frac{\text{forall } i{:}i \text{ in range:}\{P(i)\} \, S(i) \, \{Q(i)\} \text{ and}}{\text{AccessOK}(S(i)) \text{ and } P => P(i) \text{ and } Q(i) => Q}$$
$$\{P\} \text{ FORALL } i \text{ IN range DO } S \, \{Q\}$$

Where P(i), S(i), and Q(i) are commands or assertions where the variable i has assumed one of the values in the range of the parallel command.

These inference rules cover only the major language constructs. Such things as types, whether constructed or abstract, have no inference rules as such. These rules do however allow inferences to be made about the behavior of the DANCE control structures. The next section considers full-blown proofs using BPL.

Program Correctness Proofs

Complete proofs are onerous both to concoct and to follow. Only one example of a complete proof will be presented and that of a very small program: Dijkstra's linear search. An array a[1 ... n] is given for some positive integer n. Also given is that the value x is held by some element of a. The problem is to find the first occurrence of x in a.

```
--there is some element holding the value searched for
{ P: n>0 and (exists j : 1<=j<=n : a[j]=x) }
--n is positive and some element of "a" holds value x
i := 1;
DO (a[i] /= x) => i:= i+1 OD
{LS: a[i] = x and (forall j : 1 <=j<i : a[j] /= x) }
--a[i] holds x and no element of a with smaller index holds x
```

The following steps constitute the proof:

```
⇒   Assignment Axiom, a postualte of BPL
(1)  { P and 1=1} i := 1 { P and i=1 }
⇒   And-simplification of (1)
(2)  { ( P and 1=1)=P }
⇒   Rule of Consequence, (1) and (2)
(3)  { P } i:= 1 { P and i=1 }
⇒   Assignment Axiom, (3)
(4)  { P and (forall j : 1<=j<i+1 : a[j] /= x) }
     i := i + 1
     { Inv: P and (forall j : 1 <=j<i : a[j] /= x) }
```

Note: The assignment axiom just plugs in i+1 for i in the post condition. Also, the postcondition has been labeled Inv for the loop invariant.

```
⇒   substitution for label Inv into (Inv and (a[i] /= x) )
(5)  (Inv and (a[i] /= x) ) -> ( P and (forall j:1<=j<i: a[j] /= x) and (a[i] /= x) ) }
⇒   extending the range of j in (5)
(g)  { ( Inv and (a[i] /= x) ) -> ( P and (forall j : 1<=j<i+1 : a[j] /= x) ) }
⇒   Rule of Consequence, (4) and (6)
(7)  { Inv and (a[i] /= x) }
     i := i + 1
     { Inv }
⇒   Iterative Rule, (7)
(8)  { Inv }
     DO (a[i] /= x) => i := i+1 OD
     { Inv and (a[i] = x) }
⇒   Empty Range Law and (4)
(9)  { (P and i=1) => Inv }
⇒   Sequential Composition Rule, (8) and (9)
(10) { P }
     i := 1;
     DO (a[i] /= x) => i:= i+1 OD
     { Inv and (a[i] = x) }
⇒   Law of Equality and substitution for Inv and LS
(11) { (Inv and a[i]=x) => LS }
⇒   Rule of Consequence, (10) and (11)
(12) { P }
     i := 1;
     DO (a[i] /= x) => i:= i+1 OD
     { LS }
```

As this example illustrates even for trivial programs a full-blown proof is voluminous and hard to follow. The proof outlines in the next section present a short-hand method to prove programs correct.

Proof Outlines

A proof outline, sometimes called an annotated program, consists of program commands interspersed with assertions. A complete proof outline contains at least one assertion before and after each command. A complete proof outline encodes applications of the axioms and inference rules for each command in the program. Simply the assertions before and after a command form a triple that correspond to application of the axiom or inference rule defining the behavior of the command.

Assertions in proof outlines can be viewed as precise comments in a programming language. They characterize exactly what is true of the state at various points in the program. Just as it is neither necessary nor useful to place a comment between every command in a program it is usually neither necessary nor useful to place an assertion before every command in a proof outline. Thus we will place assertions at critical points to help provide convincing evidence that a proof outline represents a proof. Some day I hope to create a "proof verifier" that can automatically determine whether a program meets its specification. Such a proof verifier will likely need a complete proof outline.

Program Derivation

The linear search example showed how to use the programming logic BPL to construct a proof of correctness. Usually a programmer is given a specification of initial conditions (precondition) and the final goal (postcondition). Additionally, the program is expected to terminate.

Weakest Preconditions

Suppose the goal of a program S is to terminate in a state satisfying predicate Q. The weakest precondition of command (or composition of commands) S and a predicate Q, denoted wp(S, Q), is a predicate characterizing the largest set of states such that, if execution of S is begun in any state satisfying wp(S, Q), then the execution is guaranteed to terminate in a state satisfying Q. The predicate transformer wp is called the weakest since it produces a predicate characterizing the largest set of states that lead to a totally correct program.

The function "wp" is an odd function. It takes as its arguments a predicate and a command. It returns another predicate. In most cases wp(S, Q) is not even computed. It is sufficient to show that the precondition implies wp(S, Q). Rather than a plurality of inference rules weakest precondition predicate transformers use a single inference rule for program proofs. In practice wp is easier to work with.

Suppose we have a triple

{P} S {Q} we wish to prove is correct.

Weakest Precondition Inference Rule:

$$\frac{wp(S, Q) = R \text{ and } P \Rightarrow R}{\{P\} S \{Q\}}$$

If $P \geq wp(S, Q)$ then $\{P\} S \{Q\}$ is a theorem of BPL and hence is true. The following laws allow manipulation of expressions containing wp.

Law of Conjunction:

wp(S, Q) and wp(S, R)=wp(S, Q and R)

Law of Disjunction:

wp(S, Q) or wp(S, R) $\Rightarrow$ wp(S, Q or R)

Note that the law of disjunction is only an implication while the law of conjunction has equality.

Command Semantics using Weakest Preconditions

The skip command always terminates and changes no program variable.

wp(skip, Q)=Q

An assignment command terminates if the expression and target variable are well defined. Henceforth, wee assume this to be true. If execution of x:=e is to terminate in a state satisfying Q, it must start in a state in which every variable except x has the same value and x is replaced by e. As for the assignment axiom, this is exactly the transformation provided by textual substitution.

wp(x:=e, Q)=Qx$_c$

Sequential composition of commands leads to composition of wp.

wp(S1; S2, Q)=wp(S1, wp(S2, Q))

Parallel composition of commands leads to conjunction provided they are AccessOK.

AccessOK(S1, S2) $\Rightarrow$ wp(S1 & S2, Q)=wp(S1, Q) and wp(S2, Q)

An alternative command terminates if all expressions in the guards are well defined, one (or more) guard is true and the selected command Si terminates. For alternative command of the form:

```
IFFY:    IF
         B1 => S1
         []
         B2 => S2
         []
         ...
         []
         Bn => Sn
         FI
```

The weakest precondition predicate transformer for alternative commands is:

wp(IFFY, Q)=(B1 $\geq$ wp(S1, Q)) and ... and (Bn $\geq$ wp(Sn, Q))

The iterative command has a messy weakest precondition since it may not terminate. In fact wp(DOIT, Q) is hard to determine and not very useful. Instead, an implication will be given based on a loop invariant and bound function.

```
DOIT:    DO
         B1 => S1
         []
         B2 => S2
         []
         ...
         []
         Bn => Sn
         OD
```

Let BB be the disjunction of the guards BB=B1 or B2 or . . . or Bn. Let I be a predicate, and "bound" be an integer-valued expression whose value is non-negative. Then I $\Rightarrow$ wp(DOIT, I and not(BB))

provided (I and Bi) $\Rightarrow$ wp(Si,I) for $1 \leq i \leq n$, (I and BB) $\Rightarrow$ bound>0, and (i and Bi and bound=B) $\Rightarrow$ wp(si, bound<B) for $1 \leq i \leq n$.

The main implication is the essence of a loop invariant— it is true before execution of the loop and still true after enough executions so all the guard are false. The invariant and a true guard must imply the weakest precondition of the command with the true guard. As long as any guard is true the bound function is positive. Finally, execution of a command with a true guard reduces the bound function. The constantly decreasing, yet non-negative bound function ensures termination. Derivation of loop invariants and bound functions is an art. David Gries' *Science of Programming* has the best description of how to determine loop invariants.

The weakest precondition for the parallel command will finish our suite of predicate transformers.

FA: FORALL i IN range DO S wp(FA, Q)=wp(S[i1], Q) and wp(S[i2], Q) and . . . and wp(S[ik], Q)

where i1, 12, . . . , ik are the values i takes in tie range and S[ix] is the statement S with i replaced by the value ix.

An Extended Example: Sorting

To better explain the features of the DANCE language a sorting package is presented. The syntax is "full-blown" DANCE and so is slightly different from the syntax in previous sections. The line numbers at the left are not part of the program, but allow discussion of program text.

```
 1 package Sort[rt,ar,<]
 2 is
 3 -- this package contains a generic, parallel sorting procedure.
 4 -- an array, its type, and a total-order operator are provided by
 5 -- the calling package.
 7 required
 8 --these type parameters must be supplied to use the package
 9 type rt; --this is the type of elements to be sorted
10 type ar is array[<>] of rt; --this type is the array to be sorted
11 function '<' ( a : rt; b : rt) return bool;
12     {(c<d) and (d<e) =>(c<e)}
13 --a total order operator must be supplied for the element type
14 end required
16 procedure sort( orig : IN SPREAD ar; final : OUT SPREAD ar; low, high : IN integer);
17 {pre: forall m,n, :i <= m,n <= j : orig[m] /=orig[n] }
18 --the elements are distinct
19 {post: forall i,j : low <= i <j <=high : final[i] < final[j]
20      AND final = permutation(orig) }
21 --the post condition of sort says that the elements are in order and
22 --the result has the same elements as the original array
23 end package --Sort
25 --the text above this comment is the specification of an abstract data
26 --type called Sort and is called a "package"
27 --the following text denotes an object, "ParallelSort" of type "Sort"
28 --and is called a "body"
29 --only bodies can be executed
31 package body ParallelSort:Sort
32 is
33 procedure sort( orig : IN SPREAD ar; final : OUT SPREAD ar; low, high : IN integer)
34 is
35 declare
36 inter: SPREAD ar[low..high];
37 --array "spread" over many banks to reduce memory contention
38 pivot : integer;
40 begin--of Sort
41 {pre: forall m,n, : i <= m,n <= j : a[m] /= a[n] }
42 --the elements are distinct
43 if
44    (low = high) => final[low] := orig[low]
45    {forall i,j : low <= i < j <= high : final[i] < final[j]}
46 [] --this symbol can be read as "or if"; it is two square brackets [ ]
47   (low > high) => skip
48 []
49   (low < high) =>
50    begin
51    partition(low, high, orig, inter, pivot)
52    {forall m,n : (low <= m < pivot < n <= high) : inter[m] < inter[n] }
53    ; --explicit sequential composition
54    sort( inter[low..pivot-1], final[low..pivot-1], low, pivot-1)
55    {forall i,j : low <= i < j <= pivot-1 : final[i] < final[j]}
56    & --parallel composition
57    sort( inter[pivot+1..high], final[pivot+1..high], pivot+1, high)
58    {forall i,j : pivot+1 <= i < j <= high : final[i] < final[j]}
59    &
60    final[pivot] := inter[pivot]
61    end
62 fi
63 {post: forall i,j : low <= i < j <= high : final[i] < final[j]
64 AND final = permutation(orig) }
65 end --of sort procedure
67 procedure partition( i,j : IN integer; a[i..j] : IN SPREAD ar;
68                      hold[i..j] : OUT SPREAD ar, k: OUT integer)
69 is
70 {pre: forall m,n, : i <= m,n <= j : a[m] /= a[n]}
71 --the elements are distinct
72 {post: forall m,n : (i <= m < k < n <= j) : hold[m] < hold[k] < hold[n] }
73 --the lower part's values are less than the values in the upper part
74 declare
75 low_index := i, high_index := j : SHARED integer;
76 h := (i + j) DIV 2 : integer;
77 --choose an entry from a[i..j] to use as a pivot.
78 --pick from the middle: h = (i+j) DIV 2
79 begin
80   {i <= h <= j}
81   forall t in i..j do
82   begin
83    if
84     ( a[t] < a[h] ) =>
```

```
 85    declare
 86      s : integer;    --declare local s
 87    begin
 88      fetch_add(low_index, 1, s);
 89      --fetch_add indivisibly reads the value in the first
 90      --variable, adds the second parameter returning the
 91      --result in the third, it is combinable
 92      hold[s] := a[t]
 93      {forall m : i <= m <= s : hold[m] < a[h])}
 94    end
 95  []
 96    ( a[h] < a[t] ) =>
 97    declare
 98      s : integer;
 99    begin
100      fetch_add(high_index, -1, s);
101      hold[s] := a[t]
102      {forall m : s <= m <= j : a[h] < hold[m]}
103    end
104  []
105    ( a[t] = a[h] ) => skip
106  fi
107  end --of forall
108  ;
109  k := low_index & hold[low_index] := a[h]
110  {forall m,n : (i <= m < k < n <= j) : hold[m] < hold[k] < hold[n] }
111  end -- of partition
113 end body --of package ParallelSort:Sort
```

Line 1 begins the package declaration called "Sort." The package declaration, which continues through line 23 defines an abstract data type (ADT). ADTs are more powerful than constructed data types in that they contain operations (functions and/or procedures) that manipulate internal, hidden data structures. DANCE packages are even more powerful than most ADTs in that they allow parametric or inclusion polymorphism. Line 1 includes three parameters: "rt", "ar", and "<". These parameters are necessarily types—sets of values. The bounded universal type quantification affected by these parameters allows the package to be used with many other (currently unspecified) types so long as they uphold the bounds required of them.

Line 2 follows Ada syntax; "is" commonly connects the header of a declaration with its body.

Lines 3, 4, & 5 are comments. Comments begin with two dashes and continue to the end of line.

Lines 7 through 14 are a requirement clause. It demands that "rt" be any type whatsoever; "ar" be a one-dimensional array of unspecified length whose elements are of type "rt"; and "<" be a two-input function on elements of type "rt" and returning a boolean result. The assertion in line 12 demands that the function "<" be transitive, otherwise sorting will not produce an ordered list of elements.

Line 16 declares that the package contains a single item—the procedure "sort", with four parameters: "orig" of type "ar" to be supplied by the (caller (IN), "final" which holds the result (OUT), and "low" and "high" which indicate the range of "orig" to be sorted. The reserved word "SPREAD" causes the dynamic memory allocation of "orig" and "final" to put parts of it in many different memory banks (processors) so that "orig" and "final" may be concurrently accessed without contention. When concurrently accessible data structures are placed in a single memory bank, memory conflicts call significantly degrade performance. Line 17 demands as the precondition for invoking "sort" that the elements of the array are distinct—no duplicates. Modifying the code to handle duplicates requires an additional array to hold multiple matches of the chosen pivot. Lines 19 and 20, the postcondition, assure that when "sort" is done, the elements will be in sorted order. Other programs that invoke "sort" can use the postcondition in their own proof outlines. Such hierarchical proofs are essential for large programs. Line 23 concludes the package declaration for "Sort".

Line 31 declares that the following package body is an object named "ParallelSort" of type "Sort". Because "ParallelSort" is of type "Sort" the programmer using it needs know nothing about its internal details, just that it operates as specified by "Sort". In fact there could be many different objects of type "Sort". Sequential "BubbleSort" or "QuickSort" could be written, also of type "Sort", that would perform the same operation, but in a different way. A program written to use type "Sort" could use any of the different "ParallelSort", "BubbleSort", or "QuickSort" with equal correctness, but different performance.

Line 33 begins the declaration of the procedure "sort" and must exactly match the declaration in the package "Sort". Lines 35 through 38 introduce local variables "inter" and "pivot" by existential quantification. They are only visible within the following begin-end block which corresponds to a domain when the program is executed.

Line 40 begins the body of "sort", which is just one big alternative command (if-fi). Line 41 restates the precondition. Line 43 begins the alternative command which stretches to line 62. Line 44 contains one of the two alternatives. The guard, "(low=high)" is evaluated and if true, the body may be executed. (If more than one guard is true the choice of body is nondeterministic.) In this case an array with a single element is already sorted. Line 45 is the assertion established by executing the first alternative. Note that it is the same as the overall postcondition for the whole procedure. Line 46, the "box" separates alternatives. Line 47, which should never be executed is necessary to ensure that at least one guard is true.

Line 49 guards the third alternative in which there is more than one thing to sort. Line 51 invokes the "partition" procedure. Line 52 asserts that the data have been divided (partitioned) such that one part holds elements that are all less than the pivot and elements in the other part are greater than the pivot. This corresponds to the postcondition of "partition". Line 53, a simple semicolon, represents sequential composition of temporal logic formulae. Lines 54 and 57 recursively invoke "sort" on each part divided by "partition". Line 56, an ampersand, represents parallel composition; the two sorts may execute concurrently. Lines 55 and 58 assert that each part is in order which implies lines 63 and 64, the postcondition that the whole array (of this invocation) is in order. Lines 59 and 60 copy the value of the pivot concurrently with sorting of lines 54 and 57. Line 63 marks the end of the procedure "sort".

Lines 67 and 68 declare the procedure "partition" and its parameters. Note that the arrays passed must be "SPREAD". Lines 70 and 72 are the precondition and postcondition, respectively, for "partition". The postcondition asserts that the pivot, "k", divides "hold" into greater and lesser parts.

Lines 74, 75, and 76 introduce local variables "low_index", "high_index", and "h". Initially "low_index", "high_index", and "h" have values "i", "j", and the average of "i" and "j" respectively. The reserved word "SHARED" demands that the declared variables reside on a non-cacheable page; all accesses must use the layered network—even if it happens to reside in local memory.

Line 79 begins the main body of procedure "partition". Any value for "h" between "i" and "j" inclusive will satisfy the assertion in line 80; the average was chosen to minimize pernicious data arrangements.

Line 81 uses the parallel command to create j−i+1 subintervals each with a different value for "t" from "i" to "j" inclusive to be executed concurrently. Since the parallel command is really bounded, universal, temporal quantification, "t" is really a constant and must not be assigned in any subinterval. Line 82 begins the block for which values of "t" are valid.

Line 83 begins an alternative command. Line 84 compares the value of the element of "a" unique to this subinterval with the common pivot using the total order operator that must be supplied to use the package. Lines 85 and 86 create a new local variable "s" that is used in line 88 to determine the index to which this element "a[t]" should be assigned. In this case "a[t]" is smaller than the pivot "a[h]" so "low_index" Is used to assign a slot in the lower half of "hold" in line 92. Since "low_index" was declared "SHARED" any number of fetch-adds may occur at the same clock cycle with different values for "s" returned as if they had been executed in some sequential order. We don't really care which element of "hold" gets the value of "a[t]" so long as it's in the lower part (less than the pivot) and no other subinterval tries to assign the same element. Line 93 asserts that all the elements between "i" and "s" inclusive are smaller than the pivot.

Line 95 separates alternatives of the alternative command starting at line 83. Lines 96 through 103 are similar to lines 84 through 94 except that the value of "a[t]" is assigned to the high end of "hold". Line 105 handles the pivot and does nothing. Line 106 ends the alternative command; line 107 ends the parallel command; line 108 performs sequential composition. Line 109 copies the index of the pivot to "k" and the value of the pivot into the hole left in "hold".

The assertion on line 110 states that the elements on the low end are smaller than the elements on the high end. The inequality is tricky; "k" will be left one greater than the index of the last element considered that was smaller than the pivot—that's the hole where the pivot's value goes. Line 110 is the postcondition that procedure "partition" seeks to establish. Line 111 ends "partition"; Line 113 ends the whole package body of "ParallelSort".

To invoke "ParallelSort", the package must be imported and specialized. Use of "ParallelSort" to sort employee records alphabetically by last name is shown below. In a declaration part:

```
import sort from ParallelSort:Sort
[rt => employee_record,
 ar => employee_array,
 '<' => (employee_record.last_name < employee_record.last_name)]
end import
```

In the body of the calling procedure:

ParallelSort.sort(unsorted_team,sorted_team,1, number_of_swedes)

Of course "sort" could be used several different ways in the same procedure provided that it is imported with appropriate type parameters each time.

This package is also used for an example of parallel execution in OPERATION OF INVENTION, infra.

Example Programs

The following DANCE programs are selected to demonstrate the efficiency and elegance of DANCE compared with the code in *The Design and Analysis of Parallel Algorithms*, Selim G. Akl, Prentice-Hall, 1989.

Selection

Akl dives into "selection" first. His algorithm picks the kth largest item from an unordered sequence. He then uses selection to pick the median of the sequence for partitioning of the sequence as part of sorting. He claims optimality (in order terms) for his algorithm, but it is so twisted and hard to follow, his claims are difficult to verify. However for this algorithm to have any chance, the number of elements in the sequence must be much larger (orders of magnitude) than the number of processors.

Merging

Akl needs merging to sort. DANCE doesn't. Akl devotes a long chapter to merging on various models and algorithms to merge two sorted sequences into a single sequence. Merging is an excellent example of a simple, efficient sequential program becoming a monstrous parallel program.

Sorting

Akl then uses his inelegant selection and merging to concoct a slow sorting algorithm. Sorting with combinable operations is easy to execute. The trick is to use fetch-add operations to determine the array index during partition. An arbitrary element is chosen as the pivot. Each element is then compared to the pivot and if it is smaller, put at the beginning of the array, otherwise put at the end of the array.

Isoefficiency analysis: The DANCE program used as an example earlier is similar to "quicksort" which recursively partitions the list into larger and smaller halves, and then sorts the halves. The recursion stops when a partition has but a single element. If a median value is used then each step the algorithm requires logN waves of partitioning. However finding the median requires examining every element which is really wasted effort. If an arbitrary element is chosen as the pivot then O(logN) waves are needed but each wave is much faster. Picking an arbitrary pivot element takes Ucalc time the unit time of a sequential computer to perform a single operation—roughly one instruction. Comparing an element with the pivot, computing its new index, and copying it takes $3*U_{calc}$ time. Therefore the amount of time for each wave is $3*N*U_{calc}$+number of pivot picks$*U_{calc}$. On the first wave a single pivot will be selected. On each wave the number of partitions roughly doubles, so throughout the whole sorting procedure about N will be chosen. Since there will be (on average) logN waves the total amount of time for quicksort is:

$$T_{calc}=(3*N*logN+N)*U_{calc}$$

The analysis of the DANCE sort (on Multitude layered network parallel processor with combinable operations) is similar except that partitioning (and sorting) can be done in parallel. Choosing the pivot must be done before partitioning, so we incur some "Amdahl's law" penalty, but since many pivots can be chosen simultaneously as the algorithm progresses, and large partitions will automatically have more processors assigned to them the penalty is negligible, so the sacrifice that is taken in performance is a single $U_{calc}$ per wave (hence the logN term below). So the total amount of time to compute in parallel is:

$$T_p = (3*N*logN/P + logN)*U_{calc}$$

The overhead $T_o$ is:

$$T_o + T_{calc} = P*T_p$$

$$T_o = (3*N*logN + P*logN)*U_{calc} - (3*N*logN+N)*U_{calc}$$

$$T_o = (P*logN - N)*U_{calc}$$

To maintain the same efficiency, the ratio of To to Tcalc must be held constant:

$$To/Tcalc = K = (P*logN - N)/(3*N*logN+N)$$

So the number of processors must increase as:

$$P = (K*(3*N*logN+N)+N)/logN$$

$$P = O(N) + O(N/logN) + O(N/logN) = O(N)$$

So the parallel quicksort is (order) optimal. Increasing the number of processors proportionally with the number of elements maintains the same efficiency. Furthermore, it is expected that real running times with $P \leq N$ to have extremely high real efficiencies since the vast majority of operations are completely parallelizible.

Matrix Manipulation

Matrix operations are obligatory for many numerical analysis problems and many other problems such as connected components.

```
function Transpose(B:matrix, s:integer) return matrix
--the type "matrix" must be declared elsewhere
is
declare
    C: SPREAD matrix;
begin
    forall i,j in [1..s,1..s] do
        C[i,j]:=B[j,i]
    ;
    return C
end --of Transpose
function Multiply(A,B:matrix; s:integer) return matrix
is
declare
    C: SPREAD matrix :=0
begin
    forall i,j in [1..s,1..s] do
        declare
            k : integer :=1;   --local k for each parallel interval
        begin
            {inv: (sum m : k<=m<=s : A[i,k]*B[k,j]) + C[i,j] = val}
            {bound: s-k >= 0}
            do
                (k <= s)=>
                    begin
                        C[i,j] := A[i,k] * B[k,j] + C[i,j]
                        ;
                        k := k+1
                    end
```

```
                od
                {C[i,j] = val = sum m : 1 <= m <= s : A[i,k]*B[k,j]}
            end --of forall
        {C = A*B}
        ;
        return C
end --of Multiply
```

For both of these matrix operations the parallel versions do no extra work so the efficiency is 1 with unit-linear isoefficiency. Well not quite since the burden of scheduling requires a fetch-add to get an index and a DIV-MOD to extract the i,j indices of the element of matrix C to be calculated. Still, for large matrices that overhead is negligible. Akl presents some ugly algorithms for matrix transposition and multiplication for mesh, shuffle, and cube architectures vividly demonstrating how hard it is for programmers to map their algorithms onto static network architectures (Akl, ch. 7). Furthermore his CRCW multiplication algorithm (Akl p. 187) has a serious flaw in that his definition for write conflicts has "the sum of the numbers to be written is stored in that location." This risks not having all writes exactly simultaneous, thereby overwriting partial sums already computed.

Linear Equation Solution

The oldest of all linear equation solution algorithms is Gauss-Jordan elimination. Given a matrix A and a vector b determine a vector x such that Ax=b. Akl's CREW SIMD algorithm (Akl, p. 231) does not test for division by zero yet makes no explicit requirement that the matrix be non-singular or have a non-zero diagonal.

```
function gauss_jordan(a: matrix; b: vector; size:integer)
  return vector
is
declare
Ap: SPREAD matrix[size,size] := A;
x : SPREAD vector[size] := b;
i,k: SHARED integer;
j : integer=1;
begin
{pre: forall m : 1 <= m <= size : A[m,m] /= 0} -non-zero diagonal
  do
    (j <= size)=>
      begin
        forall i,k in 1..size,j..size+1 do
          if
            (i=j) => skip
          []
            not(i = j) =>
              if
                (k > size) => x[i] := x[i] - (Ap[i,j]/Ap[j,j])*x[j]
              []
                not(k > size) =>
                  Ap[i,k] := Ap[i,k] - (Ap[i,j]/Ap[j,j])*/Ap[j,k]
              fi
          fi
        ;
        j := j+1
      end
    od
    ;
    forall i in 1..size do
      x[i] := x[i]/Ap[i,i]
    ;
    return x
end --of Gauss-Jordan
```

This adaptation of Akl's Gauss-Jordan algorithm seems to be correct, but no loop invariant has been created to prove it.

The following matrix_invert procedure was developed from scratch and has a loop invariant. Since I=A-1A (where I is the identity matrix) we can multiply (on the right side) by a sequence of matrices Bi, transforming A into the identity matrix and I into A-1. So if initially C=I and D=A then the invariant will be C=A-1D.

When D is transformed into I then C=A-1I=A-1. So how are the Bi matrices determined? Well, we aren't going to exactly form the matrices Bi, but rather perform the same operations on each side—first normalizing the diagonal element and then subtracting a multiple of that row from each other row.

```
procedure matrix_invert(A : IN OUT SPREAD matrix; size : integer;
                        singular: OUT bool)
is
declare
    C : SPREAD matrix[size,size] = 0;
    D : SPREAD matrix[size,size] = A;
    i : SHARED integer;
    j : integer:=1;
begin
    singular := F;
    forall i in 1..size do C[i,i] := 1
    {C=I}
    ;
    do
        {inv: C = A-1D}
        {bound: size-j >= 0}
        (j <= size) and not(singular) =>
            begin
            --normalize diagonal element
            if
                (D[j,j]/=0) =>
                    forall i in 1..size do
                        C[j,i], D[j,i] := C[j,i]/D[j,j], D[j,i]/D[j,j]
            []
                (D[j,j] = 0) =>
                --pivot matrix by adding a lower row with a non-zero element
                    declare
                        k: integer:=j+1;
                    begin
                        do
                        (k <= size) and (D[k,j] = 0) => k := k+1
                        od
                        ;
                        if
                        (k>size) => singular := T
                        []
                        not(k>size) =>
                            begin
                            --pivot found in row k, add to row j
                            forall i in 1..size do
                                C[j,i], D[j,i] := C[j,i]+C[k,i], D[j,i] + D[j,i]
                            --now normalize
                            forall i in 1..size do
                                C[j,i], D[j,i] := C[j,i]/D[j,j], D[j,i]/D[j,j]
                            end
                        fi
                    end --of pivoting to gen non-zero diagonal element
            fi
            end --of normalizing diagonal element
            --now subtract that row (scaled by D[i,j]) from all the others
            ;
            forall i in 1..size do
            if
            (i = j) => skip --the skip command does nothing
            []
            (i/=j) =>
                declare
                    k: SHARED integer;
                begin --D[i,j] is the multiple of row j to subtract
                    forall k in 1..size do
                        C[i,k], D[i,k]:= C[i,k] - C[i,k]/D[i,j] , D[i,k] - D[i,k]/D[i,j]
                end
            fi
            ;
            j := j+1
    od
    {C = A-1 AND D=I AND (j>size) OR singular}
    ;
    --copy inverse back to A if not singular
    if
    (singular) => skip
    []
```

```
not(singular) => A[1..size, 1..size] := C[1..size, 1..size]
fi
end --of matrix inversion
```

The above matrix inversion algorithm allows computation of any number of "x" vectors by simple matrix-by-vector multiplication. Furthermore I am sure that anomalies like zero pivots and singular matrices are covered, notwithstanding the difficulty of using inexact floating-point numbers. I like rational numbers for this reason.

Isoefficiency Analysis: This analysis is hard since the number of pivots, or even whether the matrix is singular, is data dependent. So let's assume that pivots are never necessary (the diagonal never becomes zero). Then n iterations have two parallel steps (normalizing and subtracting) that can use up to n processors for a running time of $O(n*(1+n))=O(n2)$. Therefore the overall cost is $O(n3)$. Akl claims the sequential time is $O(nx)$ where $2<x<2.5$, but the actual work required, W, is hard to determine.

Fast Forrier Transform

The fast Forrier transform (FFT) is a common signal processing operation used to extract a frequency spectrum from a sampled signal. The FFT can also be used to transform a filtered frequency domain representation to the time domain (Akl, p. 239).

```
function rev(x, size : integer) return integer
is        --reverse the bits of a number x that is s bits long
declare
j : integer = size;
k: integer = 0;
begin
do
(j > 0) =>
    begin
    if
    (x DIV 2**(j-1)>0) => k :=k + 2**(size-j)
    []
    not(x DIV 2**(j-1) > 0) => skip
    fi
    ;
    x := x MOD 2**(j-1)
    &
    j := j-1
    end
od
;
return k
end --of rev (it reverses bits)
procedure fft( A: IN ivector; B : OUT ivector; size : IN integer) IS
declare
C,D : ivector;          --an ivector is a vector of complex numbers
                        --supplied by a package with complex data
                        --structures and operations as yet uncoded
h,p,q,k: integer;
z,w: complex;
n : integer:= 2**size
                        --n is the number of elements in the sample
begin
h := size-1             --h is the loop variable counting the number of
                             --butterfly stages
&
w := e**(2*pi*i/n)
                        --w is this goofy constant, complex number
                        --used in the FFT formula
                        --the "i" is the square root of -1 as a defined constant
                        --the complex_arithmetic package
;
C := A                  --assign whole vector to C
;
do
(h>=0) =>
    begin
    p := 2**h --difference of indexes that are bufferflied
    &
    q := 2**(size-h)
    &
    z := w**p
    ;
    D]0..n-1] := C[0..n-1]    --make copy of current vector
    ;
    forall k in 0..n-1 do
    if
```

```
        ((k MOD p) = (k MOD 2*p)) =>
            C[k], C[k+p]:=    (D[k] + D[k+p]*z**(rev(k,size) MOD q),
                              (D[k] - D[k+p]*z**(rev(k,size) MOD q)
    []
        not((k MOD p) = (k MOD 2*p)) => skip
    fi
    ;
    h := h-1
    end
od
;
forall k in 0..n-1 do
B[k] := C[rev(k)]
end--of fft
```

This program is unproven. Rather it was adapted directly from Akl.

Connected Components

Determine for each node (vertex) in a graph, its "component number." A component number is the lowest numbered vertex the node is connected to. In this way all nodes that are connected have the same component number, and just as importantly all nodes not reachable have different component numbers.

```
FUNCTION components(A: array[0..size-1,0..size-1] OF bool;
                                          size : integer)
    RETURN array[0..size-1] OF integer IS
        --A holds the adjancy matrix of the graph
        --that is A[x,y] is true
        --iff node x is directly connected to node y
        --the vector returned contains the component numbers: the
        --lowest numbered node that can be reached in the graph
DELCARE
    B : array[0..size-1,0..size-1] OF bool;
    t : array[0..size-1] of integer;
    i : integer;
BEGIN
        --A[x,y] is true if node x is directly connected to node y
        {forall x,y: 0 <= x,y < size : A[x,y] => Connect(x,y) }
        connectivity(A,B,size)     --B contains a matrix
        --B[x,y] is true if there is a path from node x to node y
        {forall x,y: 0 <= x,y < size : B[x,y] => Path(x,y) }
        ;
        FORALL i IN 0..size-1 DO
            DECLARE
                j : integer = 0;
            BEGIN
            --find the lowest numbered node we're connected to
                {inv:forall k:0 <= k < j : NOT(B[i,j]) }
                DO
                    NOT(B[i,j] OR (i=j)) => j := j+1
                OD
                {inv AND (B[i,j] OR (i=j)) }
                ;
                t[i] := j
                {t[i]=j AND (B[i,j] OR i=j) AND inv}
            END
        {post: forall v : 0 <= v < size : (forall k : 0 <= k < t[v]
            NOT(Path(x,y))) OR T[v] = v }
        --this is yet another adaptation of Dijkstra's linear search
        ;
        RETURN t
END --of components
PROCEDURE connectivity  ( B : IN SPREAD array[0..size-1,0..size-1] OF bool;
                          C : OUT SPREAD array[0..size-1,0..size-1] OF bool;
                          size : LN integer)
IS
        --given an adjacency matrix B, compute reachability matrix C
        --that means C[x,y] is true iff the is some set of nodes n1, n2,...nk
        --so that B[x,n1], B[n1,n2], ... B[nk,y] are all true
DECLARE
    D : SPREAD array[0..size-1,0..size-1] of bool;
    i : integer = 1;
    limit : integer:=integer(log2(size));   --how many iterations?
    --the second "integer" is an invocation of type conversion
BEGIN
    {forall x,y : 0 <= x,y < size : B[x,y] => Connect(x,y) }
    {Connect(x,y) => Path(x,y) }
```

```
    C:=B       --copy input
    {forall x,y: 0 <= x,y < size : C[x,y] => Path(x,y) }
    {forall x,y: 0 <= x,y < size : C[x,y] => MaxPathLength(x,y) = 1 }
    {(V => MaxPathLength = u)=>(V*V => MaxPathLength = 2*u)}
--see Akl page 254 for justification
    ;
    DO
        {inv: C => (MaxPathLength = 2**(i-1)) }
        {bound: limit - i>= 0 }
        (i < limit) =>
            BEGIN
                C := Multiply(C,C)
                --binary matrix multiplication
                i := i+1
            END
    OD
    {C => (MaxPathLength = size) }
    {forall x,y: 0 <= x,y < size : C[x,y] => Path(x,y) }
    ;
    RETURN C
END --of connectivity
```

Isoefficiency Analysis: Connected components calls "connectivity" and then uses linear search in parallel. Connectivity calls "multiply" logN times.

Multiply takes O(N3) operations. So the work involved is:

$$W=O(N3)*logN+O(N)*N=O(N3)$$

Matrix multiplication can use P=N2 processors but the linear search for the smallest one can only use N. So if you had enough processors, connected components could be computed in O(logN) time. But if you want to maintain perfect efficiency=1 (no extra work except for scheduling) you can only use N processors. On a time-shared Multitude layered network parallel processing system with many applications vying for all the computing resources they can get, the unused processing power during linear search will be quickly consumed.

Parallel Prefix

Parallel prefix takes a vector and returns another vector containing partial "sums" of the given vector. The summing may be simple addition, or a more complex commutitve operation. Parallel prefix arises in a surprisingly large number of algorithms.

```
procedure parallel_prefix(var spread A : the_array; N : integer);
    declare
        M : spread array[1..log2(N)] of the_array;
        j,s : shared integer;
begin
    {A1=A}
    forall s in [1..N] do M[s,0] := A[s]
    ;  {(s in [1...N] => M[s,0] = A[s]}
    j := 1
    ;
    do  {inv: forall n in [0..j-1] : M[i,n] = sum k in [i-2**n+1..i]}
        {bd: log2(N)-j}
        (j <= log2(N)) ->
            begin
                forall s in [1..N] do
                    if
                    (s-2**j>0) ->M[s,j] := M[s,j-1] + M(s-2**j+1,j-1]
                    []
                    not(s-2**j > 0 ) -> M[s,j] := M[s,j-1]
                    fi
                ;
                j := j+1
            end
    od
    ;
```

```
                        -continued

{inV} {j>log2(N)}
        forall s in [1..N] do A[s] := M[s,log2(N)]
end; --of parallel_prefix
{A[s] = sum k in[1..s] :A1[k]}
```

BPL Soundness Proof

The proof system BPL is sound for total correctness.

A proof system is "sound" if it derives true facts from true facts. The proof system BPL concerns DANCE programs annotated with proof outlines. The soundness of BPL allows conclusion that a program is indeed correct. This is not to say that every correct program has a proof in BPL—that is a different property, "completeness." Rather, BPL is likely "incomplete" like the proof systems developed early this century by Russel, Whitehead, and Gödel. For DANCE programs, we seek to verify given proofs of correctness, not search for proofs of arbitrary programs.

Due to the form of the proof system BPL, it is sufficient to prove that all axioms are true in the sense of total correctness and that all the inference rules of BPL are sound for total correctness. Then the result follows by induction on the length of proofs. We consider all axioms and proof rules in turn.

Where applicable, soundness of weakest-precondition (wp) predicate transformer definition is proven as well. Including wp into BPL expands the ways to prove a program is correct.

Skip model: $\mathcal{M}$ [[SKIP]]=true.

axiom: {P} skip {P} wp: wp(skip, Q)=Q grammar: <command>::="SKIP"

proof: SKIP makes no state change whatsoever. Whatever predicates are true before execution are true afterward so both the axiom and wp for SKIP are sound.

Assignment model: $\mathcal{M}$ [[X:=e]]= $\mathcal{M}_{end(i)}$[[X]]= $\mathcal{M}_{start(1)}$[[e]].

axiom: {Px$_e$}x:=e {P} wp: wp(x:=e, Q)=Qx$_e$ grammar: <command>::=<variable_name>":=" <expression> proof of axiom: If the predicate P with all occurrences of X replaced by e is true at the beginning of the interval I then P will be true at the end of the interval because the value held by X at end(i) is determined by the value of e at start(I). This is exactly the same as replacing all occurances of X with e in P, so the axiom for assignment is sound.

proof of wp: Applying Weakest Precondition Inference Rule:

$$\frac{wp(x := e, Q) = Qx_e \text{ and } P \Rightarrow Qx_e}{\{P\} \ x := e \ \{Q\}}$$

Since by the Axiom of Assignment, $\{Qx_e\}x := e \ \{Q\}$, and $P \Rightarrow Qx_e$ then by the Rule of Consequence, $\{P\}x := e \ \{Q\}$ so wp for assignment is sound.
Sequential Composition
model: $\mathcal{M}_i[[w_1; w_2]]$=true iff
there exist two subintervals of i, j⊂i and k⊂i, such that
$\mathcal{M}_j[[w_1]]$=true, $\mathcal{M}_k[[w_2]]$=true, and end (j)=start(k).
rule:

$$\frac{\{P\} \ S1 \ \{Q\} \text{ and } \{Q\} \ S2 \ \{R\}}{\{P\} \ S1 \ ; S2 \ \{R\}}$$

wp: wp(S1; S2, Q)=wp(S1, wp(S2, Q))
grammar: <command>::=<command>";"<command>
proof of rule: Let $w_1$=S1, $w_2$=S2. Given that j satisfies $\{P\} \ S1 \ \{Q\}$ and k satisfies $\{Q\} \ S2 \ \{R\}$ and Q satisfies end(j)=start(k), then i satisfies $w_1; w_2$ by definition of the model. Since by construction P satisfies start(j)=start(i), and R satisfies end(k)=end(i) then interval i satisfies $\{P\} \ S1; S2 \ \{R\}$ so the Sequential Composition Rule is sound.
proof of wp: Let R=wp(S2, Q), then by definition of wp $\{R\} \ S2 \ \{Q\}$ Let P=wp(S1, R), then by definition of wp $\{P\} \ S1 \ \{R\}$ and so, by the Sequential Composition Rule $\{P\} \ S1; S2 \ \{Q\}$ Since, by construction, P=wp(S1,wp(S2))

wp for sequential composition is sound.
Concurrent Composition
model: $\mathcal{M}_i[[w_1 \ \& \ w_2]]$=true iff
EXIST j,k:j⊂i and k⊂i:

( $\mathcal{M}_j[[w_1]]$=true) AND ( $\mathcal{M}_k[[w_2]]$=true) AND (start(j)=start(k)=start(i)) AND (end(j)=end(k)=end(i))

Rule:

$$\frac{\{P1\} \ S1 \ \{Q1\} \text{ and } \{P2\} \ S2 \ \{Q2\} \text{ and AccessOK}(S1, S2)}{\{P1 \text{ and } P2\} \ S1 \ \& \ S2 \ \{Q1 \text{ and } Q2\}}$$

AccessOK(S1,S2) is defined as:

AccessOK(S1, S2) = ∀Vi: Vi ∈ S1 ∪ S2:

(Vi ∉ lhs(S1) ∪ lhs(S2)) or (Vi ∈ S1 and Vi ∈ S2) or (Vi ∈ S2 and Vi ∉ S1) or ((Vi ∈ co(S1) and Vi ∈ co(S1)) ⇒

(co(S1) ⊑ co(S2) and co(S2) ⊑ co(S1))

lhs(S) = {v | v := e ∈ S} co(S) = {v | fetch_add(v, e, v2) ∈ S or swap(v, e, v2) ∈ S or . . . } wp: AccessOK(S1, S2) ⇒ [wp(S1 & S2, Q)=wp(S1, Q) and wp(S2, Q)]
grammar: <command>::=<command> "&" <command>
proof: Both the rule and wp for concurrent composition invoke the strange relation AccessOK. AccessOK allows noninterference to be proved definition. For flow, consider only intervals lacking combinable operations.

AccessOK(A,B) ⇒ InterferenceFree(A,B)

The relation AccessOK is stronger than Owicki-Gries' noninterference (not falsify a proof outline, [A&O p. 216]). There exist lattices that uphold noninterference but not AccessOK. Such intervals are disallowed.

The premise of the rule states:
{P1 }S1 {Q2 }and {P2 }S2 {Q2 } and AccessOK(S1,S2)
AccessOK(S1,S2) ⇒ interferenceFree(S1,S2) which means that S1 cannot affect the truth of {Q2}, and S2 cannot affect the truth of {Q1}, therefore, by the model for $\mathcal{M}_i[[S1 \ \& \ S2]]$, intervals j and k are constructed such that $\mathcal{M}_j[[S1]]$=true and $\mathcal{M}_k[[S2]]$=true and $\mathcal{M}_{start(i)}[[P1 \ \text{AND} \ P2 \ ]]$=true and $\mathcal{M}_{end(i)}[[Q1 \ \text{AND} \ Q2]]$=true therefore we can finally conclude
{P1 and P2}S1 & S2 {Q1 and Q2 }
so the rule is sound.
proof of wp:
The weakest precondition predicate transformer definition uses an implication:
AccessOK(S1, S2)⇒[wp(S1 & S2, Q)=wp(S1, Q) and wp(S2, Q)]
So only when the temporal commands are AccessOK will S1 & S2 have a defined meaning. Now since we are interested in programs that have meaning, we can assume Access OK(S1,S2) is true. Therefore wp(S1,X) is independent of wp(S2,X) whatever the predicate X. By the model (start(j)=start(k)=start(i)) AND (end(j)=end(k)=end(i)) which means that both wp(S1, Q) and wp(S2, Q) must be true at the exact same state, namely start(i). The fact that the intervals are lattices of states is crucial. The way that interval i is composed from separate (independent, interference-free) intervals j and k allows proof that their concurrent execution does both things at the same time as if they has been executed alone.

Existential Quantification model: $\mathcal{M}_j[[\text{DECLARE X=c begin w end}]]=\text{true}$ iff $\mathcal{M}_{start(i)}[[X]]=c$, and $\mathcal{M}_j[[w]]=\text{true}$.

$$\frac{\begin{array}{c}(\exists d1, d2: \text{domain}: \mathcal{D}[[d1]] \subset \mathcal{D}[[d2]]) \text{ AND} \\ (\exists s: \text{string}: (d1 \&\&``." s) = d2) \text{ AND} \\ (\forall V: \text{variable}: V \in \mathcal{D}[[d2]] \Rightarrow V \in \mathcal{D}[[d1]]) \text{ AND} \\ (X \in \mathcal{D}[[d2]]) \text{ AND } (X = c) \text{ AND } (P \Rightarrow P1X_c) \text{ AND } (Q1 \Rightarrow Q)\end{array}}{\{P\} \text{ DECLARE } X = c \text{ begin } \{P1\} \text{ w } \{Q1\} \text{ end } \{Q\}}$$

wp: wp(DECLARE X=c begin {P1}w {Q1}end,Q)=wp(w,Q1) provided (Q1$\Rightarrow$Q) and all the uses of X are contained within the begin-end. Means of defining variables, their scope (visibility), an initial value, and type.

grammar:
<command>::="DECLARE"[<variable_name> ":" <type>("="<expression>)]+"BEGIN" <command>"END"

proof of both rule and wp:
Existential quantification is how variables are brought into existance. The new variable (and its value) is hidden for use exclusively by w. So despite what values w may temporarily assign to X, those actions cannot affect any other concurrent computation. It is the essence of AccessOK. I assume both the rule and wp are sound by definition.

Bounded Universal Quantification model: $\mathcal{M}_j[[\text{FORALL X IN b DO w}]]=\text{true}$ iff there exist subintervals of $i, j1 \ldots jn, j1 \subset i \ldots jn \subset i$ such that $\mathcal{M}_{j1}[[\text{DECLARE X=}x_1 \text{ begin w end}]]=\text{true}$, and
$\mathcal{M}_{j2}[[\text{DECLARE X=}x_2 \text{ begin w end}]]=\text{true}$, and $\ldots$ and
$\mathcal{M}_{jn}[[\text{DECLARE X=}x_n \text{ begin w end}]]=\text{true}$ where $x_1, x_2, \ldots, x_n$ are all the values for X that make b true.

$$\frac{\begin{array}{c}(\text{forall } i{:}i \text{ in range: } \{P(i)\} S(i) \{Q(i)\}) \text{ and} \\ (\text{forall } i,j{:}i,j \text{ in range: AccessOK}(S(i), S(j))) \text{ and} \\ (\text{forall } i{:}i \text{ in range : } P \Rightarrow P(i)) \text{ and} \\ (\text{forall } i{:}i \text{ in range: } Q(i)) \Rightarrow Q\end{array}}{\{P\} \text{ FORALL } i \text{ IN range DO } S \{Q\}}$$

wp: AccessOK(S) $\Rightarrow$[wp(FORALL i IN range DO S, Q)=wp(S[i1],Q) and wp(S[i2],Q) and ... and wp(S[ik], Q)] where i1, i2, ..., ik are the values i takes in the range and S[ix] is the statement S with i replaced by the value ix, $Si_x$.

grammar: <command>::="FORALL"<variable_name>":"<type>"IN"
[<range>|<boolean_expression>]"DO"<command> proof of rule: The objective of this proof is given a host of assumptions that {P} is true for the first state of the interval and {Q} is true for the last state in the same interval. The model creates a host of little domains, each with its own parameter. The rule includes the requirement that each little domain be AccessOK, whereas the model does not. Execution attempts to construct a lattice that make the program true. If the model's subintervals j1, j2, ... can be created that make each individual subinterval true, then the combined interval satisfies the whole parallel command. Each of the subintervals (j1,j2, ... ) must be interference free in order to be constructed. So the requirement for interference freedom is implied in the model's definition. And now to the proof . . .

(forall i:i in range:{P(i)}S(i) {Q(i) }) and
(forall i,j:i,j in range:AccessOK(S(i),S(j)))

are premises that allow use of the Parallel Composition Rule inductively:

{ P(i1) AND P(i2) AND ... }
  S(i1) & S(i2) & ...
{ Q(i1) AND Q(i2) AND ... }

The last two premesis
(forall i:i in range P=>P(i) ) and
(forall i:i in range: Q(i))=>Q
allow use of the Rule of Consequence to conclude:
{P}S(i1) & S(i2) & ... {Q }
Which is exactly the meaning of
{P}FORALL i IN range DO S {Q }
so the rule is sound.

proof of wp:
AccessOK(S)$\Rightarrow$[wp(FORALL i IN range DO S, Q) =wp(S[i1], Q) and wp(S[i2], Q) and ... and wp(S[ik], Q)]
The weakest-precondition predicate transformer (wp) for the parallel command (FORALL) is the conjunction of wp's for each value of i in the range. Of course the executions must be mutually AccessOK. Therefore the executions of S with different i must be interference free. The model creates subintervals j1, j2, ..., jk that makes S true for every value of i in the range i1, i2, ..., ik. Therefore, at a minumum, the weakest precondition of concurrent execution must imply all of the individual executions:

wp(FORALL i IN range DO S, Q) $\Rightarrow$ wp(S[i1], Q)
wp(FORALL i IN range DO S, Q) $\Rightarrow$ wp(S[i2], Q)
   and ... and
wp(FORALL i IN range DO S, Q) $\Rightarrow$ wp(S[ik], Q)

The weakest function wp(FORALL i IN range DO S, Q) that implies each the individual wp(S[i], Q) is the conjunction of those individual wp's, so
wp(FORALL i IN range DO S, Q)=wp(S[i1], Q) and wp(S[i2], Q) and ... and wp(S[ik], Q)
and wp for the parallel command is sound.

Alternative Command model: $\mathcal{M}_j[[\text{IF B=>S1} \square \text{B2=>S2} \square \ldots \square \text{Bn =>Sn Fi}]]=\text{true}$ iff ( $\mathcal{M}_{start(i)}[[B1]]$ or z,4 $\mathcal{M}_{start(i)}[[B2]]$ or ... or $\mathcal{M}_{start(i)}[[Bn]]$) and $\mathcal{M}_{start(i)}[[B1]]\Rightarrow \mathcal{M}_j[[S1]])$ and $\mathcal{M}_{start(i)}[[B2]]\Rightarrow \mathcal{M}_j[[S2]])$ and ... and $\mathcal{M}_{start(i)}[[Bn]]\Rightarrow \mathcal{M}_j[[Sn]])$ $$\frac{\text{forall } i{:}i \text{ IN } (1\ldots n)\text{: } \{P \text{ and } B_i\} S_i \{Q\}}{\{P\} \text{ IFFY } \{Q\}}$$

wp: wp(IFFY, Q)=(B1=>wp(S1, Q)) and ... and (Bn=>wp(Sn, Q))

grammar: <command>::="IF"<boolean_expression>"=>"<command>["[]"<boolean_expression>"=>"<command>]* "FI"

Iterative Command model: $\mathcal{M}_j[[\text{DO B1=>S1 []B2=>S2 []}\ldots\text{[]Bn=>Sn OD}]]=\text{true}$ iff there exist subintervals of $i, j1 \ldots jn, j1 \subset i \ldots jn \subset i$ such that $(\cup_k \in [1 \ldots n] jk=i)$ and (start(i)=start(j1) and end(j1)=start(j2) and ... and end(jn)=end(i) ) and
forall k:0<k<=n:

($\mathcal{M}_{start(jk)}$[[B1]] $\Rightarrow$ $\mathcal{M}_{jk}$[[S1]]) and ($\mathcal{M}_{start(jk)}$[[B2]] $\Rightarrow$ $\mathcal{M}_{jk}$[[S1]]) and . . . and ($\mathcal{M}_{start(jk)}$[[Bn]] $\Rightarrow$ $\mathcal{M}_{jk}$[[Sn]]) ).
rule: forall i:i IN (1 . . . n)

$\{I \text{ and } B_i \text{ and bound}=bd\}\ S_i\ \{I \text{ and bound}<bd\}\}$ and $B_i \Rightarrow$(bound > 0)
$\overline{\{I\}\ \text{DOIT}\ \{I \text{ and not } (B_1 \text{ or } \ldots \text{ or } B_n) \text{ and not (bound} > 0)\}}$ wp: Let BB be the disjunction of the guards: BB=B1 or B2 or . . . or Bn. Let I be a predicate, and "bound" be an integer-valued expression whose value is non-negative. Then I $\Rightarrow$ wp(DOIT, I and not(BB))
provided
(I and Bi) $\Rightarrow$ wp(Si;I) for 1<=i<=n,
(I and BB) $\Rightarrow$ bound >0, and
(I and Bi and bound=B) $\Rightarrow$ wp(Si, bound<B) for 1<=j<=n.

Next model: $\mathcal{M}_s$[[O(e)]]=true iff
$\mathcal{M}_t$[[e]]=true and glb(s,t)=s and lub(s,t)=t and not ($\exists$u $\in$ i:glb(s,u)=s and lub(u,t)=t).

Nondeterministic Permutation model: $\mathcal{M}_i$[[ndperm($e_1, \ldots, e_k$)]]=(e1s, . . . , $e_{ks}$)
where $\forall j: 1 <= j <= k :$ $\exists m: e_m = e_{js}$ and $\forall n: 1 <= n <= k, n \neq j: \text{not}(e_m = e_n)$.

Fetch-Add model:

$\mathcal{M}_{ik}$[[FETCH_ADD(X,$e_1$,$Y_1$) & FETCH_ADD(X,$e_2$,$Y_2$) & . . . & FETCH_ADD(X,$e_k$,$Y_k$)]]=true
iff there exists some ndperm($e_1, \ldots, e_k$)=($e_{1s}, \ldots e_{ks}$) such that
$\mathcal{M}_{ik}$[[O(X=X+$e_1$+$e_2$+. . . +$e_k$)]]=true and $\mathcal{M}_{ik}$[[O($Y_{1s}$=X)]]=true and $\mathcal{M}_{ik}$[[O($Y_{2s}$=X+$e_{1s}$)]]=true and $\mathcal{M}_{ik}$[[O($Y_{3s}$=X+$e_{1s}$+$e_{2s}$)]]=true and . . . and $\mathcal{M}_{ik}$[[O($Y_{ks}$=X+$e_{1s}$+$e_{2s}$+. . . +$e_{k-1s}$)]]=true.
wp of one fetch-add:
wp(FETCH_ADD(X,e,Y),Q)=$(Q^Y_X)X_{X+e}$
wp of concurrent fetch-adds:
wp(FETCH_ADD(X,$e_1$, $Y_1$) & FETCH_ADD(X,$e_2$,$Y_2$)& . . . & FETCH_ADD(X,$e_k$,$Y_k$))=forall ndperm ($e_1, \ldots, e_k$)=($e_{1s}, \ldots, e_{ks}$) such that ( . . . (($Q^Y_{1sX})^Y_{2sX+e1s}$) . . . )$Y_{ksX+e1s+e2s+\ldots+ek-1s}$ Fetch-And model: $\mathcal{M}_{ik}$[[FETCH_$_{AND(X,e1)}$,$Y_1$) & FETCH_AND(X,$e_2$,$Y_2$) & . . . & FETCH_AND(X,$e_k$,$Y_k$)]]=true
iff there exists some ndperm($e_1, \ldots, e_k$)=($e_{1s}, \ldots e_{ks}$) such that
$\mathcal{M}_{ik}$[[O(X=X AND $e_1$ AND $e_2$ AND . . . AND $e_k$)]]=true and $\mathcal{M}_{ik}$[[O($Y_{1s}$=X)]]=true and $\mathcal{M}_{ik}$[[O($Y_{2s}$=X AND $e_{1s}$)]]=true and $\mathcal{M}_{ik}$[[O($Y_{3s}$=X AND $e_{1s}$ AND $e_{2s}$)]]=true and . . . and $\mathcal{M}_{ik}$[[O($Y_{ks}$=X AND $e_{1s}$ AND $e_{2s}$ AND . . . AND $e_{k-1s}$)]].

wp of one fetch-and:
wp(FETCH_AND(X,e,Y),Q)=$(Q^Y_X)^X_{X\ AND\ e}$
wp of concurrent fetch-ands:
wp(FETCH_AND(X,$e_1$,$Y_1$) & FETCH$_{13}$AND(X,$e_2$,$Y_2$) & . . . & FETCH_AND(X,$e_k$,$Y_k$))=forall ndperm ($e_1, \ldots, e_k$)=($e_{1s}, \ldots e_{ks}$) such that ( . . . (($Q^Y_{1sX})^Y_{2sX\ AND\ e1s}$) . . . )$^X_{X\ AND\ e1s\ AND\ e2s\ AND\ \ldots\ AND\ eks}$ Fetch-Or model: $\mathcal{M}_{ik}$[[FETCH_OR(X,$e_1$,$Y_1$) & FETCH_OR (X,$e_2$,$Y_2$) & . . . & FETCH_OR(X,$e_k$,$Y_k$)]]=true
iff there exists some ndperm($e_1, \ldots, e_k$)=($e_{1s}, \ldots, e_{ks}$) such that
$\mathcal{M}_{ik}$[[O(X=X OR $e_1$ OR $e_2$ OR . . . OR $e_k$)]]=true and $\mathcal{M}_{ik}$[[O($Y_{1s}$=X)]]=true and $\mathcal{M}_{ik}$[[O($Y_{2s}$=X OR $e_{1s}$)]]=true and $\mathcal{M}_{ik}$[[O($Y_{3s}$=X OR $e_{1s}$ OR $e_{2s}$)]]= true and . . . and $\mathcal{M}_{ik}$[[O($Y_{ks}$=X OR $e_{1s}$ OR $e_{2s}$ OR . . . OR $e_{k-1s}$)]]=true.
wp of one fetch-or:
wp(FETCH_OR(X,e,Y),Q)=$(Q^Y_X)^X_{X\ OR\ e}$
wp of concurrent fetchors:
wp(FETCH_OR(X,$e_1$,$Y_1$) & FETCH_OR(X,$e_2$,$Y_2$) & . . . & FETCH_OR(X,$e_k$,$Y_k$))=forall ndperm ($e_1, \ldots, e_k$)=($e_{1s}, \ldots, e_{ks}$) such that ( . . . (($Q^Y_{1sX})^Y_{2sX\ OR\ e1s}$) . . . )$^X_{X\ OR\ e1s\ OR\ e2s\ OR\ \ldots\ OR\ eks}$ Fetch-Xor model: $\mathcal{M}_{ik}$ [[FETCH_XOR(X,$e_1$,$Y_1$) & FETCH_XOR(X,$e_2$,$Y_2$) & . . . & FETCH_XOR(X,$e_k$,$Y_k$)]]=true
iff there exists some ndperm($e_1, \ldots, e_k$)=($e_{1s}, \ldots, e_{ks}$) such that
$\mathcal{M}_{ik}$[[O(X=X XOR $e_1$ XOR $e_2$ XOR . . . XOR $e_k$)]]=true and $\mathcal{M}_{ik}$[[O($Y_{1s}$=X)]]=true and $\mathcal{M}_{ik}$[[O($Y_{2s}$32 X XOR $e_{1s}$)]]=true and $\mathcal{M}_{ik}$[[O($Y_{3s}$=X XOR $e_{1s}$ XOR $e_{2s}$)]]=true and . . . and $\mathcal{M}_{ik}$[[O($Y_{ks}$=X XOR $e_{1s}$ XOR $e_{2s}$ XOR . . . XOR $e_{k-1s}$)]]=true.
wp of one fetch-xor:
wp(FETCH_XOR(X,e,Y),Q)=$(Q^Y_X)^X_{X\ XOR\ e}$
wp of concurrent fetch-xors:
wp(FETCH_XOR(X,$e_1$,$Y_1$) & FETCH_XOR(X,$e_2$,$Y_2$) & . . . & FETCH_XOR(X,$e_k$,$Y_k$))=forall ndperm ($e_1, \ldots, e_k$)=($e_{1s}, \ldots e_{ks}$) such that ( . . . (($Q^Y_{1sX})^Y_{2sXXOR\ e1s}$) . . . )$^X_{XXOR\ e1s\ XOR\ e2s\ XOR\ \ldots\ XOR\ eks}$ Swap model:

$\mathcal{M}_{ik}$[[SWAP(X,$e_1$,$Y_1$) & SWAP(X,$e_2$,$Y_2$) & . . . & SWAP(X,$e_k$,$Y_k$)]]=true
iff there exists some ndperm($e_1, \ldots, e_k$)=($e_{1s}$, $e_{ks}$) such that
$\mathcal{M}_{ik}$[[O(X=$e_{ks}$)]]=true and $\mathcal{M}_{ik}$[[O($Y_{1s}$=X)]]=true and $\mathcal{M}_{ik}$[[O($Y_{2s}$=$e_{1s}$)]]=true and $\mathcal{M}_{ik}$[[O($Y_{3s}$=$e_{2s}$)]]= true and . . . and $\mathcal{M}_{ik}$,[[O($Y_{ks}$=$e_{k-1s}$)]]=true.
wp of one swap:
wp(SWAP(X,e,Y),Q)=$(Q^Y_X)^X_e$
wp of concurrent swaps:
wp(SWAP(X,$e_1$,$Y_1$) & SWAP(X,$e_2$,$Y_2$) & . . . & SWAP (X,$e_k$,$Y_k$))=forall ndperm($e_1, \ldots e_k$)=($e_1, \ldots, e_{ks}$) such that ( . . . (($Q^Y_{1sX})^Y_{2se1s}$) . . . )$X_{eks}$ Multitude Architecture Discussion of architecture and hardware is split between this section and OPERATION OF INVENTION. Generally static structures are covered here and dynamic operations in OPERATION.

Figure 23:
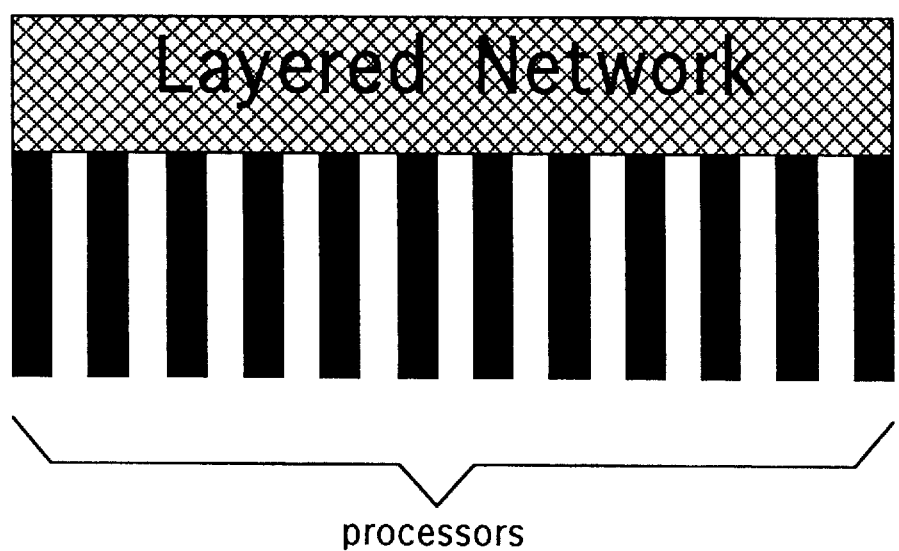
FIG. 23 shows schematically the Multitude architecture which connects processors with a layered network.

Nominally, a collection of processors that share memory via a Layered network constitute a Multitude architecture computer as shown in FIG. 23.

Figure 24:
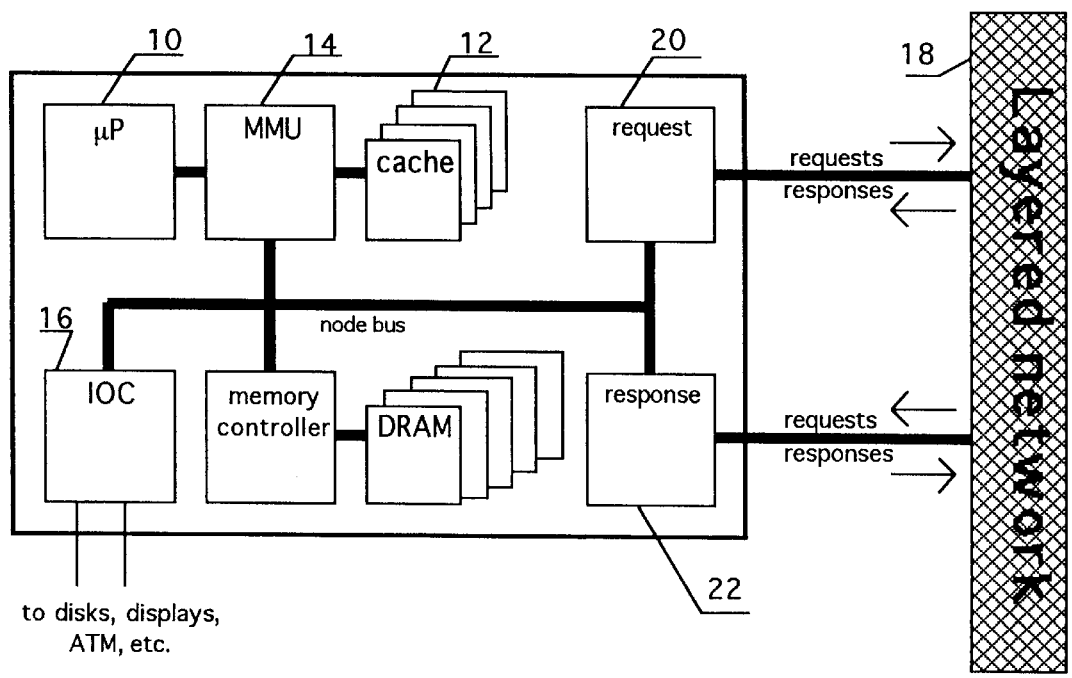
FIG. 24 shows an exemplary processing node in a Multitude architecture computer.

Each processor (also called a node) has its own microprocessor (CPU 10), cache memory 12, memory management units (MMU 14), memory, input/output controller (IOC 16), and Layered network interface 18. The Layered network interface comprises a request chip 20 and a response chip 22. The processor accesses remote memory banks through the request chip, which initiates a network request. The request is routed to the response chip of the designated processor which accesses local memory and sends a response back through the network following the same path back to the original request chip. A prcoessing node is shown in FIG. 24.

Cache coherency protocols hobble many architectures. Multitude requires no cache coherency hardware, because correct DANCE programs will never have the same value in different caches at the same time! Therefore Multitudes's caches can be as fast as the fastest sequential processor with no coherency hardware at all. Every other system, that provides shared memory has some cache coherency protocol with its attendant higher cost and reduced performance.

Memory Accessing

Figure 25:
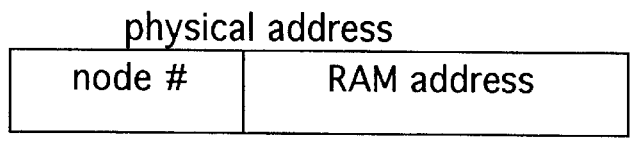
FIG. 25 represents diagrammatically a physical address comprised of node number and memory address.

The variables whose states comprise nodes (or vertices) in a lattice satisfying a DANCE program all reside in main memory: the combined, dynamic, random-access memory (DRAM) in all the processing nodes connected via a Layered network. The 64-bit physical address is divided between node number and memory address within the node as shown in FIG. 25. The physical address specifies a byte; full, 64-bit work operations must begin at addresses evenly divisible by 8—the number of bytes in a word. (Many of the following numbers are merely "best guess." For example, 64-bit microprocessors are on the market today and seem to be the trend; 64 is not a magic or crucial parameter.)

Address Space Partition

Figure 26:
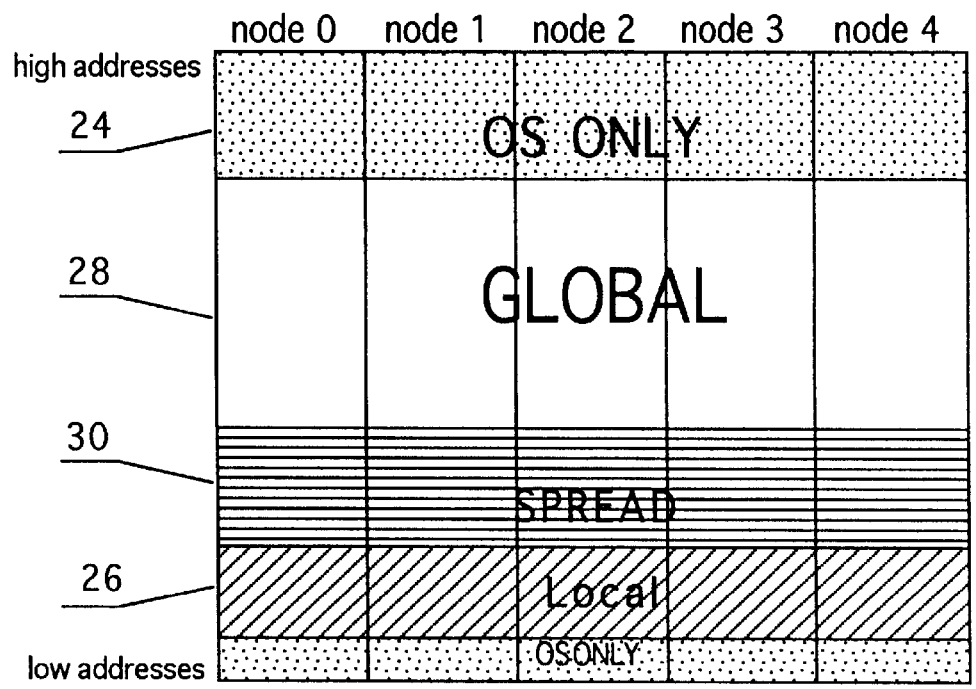
FIG. 26 illustrates the memory of each node partitioned into global, local, and spread.

The physical memory is partitioned during boot according to how it will be used: OS-only, local, spread, and global. See FIG. 26. OS-only memory 24 contains instructions and tables that must not be accessed by user programs. Local memory 26 is reserved for the microprocessor in the same node as the memory bank. Global memory 28 can be accessed by any processor. Spread memory 30 must be accessed by shuffling address bits so consecutive (word) addresses reside in different memory banks to alleviate contention. OS-only memory is also local, global, or spread depending how the OS uses it. FIG. 26 shows a possible partition of memory across several banks.

Addressing Modes

Multitude instructions allow five addressing nodes: immediate, direct, indirect, indirect with displacement, and indexed. Immediate addressing uses a constant within the instruction for its parameter value. Direct addressing uses the value in the specified memory location. Indirect addressing dereferences the address twice; the value is at the address contained in the memory location whose address is contained in the instruction. Indirect addressing with displacement (or just displacement) adds a constant to the address found in memory to determine where the value is. Indexed addressing uses two addresses, one to all integer (the index) and another to an address of an address (the base) to get the eventual address of the value. In the following C[addr] means the contents of memory location addr.

| mode | immediate | direct | indirect | displaceinent | indexed |
|---|---|---|---|---|---|
| look | #n or "str" | addr | (addr) | (addr,#disp) | (addr,indx) |
| value | constant | C[addr] | C[C[addr]] | C[C[addr]] + disp | C[C[addr]] + C[indx]] |

In all cases, addr must be an address (sometimes of a memory location containing another address, disp must be an integer constant, and indx must be the address of an integer.

Tagged Memory Words

Every memory word (8-bytes) has a 3-bit tag indicating its type. Tags cannot be directly modified by OS routines, and cannot be modified at all by user programs. Any attempt to use a word in conflict with its tag will be intercepted by the memory controller and will force a high-priority interrupt for the offending processor. Tags are but one way that erroneous program behavior is detected and crucial OS tables are protected. Tag types are: address, integer, float, instruction, segment capability, page descriptor, value, or nil.

Figure 27:
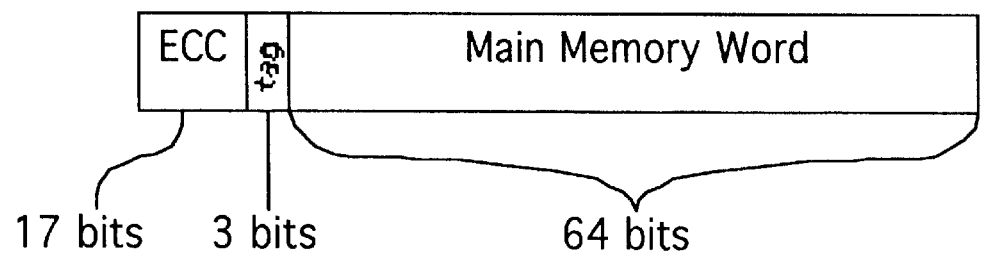
FIG. 27 shows a main memory word as comprising are 84 bits wide.

Error correction coding (ECC) requires 8 additional bits to achieve single error correction/double error detection (SEC/DED). FIG. 27 shows the format of a word stored in RAM by the memory controller.

Segmented Addressing

Figure 28:
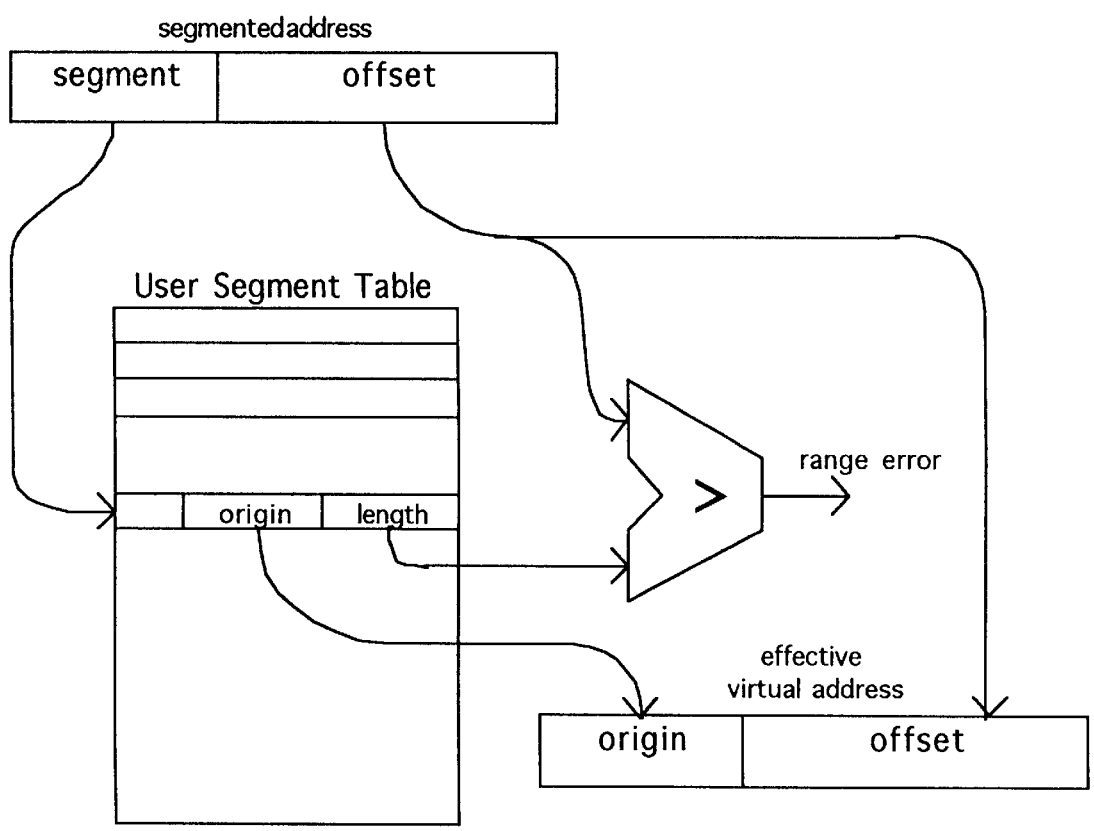
FIG. 28 represents the translation of segmented address to an effective virtual address.

All virtual addresses (those seen and manipulated by programs) are composed of a segment number, and an offset within the segment. The segment number indexes a User Segment Table (UST) which holds, among other things, the address of the origin of the segment and the length of the segment. The effective virtual address (EVA) is the origin in the UST concatenated with the offset within the segment as shown in FIG. 28. At the same time the offset can be compared with the length to check that the reference is in bounds.

Paging

Figure 29:
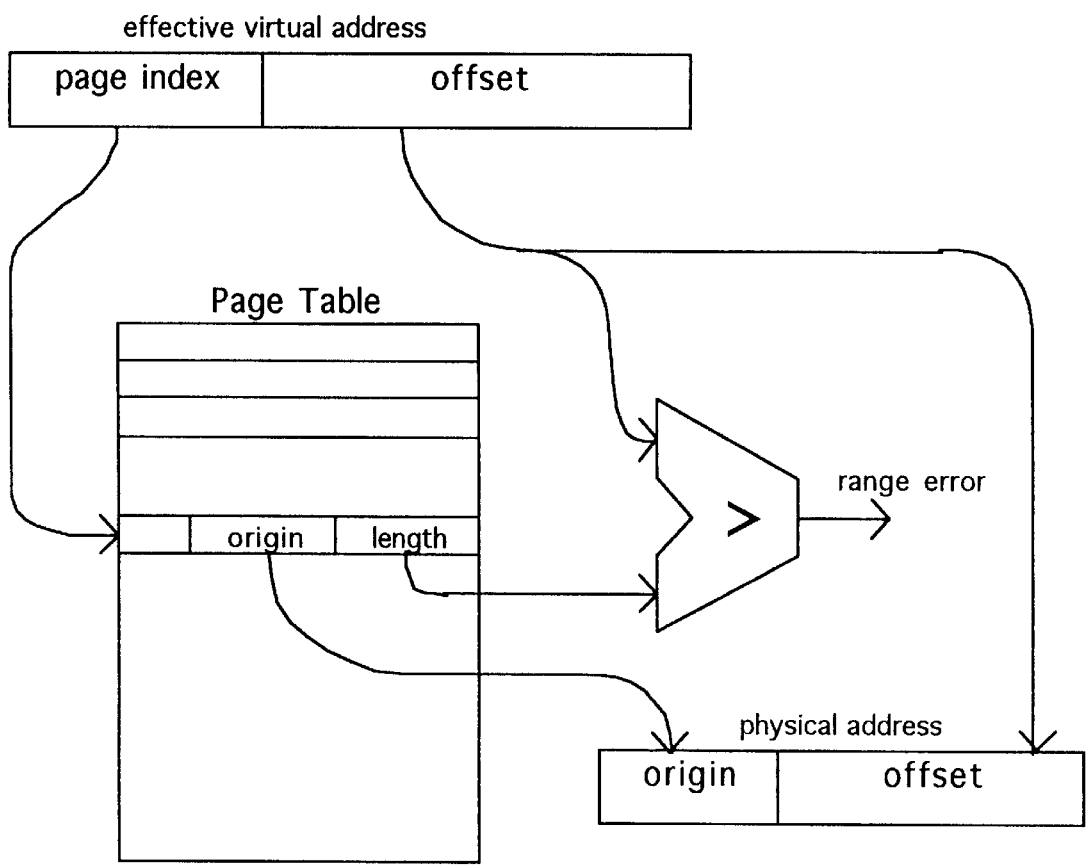
FIG. 29 represents a translation of an effective virtual address to a physical address.

Paged address translation is depicted in FIG. 29. Effective virtual addresses are translated into physical addresses using pages. A page is a chunk of memory that may be stored on disk when not in active use. Paging allows the virtual address space to appear much larger than the physical address space, by keeping most of the pages on disk. A page fault occurs when a value is accessed that currently resides on disk. If there is an empty page in memory, the IOC controlling the disk will copy the page from disk to memory and update the page table with the new, temporary, physical address of the restored page. Translation of EVA to physical address is similar to segmented address translation except that the page table is indexed with the most significant bits of EVA instead of a separate segment field.

Activation block

An activation block holds variables (and other necessary information) for procedures, functions, packages, and other language constructs. Activation records (blocks) will be kept entirely on a heap. If a processor doesn't have a pointer for a block it cannot be accessed. This contrasts sharply with the stack indexes for activation records (Computer Architecture, Vol. 1, Richard Kain, 1989, Prentice-Hall, Chapter 5). If a processor needs an ancestor's block, a pointer to that activation record may be contained in an interval map) table, or by traversing pointers linking children to their parent filling in the display at the same time. Displays allow determination of the address for any accessible variable with a single fetch (to obtain a pointer to the right activation record) and simple integer arithmetic (to add the proper offset within that activation record). Activation records of procedures that mllay be executed by any processor are held in "spread" (interleaved, commonly addressable) memory. Conversely some activation records are best put on the local stack of a specific processor, say, for example, the processor connected to a fiber-optic channel would handle external communication tasks.

Procedures can not be so easily invoked as merely pushing parameters on the top of the stack before calling the procedure. A new activation record (context) must be created to hold all of the parameters the procedure will need. Each activation record corresponds with the symbol table associated with each (meaningful, non-empty) lexical scope. Symbol tables are constructed during compilation. Program variable names will eventually devolve into an activation block pointer and an offset into the activation block. Effective address computation at run-time can be simple indexing.

In sequential, block-structured languages a stack adequately supports activation block allocation because the lifetimes of the activation blocks are nested (Kain, Vol. 1, pp 181–190). For DANCE programs such a relationship does not hold clue to parallel execution. While it is true that parent activation record lifetimes encompass their children's, a parent may have many different children whose lifetimes are unrelated. Therefore activation blocks must be allocated from a heap. Heaps are necessary anyway to support program invoked memory allocation.

Since DANCE supports exotic, polymorphic types, the size of the allocation block may not be known at compile-time. However the size of activation block must be determined when the procedure is invoked. The following procedure calling scenario steps are adapted from Kain, Vol. 1 p. 182.

A) Compute the size of activation record required.
B) Allocate that sized block from the heap.
C) Copy the current activation record address to the display in the new block. The immediate parent is at the "top" of the display.
D) Copy the display of the caller into the new block. (optional)
E) Copy the actual parameters or their pointers into the block.
F) Call the procedure, updating the activation block pointer to the new block.
G) Perform the procedure.
H) Upon completion, copy returned values into their respective actual parameter locations.
I) Restore the caller's activation record pointer with the value at the top of the display.
J) Release the unneeded activation block to the heap.

Obviously, allocation and deallocation from a heap is more involved than simple addition used to modify the top-of-stack in sequential machines. Therefore heap allocation and deallocation must be both speedy and be performed in parallel without blocking.

The simplest strategy would be fixed-size heap frames with a queue (or FIFO) policy (Kain, Vol. 1 pp. 168–171). A vector whose length is the total number of frames holds pointers to unallocated frames. Three integers then control heap allocation: NumFree, NextAlloc, and NextReturn. NumFree is decremented on allocation and incremented on deallocation with a fetch-add. Fetch-add could also be used on NextAlloc to get the index into the vector holding the address of an unused block. Deallocation uses NextReturn similarly. The disadvantage is that the size of the page frames is always the same. If the size needed for the allocation block exceeds the frame size, then some form of indirection must be used instead of simple indexing. Additionally program-directed allocations are often small (in bytes), thus wasting most of the frame.

So fixed-size frames won't work. Kain discusses three variable-size allocation strategies: first fit, best fit, and buddy system (Kain Vol. 1, pp. 171–176). All three strategies involve subdividing large blocks (when less space is needed) and combining adjacent small blocks (when no available block is big enough). The buddy system is by far the most elegant since the blocks used are always powers-of-two sized. Tlle buddy system also (seems) resistant to heap fragmentation where enough heap space is available, but in lots of noncontiguous little pieces. Furthermore both free space lists and free space tables do not lend themselves to simultaneous allocation and deallocation.

Figure 30:
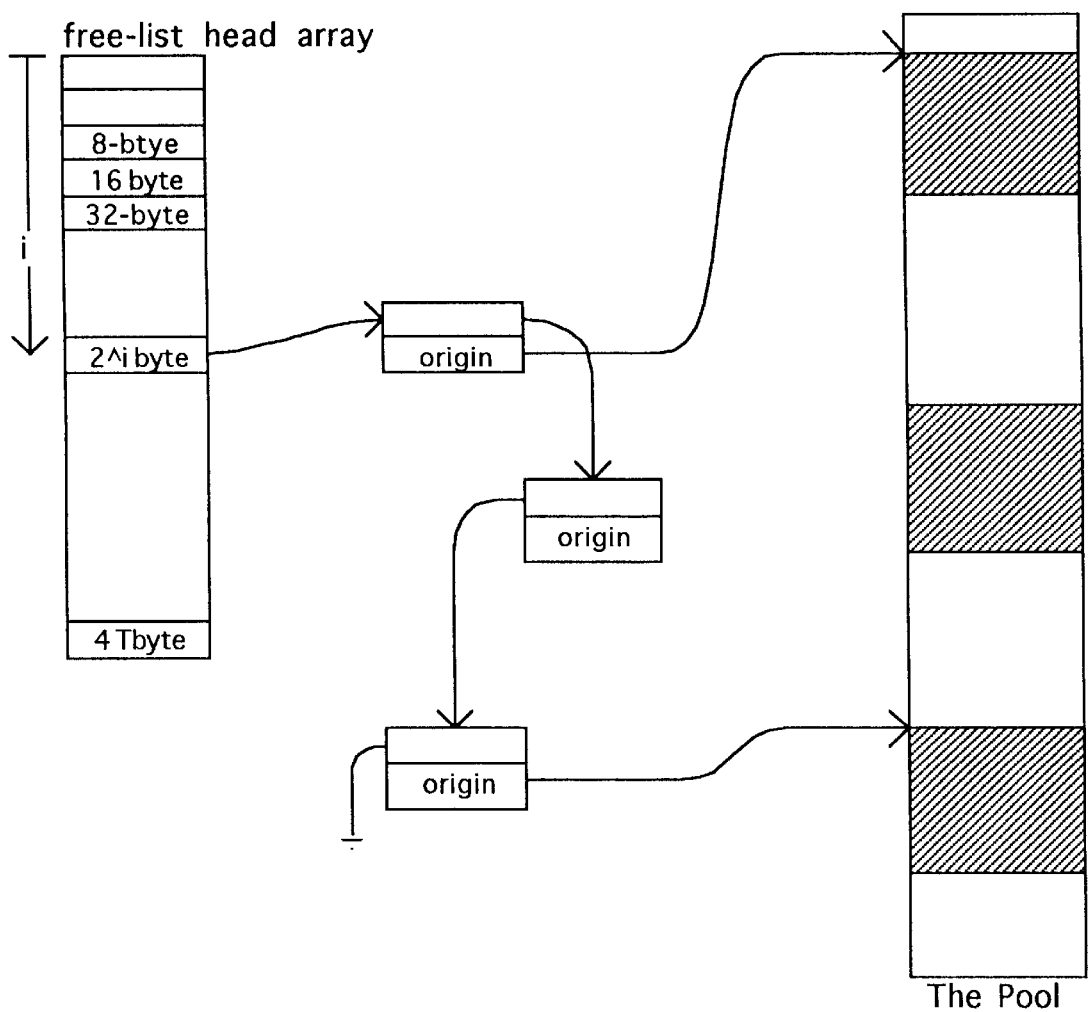
FIG. 30 shows a free-space list for blocks of 2^n bytes.

My proposed solution is the buddy system. Several free space lists are used with all of the elements in a single table being the same size. When a block of the desired size is unavailable, a next larger sized block is broken in two (or more), one piece is used and the other is placed in the next smaller list. Suppose the smallest sized block is 8 bytes. Then different lists would handle 8, 16, 32, 64, 128, 256, 512, 1024, 2048, 4096, 8k, 16k, 32k, 64k, 128k, 256k, 512k, 1M, 2M, 4M and 16M bytes. These twenty-one lists could handlle all the block sizes a program would need. A different pool of page frames is needed for each physical memory partition: OS-only, global, and spread. The local partition in each node will be managed with conventional stack and heap. FIG. 30 shows a buddy-heap data structure.

Processor Flags

Multitude processors contains no internal registers, per se. All of the instructions reference memory locations. However, several flags are available for branching or arithmetic calculations. The flags are: carry (C), overflow (V), zero (Z), negative (N), extension (X), and test result (R). These flags are set automatically during instruction execution. They may be used for conditional branching. They may not be written or read any other way.

Three Address Code

This section defines an intermediate code representation that call both:

Serve as a target language for compilation,
Be easily translated into specific ISAs by a compiler back-end.

The form of expression will be quadruples or three-address code. Each of the "addresses" will include the object's type, context, and offset within context.

The instructions for the Multitude architecture are loosely based on the intermediate language outlined in the book (*Compilers: Principles, Techniques, and Tools*, Aho, Sethi, & Ullman, Addison-Wesley 1986, Chapter 8). The compiler back-end will be able to generate actual machine code for any commercial-off-the-shelf (COTS) microprocessor from the three address code.

Five addressing modes will be used: direct, indirect, indexed, displacement, and immediate. For direct addressing the value to be used is held in the memory location specified by the field. For indirect addressing the memory location specified by the field holds the address of the parameter to be used. For immediate addressing, the parameter to be used is held within the instruction. Indexed addressing adds memory location containing an integer to a memory location containing an address to determine the address of the operand.

Not all the instructions need three addresses. In all cases, the last address receives the value when one is returned. All addresses are segmented.

Instructions denote the type of operands (e.g. integer or float) and their size in bytes. A size of "w" indicates whole word, "b" indicates byte, and a digit represents the number of bytes (at most eight). Some instructions need no type or size. If the size is unspecified, whole word will be assumed. Instruction will be represented in assembly-language by:

[label] instruction:type:size op1;op2;result—comment

No spaces are allowed within the instruction name and a space (or tab) is required between the instruction name and its operands. Labels must be enclosed in square brackets and must be separated from the instruction name by a space (or tab).

User programs may not use any assembly-language code whatsoever. Requiring and enforcing all code be generated by "trusted" compilers helps assure security and correctness. This is part of the "nothing illegal" philosophy. Much of this section is devoted to architectural features that implement an "everything checked" philosophy. Ensuring that programs do what they're supposed to do, and nothing else, assures correctness and security.

The branch instruction is an exception to the above rule. Instead of type and size as part of the instruction name, the branch condition is appended.

Branch conditions are:

| | | |
|---|---|---|
| T  | true             | always branch |
| F  | false            | never branch (useless) |
| BQ | equal            | Z |
| NE | not equal        | not(Z) |
| CC | carry clear      | not(C) |
| CS | carry set        | C |
| VC | overflow clear   | not(V) |
| VS | overflow set     | V |
| RC | test result clear| not(R) |
| RS | test result set  | R |
| LT | less than        | N and not(Z) |
| GT | greater than     | not(N) and not(Z) |
| AM | atmost           | N or Z |
| AL | at least         | not(N) or Z |

Examples of instructions:

| | | |
|---|---|---|
| [label] | add:i:w   | a;b;c --add integers in a and b, put result in c |
|         | mod:i:w   | c;#17;d   --d := c MOD 17 |
|         | eq:i:wd;#0 | --d = 0? |
|         | br:eq [done] | --test equal flag |
|         | add:i:w   | a;#1;a    --increment a |
|         | br:t      | [label]   --always branch to tabel |
| [done]  |           | --loop exit, continue |

Each instruction is typed where appropriate with i, f, b, r, or c for integer, floating-point, boolean, rational, or character respectively.

The rational type operators are not included because, lacking greatest, common divisor (GCD) hardware and processors that can handle arbitrarily large integers, rational instructions will not be provided.

Memory allocation and deallocation (alloc & free) will be performed using the "buddy system". Such operations are included as instructions (rather than OS calls) since they are so important. Aho, et. al. pp. 467–468 have three pointer assignments, two of which are covered by indirect addressing. In this case the value of location x becomes the address of location y (x :=&y). The second case (x :=*y) is accomplished by using the "mov" instruction with the N (indirect) addressing mode on the first operand. The third case (*x :=y) uses mov with the indirect addressing mode on the last operand. The ptr instruction is not really necessary since the address of y could be accomplished by the mov instruction with the address of y as an immediate operand.

Scheduling

Multitude wouldn't be a parallel architecture without the capacity to spawn, suspend and terminate intervals. Two different scheduling instructions are required because of the two types of parallel composition in DANCE. Scheduling a single process is performed by "sched". For example, in "sort" procedure two recursive calls to "sort" are invoked in parallel with simple assignment. The parent interval will schedule each new interval sequentially, but they will be picked up by different processors and executed concurrently. Barrier synchronization at the end of each new interval causes the last one to continue with the parent interval.

The power and efficiency of the Multitude architecture comes not from the ability to schedule large-grained processes, but rather from scheduling (and executing) bunches of "light-weight" processes. A lightweight process runs in its parent's environment (activation block) obviating the need for each light-weight process to allocate its own activation block thus permitting parallel execution with a minimum of fuss. The instruction "schedm" schedules many processes at once that share the same environment and code. The combinable, fetch-add operation will be used by each light-weight process to determine a unique parameter so that although running the same code, the processes do different things. Both sched and schedm require two parameters that contain addresses. One for the proper activation block and the other for the first instruction to be executed. The instruction "susp" suspends execution of the current processes and schedules the processes for later execution starting at the following instruction. The instruction "term" terminates the current process.

Combinable Operations

Combinable operations (fadd, for, fand, fxor, swapi, swapf, & swapb) are included as instructions since they are so critical to parallel processing without locks or critical sections. Inclusion of combinable operations in the ISA of any microprocessor will make it my choice for Multitude. Alas, I'm aware of none that do. Therefore the node processor will probably need some means for transforming a write followed by a read to some specific physical address range into a combinable operation.

Segment Capability

Every segment has an associated capability. A capability is used to form an effective virtual address by concatenating the address of the segment's origin with the offset provided by the instruction. The segment's length is used for range checking. The page size holding the segment has two purposes: additional memory allocation and releasing memory when no longer needed. A memory allocation request may be satisfied by the OS by using the extra space in a page without needing to get fresh memory from the heap. A capability also has access rights that limit how a segment can be used.

A segment must be global, spread, shared, or private; a segment may be read-only; a segment may be protected; a segment may be OS-only.

Global: resides in memory accessible by any processor.

Spread: same as global, except that the bits used for memory bank number come from the least significant end of the virtual address to spread the segment over many or all the working memory banks.

Shared: non-cacheable; every access must use the Layered network; memory locations serving as targets for combinable operations must be on shared pages. Private: resides in local memory for this node.

Read-Only: no writing; all instructions reside in read-only segments.

Protected: can force writeback of cache values; data structures that are accessed using combinable operations to assure non-interference reside in protected segments. The wback instruction forces writing back to main memory every value in that segment that may have been loaded into cache. This allows temporary caching of values from a data structure visible by any processor. Executing wback before barrier synchronization assures that main memory reflects the true state of the interval representing execution of the program as a whole. In addition, protected segments are expected to reduce LRU-induced write-back upon cache-miss; protected segments will leave many empty cache entries after wback.

OS-only: OS-only segments will never appear in a User Segment Table.

Requirements: Bit field indicating authorizations necessary to access the segment. A set of corresponding authorization bits (access rights) bound to each user, are compared with the requirements. All requirements must be met (corresponding authorization bits set) to access the segment. A limited number of discretionary access controls can be directly implemented in hardware.

Security level: Users may read their level or lower; write their level or higher; and do combinable operations on their level only.

Figure 31:
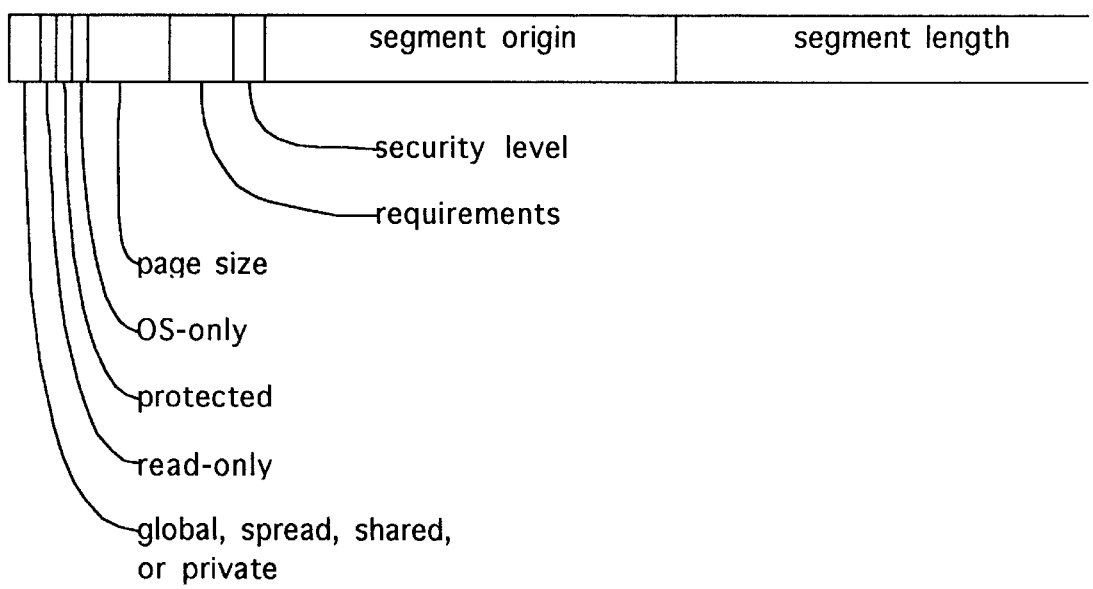
FIG. 31 shows the segment capability bit assignment.

FIG. 31 shows the bits in a capability.

Page Descriptor

Figure 32:
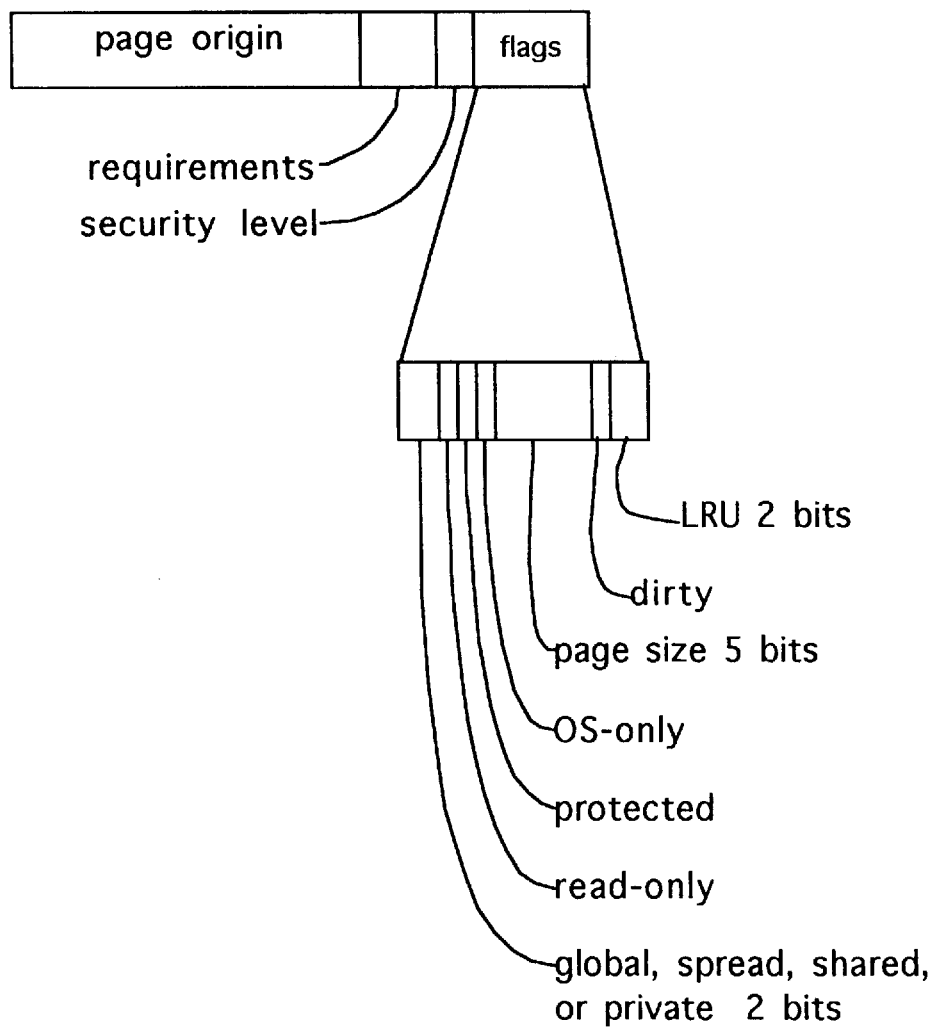
FIG. 32 illustrates page descriptor fields.

A page descriptor is used to translate effective virtual addresses into physical addresses; check access rights, security level, type of operation; and record page use for virtual memory page swapping. FIG. 32 shows the bits in a page descriptor.

Temporary Variables

At any time, the processor may use implicitly temporary variables that are stored solely in cache. Of course temporary variables must be written before read. The cache immediately makes a place for the temporary variable, if it is not present already. All temporary variables are discarded upon wback, or suspending or terminating the current interval. Procedure and functions that use temporary variables must wback before they return.

Linking

Figure 33:
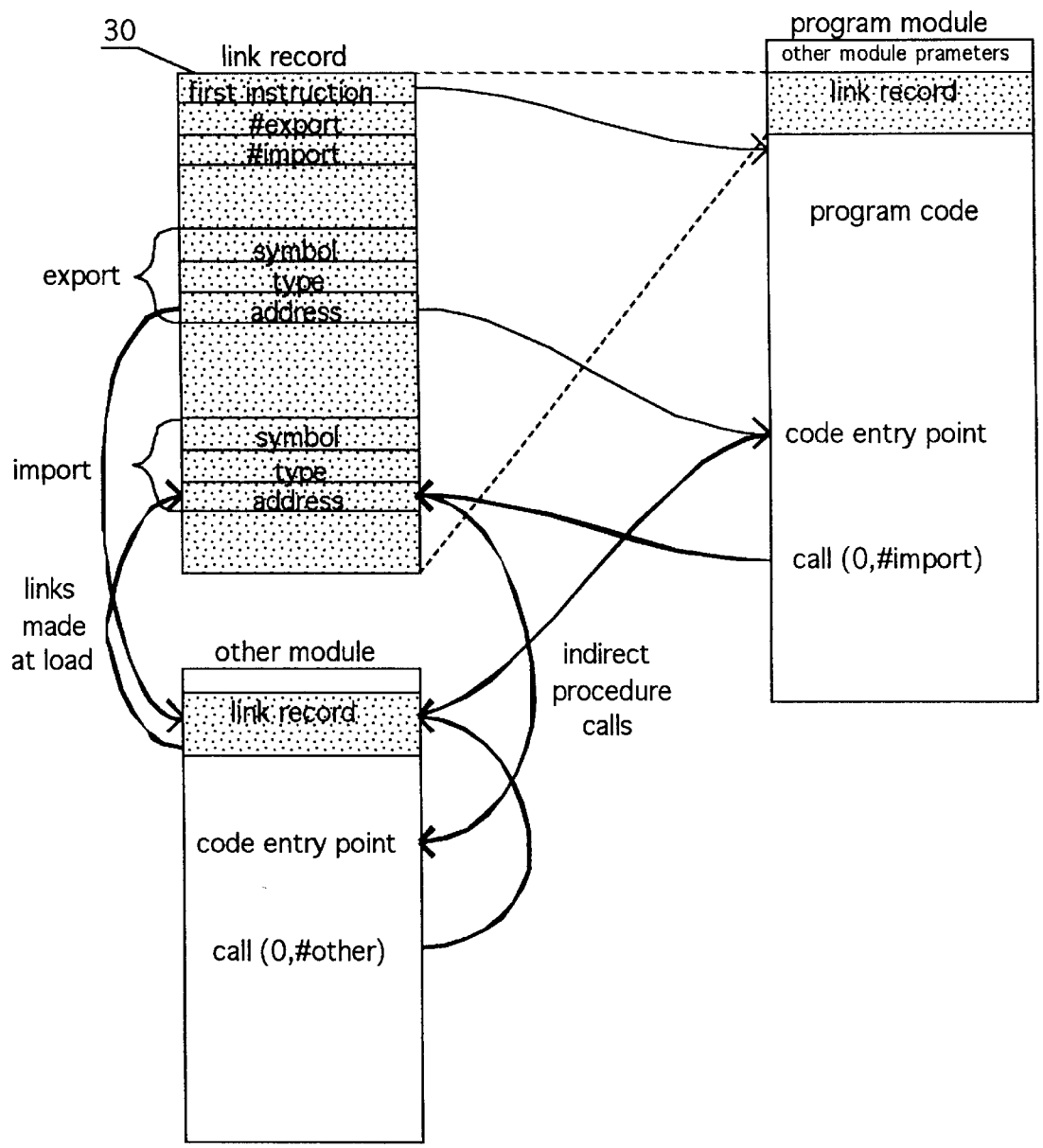
FIG. 33 represents the static linking with link record.

A compiled DANCE program will comprise many, separate code modules. The modules have placeholders for addresses not known when they were compiled. The process of connecting the modules is known as "linking." Linking may either be static (all links made when program is loaded, before execution) or dynamic (some links made during execution). Multitude can do either; static typing is sometimes required to ensure security. FIG. 33 graphically depicts static linking.

The beginning of every linkable subprogram contains a link record 30. The link record contains an entry for every symbol exported (defined in this module, used elsewhere) or imported (defined elsewhere, used in this module). Every export entry contains the exported symbol, its type, and its address. Every import entry also contains a symbol and its type, but its address is nil. Filling in all the nil addresses in every import entry in every code module is the process of static linking.

Dynamic linking fills in as many links as are known when the program is loaded, but leaves some links nil. These dynamic links are made in the activation record for this subprogram. Space is allocated for the dynamic links when the subprogram's activation record is allocated. Instructions use the link record 30 for links established before execution. The link record is part of the program segment and will be read-only after loading. Instructions use the activation record for dynamic links. In either case, displacement addressing will be used to reference imported symbol__ displacement from the origin of program text or the origin of the activation record.

Linking must check to see that the types linked together are compatible. Usually this is just integer, float, or instruction, but type checking of the polymorphic abstract data types provided by DANCE will entail comparing type expressions similar to that used in the compiler.

OPERATION OF INVENTION

This section expounds the "operation" of this invention, the model of computation described earlier. That entails disclosing how someone would actually "use" this invention. This invention is a process for transforming information into a desired form. Generally, such transformation is called "computation." This invention performs computation so that many parts of the computation may proceed concurrently. Concurrent computation is achieved by constructing a particular kind of mathematical object that satisfies (makes true) a temporal logic formula. DANCE programs are temporal logic formulas. The constructed mathematical objects are lattices of states. States are values of program variables at an instant of time. The first state holds the information as received; the last state holds the transformed information in the desired form.

The operation of this invention is the construction of state lattices that satisfy DANCE programs. Correct DANCE programs describe how to construct a satisfying state lattice.

Use of the invention

To use this invention one must write a correct DANCE program, compile the program into executable form, and linkloadexecute it on a Multitude-architecture computer.

Writing a DANCE program

Composing a DANCE program and its proof outline together is more art than craft. Gries' *Science of Programming* well explains derivation of sequential programs. Writing parallel programs in DANCE is similar, but seeks to maximize the opportunities for concurrent computation. In general, new data structures accessed via combinable operations will be required to achieve non-interference without blocking.

Compiling

Compilation of DANCE programs differs little from compilation of ordinary languages. We believe the best way to do so is to use an attribute grammar to define language syntax and semantics. Currently those who compile large programs perform "parallel" compilation by using several networked workstations to compile individual "compilation units." Rich opportunities for concurrent computation within compilation units can be realized with a DANCE compiler written in DANCE.

Lexical analysis→Parsing→Tree building→Tree decoration→Code generation

Execution on a Multitude-architecture MPP

Prior to execution, the program must be loaded, linked, and scheduled. Proper linking of packages with type parameters (e.g. ParallelSort) is tricky; every invocation uses the same object code with different, appropriate links. This facilitates use of pre-compiled libraries and minimizes the need for recompilation when the program is modified.

How to write a DANCE program

Once the new paradigm embodied in DANCE is understood (a major change from the inherently sequential way people think), DANCE programs will be as easy to write as Pascal programs. High school graduates with a firm grounding in algebra and two years of trade school should be able to write most DANCE programs used.

Determine what you want

Software engineering methods' "waterfall" model stress requirements evaluation prior to design and coding. These methods determine "what" the program should do, rather than "how" it should do it.

Formally specify requirements

Natural language specifications must be transformed into assertions written in the first-order predicate calculus used for proof outlines. For most applications this means composing the precondition the program can assume and the postcondition the program must assure. Real-time and transaction-based systems will write pre- and postconditions for every event that can occur with the caveat that several events may be serviced simultaneously.

Formal requirements can form a contract between developers and users. Proof outlines show that a program meets its formal specification—not that the system does what's intended. Assuring that the specification accurately captures the desires of users will remain a human-intensive activity forever. Fortunately, the process of transforming natural language specifications into formal assertions identifies ambiguities and lapses in the natural language specification early in the development process. Thus critics of correctness proofs, because they only assure a program meets its specification and not what is wanted, are wrong. Formality assists conformance to expectations.

Choose concurrently accessible data structures

Unfortunately, older FORTRAN programs cannot be automatically converted into DANCE while still obtaining efficiencies possible. New, concurrently-accessible data structures that use combinable operations must be created. Fetch-add is useful for accessing arrays to assure that at most one interval is reading or writing any array element. Similarly, swap is useful for manipulating dynamic data structures like linked-lists and trees.

Array Queue

Figure 12:
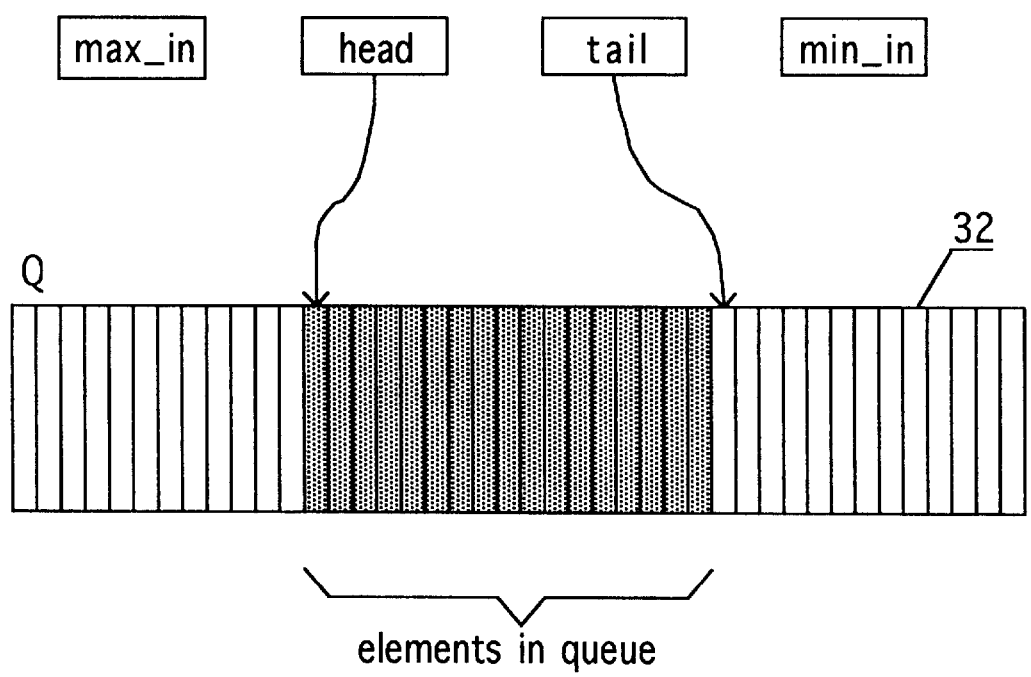
FIG. 12 represents a conventional concurrently accessible queue: Using fetchadd to determine the array index for either get or put allows many intervals to access the queue concurrently.

FIG. 12 depicts a simultaneously accessible queue 32. For simplicity we (initially) assume that the queue size is sufficiently large enough so that there is always enough room for another put, and there is always something in the queue for a get.

```
Put code:
    fetch_add(tail,1,put_index);
    Q[put_index MOD Q_length] := put_value
Get code:
    fetch_add(head,1,get_index);
    get_value := Q[get_index MOD Q_length]
```

Now let's assume that the queue 32 may be empty or full, in which case the interval will be suspended, and retried later.

```
Put code:
{inv: 0<= min_in <= (tail-head) MOD Q_length <= max_in < Q_length }
{ OLDTAIL = tail }
put: success := F;
    do
    (not success) ->
        declare
            size : nat;
        begin
            fetch_add(max_in,1,size);
            if
                (size < Q_length) ->
                    begin
                        fetch_add(tail,1,put_index);
                        Q[put_index MOD Q_length] :=
            put_value;
                        fetch_add(min_in,1,dummy);
                        success := T
                    end
            []
                NOT(size < Q_length) ->
                    begin
                        fetch_add(max_in,-1,dummy);
```

-continued

```
                    suspend
                end
            fi
        end
    od
{ inv AND exists i : OLDTAIL <= i < tail : Q[i]=put_value AND AccessOK}
Get code:
{ inv }
{ OLDHEAD = head AND OLDQ = Q }
get: success := F;
    do
        (not success) ->
            declare
                size : nat;
            begin
                fetch_add(min_in,-1,size);
                if
                    (size > 0) ->
                        begin
                            fetch_add(head,1,get_index);
                            get_value := Q[get_index MOD
Q_length];
                            fetch_add(max_in,-1,dummy);
                            success := T
                        end
                []
                    NOT(size > 0) ->
                        begin
                            fetch_add(min_in,1,dummy),
                            suspend
                        end
                fi
            end
    od
{ inv AND exists i : OLDHEAD <= i < head : OLDQ[i]=get_value AND
AccessOK}
```

Linked List Queue

Figure 13:
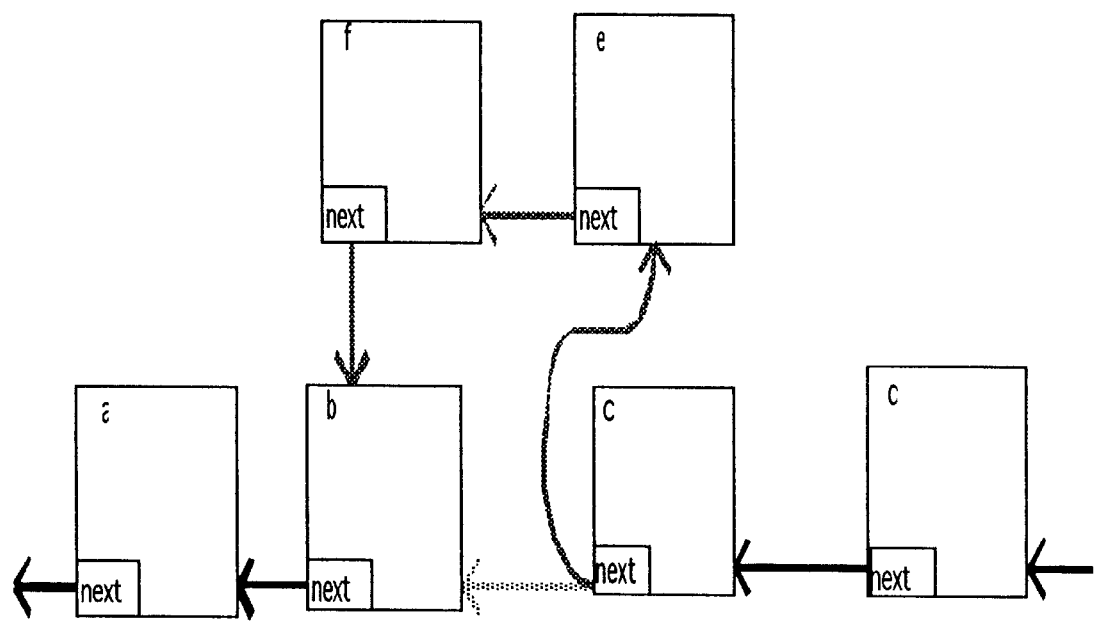
FIG. 13 illustrates the inserting of records into a linked list: Two records can be inserted into the same place at the same time using a swap operation.

FIG. 13 depicts insertion of a record into a linked list. A swap is used to exchange a pointer in the linked list. When only a single insertion occurs, the swap exchanges a pointer to the new record with the pointer to the "next" record. Assigning the returned value to the "next" entry in the new record keeps the list linked. The code to insert a new record, "e" after record "c" will look something like this:

```
e := NEW record_type;
--fill in my_record
swap(c.next,e,old_ptr);
e.next := old_ptr;
```

But if another interval tries to insert a record, say "f", at the same place at the same time, the swaps will combine nondeterministically. The value swapped into "c.next" will always be one of the swap parameters, "e" or "f"; the value swapped out of "c.next" will be returned as "old_wtr" to only one interval; and the value returned as "old_ptr" to the remaining interval is the swap parameter of the other interval. In FIG. 13 the value swapped into "c.next" was "e", "e.next" became "f", and "f.next" got the value originally in "c.next" which was "d". Since swap is nondeterministic, record "f" could have been inserted before record "e", but in any case all of the records will be inserted between "c" and "d" no matter how many records are inserted simultaneously, but the inserted records could be in any order.

Figure 14:
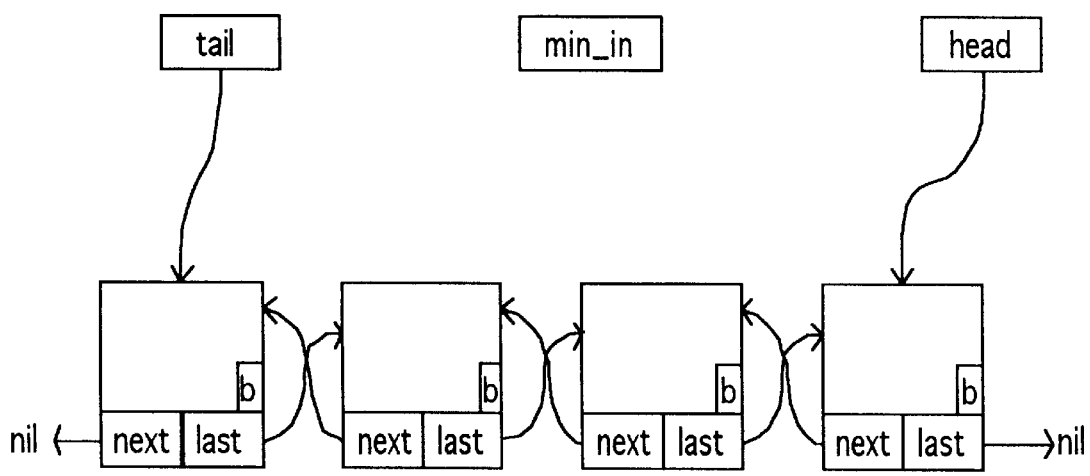
FIG. 14 illustrates a conventional linked-list queue: Using swap to manipulate pointers allows concurrent access to a dynamically-sized queue.

FIG. 14 depicts a queue made from a doubly-linked list. Such a queue is limited only by the memory available and consumes no more memory than needed.

```
Put code:
my_record := NEW record_type;
--fill in my_record
swap(tail,my_record,old_tail);
my_record.last := old_tail;
old_tail.next := my_record
Get code:
my_record := head;
swap(head,my_record.next,dummy);
```

This works fine for put; simultaneous swaps to "tail" allow multiple records to be added to the queue concurrently, but get only works for one interval at a time.

Dynamic Double-Ended Queue

Making the queue work with multiple, simultaneous "get"s gets messy.

```
Put code:
my_record := NEW record_type;
--fill in my_record
{ list = SET L :: L=head OR (EXISTS L2 : L2 IN list : L=L2.next) }
--list is the set of all pointers such that either the pointer is head or
--another pointer in the list has it as the next pointer
{inv: min_in + lookers <= NUM r : r IN list:r.b}
--min_in is at most the number of pointers in the list whose records
--have the b flag true (default value)
swap(tail,my_record,old_tail);
my_record.last := old_tail;
if
        old_tail = nil)->swap(head,my_record,dummy1)
[]
        (old_tail /= nil) ->old_tail.next := my_record
fi;
```

-continued

```
my_record.b := T;
fetch_add(min_in,1,dummy);
{inv AND AccessOK}
Get code:
get:    success := F;
        {inv}
        do
        (not success) ->
        declare
            size : nat;
        begin
            {OLDMIN = min_in AND OLDLOOK = lookers}
            fetch_add(min_in,-1,size);
            {min_in = OLDMIN-1}
            if
                (size > 0) ->
                begin
                    {lookers = OLDLOOK+1}
                    my_record := head;
                    {OLDB = my_record.b}
                    fetch_and(my_record.b,F,success);
                    {inv2: success OR NOT OLDB}
                    do
                        (NOT success) ->
                        begin
                            my_record :=
my_record.next;
                            {OLDB =
my_record.b}
fetch_and(my_record.b,F,success)
                            {inv2}
                        end
                    od
                    {success AND exclusive(my_record)}
                    swap(head,my_record next,dummy)
                end
            []
                NOT(size > 0) ->
                begin
                    {min_in = OLDMIN-1}
                    fetch_add(min_in,1,dummy);
                    {(min_in = OLDMIN) AND (lookers =
OLDLOOK) }
                            --well the above assertion isn't quite
accurate, but the
                            --net change in min_in and lookers is
zero
                    suspend
                end
            fi
        end
    od
{inv AND exclusive(my_record) AND success AND AccessOK}
```

Operation of Parallel Sort

Returning to the earlier example of ParallelSort execution will be explained using reference numerals Chicago font (1234567890) for line numbers of the package in section: An Extended Example: Sorting.

Suppose the employee names to be sorted are: Johnson, Swenson, Anderson, Larson, Carlson, Jackson, Henderson, and Peterson. Execution will (try) to make the following temporal logic formula true by constructing a lattice of states:

sort(unsorted_employees,sorted_employees,
1,number_of_employees)

where "unsorted_employees" have the names above and the "number_of_employees" is eight. Initially the graph is only a start node 101 as shown in FIG. 15.

Exchanging actual parameters for formal parameters (just a name change, no copying or computation) yields the state at the beginning of procedure "sort", line 33, depicted in FIG. 16.

Figure 17:
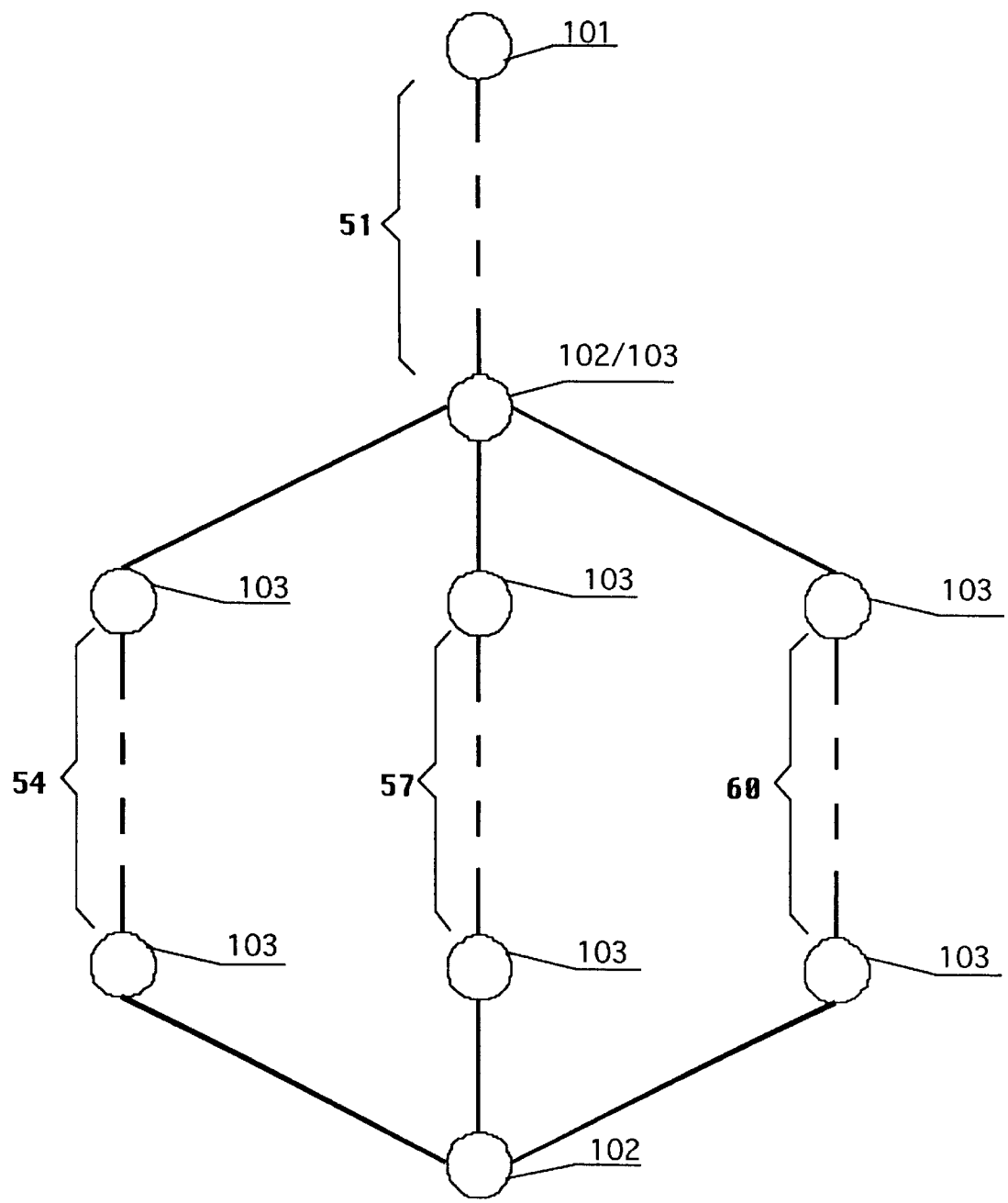
FIG. 17 graphically shows an interval to satisfy "sort": Four subintervals are inserted into the lattice for "sort" to first partition the data (51), followed by sorts on the upper (54) and lower (57) halves, concurrent with storing the pivot (60)

To satisfy temporal predicate "sort" we must satisfy its body. The body of "sort" is just an alternative command. To satisfy an alternative command, we must satisfy a choice with an open guard. Since "low" is less than "high" we must satisfy the choice from line 50 to line 61. To do this we must construct an interval that first satisfies "partition", line 51, and then satisfies two temporal predicates "sort", lines 54 and 57, and an assignment, line 60, concurrently. FIG. 17 depicts such an interval. The dashed lines represent some lattice of states that satisfy the temporal predicate on the line indicated.

Figure 18:
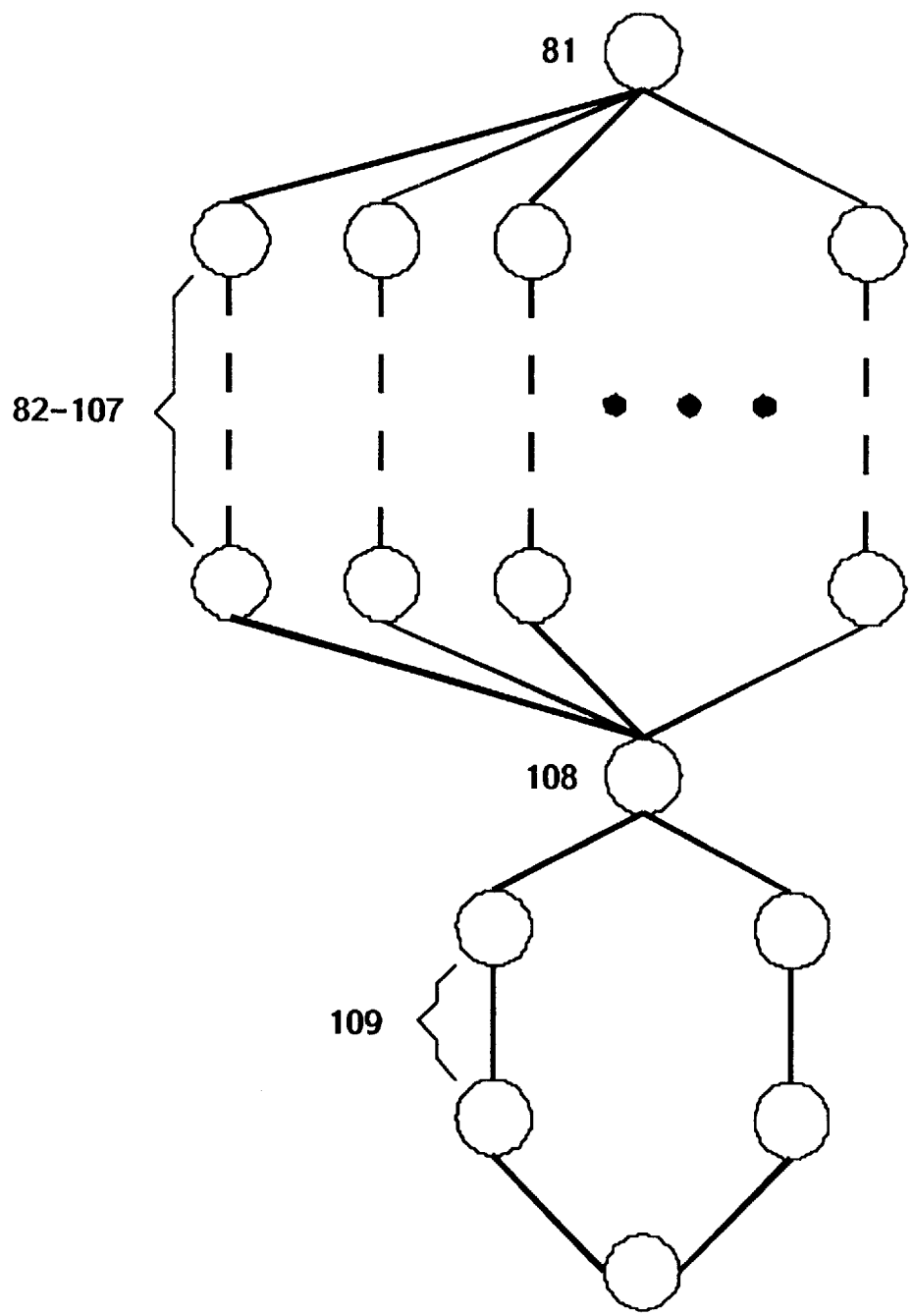
FIG. 18 illustrates an interval to satisfy "partition"

The interval satisfying "partition", line 51, must satisfy its definition starting on line 67. As usual, the names of the formal and actual parameters differ without performance impact. The body of "partition", lines 79 through 111, consists of a parallel command, line 81, followed by a pair of concurrent assignments, line 109, as shown in FIG. 18.

Figure 19:
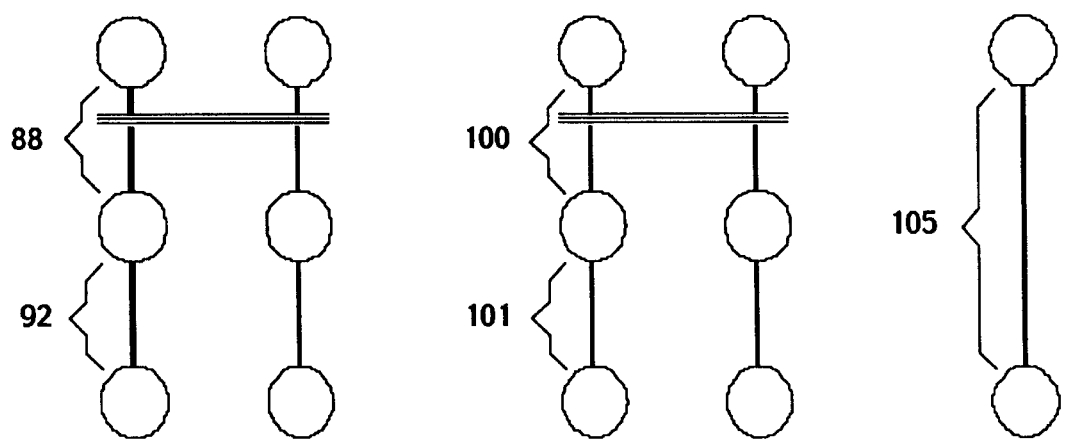
FIG. 19 shows concurrent intervals satisfying the alternative command within "partition"

The body of the parallel command is an alternative command with three choices, lines 82 to 107. The last choice, line 105, is selected when considering the pivot, and does nothing. The other two choices perform a fetch-add, line 88 or 100, and then an assignment, line 92 or 101, using the value returned by the fetch-add. Fetch-add is one of the combinable operations that allow concurrent intervals to use the same state variables simultaneously in a non-deterministic, yet controlled manner. State transitions involving combinable operations that occur simultaneously are crossed with a striped, horizontal bar. FIG. 19 shows a few, possible concurrent intervals that satisfy the alternative command, lines 83 to 106.

Many different intervals can satisfy a temporal predicate, and yield exactly the same result! The previous example illustrates that many different state lattices (intervals) can satisfy "sort"—even a sequence. The best intervals are short (few arcs in longest path from start to end of the lattice) and bushy (much concurrent computation).

Figure 20:
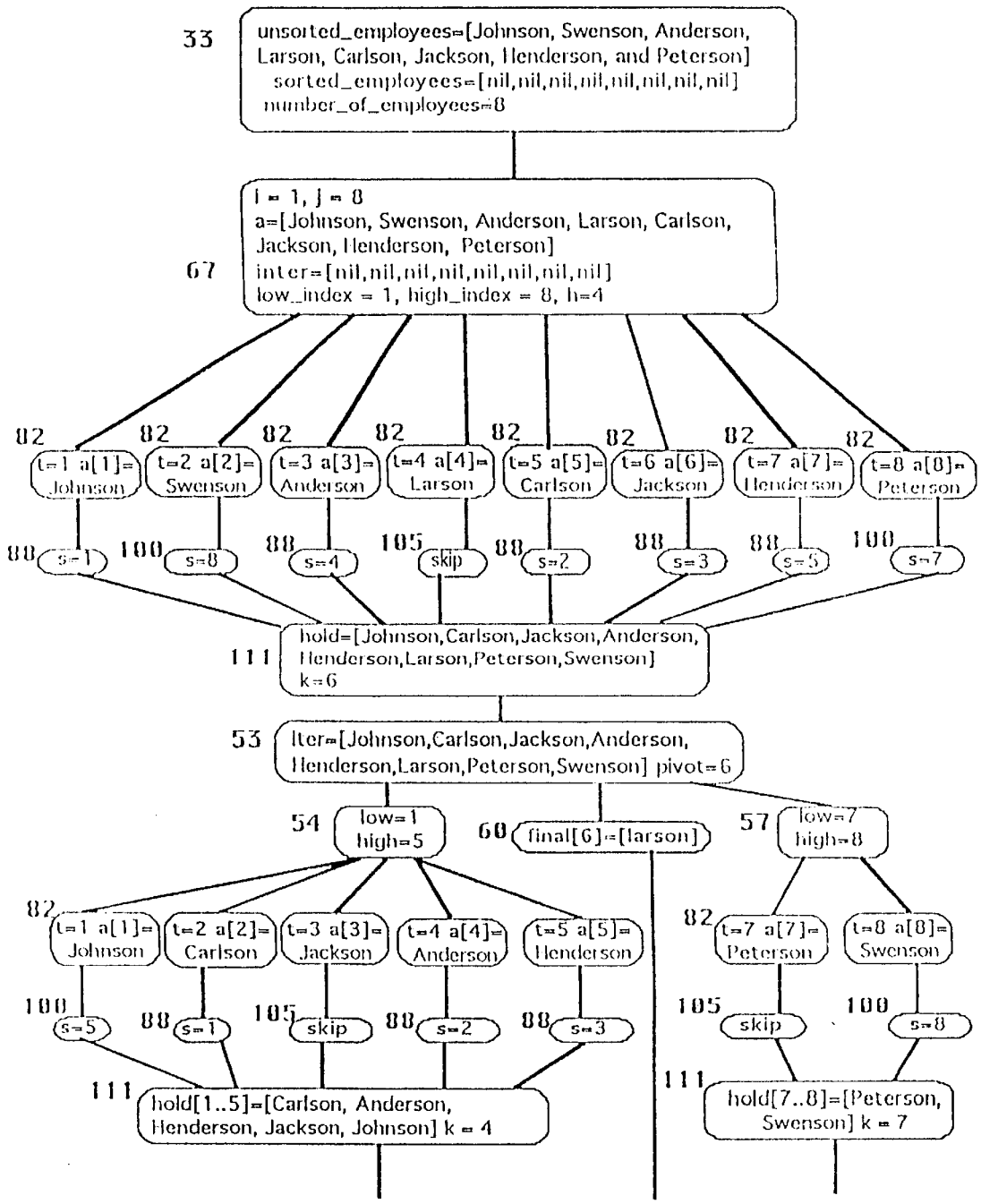
FIGS. 20, 21 and 22 when arranged as shown in FIG. 22A illustrate as an examplee a lattice satisfying a temporal logic formula for sorting members of the Swedish Bikini Team.
Figure 21:
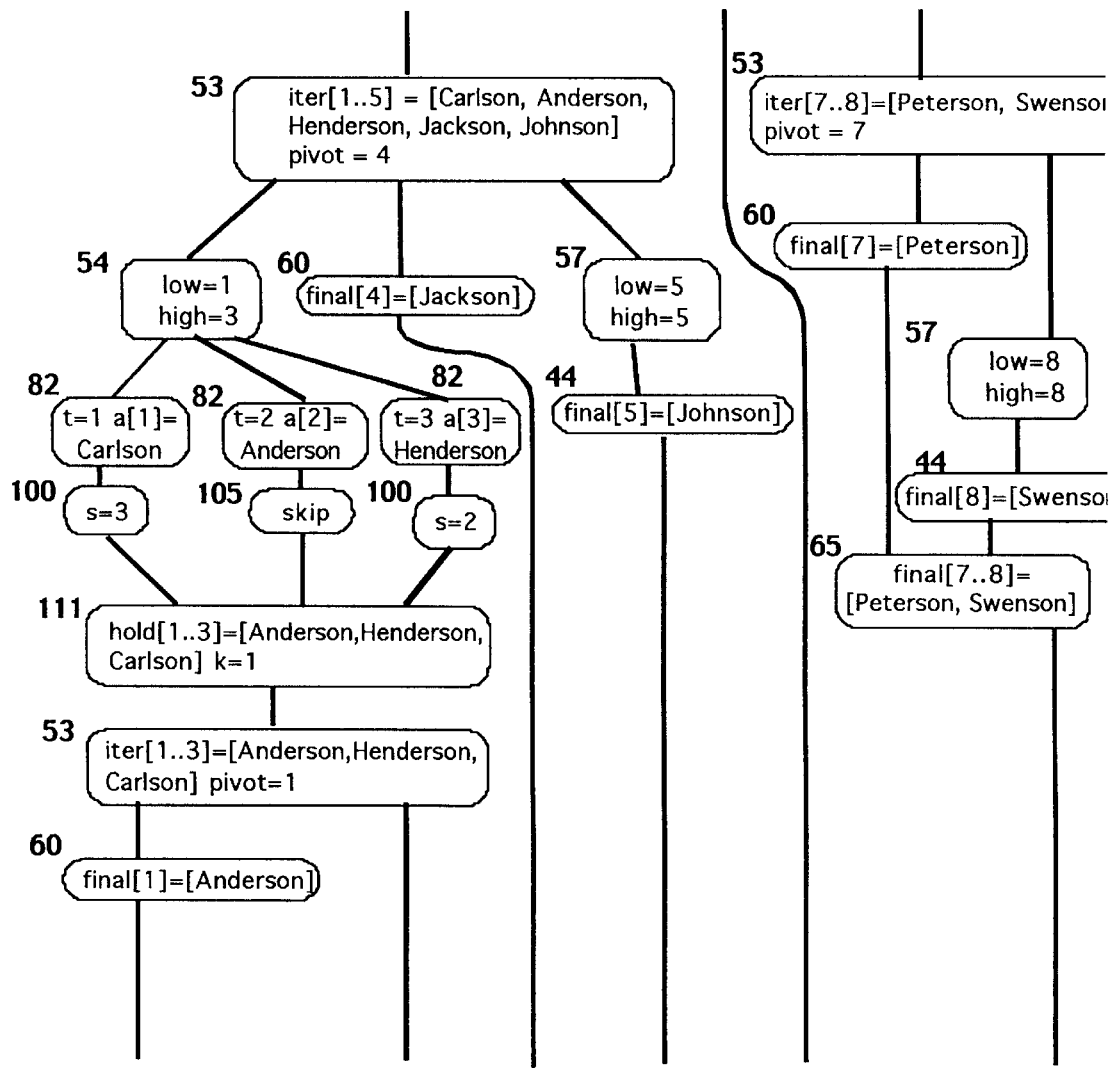
Figure 22:
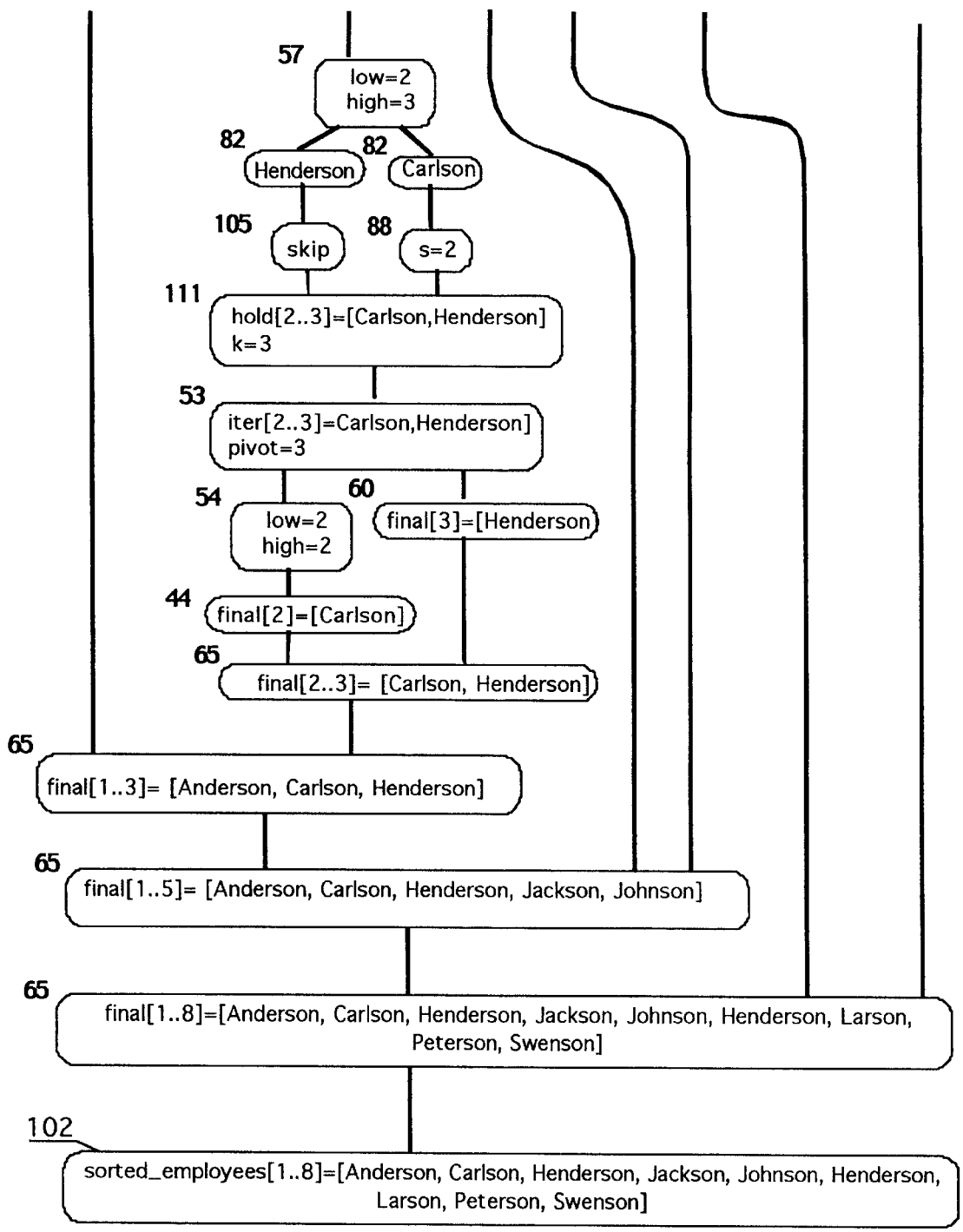
Figure 22A:
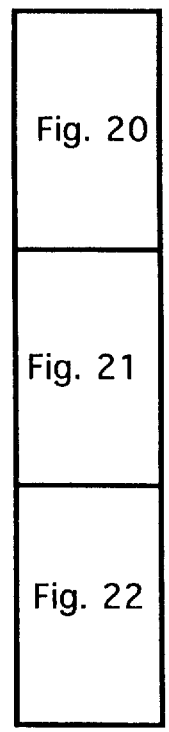

FIGS. 20, 21, and 22 exemplify a particular state lattice, that could be an interval that sorts the roster for the Swedish Bikini Team. The first state is just the values of variables in the initial invocation of "sort" as in FIG. 15. The states are labeled with line numbers, but should not be thought of as the location of a program counter or place in the text of the program. Debuggers are universally used for sequential program development. A debugger allows the programmer to step through the code and examine any variables desired. This works because there is a single locus of control which can be stopped to examine state variables. The semantics of a traditional, prior-art, language for FIG. 15 would be: "Push current state variables onto the stack; jump to the beginning of the sort' subroutine; and sequentially execute the instructions found there." In contrast, DANCE semantics for FIG. 15 are: "make a lattice of states that satisfies sort(unsorted_employees,sorted_employees,
1,number_of_employees)

where the values of variables in the initial state are as given." Therefore the states of the lattice really don't correspond to any particular line of the program at all, but to tell which temporal predicate is satisfied by the subinterval containing the numbered state.

FIG. 20 deliberately resembles FIG. 17 which depicts an interval (lattice of states) to satisfy "sort". Each of the dashed lines in FIG. 17 represents a subinterval that satisfies the numbered line of the program. The subinterval from 67 to 111 in FIG. 20 replaces 51 in FIG. 17. Similarly subintervals 54, 57 and 60 in FIG. 17 are replaced by subintervals beginning at states labeled 54, 57 and 60 which continue off the page into FIG. 21. States 88 in FIG. 20 hold initial values for each subinterval labeled 82–107 in FIG. 19. The values for "s" in states 88 or 100 are the first actual state change— the result of a fetch-add. The state in 109 is the last state of the subinterval satisfying "partition". States 54 and 57 begin subintervals that make each (smaller) "sort". Those subintervals have the same shape as FIG. 17. The process of inserting subintervals (lattices) continues until the predicate "sort" can be satisfied by a single assignment, 44. Each subinterval satisfying "sort" ends with a state labeled 65. Finally the array "sorted_employees" gets its proper value in the last state of the interval in FIG. 22.

Figure 34:
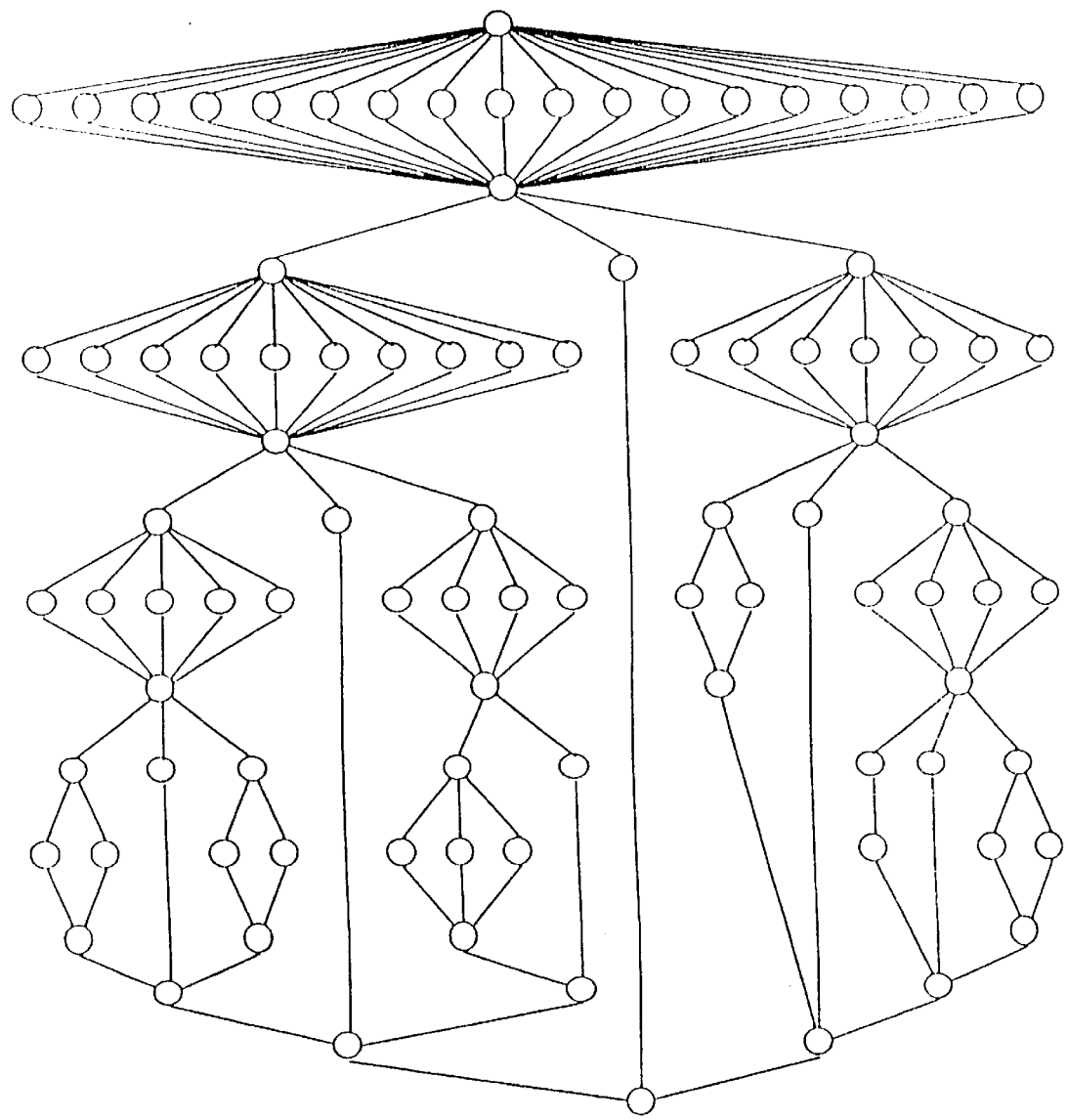
FIG. 34 shows a lattice of states satisfying a DANCE temporal formula.

FIG. 34 graphically represents another exemplarylattice satisfying "sort" for different data without state variable values in each node of the graph. Sorting a million records will still have the same shape for the interval which satisfies "sort", just wider and deeper.

Sort Assembly Language:

```
[sort]  eq:i:w  low;high       --are the indices the same?
        branch      EQ;onething --yes
        gt:i:w  low;high
        branch      GT;endsort
        alloc sp,p;psize;loc 1
        mov:w       low;loc1.i;wordsize
        mov     high;loc1.j;wordsize
        subi    high    low     tmp2
        addi    tmp2    1       tmp2
        multi   rsize   tmp2    tmp3
        mov     orig    loc1.a  tmp3
        call    loc1    partition
```

Hardware Operation

The section Multitude Computer Architecture in the DESCRIPTION OF INVENTION summarized what the hardware necessary to execute is. This section describes what the hardware does.

The three-address code, clever memory management, capabilities, descriptors, hidden registers, and tags will almost certainly be emulated by early prototypes. A layered network prototype system with custom GaAs switch chips has been developed. It employs off-the-shelf VME-card processors for the nodes. Combining is not done in the network, but rather in the custom hardware that handles network operations for each node. It is believed to be the first platform to execute a DANCE program in parallel, with all the performance-degrading emulation by conventional hardware.

Hidden Registers

Figure 35:
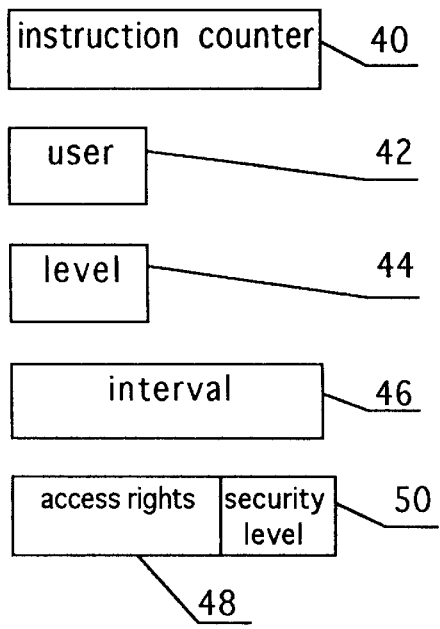
FIG. 35 illustrates hidden registers.

Several hidden registers are used by the microprocessor, but are not directly accessible: instruction counter 40, user 42, nesting level 44, interval 46, access rights 48, and security level 50. The hidden registers are shown in FIG. 35. The instruction counter (ic) 40 contains the address of the next instruction to be executed by this processor.

The "user" register 42 identifies what program the processor is doing. It is implicitly part of every address the processor generates. It tells which User Segment Table defines segments for this program. When Multitude architecture computers are timeshared as a public utility, many different user's programs will be running concurrently. Processors will be switching between users frequently. The user register ensures that user programs cannot access memory locations or other resources without an explicit entry in the User Segment Table. This is a valuable security mechanism.

The "level" register 44 defines the nesting level of the currently executing code. The default value for the segment number of every address is contained in the level register. Variables declared by a parent subprogram and visible at this level have segment numbers relative to the level register.

The "interval" register 46 designates an Interval Mapping Table (IMT). An IMT maps segment numbers up to the level register into the true segment numbers. In this manner many intervals may be executing concurrently, at the same level, but still use independent segments in the same User Segment Table.

The "access rights" and "security level" registers 48, 40 hold a user's permissions and security classification. These are compared with segment capabilities and page descriptors to enforce security policies.

Memory Management Unit

Figure 36:
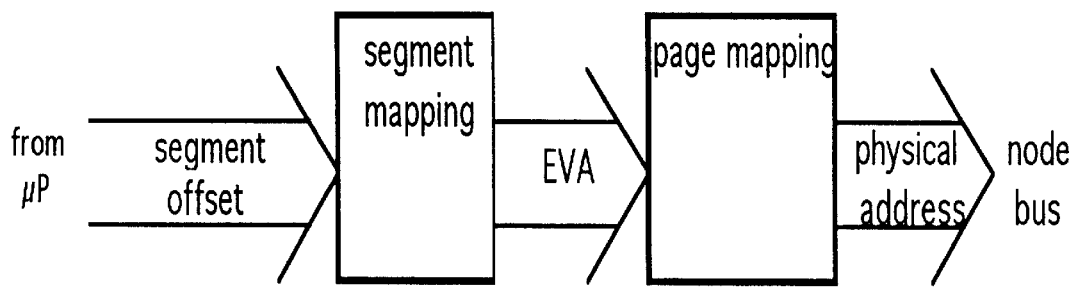
FIG. 36 shows that MMU translates a segmented address to a physical address.

The Memory Management Unit (MMU) performs address translation, reference monitoring, cache operation, virtualmemory page swapping, and node bus transactions. The TLB described below usually resides in the microprocessor, but may be included on the MMU chip. In fact, the MMU may not even have its own chip, but be also included in the microprocessor. The address translation performed by the MMU are depicted in FIG. 36.

Translation Lookaside Buffer

Figure 37:
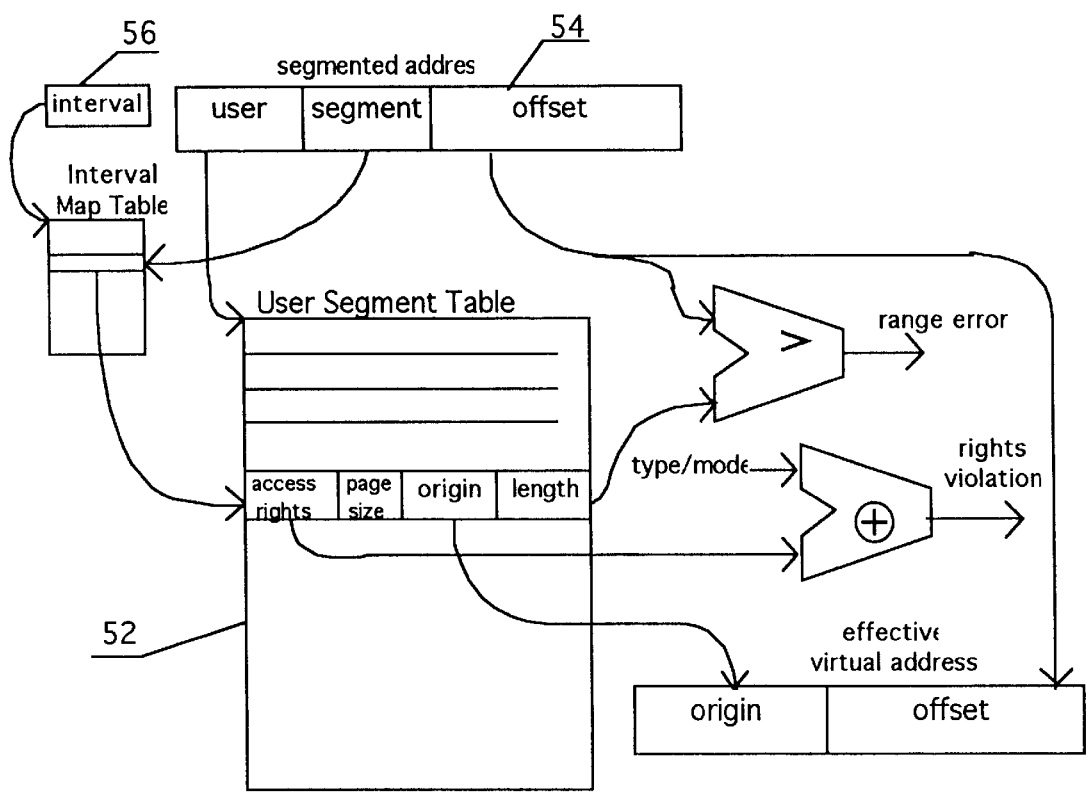
FIG. 37 shows how a User Sergment Table defines Segmented-to-EVA translation.
Figure 38:
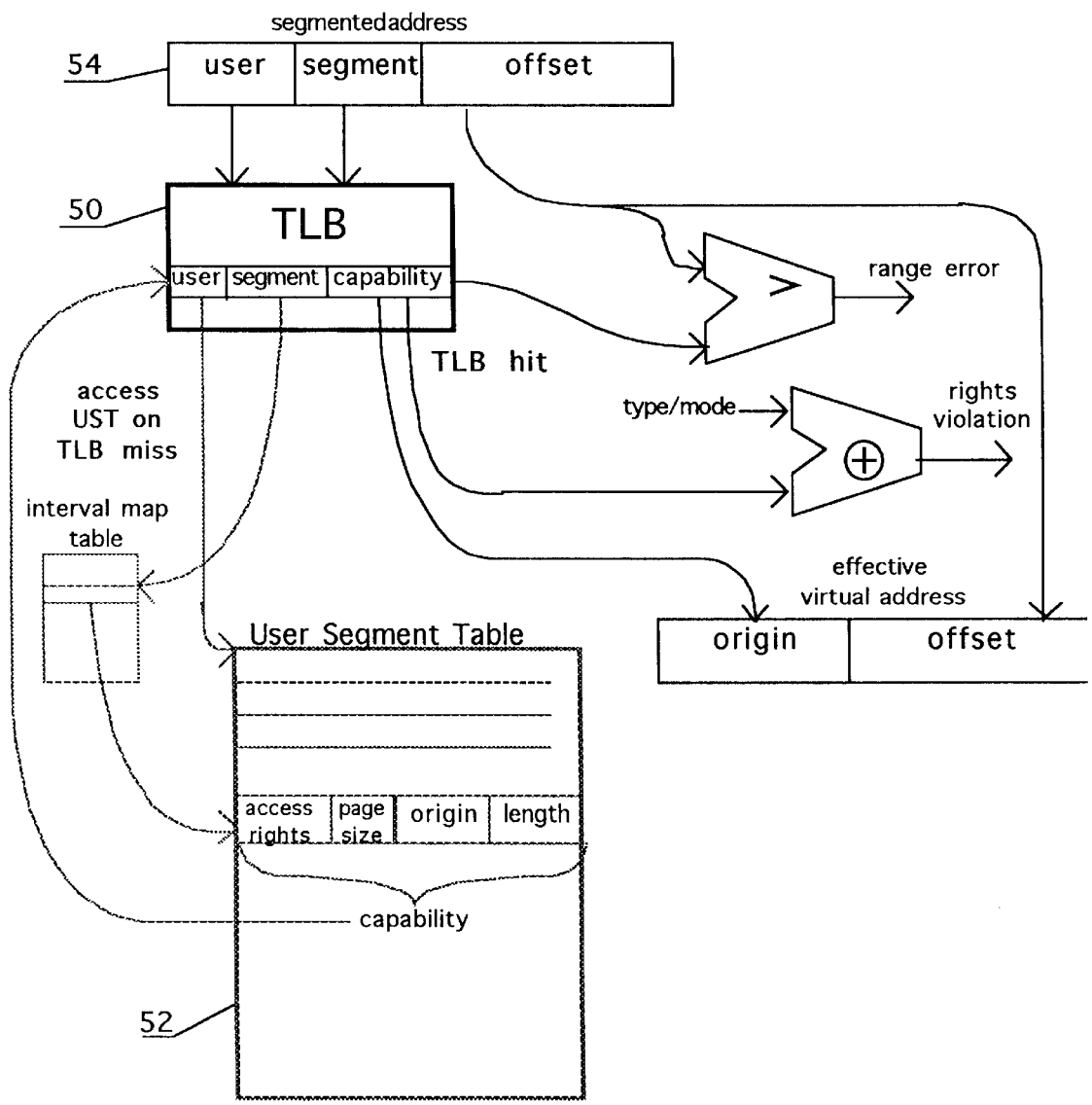
FIG. 38 illustrates TLB hit address translation.

The Translation Lookaside Buffer (TLB) implements segmented addressing. Referring to FIGS. 36, 37 and 38, TLB 50 translates addresses generated by the processor (user, segment,offset) into effective virtual addresses (EVA). The TLB holds temporary copies of capabilities held in a User Segment Table (UST) 52. The TLB is a cache for address translations.

The UST defines segmented-to-EVA translation. The user register 54 indicates which UST defines this user's capabilities. The interval register 56 indicates segment substitution for low-numbered segments. It has as many entries as the level register 56. Segment numbers greater than level are unmodified. This allows multiple intervals to be executing at the same level but with different local variables.

The TLB 50 holds copies of recently used capabilities for rapid access as shown in FIG. 38.

EVA is translated into a physical address using a page table. Since a segment resides on a single page, inclusion of a page descriptor in the TLB allows direct translation from segmented address to physical address.

Figure 39:
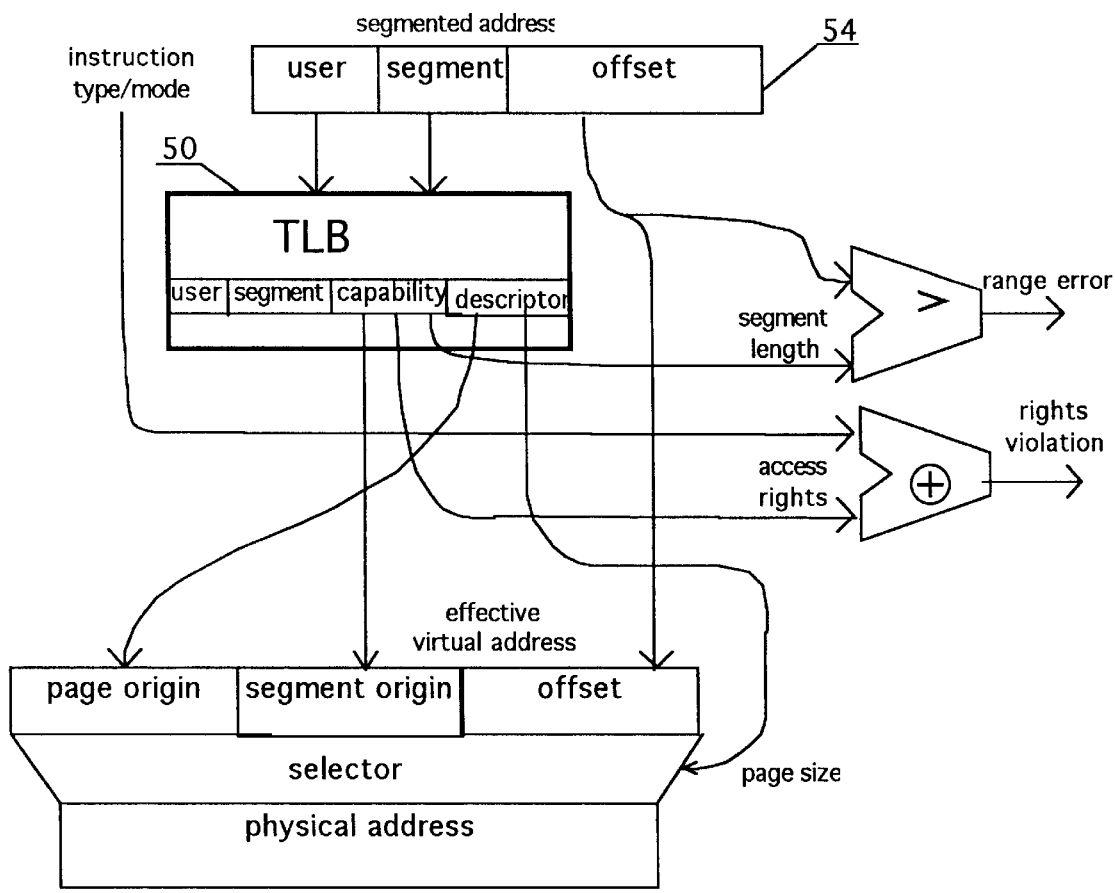
FIG. 39 illustrates TLB hit address translation with page descriptor.

FIG. 39 shows the TLB 50 augmented with page descriptors. The page size determines how many bits of page origin are used to form the physical address; larger pages use fewer bits.

Cache

Figure 40:
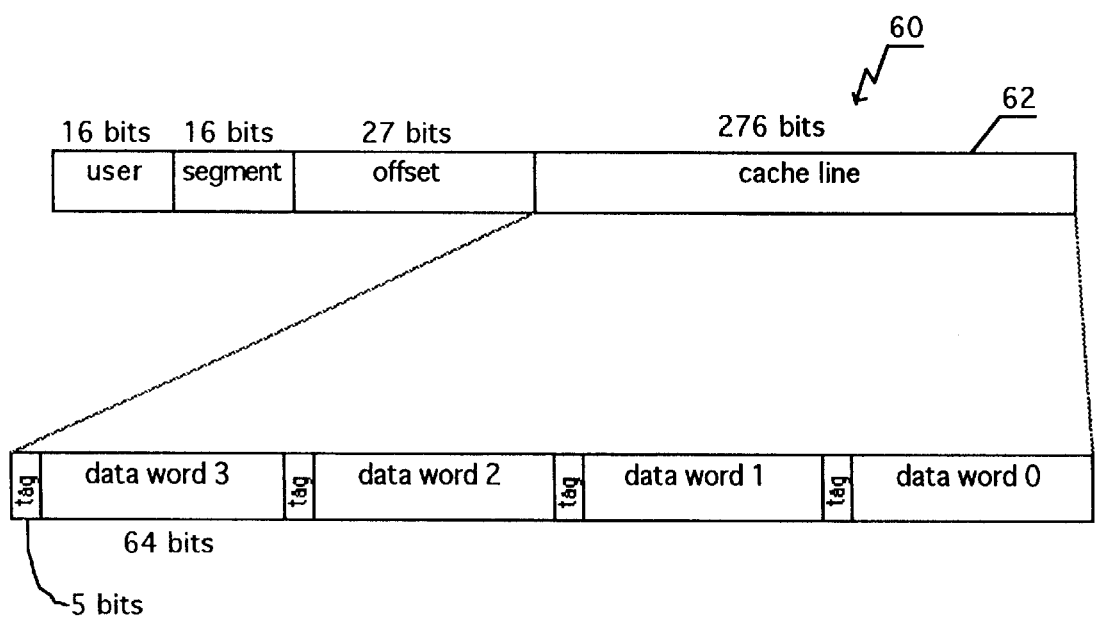
FIG. 40 illustrates that a cache line holding four words needs 335 bits.

The cache 60 (FIG. 40) holds values in fast static RAM (SRAM). The values in the cache are the same as the values obtained from main memory in absence of the cache, except for temporary variables which have no main memory addresses at all. Shared variables are never cached. Fortunately the vast majority of state variables can be cached. The wback instruction requires that the cache entries for a particular segment be known.

Figure 41:
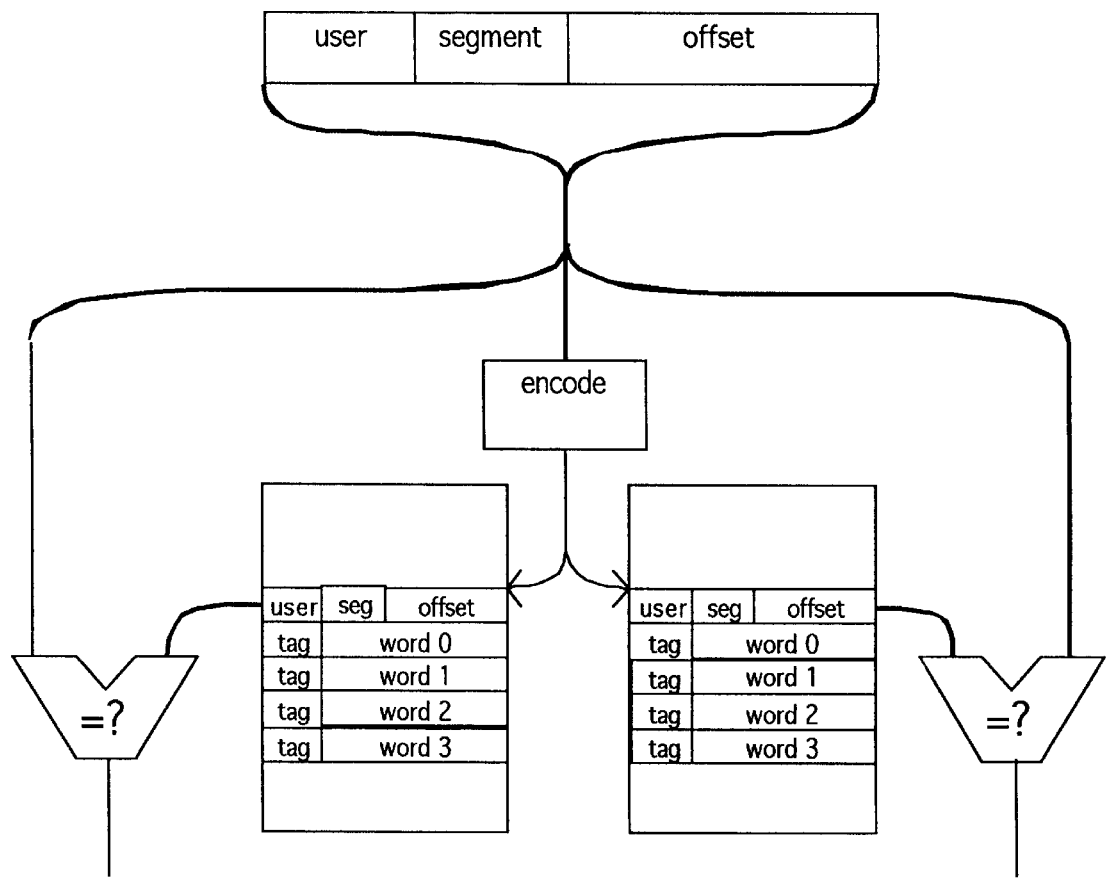
FIG. 41 shows that cache hits are determined by encoding virtual address to select cache lines, and then compare that user, segment, and offset match.

A cache line 62 holding four, 64-bit words needs 335 bits, not including parity. Wide cache lines strain limitations of chip bonding pads and package pins. Multiplexing can alleviate pinout restrictions at the cost of two-cycle cache access. Standard, two-way, set-associative, LRU-replacement cache management is fine, except protected segments must be written back upon wback. FIG. 41 shows the set-associative cache.

One method would be to read every cache line and compare its user and segment fields with the segment being written back, and if the cache line is dirty (has been written) writes the values back into main memory. The disadvantage of this approach is the time to cycle through every cache line.

Augmenting the TLB with three parameters can substantially reduce the number of cache lines considered for wback. Retaining the largest and smallest offset numbers used to write variables in the segment limits range of offsets that must be tested. Counting the number of writes tells the maximum number of cache lines that may need writeback. Write counts of zero, one or two are especially helpful.

Memory Controller

The Memory Controller reads and writes the DRAM chips according to node bus transactions. It performs the fetch-op for combinable operations. It checks the tags for proper use. It clears (sets to nil) memory when allocated.

Input/Output Controller

The input/output controller (IOC) swaps pages to disk, reads or writes disk files, and handles any other peripherals under command of the OS.

Request and Response Chips

The request and response chips interface the node to the Layered network.

Construct Implementations

The following construct implementations are the form of code the compiler would generate for the particular command. English descriptions of code appear where appropriate.

Alternative Command

```
if g1 => s1 [] g2 => [] . . . []gn => sn fi
[if]     --evaluate boolean expression for g1
         branch:g1   s1   --g1 is condition code of µp flags: EQ,LT,CC,
         --evaluate boolean expression for g2
         branch:g2   s2
         . . .
         --evaluate boolean expression for gn
         branch:gn   sn
         goto        error  --an error has occurred
[s1]     --code implementing s1
         goto        fi
[s2]     --code implementing s2
         goto        fi
         . . .
[sn]     --code implementing sn
[fi]     --code executed after alterative command
```

Iterative Command

```
do
g => s
od
[do]    --evaluate g
        branch:g   od   --g is condition code for branch
        --code implementing s
        branch:T   do   --always branch
[od]    --code executed after iterative command
```

Parallel Composition

```
c1 & c2 & . . . & cn
[sync] shared        int       --sync must be on shared, noncacheable page
[par]  mov           #n;sync;1 --initialize sunc to n
       alloc sp,p ;#c1size;c1block  --allocate spread, protected
       --fill in state variables in activation block: c1block
       sched c1block;c1   --schedule starting at c1 using c1block
       alloc  sp,p;#c2size;c2block
       --fill in state variables in c2block
       sched c2block;c2
       . . .
       alloc  sp,p,#cnsize;cnblock
       --fill in state variables in cnblock
       sched cnblock;cn
       term                           --end this interval
[c1]   --code implementing c1
       wback        c1block           --clear cache
       fadd:i:w     sync;-1;tmp1      --segment for sync is level-1
       eq:i:w 1;tmp1                  --are we last to sync?
       branch       EQ;rest1
       term                           --no, quit
[rest1] rtn         rest              --yes, continue parent
[c2]   --code implementing c2
       wback        c1block
       fadd   :i:w   sync;-1;tmp2
       eq:i:w 1;tmp2
       branch       EQ;rest2
       term
[rest2] rtn         rest
       . . .
[cn]   --code implementing cn
       wback        c1block
       fadd   :i:w   sync;-1;tmpn
       eq:i:w 1;tmpn
       branch       EQ;restn
       term
[restn] rtn         rest
[rest] --copy state variables (if needed) --last sync does rest
       free         c1block
       free         c2block
       . . .
       free         cnblock
       --code following the parallel composition
```

Parallel Command

```
FORALL i IN j..k DO body
[i]        shared int    --i in activation record, filled w/address by alloc
[bar]      shared int    --barrier syncronization variable
[forall]   alloc:w    sh;#2;i    --get address for i and bar
           mov        j;[i]      --initialize i
           sub:i:w    j;k;tmp
           add:i:w    1;tmp;[bar]    --number of subintervals
           schedin    myblock;body;[bar]
           term
[after] --code following parallel command
[body]     fadd       :i:w       [i];1;tmpi
           --code for body using tmpi for i
           fadd:i:w   [bar];-1;tmpr
           eq:i:w 1;tmpr
           branch     EQ;goaft
           term
[goaft]    goto                  after
```

Math Symbols

| | |
|---|---|
| ∈ | member of |
| ∉ | not memeber of |
| ∅ | empty set |
| ⊆ | subset |
| ⊂ | proper subset |
| ⊇ | superset |

-continued

| | |
|---|---|
| ∩ | intersection |
| ∪ | union |
| ∩$_{i \in}$ | multiple intersection |
| ∪$_{i \in}$ | multiple union |
| × | Cartesian product |
| ∘ | composition |
| → | function space |
| ⇒ | mapping, or implication |
| ⇔ | double implication |
| $f$ | function symbol |
| ≠ | not equal |
| ≧ | at least |
| ≦ | at most |
| ≈ | about equal |
| ε | empty sequence |
| = | equality by definition |
| ⊏ | partial order |
| ⊏ | irreflexive partial order |
| $\S$ | infinite sequence |
| ∃ | there exists |
| ∀ | for all |
| $m$ | meaning |
| ○ | next |
| 𝔇 | domain operator |
| ◇ | sometime |
| Σ | summing quantifier |
| Π | multiplying quantifier |
| ⊨ | infer |

Textual Substitution:

If no variable in expression e has the same name as any bound variable in predicate P, then $P^x_e$ is defined to be the result of replacing every free occurrence of x with e.

Simple DANCE Grammar

This is a simplified grammar for DANCE. There are several (small) differences from the full-blown grammar. In particular, parameters in function and procedure declarations are separated by semicolons; parameters in function and procedure invocations are separated by commas.

Predicate Calculus:

| | |
|---|---|
| Law of Negation:. | P = NOT(NOT(P)) |
| Law of Excluded Middle: | P OR NOT(P) = T |
| Law of Contradiction: | P AND NOT(P) = F |
| Law of Implication: | P => Q = NOT(P) OR Q |
| Law of Equality: | (P=Q) = (P=>Q) OR (Q=>P) |
| Laws of OR-simplification: | P OR P = P |
| | P OR T = T |
| | P OR F = P |
| | P OR (P AND Q) = P |
| Laws of AND-simplification: | P AND P = P |
| | P AND T = P |
| | P AND F = F |
| | P AND (P OR Q) = P |
| Commutative Laws: | (P AND Q) = (Q AND P) |
| | (P OR Q) = (Q OR P) |
| | (P = Q) = (Q = P) |
| Associative Laws: | P AND (Q AND R) = (P AND Q) AND R |
| | P OR (Q OR R) = (P OR Q) OR R |
| Distributive Laws: | P OR (Q AND R) = (P OR Q) AND (P OR R) |
| | P AND (Q OR R) = (P AND Q) OR (P AND R) |
| DeMorgan's Laws: | NOT(P AND Q) = NOT(P) OR NOT(Q) |
| | NOT(P OR Q) = NOT(P) AND NOT(Q) |
| AND-elimination: | (P AND Q) => P |
| OR-introduction: | P => (P OR Q) |
| DeMorgan's Laws for Quantifiers: | (EXISTS B : R : P) = NOT(FORALL B : R : NOT(P)) |
| | (FORALL B : R : P) = NOT(EXISTS B : R : NOT(P)) |
| Conjunction Law: | (FORALL B : R : P AND Q) = |
| | (FORALL B : R : P) AND (FORALL B : R : Q) |
| Disjunction Law: | (EXISTS B : R : P OR Q) = |
| | (EXISTS B : R : P) OR (EXISTS B : R : Q) |
| Counting Law: | FORALL I : Q NOT R : |
| | (NUM B1 : R OR I : Q = (NUM B2 : R: Q) + 1) |
| Summing Law: | FORALL I : Q NOT R : |
| | (SUM B1 : R OR I : Q = (SUM B2 : R: Q) + I) |
| Product Law: | FORALL I : Q NOT R : |
| | (PROD B1 : R OR I : Q = (PROD B2 : R : Q) *I) |
| Empty Range Laws: | (FORALL B : F : P) = T |
| | (EXISTS B : F: P) = F |
| | (NUM B : F : P) = 0 |
| | (SUM B : F : P) = 0 |
| | (PROD B : F : P) = 1 |

Productions within <>
Literals within ""
One or More +
Zero or more *
Choice |
Grouping []
Zero or One ()
<name> ::= <identifier>
<name> ::= <name> "[" <expression>+ "]"
<name> ::= <name> "." <label>
<name> ::= <name> "." <enumeration_identifier>
<expression> ::= <function_name> "(" <expression>+ ")"
<expression> ::= <expression> <function_symbol> <expression>
<expression> ::= "(" <expression> ")"
<expressioil>::= <variable_name>
<expression>::= <literal>
<command> ::= "SKIP"
<command> ::= <procedure_name> "(" <expression>+ ")"
<command> ::= <command> ";" <command>
<command> ::= <command> "&" <command>
<command> ::= "BEGIN" <command> "END"
<command> ::= "DECLARE" [<variable_name> ":" <type> ("=" <expression>)]+
              "BEGIN" <command> "END"
<command> ::= <variable_name> ":=" <expression>
<command> ::= "FORALL" <variable_name> ":" <type>"IN"
              [<range> | <boolean_expression> [ "DO" <command>]
<command> ::= "IF" <boolean_expression> "=>" <command>
              ["[]" <boolean_expression> "=>" <command>]* "FI"
              <command> ::= "DO" <booleen_expression> "=<" <command>
              ["[]" <boolean_expression> "=>" <command> ]* "OD"
<command> ::= "RETURN" <expression>
<declaration> ::= "DECLARE" <variable_name>+ ":" <type> ";"
<declaration> ::= "TYPE" <type_name> ("[" <type_name>+ "]")
              "IS" <type> ";"
<declaration> ::= <package> | <package_body>
<declaration> ::= "PROCEDURE" <procedure_name> "(" [<variable_name>+
              ":" type>]+ ")" ( "IS" <command> ) ";"
<declaration> ::= "FUNCTION" <function_name> "(" [<variable_name>+
              ":" <type>]+ ")" "RETURN" <type> ("IS" <command> ) ";"
              <type> ::= "INTEGER" | "BOOL" | ""RAT" | FLOAT" | "CHAR"
              <type> ::= "(" [<identifier>+ | <literal>+] ")"
              <type> ::= "ARRAY" "[" <range>+ "]" "OF" <type>
              <type> ::= <type> "=>" <type>
              <type> ::= "RECORD" <label> ":" <type> ["," <label> ":" <type>]*
              "END" "RECORD"
              <type>::= "VARIANT" <discriminant> : <enumeration_type> ";"
              ":" <type> ["," <label> ":" <label> <type>]* "END" "VARIANT"
              <type> ::= <type_name> "[" <type_name>+ "]"
              <type> ::= "PRIVATE"
              <package> ::= "PACKAGE" <package_name> "[" <name>+ "]" ) "IS"
              <requiremnt_clause>*
              <import_clause>*
              <declaration>+ ( "PRIVATE" <declaration>+) "END"
"PACKAGE"
<package_body> ::= "PACKAGE BODY" <body_name> ":" <package_name> "IS"
              <declaration>+ "END" "PACKAGE"
              <requirementclause> ::= "REQUIRED" <package_name> ":"
              <declaration>+ "END" "REQUIRED"
<importclause> ::= "IMPORT" [ "ALL" | <name>+]
              "FROM" (<body_name> ":") <package_name>
              ( "(" [formal_parameter "=>" actual_parameter ]+ ")" )
              "END" "IMPORT"

DANCE Language Summary

Expressions in DANCE are built inductively as follows:
Variable names or constants: X, Y, Z, 5, 1509, 0
Functions: $f(e_1, \ldots, e_k)$, where f is a function symbol defined by $\mathcal{M}$, $k>=0$, and $e_1, \ldots, e_k$ are expressions. Parentheses may be used for grouping expressions. Functions of two parameters may be represented in infix notation.
Formulas (constructions of temporal predicates=> DANCE programs) are built inductively as follows:
Predicates: $p(e_1, \ldots, e_k)$, where p is a predicate symbol defined by $\mathcal{M}$, $k>=0$, and $e_1, \ldots, e_k$ are expressions, Logical connectives: $w_1 \& w_2$ and $w_1$; $w_2$ where $w_1$, and $w_2$ are predicates. Predicates may be grouped with BEGIN-END.

Variables/Constants/Literals $\mathcal{M}_i[[X]]$=where X is a variable name, s is a state, i is an interval, $S_i$ are the states comprising the interval, $X \in s$, and $s \in S_i$.

Functions $\mathcal{M}_i[[f(e_1, \ldots, e_k)]] = \mathcal{M}_i[[f]](\mathcal{M}_i[[e_1]], \ldots \mathcal{M}_i[[e_k]])$ Temporal Predicates:

$\mathcal{M}_i[[p(e_1, \ldots, e_k)]] = \mathcal{M}_i[[p]](\mathcal{M}_i[[e_1]], \ldots, \mathcal{M}_i[[e_k]])$ Skip $\mathcal{M}_i[[SKIP]]$=true Sequential Composition $\mathcal{M}_i[[w_1;w_2]]$=true iff there exist two subintervals of i, j⊂i and k⊂i, such that $\mathcal{M}_j[[w_1]]$=true, $\mathcal{M}_k[[w_2]]$=true, and end(j)=start (k).

Concurrent Composition:

$\mathcal{M}_i[[w_1 \& w_2]]$=true iff ∃ j, k:j⊂i and k⊂i:( $\mathcal{M}_j[[w_1]]$=true) and $\mathcal{M}_k[[w_2]]$=true) and (start(j)=start(k)=start(i)) and (end(j)=end(k)=end(i))

Existential Quantification $\mathcal{M}_i[[DECLARE\ X=c\ begin\ w\ end]]$=true iff $\mathcal{M}_{start(i)}[[X]]$=c, and $\mathcal{M}_i[[w]]$=true.

Bounded universal quantification $\mathcal{M}_i[[FORALL\ X\ IN\ b\ DO\ w]]$=true iff ∃j1 . . . jni:j1⊂i . . . jn⊂i:

$\mathcal{M}_{j1}[[DECLARE\ X=x_1\ begin\ w\ end]]$=true, and
$\mathcal{M}_{j2}[[DECLARE\ X=x_2\ begin\ w\ end]]$=true, and . . . and
$\mathcal{M}_{jn}[[DECLARE\ X=x_n\ begin\ w\ end]]$=true where $x_1, x_2, \ldots, x_n$ are all the values for X that make b true.

Assignment $\mathcal{M}_i[[X:=e]] = \mathcal{M}_{end(i)}[[X]] = \mathcal{M}_{start(i)}[[e]]$.

Alternative command $\mathcal{M}_i[[IF\ B1=>S1\ []B2=>S2[]\ \ldots []Bn=>Sn\ FI]]$=true iff
( $\mathcal{M}_{start(i)}[[B1]]$or $\mathcal{M}_{start(i)}[[B2]]$or . . . or $\mathcal{M}_{start(i)}[[Bn]]$) and ( $\mathcal{M}_{start(i)}[[B1]] \Rightarrow \mathcal{M}_i[[S1]]$) and ( $\mathcal{M}_{start(i)}[[B2]] \Rightarrow \mathcal{M}_i[[S2]]$) and . . . and ( $\mathcal{M}_{start(i)}[[Bn]] \Rightarrow \mathcal{M}_i[[Sn]]$)

Iterative command:

$\mathcal{M}_i[[DO\ B1=>S1\ []B2=>S2\ []\ldots []Bn=>Sn\ OD]]$=true iff ∃j1 . . . jc:j1⊂i...jc⊂i;

($\cup_{k \in [1 \ldots c]}jk=i$) and
(start(i)=start(j1) and end (j1)=start(j2) and . . . and end(jc)=end(i) ) and
∀k:0<k<=n:
((  $\mathcal{M}_{start(jk)}[[B1]] \Rightarrow \mathcal{M}_{jk}[[S1\ ]]$) and
(  $\mathcal{M}_{start(jk)}[[B2]] \Rightarrow z,4_{jk}[[S2]]$)
and . . . and (z,$4_{start(jk)}[[Bn]] \Rightarrow z,4_{jk}[[Sn]]$) ).

Next $\mathcal{M}_s[[\bigcirc(e)]]$=true iff $\mathcal{M}_t[[e]]$=true and glb(s,t)=s and lub(s,t)=t and not (∃u∈i:glb(s,u)=s and lub(u,t)=t).

Nondeterministic Permutation $\mathcal{M}_i[[ndperm(e_1, \ldots, e_k)]]=(e_{1s}, \ldots, e_{ks})$ where ∀j:1<=j<=k:

∃m:$e_m=e_{js}$, and
∀n: 1<=n<=k, n≠j: not($e_m=e_n$).

Fetch-Add:

$\mathcal{M}_{ik}[[FETCH\_ADD(X,e_1,Y_1)\ \&\ FETCH\_ADD(X,e_2,Y_2)\ \&\ \ldots\ \&\ FETCH\_ADD(X,e_k,Y_k)]]$=true
iff
there exists some ndperm($e_1, \ldots, e_k$)=($e_{1s}, \ldots, e_{ks}$) such that $\mathcal{M}_{ik}[[\bigcirc(X=X+e_1+e_2+\ldots+e_k)]]$=true and $\mathcal{M}_{ik}[[\bigcirc(Y_{1s}=X)]]$=true and $\mathcal{M}_{ik}[[\bigcirc(Y_{2s}=X+e_{1s})]]$=true and $\mathcal{M}_{ik}[[\bigcirc(Y_{3s}=X+e_{1s}+e_{2s})]]$=true and . . . and $\mathcal{M}_{ik}[[\bigcirc(Y_{ks}=X+e_{1s}+e_{2s}+\ldots+e_{k-1s})]]$=true.

$\mathcal{M}_{ik}[[FETCH\_AND(X,e_1,Y_1)\ \&\ FETCH\_AND(X,e_2,Y_2)\ \&\ \ldots\ \&\ FETCH\_AND(X,e_k,Y_k)]]$=true
iff
there exists some ndperm($e_1, \ldots, e_k$)=($e_{1s}, e_{ks}$) such that $\mathcal{M}_{ik}[[\bigcirc(X=X\ AND\ e_1\ AND\ e_2\ AND\ldots AND\ e_k)]]$=true and $\mathcal{M}_{ik}[[\bigcirc(Y_{1s}=X)]]$=true and $\mathcal{M}_{ik}[[next(Y_{2s}=X\ AND\ e_{1s})]]$=true and $\mathcal{M}_{ik}[[\bigcirc(Y_{3s}=X\ AND\ e_{1s}AND\ e_{2s})]]$=true and . . . and $\mathcal{M}_{ik}[[\bigcirc(Y_{ks}=X\ AND\ e_{1s}AND\ e_{2s}AND\ldots AND\ e_{k\_1s})]]$. $\mathcal{M}_{ik}[[FETCH\_OR(X,e_1,Y_1)\ \&\ FETCH\_OR(X,e_2,Y_2)\ \&\ \ldots\ \&\ FETCH\_OR(X,e_k,Y_k)]]$=true
iff
there exists some ndperm($e_1, \ldots, e_k$)=($e_{1s}, \ldots, e_{ks}$) such that $\mathcal{M}_{ik}[[\bigcirc(X=X\ OR\ e_1\ OR\ e_2\ OR\ \ldots\ OR\ e_k)]]$=true and $\mathcal{M}_{ik}[[\bigcirc(Y_{1s}=X)]]$=true and $\mathcal{M}_{ik}[[\bigcirc(Y_{2s}=X\ OR\ e_{1s})]]$=true and $\mathcal{M}_{ik}[[\bigcirc(Y_{3s}=X\ OR\ e_{1s}\ OR\ e_{2s})]]$= true and . . . and $\mathcal{M}_{ik}[[\bigcirc(Y_{ks}=X\ OR\ e_{1s}\ OR\ e_{2s}\ OR\ \ldots\ OR\ e_{k-1s})]]$=true.

$\mathcal{M}_{ik}[[FETCH\_XOR(X,e_1,Y_1)\ \&\ FETCH(X,e_2,Y_2)\ \&\ \ldots\ \&\ FETCH\_XOR(X,e_k,Y_k)]]$=true
iff
there exists some ndperm($e_1, \ldots, e_k$)=($e_{1s}, \ldots, e_{ks}$) such that $\mathcal{M}_{ik}[[\bigcirc(X=X\ XOR\ e_1 XOR\ e_2 XOR\ \ldots\ XOR\ e_k)]]$=true and $\mathcal{M}_{ik}[[\bigcirc(Y_{1s}=X)]]$=true and $\mathcal{M}_{ik}[[\bigcirc(Y_{1s}=X)]]$=true and $\mathcal{M}_{ik}[[\bigcirc(Y_{2s}=X\ XOR\ e_{1s})]]$=true and $\mathcal{M}_{ik}[[\bigcirc(Y_{3s}=XXOR\ e_{1s} XOR\ e_{2s})]]$=true and . . . and $\mathcal{M}_{ik}[[\bigcirc(Y_{ks}=XXORe_{1s} XOR\ \ldots\ XORe_{k-1s})]]$=true.

$\mathcal{M}_{ik}[[SWAP(X,e_1,Y_1)\ \&\ SWAP(X,e_2,Y_2)\&\ \ldots\ \&\ SWAP(X,e_k,Y_k)]]$=true
there exists some ndperm($e_1, \ldots, e_k$)=($e_{1s}, \ldots, e_{ks}$) such that $\mathcal{M}_{ik}[[\bigcirc(X=e_{ks})]]$=true and $\mathcal{M}_{ik}[[\bigcirc(Y_{1s}=X)]]$=true and $\mathcal{M}_{ik}[[\bigcirc(Y_{2s}=e_{1s})]]$=true and $\mathcal{M}_{ik}[[\bigcirc(Y_{3s}=e_{2s})]]$=true and . . . and $\mathcal{M}_{ik}[[\bigcirc(Y_{ks}=e_{k-1s})]]$=true.

Domains:

Define the domain operator $\mathfrak{D}$, by:
$\mathfrak{D}[[d]]=\{(n,v)\ |n \in$ identifier, $v \in$ Type(n) }
$\mathfrak{D}[[d1]] \subset \mathfrak{D}[[d2]]$ iff ∃s: string |d1 && s=d2
neighbors(d1,d2)= $\mathfrak{D}[[d1]] \cap \mathfrak{D}[[d2]] \neq \emptyset$.
remote(d1,d2)= $\mathfrak{D}[[d1]] \cap \mathfrak{D}[[d2]]=\emptyset$.
Skip Axiom: {P }skip {P }

Assignment Axiom: $\{P^x_e\}$ x:=e $\{P\}$

Sequential Composition Rule:

$$\frac{\{P\}\ S1\ \{Q\}\ \text{and}\ \{Q\}\ S2\ \{R\}}{\{P\}\ S1\ ;S2\ \{R\}}$$

Alternative Rule:

$$\frac{\forall i: i \in [1\ldots n]:\ \{P\ \text{and}\ B_i\}\ S_i\ \{Q\}}{\{P\}\ IFFY\ \{Q\}}$$

Iterative Rule:

$$\frac{\forall i: i \in [1\ldots n]:\ B_i \Rightarrow (\text{bound} > 0)\ \text{and}}{\{I\}\ DOIT\ \{I\ \text{and}\ B_i\ \text{and bound}=bd\}\ S_i\ \{I\ \text{and bound}<bd\}\}}$$

Rule of Consequence:

$$\frac{P1 \Rightarrow P,\ \{P\}\ S\ \{Q\},\ Q \Rightarrow Q1}{\{P1\}\ S\ \{Q1\}}$$

Parallel Composition Rule:

$$\frac{\{P1\}\ S1\ \{Q1\}\ \text{AND}\ \{P2\}\ S2\ \{Q2\}\ \text{AND AccessOK}(S1, S2)}{\{P1\ \text{and}\ P2\}\ S1\ \&\ S2\ \{Q1\ \text{and}\ Q2\}}$$

AccessOK(S1,S2)=

$\forall Vi: Vi \in S1 \cup S2: (Vi \notin Ihs(S1) \cup Ihs(S2))$ or $(Vi \in S1$ and $Vi \notin S2)$ or $(Vi \in S2$ and $Vi \notin S1)$ or $((Vi \in co(S1)$ and $Vi \in co(S2))) \Rightarrow (co(S1) \sqsubset co(S2)$ and $co(S2) \sqsubset co(S1))$ Ihs(S) = $\{v\ |v:=e \in S\}$ co(S)=$\{v\ |$fetch_add(v,e,v2)$\in S$ or swap(v,e,v2)$\in S$ or ... $\}$ Existential Quantification Rule:

$$\frac{(\exists d1, d2 : \text{domain}: \supset[[d1]] \subset \supset[[d2]])\ \text{and}}{\{P\}\ DECLARE\ X=c\ \text{begin}\ \{P1\}\ w\ \{Q1\}\ \text{end}\ \{Q\}}$$

$(\exists s : \text{string} : (d1 + \text{"."} + s) = d2)$ and $(\forall V : \text{variable} : V \in \supset[[d1]] \Rightarrow V \in \supset[[d2]])$ and $(X \in \supset[[d2]])$ and $(X=c)$ and $(P \Rightarrow P1_c^X)$ and $(Q1 \Rightarrow Q)$ Parallel Command Rule:

$$\frac{(\forall i : i \in \text{range} : \{P(i)\}\ S(i)\ \{Q(i)\})\ \text{and}}{\{P\}\ FORALL\ i\ IN\ \text{range}\ DO\ S\ \{Q\}}$$

$(\forall i,j : i,j \in \text{range} : AccessOK(S(i), S(j)))$ and $(\forall i : i \in \text{range} : P \Rightarrow P(i))$ and $(\forall i : i \in \text{range} : Q(i)) \Rightarrow Q$ Weakest Precondition Predicate Transformers Law of Conjunction:

wp(S,Q) and wp(S,R)=wp(S,Q and R)

Law of Disjunction:

wp(S,Q) or wp(S,R) $\Rightarrow$ wp(S,Q or R)

Weakest Precondition Inference Rule:

$$\frac{wp(S,Q) = R\ \text{and}\ P \Rightarrow R}{\{P\}\ S\ \{Q\}}$$

Weakest preconditions of statements:

wp(skip,Q)=Q wp(x:=e,Q)=$Q^x_e$ wp(S1; S2, Q)=wp(S1, wp(S2, Q))

AccessOK(S1, S2)$\Rightarrow$wp(S1 & S2,Q)=wp(S1,Q) and wp(S2, Q) wp(IFFY,Q)=(B1=>wp(S1,Q)) and . . . and (Bn=>wp(Sn, Q))

WP for Iterative Command:

Let BB be the disjunction of the guards: BB=B1 or B2 or . . . or Bn. Let I be a predicate, and "bound" be an integer-valued expression whose value is nonnegative. Then $$\frac{(I\ \text{and}\ BB) \Rightarrow (\text{bound} > 0)\ \text{and}}{I \Rightarrow wp(DOIT, I\ \text{and}\ \text{not}(BB))}$$

$(\forall i: 1 <= i <= n: (I\ \text{and}\ Bi) \Rightarrow wp(Si, I)$ and $(I\ \text{and}\ Bi\ \text{and bound}=X) \Rightarrow wp(Si, \text{bound}<X))$ WP for Parallel Command:

wp(FORALL i IN range DO S,Q)=wp(S[i1],Q) and wp(S[i2],Q) and . . . and wp(S[ik],Q)

where i1,i2, . . . , ik are the values i takes in the range and S[ix] is the statement S with i replaced by the value ix, $Si_x$.

DANCE Language Reference Manual

This DANCE Language Reference Manual parallels the Ada language reference manual (MIL-STD-1815A). Principally, naming conventions, packages, and subprogram syntax are based on Ada which in turn was based on Pascal. The graimar of DANCE is defined using LNF. LNF productions can be parsed by a modified CYK algorithm. LNF is defined in Appendix C which contains the complete grammar. Appendix D has LNF productions for DANCE in lexicographic order.

Lexical Elements

This chapter defines the lexical elements of DANCE. Lexical elements are denoted with the same LNF notation as the language grammar. LNF notation is described in appendix C. Simply, LNF productions have either one or two non-terminals (enclosed in angle brackets <>) or a single terminal on the right hand side. For lexical token definition only, the vertical bar, |, should be read as "or."

Character Set

Any lower case letter is equivalent to the corresponding upper case letter, except within character strings and character literals.

All language constructs may be represented with a basic character set, which is subdivided as follows:

<upper_case_letter>::=

"A"|"B"|"C"|"D"|"E"|"F"|"G"|"H"|"I"|"J"|"K"|
"L"|"M"|"N"|"O"|"P"|"Q"|"R"|"S"|"T"|"U"|
"V"|"W"|"X"|"Y"|"Z"

<digit>::="0"|"1"|"2"|"3"|"4"|"5"|"6"|"7"|"8"|"9"<special_character>:: =

```
""|"#"|"%"|"&"|"("|")"|"*"|"+"|","|
"-"|"."|"/"|":"|";"|"<"|"="|">"|"-"|"|"|
"["|"]"| "!"|"$"|"?"|"@"|"  "|"~"
```

<lower_case_letter>::=

```
"a"|"b"|"c"|"d"|"e"|"f"|"g"|"h"|"i"|"j"|"k"|
"l"|"m"|"n"|"o"|"p"|"q"|"r"|"s"|"t"|"u"|
"v"|"w"|"x"|"y"|"z"
```

<space>::=" "
<other_special_character>::="\"|"""|"'''"|"{"|"}"

The other_special_character group is specially used to allow parallel lexical analysis.

Lexical Units and Spacing Conventions

A program is a sequence of lexical units; the partitioning of the sequence into lines amid the spacing between lexical units does not affect the meaning of the program. The lexical units are identifiers (including reserved words), numeric literals, character literals, strings, delimiters, and comments. A delimiter is either a special_character or a compound_symbol:

<compound_symbol>::="=>"|".."|"**"|":="|"/="|">="|"<="|"<>"

Adjacent lexical units may be separated by spaces or by passage to a new line. An identifier or numeric literal must be separated in this way from an adjacent identifier or numeric literal. Spaces must not occur within lexical units, except in strings, comments, and the space character literal. Each lexical unit must fit on a single line.

Any of carriage return, line feed, vertical tabulate, or form feed, and only these causes passage to a new line. Horizontal tabulate is allowed within comments. Between lexical units, horizontal tabulate is equivalent to a space, backspace is disallowed, and delete, null, or any other ASCII characters are ignored.

Identifiers

Identifiers are used as names and also as reserved words. All characters, including underscores, are significant. Lower case letters are equivalent to the corresponding upper case letter.

<identifier>::=<letter>
<identifier>::=<letter><id1>
<id1>::=<letter_or_digit_or_u>
<id1>::=<letter_or_digit_or_u> <id1>

<underscore>::="_"
<letter_or_digit_or_u>::=<letter>
<letter_or_digit_or_u>::=<digit>
<letter_or_digit_or_u>::=<underscore>
<letter>::=<upper_case_letter>
<letter>::=<lower_case_letter>

Examples

```
COUNT   X   get_symbol   a_1
```

Numeric Literals

There are two classes of numeric literals: Integers and floats. No computer has ever represented real numbers—we merely approximate them with floating point numbers. Rational numbers are denoted by a vertical bar between integers.

<int>::=<digit>
<int>::=<digit> <int>

<numeric_literal>::=<int>
<numeric_literal>::=<int> <dot_integer>
<dot_integer>::=<dot> <int>
<dot>::="."
<numeric_literal>::=<int> <exponent>
<dot_i_n_exp>::=<dot_integer> <exponent>
<numeric_literal>::=<int> <dot_i_n_exp>
<exponent>::=<e><plus_int>
<exponent>::=<e><minus_int>
<e>::="E"
<plus>::="+"
<minus>::="-"
<plus_int>::=<plus> <int>
<minus_int>::=<minus> <int>
<numeric_literal>::=<int> <bar_int>
<bar_int>::=<bar> <int>
<bar>::="|"

Examples

```
3.0E1    3E+1    3    3.0    9|3
```

Character Literals

A character literal is formed by enclosing one of the 95 ASCII graphic characters between string bracket characters: accent and apostrophe. In order that arbitrary strings of characters may be represented, any included string or assertion bracket character or backslash (\) must be prefaced by a backslash. This representation of character literals allows parallel lexical analysis.

<character>::=<upper_case_letter>
<character>::=<digit>
<character>::=<special_character>
<character>::=<space>
<character>::=<lower_case_letter>
<character>::=<backslash> <other_special_character>

<character_literal>::=<accent> <ch_ap>
<ch_ap>::=<character> <apostrophe>

<accent>::="`"
<apostrophe>::="'"

Examples

H' \]'

Character Strings

A character string is a sequence of zero or more characters prefixed and terminated by string bracket characters-accent and apostrophe. Character strings are represented this way to allow lexical analysis in parallel. Having different characters delineate string literals allows determination of string boundaries without global information.

<character_string>::=<accent> <st_ap>
<character_string>::=<accent> <apostrophe>
<st_ap>::=<string> <apostrophe>
<string>::=<character>
<string>::=<character> <string>

The length of a string is the length of the sequence represented. Backslashes use to delinate special character literals are not counted for string length. Catenation must be used to represent strings longer than one line, and strings containing control characters. The plus character, +, is used for string literal concatenation.

Examples

String containing'+ACSII.CR+ASCII.LF+Control Characters'

String containing bracket characters \\'\\\\{\\}'

Comments

A comment starts with two hyphens and is terminated by the end of line. It may only appear following a lexical unit, or at the beginning or end of a program unit. Comments have no effect on the meaning of a program—their sole purpose is the enlightenment of a human reader.

Example

This is a comment.

Pragmas

Pragmas (compiler directives) are not included in DANCE at this time.

Reserved Words

The identifiers listed below are reserved words that have special significance in DANCE. Declared identifiers may not be reserved words. Reserved words' lower, upper, or mixed case equivalents are considered the same.

| Reserved Word | Used For |
| --- | --- |
| ACCESS | access type declaration; Ada-style pointers |
| ALL | deferences access types when object is scalar: ALL |
| AND | logical operator |
| ARRAY | array type declaration |
| BEGIN | start of block, must have corresponding END |
| BODY | used w/PACKAGE to start a package body |
| CAND | conditional and, the left argument eval 1st |
| CONSTANT | declare a named, constant value |
| COR | conditional or, the left argument eval 1st |
| DIV | integer divide |
| DO | start of do loop, or part of parallel command |
| END | end of package etc. |
| F | false |
| FETCH_ADD | read the value, indivisibly add to it |
| FETCH_AND | read the value, indivlsibly AND with it |
| FETCH_OR | read the value, indivlsibly OR with it |
| FETCH_XOR | r,ead the value, indivisibly XOR with it |
| FILE | file type (not included in DANCE yet) |
| FLOAT | floating point type |
| FORALL | bounded universal quantification |
| FROM | part of import declaration |
| FUNCTION | declare a function |
| IF | start of alternative command |
| IMPORT | make objects in named packages visible |
| IN | part of parallel command, before range |
| INTEGER | integer type |
| IS | separates a subprogram declaration from its body |
| LIMITED | declares that a type exists, but no |
| MOD | integer remainder, result always non-negative |
| NEW | allocate memory for object, set up access variable |
| NIL | universal value held by uninitialized variables |
| NOT | logical negation |
| NUM | counting quantifier |
| OD | end of iterative command |
| OF | part of array declaration |

-continued

| Reserved Word | Used For |
| --- | --- |
| OR | logical or |
| OUT | mode of procedure operands |
| PACKAGE | start (or end) of package specification or body |
| PRIVATE | declare existance of a type with assignment |
| PROCEDURE | procedure declaration |
| PROD | product quantifier |
| RANGE | range restriction |
| RAT | rational number type |
| RECORD | start of record type |
| REM | integer remainder |
| REMOTE | caller and performer of routine may be distant |
| RENAME | introduce alias, nice when names have many dots |
| REQUIRED | demand type parameters for this package |
| RETURN | declare returned type for ths, command at end |
| SHARED | prohibit caching of value |
| SKIP | do nothing command. |
| SPREAD | shared data structure--spread many memory banks |
| SUM | summing quantifier |
| SWAP | indivisibly exchange a given value with that stored |
| T | true |
| TYPE | start of type declaration |
| VARIANT | Start (or end) of variant type |
| XOR | logical exclusive-or |

Declarations and Constructed Types

DANCE defines several forms of named entities. A named entity can be: a number, an enumeration literal, an object (variable), a discriminant, a record component, a type, a subprogram (procedure or function), a package, or a parameter.

Declarations

A declaration associates an identifier with a declared entity. Each identifier must be explicitly declared before it is used. A declaration may declare one or more entities.
<declaration>::=<object_declaration>
<declaration>::=<number_declaration>
<declaration>::=<type_declaration>
<declaration>::=<subprogram_declaration>
<declaration>::=<package_declaration>
<declaration>::=<rename_clause>
<declaration>::=<requirment_clause>
<declaration>::=<import_clause>
<declaration>::=<declaration> <declaration>

The process by which a declaration achieves its effect is called the "elaboration" of the declaration. This process generally involves several successive actions (at compile time):

1) The identifier of a declared entity is "introduced" at the point of its first occurrence; it may hide other previously declared identifiers from then on.
2) The entity is elaborated. For all forms of declarations, except those of subprograms and packages, an identifier can only be used as a name of a declared entity once the elaboration of the entity is completed. A subprogram or package identifier can be used as a name of the corresponding entity as soon as the identifier is introduced, hence even within the declaration of the entity. Elaboration at compile time consists of placing an entry in the symbol table corresponding to the scope of the declaration.
3) The last action performed by the elaboration of an object declaration may be the initialization of the declared object(s), if the initialization is a constant value.

Object and Number Declarations

An object is an entity that contains a value of a specified type. Objects can be introduced by object declarations.

Objects can also be components of other objects, or formal parameters of subprograms.
<object_declaration>::=<obj1> <obj2>
<object_declaration>::=<obj1> <subtype_indication>
<obj1>::=<identifier_list> <colon>
<colon>::=":"
<obj1>::=<identifier_list> <colon_constant>
<obj1>::=<identifier_list> <colon_shared>
<obj1>::=<identifier_list> <colon_spread>
<obj1>::=<identifier_list> <colon_remote>
<constant>::="CONSTANT"
<shared>::="SHARED"
<spread>::="SPREAD"
<remote>::="REMOTE"
<colon_constant>::=<colon> <constant>
<colon_shared>::=<colon> <shared>
<colon_spread>::=<colon> <spread>
<colon_remote>::=<colon> <remote>
<obj2>::=<subtype_indication> <assign_expression>
<assign>::=":="
<assign_expression>::=<assign> <expression>

An object declaration may include an expression specifying the initial value for the declared objects. Otherwise the object has value "NIL" and will cause a runtime error if the value is used before a value is aissigned.

An object is constant if the reserved word "CONSTANT" appears in its declaration. Objects that are not constant are called "variables."

A number declaration introduces one or more identifiers naming a number defined by a literal_expression, which involves only numeric literals, names of numeric literals, parenthesized literal expressions and predefined arithmetic operators.
<number_declaration>::=<identifier_list> <num_d1>
<num_d1>::=<colon_const> <assign_expression>

<identifier_list>::=<identifier>
<identifier_list>::=<identifier> <comma_id>
<comma>::=","
<comma_id>::=<comma> <identifier_list>

During elaboration, an object is bound to its type. Restriction of object behavior to its type (type checking) is essential to program correctness. Only when our programs do exactly what we say they do (nothing more or less) then quality programming can be achieved.

Chackers beware! Your days of code slinging and bit fiddling are few. The new wave of software engineering will displace your midnight marathons by disciplined teams concocting understandable specifications, elegant designs, and clean, maintainable programs.

Type Declarations

A "type" denotes a set of values and a set of operations applicable to those values. "Scalar" types have no components; their values can be enumerated, integer or floating point. "Array" and "record" types are composite; their values consist of several component values. "Private" types have well defined possible values, but are not known to users of such types. Private types are equivalent to Cardelli & Wegner's existentially quantified types.

Record types may have special components called "discriminants" whose values distinguish alternative forms of values. Discriminants are defined by a "discrimiinant part." A private type is known only by its names its discriminiants (if any) , and the set of operations applicable to its values.
<type_declaration>::=<type_d1> <type_d2>
<type_d1>::=<type_ident> <is>
<type_d1>::=<type_ident> <param_is>
<is>::=32 "IS"
<type1>::="TYPE"
<type_ident>::=<type1> <identifier>
<param_is>::=<lbracket_t_p> <rbracket_is>
<lbracket_t_p>::=<lbracket> <type_parameters>
<lbracket>::="["
<rbracket>::="]"
<rbracket_is>::=<rbracket> <is>
<type_d2>::=<type_definition> <semicolon>
<type_name>::=<identifier>
<type_parameters>::=<type_name>
<type_parameters>::=<type_name> <comma_t_p>
<comma_t_p>::=<comma> <type_parameters>

Examples

TYPE matrix IS ARRAY[1 . . . 100] OF INTEGER;
TYPE operator[type1,type2] IS ARRAY[type1] OF type2;
TYPE array_of_integers IS operator[0 . . . 10,INTEGER];

Type Definition

A type definition defines a type for type declarations and other type expressions.
<type_definition>::=<enumeration_type_definition>
<type_definition>::=<integer_type_definition>
<type_definition>::=<character_type_definition>
<type_definition>::=<boolean_type_definition>
<type_definition>::=<float_type_definition>
<type_definition>::=<array_type_definition>
<type_definition>::=<string_type_definition>
<type_definition>::=<record_type_definition>
<type_definition>::=<derived_type_definition>
<type_definition>::=<private_type_definition>
<type_definition>::=<subtype_indication>
<type_definition>::=<access_type_definition>
<type_definition>::=<function_type_definition>
<type_definition>::=<variant_type_definition>
<type_definition>::=<rational_type_definition>

Subtype Indication

A subtype indication is a type name with possibly a constraint limiting the range of values to a subset of the named type.
<subtype_indication>::=<type_name>
<subtype_indication>::=<type_name> <range_constraint>

The elaboration of a type definition always produces a distinct type. TIhe type identifier serves as a name of the type resulting from the elaboration of the type definition.

Examples of type declarations

| | |
|---|---|
| TYPE enumerated IS (one, two, three, four); | --enumerated |
| TYPE int IS integer RANGE 0..100; | --integer |
| TYPE ch IS char; | --character |
| TYPE b IS bool; | --boolean |
| TYPE fuzzy IS float RANGE 0.0..1.0; | --floatlng point |
| TYPE gooey IS ARRAY[enumerated] OF fuzzy; | --array |
| TYPE s IS string; | --string |
| TYPE dj IS RECORD | --record |
|     handle : string; | |
|     salary : float; | |
|     funny : bool; | |

-continued

```
END RECORD;
TYPE type_operator[type1 ,type2] IS ARRAY[type1] OF type2;
    --type definitions with parameters are type operators
    TYPE gooey2 IS type_operator[enumerated,fuzzy];
    --a derived type is created by applying a type operator
TYPE myob IS PRIVATE;                          --private
TYPE ptr IS ACCESS gooey2;                     --access
TYPE two_input_integer_function IS [integer,integer] => integer;
    --function type
TYPE either_or IS                              --variant
    VARIANT selector : enumerated;
        one : integer,
        two : float,
        three, four : fuzzy
    END VARIANT;
TYPE rational_range IS 0|1..1|1;               --rational
```

Scalar Types

Scalar types comprise discrete types and floating point types. Scalar types are ordered. Discrete types ire enumeration types and integer types; they may be used for array indices, sequential looping, and parallel conjunction. A range constraint specifies a set of allowable values for a scalar type. The range L . . . R describes the values from L to R inclusive. L is the lower bound; R is the upper bound. A value satisfies the range constraint if its value is in the range.
<range_constraint>::=<range1> <range>
<range1>::="RANGE"
<range>::=<literal> <dotdot_literal>
<dotdot_literal>::=<dotdot> <literal>
<dotdot>::=".."

Examples

| 'a'..'z' | January..June | where January and June are elements of an enumerated type.

Enumeration Types

An enumeration type definition defines an ordered set of distinct values that are denoted by enumeration literals.
<enumeration_type_definition>::=<lparens> <enum_rp>
<enum_rp>::=<enumerations> <rparens>
<lparens>::="("
<rparens>::=")"
<enumerations>::=<enumeration_literal>
<enumerations>::=<enumeration_literal> <comma_e_t_d>
<comma_e_t_d>::=<comma> <enumerations>
<enumeration_literal>::=<identifier>
<enumeration_literal>::=<true>
<enumeration_literal>::=<false>
<numeration_literal>::=<false>
<numeration_literal>::=<string_literal>
<true>::="T"
<false>::="F"

Example

TYPE Month IS (January, February, March, April, June, July, August, September, October, November, December);

Character Types

A character type is an enumeration type that contains character literals. Character literals of character types may be used in character strings.

<character_type_definition>::="CHAR"

Boolean Types

There is a predefined enumeration type "bool." It contains two literals: "T"for true and "F" for false ordered with the relation F<T. The evaluation of a "condition" must result in type bool.
<boolean_type_definition>::="BOOL"

Integer Types

Ada requires all integers to be declared with range constraints. This makes me uncomnfortable. I hope that Multitude will not place a bound on integer representation. Anyway:
<integer_type_definition>::=<range>
<integer_type_definition>::=<integer>
<integer>::="INTEGER"

Examples

TYPE century IS 1 . . . 100;
TYPE days IS array[1. . . 31] OF INTEGER;

Floating Point Types

Floating point types provide approximations to the real numbers. For this reason I choose not to call them "real." However, I have omitted (for now) accuracy constraints that numerical analysis users want. No fixed point arithmetic is directly supported.
<float_type_definition>::=<range>
<float_type_definition>::=<float1>
<float1>::="FLOAT"

Examples

TYPE fuzzy IS 0.0 . . . 1.0;
TYPE weights IS array[1 . . . 5] OF FLOAT;

Rational Types

Fast GCD hardware to supports Rat. A vertical bar separates the denominator from the numerator in rational literals.
<rational_type_definition>::=<range>
<rational_type_definition>::=<rational1>
<rational1>::="RAT"

Examples

TYPE exact IS 0|1 . . . 1|1;
TYPE factors IS array[1 . . . 10] OF RAT;

Array Types

An array object is a composite object consisting of components of the same type. A component of an array is designated using one or more index values belonging to specified discrete types. An array object is characterized by the number of indices, the type and position of each index, the lower and upper bounds for each index, and the type of the components.
<array_type_definition>::=<a_r_d1> <a_r_d2>
<a_r_d1>::=<a_r_d3> <a_r_d4>
<array1>::="ARRAY"
<a_r_d3>::=<array1> <lbracket>
<a_r_d4>::=<index> <rbracket>
<of>::="OF"
<a_r_d2>::=<of><subtype_indication>

```
<index>::=<discrete_range>
<index>::=<discrete_range> <comma_index>
<comma_index>::=<comma> <index>

<discrete_range>::=<subtype_indication>
<discrete_range>::=<range>
<discrete_range>::=<box>
<box>::="< >"
```

Unconstrained arrays have no range explicitly given. The range of the allowed indices is determined by the ranges of their types. Values for unassigned components are initially NIL. Constrained arrays have ranges in their declarations.

Examples

ARRAY [1 . . . 100] OF employee_records
ARRAY [January . . . December] OF monthly_sales
ARRAY [1 . . . size, 1 . . . size] OF matrix_element
ARRAY [< >] OF mystery_achievements

Strings

The predefined type "STRING" denotes a onedimensional arrays of the predefined type "CHARACTER," indexed by the predefined type "NAT."

TYPE NAT IS INTEGER RANGE 0 . . . integer_last1;
TYPE STRING IS ARRAY[< >] OF CHAR;

Concatenation is a predefined operator for the type STRING and for one-dimensional array types. Concatenation is represented as "+". The relational operators<, <=, >, and >= are defined for strings by lexicographic order.
<string_type_definition>::="STRING"

Example

This string has'+ catenation.' —the first character of a string has index zero
first_ch :=some_string[0]

Record Types

A record object is a composite object consisting of named components, which may be of different types
```
<record_type_definition>::=<r_t_d1> <end_record>
<end_record>::=<end> <record1>
<end>::="END"
<record1>::="RECORD"
<r_t_d1>::=<record1> <r_t_d2>
<r_t_d2>::=<r_t_d3>
<r_t_d2>::=<r_t_d3> <r_t_d4>
<r_t_d4>::=<comma> <r_t_d2>
<r_t_d3>::=<identifier_list> <colon_type>
<colon_type>::=<colon> <type>
```

Example

```
TYPE data IS
    RECORD
        day : 1..31,
        month : months,
        year : -10000..10000
    END RECORD;
```

Discriminants

A discriminant is a value of an enumeration type (including INTEGER) that determines which possible variant part is used.

Variants

A variant is like a record in that it has named components, but a variant object may have only one actual component determined by its discriminant.
```
<variant_type_definition>::=<v_t_d1> <end_variant>
<end_variant>::=<end> <variant>
<variant>::="VARIANT"
<v_t_d1>::=<variant> <v_t_d5>
<v_t_d2>::=<v_t_d3>
<v_t_d2>::=<v_t_d3> <v_t_d4>
<v_t_d3>::=<identifier_list> <colon_type>
<v_t_d4>::=<comma> <v_t_d2>
<v_t_d5>::=<v_t_d6> <v_t_d2>
<v_t_d6>::=<discriminant_part> <semicolon>
<discriminant_part>::=<identifier> <colon_e_t>
<colon_e_t>::=<colon> <enumeration_type>
<enumeration_type>::=<enumeration_type_definition>
<enumeration_type>::=<type_name>
```

The discriminant of a variant can only be changed by assigning the whole variant.

Example

```
TYPE device IS (printer, disk, drum);
TYPE data IS (open, closed);
    TYPE peripheral IS
        RECORD
            status : state,
            variant_part:
            VARIANT unit : device;
                printer : 1..page_size,
                disk, drum:
                    RECORD
                        cylinder : cylinder_index
                        track : track_number
                    END RECORD
            END VARIANT
        END RECORD;
periph.variant_part.disk.track
    --yields a track number from a peripheral
periph.variant_part.unit    --tells what device it is
```

Access Types

DANCE contains access types which are a lot like pointers.

As with Ada:
```
<access_type_definition>::=<access> <subtype_indication>
<access>::="ACCESS"
```

Example

TYPE peripheral_ref IS ACCESS peripheral;

Declarative Parts

A declarative part contains declarations and related information that apply over a region of program text. Declarative parts may appear within blocks, subprograms, and packages.
```
<declarative_part>::=<declarative_item>
<declarative_part>::=<declarative_item> <declarative_part>
<declarative_part>::=<program_component>
<declarative_part>::=<program_component> <declarative_part>
<declarative_item>::=<declaration>
<declarative_item>::=<import_clause>
<program_component>::=<body>
<program_component>::=<package_declaration>
```

```
<program_component>::=<body_stub>
<body>::=<subprogram_body>
<body>::=<package_body>
```
The body of a subprogram or package declared in a declarative part must be provided in the same declarative part. If the body of one of these program units is a separately compiled subunit, it must be represented by a body stub at the place where it would otherwise appear.
```
<body_stub>::=<pack_b1> <is_separate>
<is_separate>::=<is> <separate>
<separate>::="separate"
```

Derived Type Definition

A derived type definition provides a type expression including type parameters. Type parameters are enclosed in square brackets immediately following the type name in a type declaration. When a type declaration has parameters it does not create a new type, but rather a type operator. A derived type is created when the type operator is invoked with type parameters.
```
<derived_type_definition>::=<der_t_d1> <der_t_d2>
<der_t_d1>::=<identifier> <lbracket>
<der_t_d2>::=<identifier_list> <rbracket>
```

Examples of deririved type

TYPE type_operator[type1,type2]IS ARRAY[type1]OF type2;

TYPE gooey2 IS type_operator[enumerated,fuzzy];

Private Type Definition

Private type definitions only make sense within the visible part of the package stating only that the type exists. Functions and procedures provided by the package may use the private type.
```
<private_type_definition>::=<private>
```

Function Type Definition

In order to allow functions to be passed as parameters, a function type is necessary.
```
<function_type_definition>::=<lbracket_t_p> <rb_ar_type>
<rb_ar_type>::=<rb_ar> <type>
<rb_ar>::=<rbracket> <arrow>
```

Examples

TYPE two_input_integer_function IS [integer,integer] =>integer; integer_addition: two_input_integer_function;

Names and Expressions

Names

Names denote declared entities such as objects, numbers, types, subprograms, and packages. Names can also denote operators, components of objects, or the result returned by a function.
```
<name>::=<function_call>
<name>::=<operator_symbol>
<name>::=<deminame>
<deminame>::=<identifier>
<deminame>::=<indexed_component>
<deminame>::=<selected_component>
```

Indexed Components

An indexed component denotes a component of an array.
```
<indexed_component>::=<deminame> <i_c1>
<i_c1>::=<lbracket> <i_c2>
<i_c2>::=<expression_list> <rbracket>
<expression_list>::=<expression>
<expression_list>::=<expression> <comma_exp>
<comma_exp>::=<comma> <expression_list>
```

Examples

Monthly_sales[January] matrix[x,y]

Slices

A slice denotes a subarray formed by a sequence of consecutive components of an array.
```
<slice>::=<slice1> <slice2>
<slice1>::=<deminame><lbracket>
<slice2>::=<discrete_range> <rbracket>
```

Example

Monthly_sales[January . . . June] corner[1 . . . n/2,1 . . . n/2]

Selected Components

Selected components are used to denote record components, contents of objects denoted by access values, and entities declared in the visible part of a package.
```
<selected_component>::=<name_dot> <enumeration_literal>
<selected_component>::=<name_dot> <all>
<selected_component>::=<name_dot> <enumeration_identifier>
<all>::="ALL"
<name_dot>::=<deminame> <dot>
```
The name of the object from which a component is selected must denote a record, variant, or package. When the name is an access type and the reserved word ALL is the selector, the entire object pointed to is selected (dereferenced).

Examples

| | | |
|---|---|---|
| record 2.selection | pointr.ALL | complex. '*' |

Literals

A literal denotes an explicit value of a given type.
```
<literal>::=<numeric_literal>
<literal>::=<enumeration_literal>
<literal>::=<character_string>
<literal>::=<nil>
<nil>::="NIL"
```

Aggregates

An aggregate denotes a record or an array value constructed from component values.
```
<aggregate>::=<lparen> <agg1>
<agg1>::=<c_a_list> <rparen>
<c_a_list>::=<component_association>
<c_a_list>::=<component_association> <agg2>
<agg2>::=<comma> <c_a_list>
<component_association>::=<choice_arrow> <expression>
<choice_arrow>::=<choice> <arrow>
<arrow>::="=>"
<choice>::=<simple_expression>
```

<choice>::=<discrete_range>

The expressions define the values to be associated with components. Component associations can be given by naming the chosen components. An aggregate must be complete; a value must be provided for each component of the composite value.

Examples (harry=>23, julie=>28, children=>0)

todays_date:=(day=>7, month=>November, year=>1992)

Expressions

An expression is a formula that defines the computation of a value. Expressions in DANCE are nearly identical with expressions in Ada and Prascal.
<expression>::=<relation>
<expression>::=<relation> <exp1>
<exp1>::=<logical_operator> <relation>
<relation>::=<simple_expression>
<relation>::=<simple_expression> <rel1>
<rel1>::=<relational_operator> <simple_expression>
<simple_expression>::=<u_o_term>
<simple_expression>::=<u_o_term> <s_e1>
<u_o_term>::=<term>

<u_o_term>::=<unary_operator> <term>
<s_e1>::=<adding_operator> <term>

<term>::=<factor>
<term>::=<factor> <term1>
<term1>::=<multiplying_operator> <factor>

<factor>::=<primary>
<factor>::=<primary> <factor1>
<factor1>::=<starstar> <primary>
<starstar>::=<exponentiation_operator>

<primary>::=<literal>
<primary>::=<aggregate>
<primary>::=<name>

<primary>::=<function_call>
<primary>::=<lparen> <primary1>
<primary1>::=<expression> <rparen>

Each primary has a value and type. The only names allowed as primaries are names denoting objects. The type of an expression depends on the type of its constituents and on the operators applied. For the case where some programmer used operator overloading, the expression type must be determinable by context.

Expression examples j + 1
Ap[i,k] − (Ap[i,j]/Ap[j,j,])*Ap[j,k]
NOT(k > n)
A[i,k] * B[k,j] + C[i,j]

Operators and Expression Evaluation

The following operators, divided into six classes, have a predefined meaning in DANCE. These operators may be overloaded for user defined types. They are given in order of increasing precedence.

All operands of a factor, term, simple expression, relation, or expression are evaluated before application of the corresponding operator.

Logical Operators

The logical operators are applicable to Bool values and to one dimensional arrays of Bool values having the same number of components.
<logical_operator>::=<and>
<logical_operator>::=<or>
<logical_operator>::=<xor>
<logical_operator>::=<cand>
<logical_operator>::=<cor>
<and>::="AND"
<or>::="OR"
<xor>::="XOR"
<cand>::="CAND"
<cor>::="COR"

Relational Operators

The relational operators have operandi of the same type and return values of the predefined type Bool. Equality (inequality) is defined for any two objects of the same type except when the type is "limited private."

| Operator | Operation | Operand type | Result type |
| --- | --- | --- | --- |
| = /= | (in)equality | any type | Bool |
| < <= > >= | test for order | scalar or discrete | Bool |
| IN | inclusion | discrete type IN discrete range | Bool |

Equality for discrete types is equality of values. Equality for Float types requires some misty liandwaving about nearly equal. If the numerical analysis people want some special equality test, they must supply it; DANCE compares for exact equality. For equality tests of arrays and records, corresponding components are compared. Order tests of arrays use lexicographic ordering. Ada permits arrays of different lengths to be compared. This works nicely for strings (arrays of characters) and provides "telephone directory" ordering of various lengths of strings. However, in DANCE the arrays or records compared must be the same type, including array length.

The IN operator tests whether an discrete value lies within a discrete range or a given enumeration.
<relational_operator>::=<equal>
<relational_operator>::=<not_equal>
<relational_operator>::=<less_than>
<relational_operator>::=<at_most>
<relational_operator>::=<greater_than>
<relational_operator>::=<at_least>
<relational_operator>::=<in>
<equal>::="="
<not_equal>::="/="
<less_than>::="<"
<at_most>::="<="
<greater_than>::=">"
<at_least>::=">="

Example ch IN 0' . `9'
ch IN (a', e', i', o', u')

Adding Operators

The adding operators are as expected (+,−) except for the concatenation operator is also +.

```
<adding_operator>::=<plus>
<adding_operator>::=<minus>
<plus>::="+"
```

Unary Operators

The unary operators are applied to a single operand and return a result of the same type. Unary plus (+) is unnecessary since it is an identity. Unary minus (−) causes negation of numeric operands. "NOT" is logical negation and may be used for one dimensional arrays of Bool.

```
<unary_operator>::=<plus>
<unary_operator>::=<minus>
<unary_operator>::=<not>
<not>::="NOT"
```

Multiplying Operators

Multiplication (*) and division (/) are straightforward for both Int and Float types. Modulus (MOD) and remainder (REM) are defined by the relations:

$$A=(A/B)*B+(A \text{ REM } B)$$

where (A REM B) has the same sign as A and an absolute value less than B.

$$A=B*N+(A \text{ MOD } B)$$

where (A MOD B) has the same sign as B, which must be positive, and N is some integer. Make sure you get the operator you really want.

```
<multiplying_operator>::=<multiply>
<multiplying_operator>::=<divide>
<multiplying_operator>::=<mod>
<multiplying_operator>::=<rem>
<multiply>::="*"
<divide>::="/"
<mod>::="MOD"
<rem>::="REM"
```

Exponentiation Operator

Exponentiation (**) of an operand by a positive integer is equivalent to repeated multiplication of the operand by itself. For fractional exponents:

$$a**b=\text{alog}(b*\log(a))$$

where log and alog are natural (base e) logarithm and anti-logarithm respectively.

```
   <exponentiation_operator>::="**"
```

Type Conversions

Type conversions may be made between scalar types and arrays of scalar types.

```
<type_conversion>::=<t_c1> <t_c2>
<t_c1>::=<scalar_type> <lparen>
<t_c2>::=<expression> <rparen>
<scalar_type>::=<character_type_definition>
<scalar_type>::=<integer>
<scalar_type>::=<float1>
<scalar_type>::=<rational1>
```

The only type names allowed are Int, Char, Rat, and Float. Conversions between character and integer types are based on ASCII. Integer types may be converted to Rat, Float, or Char. Char types may only be converted to integer. Float types may be converted to Int (by truncation) and Rat (by approximation). Rat types may be converted into Int and Float (by division).

Type conversion examples

Integer(5.3)
Float(3)
Char(1)
Integer(a')
Rat(3)

Allocators

The evaluation of an allocator creates an object and yields an access value that designates the object.

```
<allocator>::=<alloc1>
<allocator>::=<alloc1> <constraint>
<alloc1>::=<new> <type_name>
<new>::="NEW"
```

An implementation must guarantee that any object created by evaluation of an allocator remains allocated for as long as this object or one of its subcomponents is accessible directly of indirectly, that is, as long as it can be denoted by some name. An implementation may reclaim the storage occupied by an object created by an allocator, once this object has become inaccessible. This should be sufficient to prohibit security breaches due to use of stale access types.

Allocator example

| | |
|---|---|
| TYPE ptr IS ACCESS some_type; | --in declaration part |
| pointer : ptr; | --in declaration part |
| pointer := NEW ptr; | --in subprogram body |

Static Expressions

A static expression can be evaluated at compile time and has constant value.

Commands

Commands in DANCE are temporal predicates which are all made true by constructing a model. That model is the lattice of state variable values that comprise an interval. The semantics are also defined through weakest-precondition predicate transformers.

Simple and Compound Commands

A command may be simple, compound, have assertions, or may be the composition of other commands. Simple commands enclose no other command. A compound command can enclose other commands. An assertional command may be preceded or followed by an assertion that has no operational effect. Composition is used to combine commands to be executed serially or concurrently.

Simple commands are single commands like assignment. Compound commands have complex structure. An assertional command has assertions before or after it. Assertions have no effect on prograin behavior. Sequential composition causes commands to be executed one after the other; parallel composition causes commands to be executed simultaneously.

```
<command>::=<simple_command>
<command>::=<compound_command>
<command>::=<assertional_command>
<command>::=<sequential_composition>
<command>::=<parallel_composition>
```

A simple command may be an assignment of an expression to a variable, a procedure invocation, a skip (do nothimg), specify the value to be returned by a function, or a special "combinable" command utilizing Layered network supported, indivisible operations.
<simple_command>::=<assignment_command>
<simple_command>::=<procedure_call>
<simple_command>::=<skip_command>
<simple_command>::=<return_command>
<simple_command>::=<combinable_command>

<compound_command>::=<alternative_command>
<compound_command>::=<iterative_command>
<compound_command>::=<parallel_command>
<compound_command>::=<block>

<assertional_command>::=<command>
<assertional_command>::=<assertion> <command>
<assertional_command>::=<command> <assertion>
<assertional_command>::=<assertion> <a_c2>
<a_c2>::=<command> <assertion>

Skip and Assignment Commands

The skip command does nothing.

<skip_command> ::= "SKIP"
model:          i[[SKIP]] = true.
axiom:          { P } skip { P }
wp:             wp(skip, Q) = Q Assigning values to variables is undamental to the imperative style of programming.
<assignment_command>::=<name_list> <assign_expression_list>
<assign_expression_list>::=<assign> <expression_list>
<name_list>::=<name>
<name_list>::=<name> <c_n_1>
a.::=<comma> <name_list>

The assignment command assigns the value of the expression to a state variable. Textual substitution is used for its semantics:

model:    $\mathcal{M}_i[[X \&= e]] = \mathcal{M}_{end(i)}[[X]] = \mathcal{M}_{start(i)}[[e]]$.

axiom:    $\{P^x_e\}\, x := e\, \{P\}$ wp:       $wp(x := e, Q) = Q^x_e$

Where $P^x_e$ is the predicate where every free occurrence of x is replaced by the expression e. This is the same as the interval temporal logic definition where the value of x at the end of the subinterval is the same as the value of the expression evaluated at the beginning of the subinterval.

Multiple assignments are equivalent to parallel composition of single assignments:

$x2,x2,\ldots,xn:=e1,e2,\ldots,en \equiv x1:=e1\,\&\,x2:=e2\,\&\,\ldots\,\&\,xn:=en$ Assignment examples $k:=k+1$ $h:=(i+j)\text{DIV}\,2;$ $x,y:=y,x$ Array Assignment Arrays are functions from a discrete type to the base type. The whole array can be assigned, or member by member.

Array assignment examples $C[i,j]:=B[j,i]$ $C:=B$ $x[i]:=x[i]/Ap[i,i]$ $a[i\ldots j]:=\text{hold}[i\ldots j]$ Record Assignment Record assignment is straightforward. Either elements can be assigned singly by appending the record variable name with a period and the name of the record component, or the entire record can be assigned, provided the types are the same.

Record assignment examples disk_jockey.handle:=Slick Willie'
disk_jockey.salary 200000.00
disk_jockey.funny:=F
disk_jockey1:=disk_jockey2

Alternative Command

The alternative command allows an alternative statement to be executed, provided its guard is true. If more than one guard is true, the altenative selected is nondeterministic.

The semantics are given in terms of an inference rule, wp, and model. Suppose we have an alternative command named "IFFY":

IFFY: if $B_1 \Rightarrow S_1[\ ]\ldots [\ ]B_n \Rightarrow S_n$ fi with n guarded commands gives the inference rule:

Alternative Rule $$\frac{\forall i : i \in [1\ldots n] : \{P \text{ and } B_i\}\, S_i\, \{Q\}}{\{P\}\, IFFY\, \{Q\}}$$

In terms of weakest preconditions:

wp(IFFY, Q)=(B1=>wp(S1, Q)) and ... and (Bn=>wp(Sn, Q))

model:

$\mathcal{M}_i[[\text{IF B1}\Rightarrow\text{S1}\ []\text{B2}\Rightarrow\text{S2}\ []\ldots Z,5\ \text{Bn} \Rightarrow\text{Sn FI}]]=$ true iff ( $\mathcal{M}_{start(i)}[[B1]]$ or $\mathcal{M}_{start(i)}[[B2]]$ or ... $\mathcal{M}_{start(i)}[[Bn\ ]])$ and ( $\mathcal{M}_{start(i)}[[B1]] \Rightarrow \mathcal{M}_i[[S1]])$ and ( $\mathcal{M}_{start(i)}[[B2]] \square\, \mathcal{M}[[S2]])$ and ... and ( $\mathcal{M}_{start(i)}[[Bn]] \Rightarrow \mathcal{M}_i[[Sn]])$ <alternative_command>::=<id_colon> <alt1>
<alternative_command>::=<alt1>
<id_colon>::=<identifier> <colon>
<alt1>::=<if> <alt2>
<if>::="IF"
<alt2>::=<alt3> <fi>
<fi>::="FI"
<alt3>::=<be_a_c>
<alt3>::=<be_a_c> <alt4>
<alt4>::=<box2> <alt3>
<box2>::="[ ]"
<be_a_c>::=<boolean_expression> <arrow_command>
<arrow_command>::=<arrow> <command>

Alternative command example

IF
$$(k > n) => x[i] := x[i] - (Ap[i,j]/Ap[i,j])*x[j]$$
[]
$$NOT(k > n) => Ap[i,k] := Ap[i,k] - (Ap[i,j]/Ap[i,j])*Ap[j,k]$$
FI

Iterative Command

The iterative command provides looping. Although similar to the alternative command, the iterative command will continue to execute as long as at least one of the guards is true.

model:

$\mathcal{M}_i[[DO\ B1 => S1\ []\ B2 => S2\ []\ \ldots\ []\ Bn => Sn\ OD]] = $ true iff $\exists j1 \ldots jc : j1 \subset i \ldots jc \subset i$:

$(\cup_{k \in [i,c]} jk = i)$ and $(start(i) = start(j1)$ and $end(j1) = start(j2)$ and $\ldots$ and $end(jc) = end(i))$ and $\forall k : 0 < k <= n$:

$((\mathcal{M}_{start(jk)}[[B1]] \Rightarrow \mathcal{M}_{jk}[[S1]])$ and $(\mathcal{M}_{start(jk)}[[B2]] \Rightarrow \mathcal{M}_{jk}[[S2]])$ and $\ldots$ and $(\mathcal{M}_{start(jk)}[[Bn]] \Rightarrow \mathcal{M}_{jk}[[Sn]]))$ Proving correctness of a iterative command requires construction of a loop invariant. Suppose we have an iterative command named "DOIT":

$$DOIT: do\ B_1 => S_1 []\ldots[] B_n => S_n\ od$$

with n guarded comnmands gives the inference rule:

Iterative Rule $$\frac{\forall i : i \in [1 \ldots n] : B_i \Rightarrow (bound > 0)\ and\ \{I\ and\ B_i\ and\ bound=bd\}\ S_i\ \{I\ and\ bound<bd\}}{\{I\}\ DOIT\ \{I\ and\ not\ (B_1\ or\ \ldots\ or\ B_n)\ and\ not\ (bound > 0)\}}$$

The iterative statement has a messy weakest precondition since it may not terminate. In fact wp(DOIT, Q) is hard to determine and not very useful. Rather merely an implication will be given based on a loop invariant and bound function.

Let BB be the disjunction of the guards: BB=B1 or B2 or ... or Bn. Let I be a predicate, and "bound" be an integer-valued expression whose value is non-negative. The $(I\ and\ BB) => (bound > 0)$ and $(\forall i : 1 <= i <= n : (I\ and\ Bi) => wp(Si, I)$ and $\frac{(I\ and\ Bi\ and\ bound=X) => wp(Si, bound<X))}{I => wp(DOIT, I\ and\ not(BB))}$ Once predicate "I" and boolean function "bound" have been created aid shown to have the desired properties, showing that the precondition, P, implies wp(DOIT, Q) where Q is the postcondition is straightforward. Unfortunately, find proper loop invariants is difficult, but loops created without an invariant or bound function often execute erroneously.

<iterative_command>::=<id_colon> <iter1>
<iterative_command>::=<iter1>
<iter1>::=<do> <iter2>
<do>::="DO"
<iter2>::=<iter3> <od>
<od>::="OD"
<iter3>::=<be_a_c>
<iter3>::=<be_a_c> <iter4>
<iter4>::=<box2> <iter3>
<be_a_c>::=<boolean_expression> <arrow_command>
<arrow_command>::=<arrow> <command>

Iterative command example

```
do
   (k <= s) =>
      begin
         a. := A[i,k] * B[k,j] + C[i,j]
         ;
         k := k + 1
      end
od
```

Blocks

A block introduces a new scope within which objects declared cannot escape (except for those darn access types). A block provides existential quantification in temporal logic. By definition, variables declared local to a single interval cannot be accessed by other intervals. This property facilitates showing "AccessoK" for the variables accessed by intervals executing concurrently. Therefore, blocks are encouraged and global variables are discouraged.

model:

$\mathcal{M}_i[[DECLARE\ X = c\ begin\ w\ end]] = $ true iff $\mathcal{M}_{start(i)}[[X]] = c$ and $\mathcal{M}_i[[w]] = $ true Rule:

$(\exists d1, d2 : domain : \mathcal{D}[[d1]] \subset \mathcal{D}[[d2]])$ and $(\exists s : string : (d1 + "." + s) = d2)$ and $(\forall V : variable : V \in \mathcal{D}[[d1]] \Rightarrow V \in \mathcal{D}[[d2]])$ and $\frac{(X \in \mathcal{D}[[d2]])\ and\ (X=c)\ and\ (P \Rightarrow P1_c^X)\ and\ (Q1 \Rightarrow Q)}{\{P\}\ DECLARE\ X=c\ begin\ \{P1\}\ w\ \{Q1\}\ end\ \{Q\}}$ wp:

wp(DECLARE X=c begin {P1} w {Q1} end,Q)=wp(w, Q1) provided (Q1 $\Rightarrow$ Q) and all the uses of X are contained within the begin-end.

<block>::=<block_body>
<block>::=<id_colon> <block_body>
<block>::=<dec_d_p> <block_body>
<block ::=<both_id_dec> <block_body>
<both_id_dec>::=<id_colon> <dec_d_p>
<dec_d_p>::=<declare> <declaration_part>
<block_body>::=<begin_command> <end>
<begin_comnmand>::=<begin> <command>
<begin>::="BEGIN"
<declare>::="DECLARE"
<declaration_part>::=<block_declaration>
<declaration_part>::=<declaration_part> <block_declaration>

<block_declaration>::=<object_declaration>
<block_declaration>::=<number_declaration>
<block_declaration>::=<rename_clause >
Example of block declare
      $s$ : integer;
   begin
      fetch_add(high_index, −1, $s$)
      ;
      hold[$s$] : = $a$[$t$]
   end

Sequential Composition

The semicolon in Ada is merely a statement separator. In DANCE the semicolon is an operator on commands that causes them to be executed sequentially.
<sequential_composition>::=<command> <semi_command>
<semi_command>::=<semicolon> <command>

If we have two commands, S1 and S2 then we can use the following inference rule for sequential composition:

Sequential Composition Rule $$\frac{\{P\}\ S1\ \{Q\}\ \text{and}\ \{Q\}\ S2\ \{R\}}{\{P\}\ S1\ ;\ S2\ \{R\}}$$

This is analogous to dividing an interval such that both temporal predicates are true, namely the state where Q holds.

S1;S2
where S1 and S2 are formulas means $\mathcal{M}_i[[S_1;S_2]]$=true iff $\exists j,k:j\subset i$ and $k\subset i$:( $\mathcal{M}_j[[S_1]]$=true) and ( $\mathcal{M}_k[[S_2]]$=true) and (end(j)=start (k) )

This says "the meaning of S1; S2 is true in the interval i if-and-only-if there exists some subintervals of i, namely j and k, such that the meaning of $S_1$ is true during j and the meaning of $S_2$ is true during k." Note that the two subintervals of i share the state end(j)=start(k). Essentially $S_1$ is true on the first part of the interval and $S_2$ is true on the last part.

In terms of weakest-precondition predicate transformers (wp):

wp(S1; S2, R)=wp(S1, wp(S2, R) )
Example of sequential composition:

fetch_add(high_index, −1, $s$)
   ;
   hold[$s$] : = $a$[$t$]

Concurrent Composition

Concurrent (parallel) composition of commands uses the ampersand (&) to indicate that the two commands may be executed concurrently.
<parallel_composition>::=<command> <amp_command>
<amp_command>::=<ampersand> <command>
<ampersand>::="&"

Concurrent Composition Rule $$\frac{\{P1\}\ S1\ \{Q1\},\ \{P2\}\ S2\ \{Q2\},\ \text{and AccessOK}(S1, S2)}{\{P1\ \text{and}\ P2\}\ S1\ \&\ S2\ \{Q1\ \text{and}\ Qb2\}}$$

where AccessOK(S1,S2) is defined as:

forall variables Vi occurring in S1 or S2 neither S1 nor S1 changes the value of Vi, only one of S1 or S2 accesses (read or write) Vi, or S1 and S2 access Vi solely via combinable operation: and the truth of Q1 and Q2 is independent of the order of the combinable operations.

or more formally:

AccessOK($S1$, $S2$) =

$\forall\ Vi : Vi \in S1 \cup S2$ :

($Vi \notin lhs(S1) \cup lhs(S2)$) or ($Vi \in S1$ and $Vi \notin S2$) or ($Vi \in S2$ and $Vi \notin S1$) or (($Vi \in co(S1)$ and $Vi \in co(S2)$) $\Rightarrow$ ($co(S1) \sqsubseteq co(S2)$ and $co(S2) \sqsubseteq co(S1)$))

$lhs(S) = \{v \mid v := e \in S\}$ $co(S) = \{v \mid \text{fetch\_add}(v, e, v2) \in S\ \text{or swap}(v, e, v2) \in S\ \text{or} \ldots\}$ In terms of intervals:

$\mathcal{M}_i[[w_1\ \&\ w_2]]$ = true iff $\exists j, k : j\subset i$ and $k\subset i$ : ( $\mathcal{M}_j[[w_1]]$ = true) and ( $\mathcal{M}_k[[w_2]]$ = true) and (start($j$) = start($k$) = start($i$)) and (end($j$) = end($k$) = end($i$))

In terms of wp:
AccessOK(S1, S2)$\Rightarrow$[wp(S1 & S2, Q)=wp(S1, Q) and wp(S2, Q)]
Concurrent composition example:
k:=high_index & a[i . . . j]:=hold[i . . . j]

Parallel Command

The parallel command is a generalization of concurrent (parallel) composition. For each value in the discrete range a command is executed with the value replacing the identifier in the command.
<parallel_command>::=<p_c_head> <p_c_body>
<p_c_head>::=<forall_id> <in_d_r>
<forall_id>::=<forall> <identifier>
<forall>::="FORALL"
<in_d_r>::=<in> <discrete_range>
<p_c_body>::=<do> <command>
<in>::="IN"
  model:

$\mathcal{M}_i[[\text{FORALL}\ X\ \text{IN}\ b\ \text{DO}\ w]]$ = true iff $\exists j1 \ldots jn : j1 \subset i \ldots jn \subset i$ :

$\mathcal{M}_{j1}[[\text{DECLARE}\ X = x_1\ \text{begin}\ w\ \text{end}]]$ = true, and $\mathcal{M}_{j2}[[\text{DECLARE}\ X = x_2\ \text{begin}\ w\ \text{end}]]$ = true, and . . . and -continued $\mathcal{M}_{jn}[[\text{DECLARE } X = x_n \text{ begin } w \text{ end}]] = \text{true}$ where $x_1, x_2, \ldots, X_n$ are all the values for X that make b true.

rule:

$(\forall i : i \in \text{range} : \{P(i)\} \, S(i) \, \{Q(i)\})$ and $(\forall i, j : i, j \in \text{range} : \text{AccessOK}(S(i), S(j)))$ and $(\forall i : i \in \text{range} : P \Rightarrow P(i))$ and $(\forall i : i \in \text{range} : Q(i)) \Rightarrow Q$ $\{P\}$ FORALL $i$ IN range DO $S$ $\{Q\}$ wp:
AccessOK(S)$\Rightarrow$[wp(FORALL i IN range DO S, Q)]=wp(S[i1], V) and wp(S[i2, Q) and . . . and wp(S[ik], Q)]where i1, i2, . . . , ik are the values i takes in the range and S[ix] is the statement S with i replaced by the value ix, $S^i_x$.

Of course programmers should use the FORALL command often.

Parallel command example:

FORALL $i$ IN $j \ldots k$ DO $str1(i) := str2(i)$

Return Command

The return command specifies the value to be returned from a function. It causes no effect on execution or termination of functions or procedures.

<return_command>::=<return> <expression>
<return>::="RETURN"

Return command example:

return C

Combinable Commands

Combinable commands allow many different intervals to modify the value of the same shared variable without mutual exclusion. Direct support for combinable operations in Layered networks provides the key to efficient parallel execution with the Multitude architecture. Many data structures can be accessed using combinable commands that otherwise would require parallelism-destroying mutual exclusion.

<combinable_command>::=<c_fetch_add>
<combinable_command>::=<c_fetch_or>
<combinable_command>::=<c_fetch_and>
<combinable_command>::=<c_fetch_xor>
<combinable_command>::=<c_fetch_swap>
<c_fetch_add>::=<fetch_add> <fetch_params>
<fetch_add>::="FETCHADD"
<fetch_params>::=<f_p1> <f_p2>
<f_p1>::=<f_p3> <f_p4>
<f_p2>::=<f_p5> <rparen>
<f_p3>::=<lparen> <name>
<f_p4>::=<comma> <expression>
<f_p5>::=<comma> <identifier>
<c_fetch_swap>::=<swap> <fetch_params>
<swap>::="SWAP"
<c_fetch_or>::=<fetch_or> <fetch_params>
<fetch_or>::="FETCH_OR"
<c_fetch_and>::=<fetch_and> <fetch_params>
<fetch_and>::="FETCH_AND"
<c_fetch_xor>::=<fetch_xor> <fetch_params>
<fetch_xor>::="FETCH_XOR"

The first term (name) designates the variable to fetched and modified. The second term (expresseion) is the value to be added, anded ored, xored, or swapped. The third term (identifier) designates the variable into which the returned valued is assigned.

Fetch-Add model:

$\mathcal{M}_{ik}[[\text{FETCH\_ADD}(X, e_1, Y_1) \, \&$ $\text{FETCH\_ADD}(X, e_2, Y_2) \, \& \ldots \& \, \text{FETCH\_ADD}(X, e_k, Y_k)]] = \text{true}$ iff there exists some $ndperm(e_1, \ldots, e_k) = (e_{1s}, \ldots, e_{ks})$ such that $\mathcal{M}_{ik}[[\bigcirc \, (X=X + e_1 + e_2 + \ldots + e_k]] = \text{true and}$ $\mathcal{M}_{ik}[[\bigcirc(Y_{3s} = X + e_{1s} + e_{2s})]] = \text{true and}$ $\mathcal{M}_{ik}[[\bigcirc(Y_{2s} = X + e_{1s})]] = \text{true and}$ $\mathcal{M}_{ik}[[\bigcirc(Y_{3s} = X + e_{1s} + e_{2s})]] = \text{true}$ and . . . and $\mathcal{M}_{ik}[[\bigcirc(Y_{ks} = X + e_{1s} + e_{2s} + \ldots + e_{k-1s})]] = \text{true}.$ wp of one fetch-add:
wp(FETCH_ADD(X,e,Y),Q)=$(Q^Y_{x)}{}^x_{x+e}$
wp of concurrent fetch-adds:
wp(FETCH_ADD(X,e$_1$,Y$_1$) & FETCH_ADD(X,e$_2$,Y$_2$) & . . . & FETCH_ADD(X,e$_k$,Y$_k$))=forall ndperm(e$_1$, . . . , e$_k$)=(e$_{1s}$, . . . , e$_{ks}$) such that
$( \ldots ((Q^Y_{1sX})^Y_{2s\, X+e1s}) \ldots )^X_{x+e1s+e2s+\ldots+eks}$

Fetch-And model:

$\mathcal{M}_{ik}[[\text{FETCH\_AND}(X,e_1,Y_1) \, \& \, \text{FETCH\_AND}(X,e_2, Y_2) \, \& \ldots \& \, \text{FETCH\_ADD}(X,e_k,Y_k)]]=\text{true}$ iff there exists some ndperm(e$_1$, . . . , e$_k$)=(e$_{1s}$, . . . , e$_k$) such that $\mathcal{M}_{ik}[[\bigcirc(X=X \text{ AND } e_1 \text{ AND } e_2 \text{ AND} \ldots \text{AND } e_k]]=\text{true}$ and $\mathcal{M}_{ik}[[\bigcirc(Y_{1s}=X)]]=\text{true and}$ $\mathcal{M}_{ik}[[\text{next}(Y_{2s}=X \text{ AND } e_{1s})]]=\text{true and}$ $\mathcal{M}_{ik}[[\bigcirc(Y_{3s}=X \text{ AND } e_{1s} \text{ AND } e_{2s})]]=\text{true and} \ldots \text{and}$ $\mathcal{M}_{ik}[[\bigcirc(Y_{ks}=X \text{ AND } e_{1s} \text{ AND } e_{2s} \text{ AND } \ldots \text{AND } e_{k-1s})]],$ wp of one fetch-and:
wp(FETCH_AND(X,e,Y),Q)=$(Q^Y_X)^X_X$ AND $_e$
wp of concurrent fetchands:
wp(FETCH_AND(X,e$_1$,Y$_1$) & FETCH_AND(X,e$_2$,Y$_2$) & . . . & FETCH_AND(X,e$_k$,Y$_k$))=forall ndperm (e$_1$, . . . , e$_k$)=(e$_{1s}$, . . . , e$_{ks}$) such that
$( \ldots ((Q^Y_{1sX})^Y_{2sX} \text{ AND } e_{1s}) \ldots )^X_X$ AND e1s AND e2s AND . . . AND $_{eks}$

Fetch-Or model:

$\mathcal{M}_k[[\text{FETCH\_OR}(X,e_1,Y_1) \, \& \, \text{FETCH\_OR}(X,_2Y_2) \, \& \ldots \& \, \text{FETCH\_OR}(X,e_k,Y_k)]]=\text{true}$ iff there exists some ndperm$(e_1, \ldots, e_k)=(e_{1s}, \ldots, e_{ks})$ such that $\mathcal{M}_{ik}[[\bigcirc(X=X \text{ OR } e_1 \text{ OR } e_2 \text{ OR } \ldots \text{ OR } e_k)]]$=true and $\mathcal{M}_{ik}[[\bigcirc(Y_{1s}=X)]]$=true and $\mathcal{M}_{ik}[[\bigcirc(Y_{2s}=X \text{ OR } e_{1s})]]$=true and $\mathcal{M}_{ik}[[\bigcirc(Y_{3s}=X \text{ OR } e_{1s} \text{ OR } e_{2s})]]$=true and $\ldots$ and $\mathcal{M}_{ik}[[\bigcirc(Y_{ks}=X \text{ OR } e_{1s} \text{ OR } e_{2s} \text{ OR } \ldots \text{ OR } e_{k-1s})]]$=true.

wp of one fetch-or:

wp(FETCH_OR(X,e,Y),Q)=$(Q^Y_x)^X_{x \text{ OR } e}$ wp of concurrent fetch-ors:

wp(FETCH_OR(X,$e_1$,$Y_1$) & FETCH_OR(X,$e_2$,$Y_2$) & $\ldots$ & FETCH_OR(X,$e_k$,$Y_k$))=forall ndperm $(e_1, \ldots, e_k)=(e_{1s}, \ldots, e_{ks})$ such that $(\ldots ((Q^Y_{1sX})^Y_{2sX \text{ OR } e1s}) \ldots )^X_{X \text{ OR } e1s \text{ OR } e2s \text{ OR } \ldots \text{ OR } eks}$

Fetch-Xor model:

$\mathcal{M}_{ik}[[\text{FETCH\_XOR}(X,e_1,Y_1) \& \text{FETCH\_XOR}(X, e_2, Y_2) \& \ldots \& \text{FETCH\_XOR}(X,e_k,Y_k)]]$=true iff there exists some ndperm$(e_1, \ldots, e_k)=(e_{1s}, \ldots, e_{ks})$ such that $\mathcal{M}_{ik}[[\bigcirc(X=X \text{ XOR } e_1 \text{ XOR } e_2 \text{ XOR } \ldots \text{ XOR } e_k)]]$=true and $\mathcal{M}_{ik}[[\bigcirc(Y_{1s}=X)]]$=true and $\mathcal{M}_{ik}[[\bigcirc(Y_{2s}=X \text{XOR} e_{1s})]]$=true and $\mathcal{M}_{ik}[[\bigcirc(Y_{3s}=X \text{XOR} e_{1s} \text{XOR} e_{2s})]]$=true and $\ldots$ and $\mathcal{M}_{ik}[[\bigcirc(Y_{ks}=X \text{ XOR} e_{1s} \text{XOR } e_{2s} \text{XOR } \ldots \text{ XOR } e_{k-1s})]]$=true.

wp of one fetch-xor:

wp(FETCH_XOR(X,e,Y),Q)=$(Q^Y_x)^X_{X\text{XOR } e}$ wp of concurrent fetch-xors:

wp(FETCH_XOR(X,$e_1$,$Y_1$) & FETCH_XOR(X,$e_2$,$Y_2$) & $\ldots$ & FETCH_XOR(X,$e_k$,$Y_k$))=forall ndperm $(e_1, \ldots, e_k)=(e_{1s}, \ldots, e_{ks})$ such that $(\ldots ((Q^Y_{1sX})^Y_{2s \text{ XXORe1s}}) \ldots )^X_{X \text{ XOR } e1s \text{ XOR } e2s \text{ XOR } \ldots \text{ XOR } eks}$

Swap model:

$\mathcal{M}_{ik}[[\text{SWAP}(X,e_1,Y_1) \& \text{SWAP}(X,e_2,Y_2) \& \ldots \& \text{SWAP}(X,e_k,Y_k)]]$=true iff there exists some ndperm$(e_1, \ldots, e_k)=(e_{1s}, \ldots, e_{ks})$ such that $\mathcal{M}_{ik}[[\bigcirc(X=e_{ks})]]$=true and $\mathcal{M}_{ik}[[\bigcirc(Y_{1s}=X)]]$=true and $\mathcal{M}_{ik}[[\bigcirc(Y_{2s}=e_{1s})]]$=true and $\mathcal{M}_{ik}[[\bigcirc(Y_{3s}=e_{2s})]]$=true and $\ldots$ and $\mathcal{M}_{ik}[[\bigcirc(Y_{ks}=e_{k-1s})]]$=true.

wp of one swap:

wp(SWAP(X,e,Y),Q)=$(Q^Y_x)^X_e$ wp of concurrent swaps:

wp(SWAP(X,$e_1$,$Y_1$) & SWAP(X,$e_2$,$Y_2$) & $\ldots$ & SWAP(X,$e_k$,$Y_k$))=forall ndperm$(e_1, \ldots, e_k)=(e_{1s}, \ldots, e_{ks})$ such that $(\ldots ((Q^Y_{1sX})Y_{2se1s}) \ldots )X_{eks}$

Subprograms

Subprograms are a kind of program unit of which programs can be composed. A subprogram is a program unit whose execution is invoked by a subprogram call. There are two forms of subprogram: procedures and functions. Procedures may contain side-effects; functions may not contain side-effects. Procedures may return a value. Functions and procedures that return a value may be used in expressions. Procedures without a return value may be invoked as a command.

Subprogram Declarations

A subprogram declaration declares a procedure or a function, as indicated by the initial reserved word.

<subprogram_declaration>::=<procedure_declaration>
<subprogram_declaration>::=<function_declaration>

Procedure Declaration

The specification of a procedure specifies its identifier and its formal parameters (if any).

<procedure_declaration>::=<proc_id>
<procedure_declaration>::=<proc_id> <formal_part>
<proc_id>::=<procedure> <identifier>
<procedure>::="PROCEDURE"

Function Declaration

The specification of a function specifies its designator, its formal parameters (if any), and the type of the returned value.

<function_declaration>::=<func_des> <return_type>
<function_declaration>::=<func_des_formal_part> <return_type>
<func_des>::=<function> <designator>
<func_des_formal_part>::=<func_des> <formal_part>
<function>::="FUNCTION"
<return_type>::=<return> <type_name>

Subprogram Parameters

A designator that is an operator symbol is used for the overloading of an operator.

<designator>::=<identifier>
<designator>::=<operator_symbol>
<operator_symbol>::=<string_literal>

The formal_part contains the parameters demanded by procedures and functions.

<formal_part>::=<lparen> <f_p1 >
<f_p1>::=<par_spec_list> <rparen>
<par_spec_list>::=<parameter_specification>
<par_spec_list>::=<parameter_specification> <f_p2>
<f_p2>::=<semicolon> <par_spec_list>

Each parameter_specification has a list of identifiers, a type and possibly a mode (if this is a parameter for a procedure). Function parameters have default parameter mode "IN".

<parameter_specification>::=<id_list_colon> <mode_type>
<id_list_colon>::=<identifier_list> <colon>
<mode_type>::=<mode> <type_name>
<mode_type>::=<type_name>

Formal Parameter Modes

The value of an object is said to be "read" when this value is evaluated; it is also said to be read when one of its subcomponents is read. The value of a variable is said to be "updated" when an assignment is performed to the variable, or when the variable is used as an actual parameter of a procedure call that updates that parameter; it is also said to be updated when one of its subcomponents is updated. A procedure may modify one of its OUT parameters at any time after invocation. Since parallel execution is permitted, more than one procedure can modify the same set of variables. In some cases this is precisely what is desired, especially when using combinable operations to guard a conmnon data structure.

<mode>::=<in>
<mode>::=<out>
<mode>::=<in> <out
<out>::="OUT"

A formal parameter of a subprogram has one of the three following modes:

IN  The formal parameter is treated as constant and permits only reading of the value of the associated actual parameter.

OUT  The formal parameter is a variable and permits updating of the associated actual parameter.

IN OUT  The formal parameter is a variable and permits both reading and updating of the associated actual parameter.

If no mode is explicitly given, mode IN is assumed. All formal parameters of functions must be mode IN.

Subprogram Bodies

A subprogram body specifies the meaning (behavior) of the subprogram. The meanings of DANCE functions and temporal predicates are:

$$\mathcal{M}_i[[f(e_1, \ldots, e_k)]] = \mathcal{M}_i[[f]]( \mathcal{M}_i[[e_1]], \ldots, \mathcal{M}_i[[e_k]])$$

$$\mathcal{M}_i[[p(e_1, \ldots, e_k)]] = \mathcal{M}_i[[p]]( \mathcal{M}_i[[e_1]], \ldots, \mathcal{M}_i[[e_k]])$$

Subprogram bodies define $\mathcal{M}_i[[f]]$ and $\mathcal{M}_i[[p]]$. The use of the same symbol, $e_1, \ldots, e_k$, for the actual parameters of functions and procedures is misleading. For functions $e_1, \ldots, e_k$ must be expressions; for procedures, $e_1, \ldots e_k$ may be variables names, and must be if its mode is IN or IN OUT. The actual parameters $e_1, \ldots, e_k$ are substituted for the formal parameters used within the subprogram. Parameters for functions must be mode IN so the value of $e_1, \ldots, e_k$ is pertainent only at start(i). The caller of any procedure must assure noninterference of updates to OUT or IN OUT parameters with other, concurrent executions.

<subprogram_body>::=<subprogram_dec_is> <block>
<subprogram_dec_is>::=<subprogram_declaration> <is>

Subprogram Calls

A subprogram call is either a procedure call command, or a function or procedure call; it invokes the execution of the corresponding subprogram body—construction of a state lattice (interval) that satisfies the subprogram.

<procedure_call>::=<identifier>
<procedure_call>::=<identifier> <actual_parameter_part>

<function_call>::=<identifier>
<function_call>::=<identifier> <actual_parameter_part>

<actual_parameter_part>::=<lparen> <a_p_p1>
<a_p_p1 >::=<p_a_list> <rparen>
<p_a_list>::=<parameter_association>
<p_a_list>:: =<parameter_association><a_p_p2>
<a_p_p2>::=<comma> <p_a_list>
<parameter_association>::=<actual_parameter>
<parameter_association>::=<f_p_arrow> <actual_parameter>
<f_p_arrow>::=<formal_parameter> <arrow>
<formal_parameter>::=<identifier>
<actual_parameter>::=<expression>
<actual_parameter>::=<deminame>
<actual_parameter>::=<type_conversion>

Each parameter association associates an actual parameter with a corresponding formal parameter. A parameter association is said to be "named" if the folmal parameter is named explicitly; it is otherwise said to be positioned. For a positional association, the actual parameter corresponds to the formal palranieter with the same position in the formal part.

For each formal parameter of a subprogram, a subprogram call must specify exactly one corresponding actual parameter.

Function Subprograms

A function is a subprogram that returns a value, the result of the function call. A function may have no side-effects; that is, no assignment of state that is either visible outside the function or between consecutive function calls is permitted. This allows parallel execution of expressions consisting entirely of functions via the Church-Rosser property.

Packages

A package is a kind of program unit, of which programs are composed. Packages allow the specification of groups of logically related entities. in their simplest form packages specify pools of common object and type declarations. More generally, packages can be used to specify groups of related entities such as subprograms that can be called from outside the package, while their inner workings remain concealed andi protected from outside users.

Packages in DANCE support the abstract data typing of Cardelli & Wegner. Their bounded universal quantification is achieved via the "required" construct.

Package Structure

A package is generally provided in two parts: a package specification and a package body.

<package_declaration>::=<pack_s1 > <pack_s2>
<pack_s1 >::=<pack_id> <is_dec>
<pack_id>::=<package> <package_name>
<package>::="PACKAGE"
<is_dec>::=<is>
<is_dec>::=<is> <declarations>
<declarations>::=<declaration>
<declarations>::=<declarations> <declarations>
<pack_s2>::=<end_package>
<pack_s2>::=<private_dec> <end_package>
<private_dec>::=<private> <declarations>
<private>::="PRIVATE"
<end_package>::=<end> <package>

The name of the package body associates it with the corresponding package specification.

Package Specifications and Declarations

The first list of declarative items of a package specification is called the "visible" part of the package. The list of declarative items (if any) after the reserved word PRIVATE is called the "private" part of the package. Private parts provide existential quantification for abstract data types created with packages.

An entity declared In the private part of a package is not visible outside the package. In contrast, expanded names denoting objects declared in the visible part can be used outside the package. Direct visibility (without the package name, dot, entity name) of such entities can be achieved by means of use clauses.

Package Bodies

Entities declared within a package body are only visible within the package body itself. A variable declared in the body of a package is only visible within this body, so its value can only be changed by procedures within the package body.

<package_body>::=<pack_b1> <pack_b2>
<pack_b1>::=<package_body_id> <is_dec>
<package_body_id>::=<package_body1 > <id_packtype>
<package_body1>::=<package> <body1>
<id_packtype>::=<identifier> <colon_pt>
<colon_pt>::=<colon> <package_name>
<package_name>::=<identifier>
<package_name>::=<identifier>
<package_name>::=<package_name> <dot_identifier>
<dot_identifier>::=<dot> <identifier>
<body1>::="BODY"
<pack_b2>::=<body> <end_package>

Private Types

The declaration of a type as a private type in the visible part of a package serves to separate the characteristics that can be used directly by outside program units from other characteristics whose direct use is confined to the package.
<private_type_delcaration>::=<p_t_d1> <p_t_d2>
<p_t_d1 >::=<type_ident> <d_p_is>
<d_p_is>::=<is>
<d_p_is>::=<discriminant_part> <is>
<p_t_d2>::=<private>
<p_t_d2>::=<limited> <private>
<limited>::="LIMITED"
<private>::="PRIVATE"

<deferred_constant_declaration>::=<identifier_list> <d_c_d1 >
<d_c_d1>::=<colon_const> <type_name>
<colon_const>::=<colon> <constant>

Requirement Clauses

Requirement clauses allow definition of packages that are parameterized when used. The package with a requirement clause becomes a bounded, universally-quantified type.
<requirement_clause>::=<required_rtypes> <end_required>
<required_rtypes>::=<required> <rtypes>
<required>::="REQUIRED"
<end_required>::=<end> <required>
<rtypes>::=<rtype>
<rtypes>::=<rtype> <rtypes>
<rtype>::=<type_declaration>
<rtype>::=<subprogram_declaration>
<rtype>::=<undefined_type>
<undefined_type>::=<type_name> <id_semi>
<id_semi>::=<identifier> <semicolon>

Visibility Rules

The rules defining the scope of declarations and the rules defining which identifiers are "visible" at various points in the text of the program are described in this chapter. She formulation of these rules uses the notionl of a "declarative region." I have formally redefined such scoping rules using domains so that parallel correctness can be proven using Owicki-Gries. Such proofs formalize informal correctness justifications such as: "My interval, which is correct in isolation, is correct with an unknown collection of other intervals because no other interval can see or modify my state variables."

The visibility rules, as stated, are difficult to understand. It uses such terms as "declarative region," "occur immediately," and "outer regions." However, the visibility rules are generally intuitive:

Variables declared within a subprogram or block are not visible outside. This corresponds to domains— variable/value bindings:

$\mathfrak{D}[[d]] = \{(n,v) | n \in \text{identifier}, v \in \text{Type}(n)\}$ $\mathfrak{D}[[d1]] \subset \mathfrak{D}[[d2]]$ iff $\exists s: \text{string} | d1 +"."+s = d2$ where+is string CONcatenation. That is that domain d2 can "see" all the values in every domain d1 whose name is a shortened version of d2, but there may be variables declared within a subprogram or block in d2 but not d1.

a declaration makes that object visible throughout the program structure in which it appears, an import clause makes the contents of a package visible.

An intuitive understanding of scoping (visibility) is desirable since few programmers will refer to this section when they write code.

model:

$\mathcal{M}_i[[\text{DECLARE} X = c \text{ begin } w \text{ end }]] = \text{true}$ iff $\mathcal{M}_{start(i)}[[X]] = c$ and $\mathcal{M}_i[[w]] = \text{true}$.

rule:

$$\frac{(\exists d1, d2 : \text{domain} : \mathfrak{D}[[d1]] \subset \mathfrak{D}[[d2]]) \text{ AND}}{(\exists s : \text{string} : (d1 \&\& "." s) = d2) \text{ AND}}$$
$$\frac{(\text{FORALL} V : \text{variable} : V \text{ IN } \mathfrak{D}[[d1]] \Rightarrow V \text{ IN } \mathfrak{D}[[d2]]) \text{ AND}}{(X \text{ IN } \mathfrak{D}[[d2]]) \text{ AND } (X = c) \text{ AND } (P \Rightarrow P1_c^X) \text{ AND } (Q1 \Rightarrow Q)}$$
$$\{P\} \text{ DECLARE } X = c \text{ begin } \{P1\} w \{Q1\} \text{ end } \{Q\}$$

wp:

wp(DECLARE X=c begin {P1}w {Q1 }end Q)=wp(w, Q1) provided (Q1⇒Q) and all the uses of X are contained with.n the begin-end. Means of defining variables, their scope (visibility), an initial value, and type.

Declarative Region

A "declarative region" is a portion of the program text. A single declarative region is formed by the text of each of the following:

A subprogram or package declaration together with the corresponding body (if any) and subunits (if any).

A record or variant type declaration.

A renaming declaration.

A block.

A parallel command (FORALL).

In each of the above cases, the declarative region is said to be "associated" with the corresponding declaration or statement. A declaration is said to occur immediately within a declarative region if this region is the innermost region that encloses the declaration, not counting the declarative region (if any) associated with the declaration itself. In the following code fragment i and k occur immediately within the parallel command.

```
FORALL i,k IN 1..sizej..size+1 DO
    IF
        (i = j) => skip
    []
        NOT(i = j) =>
        IF
            (k > size) => x[i] := x[i] - (Ap[i,j]/Ap[j,j])*x[j]
        []
            NOT(k > size) => Ap[i,k] := Ap[i,k] -
                (Ap[i,j]/Ap[j,j])*Ap[j,k]
        FI
    FI
```

Those program constructs (e.g. function and procedure) have declarative regions associated with them, so the declaration occurs immediately in the enclosing declarative region (e.g. package).

A declaration that occurs immediately within a declarative region is said to be "local" to the region. Declarations in outer (enclosing) regions are said to be "remote" to an inner (enclosed) declarative region. A local entity is one declared by a local declaration; a remote entity is one declared by a remote declaration.

Scope of Declarations

For each form of declaration, a certain portion of program text is called the scope of the declaration. The scope of a declaration that occurs immediately within a declarative region extends from the beginning of the declaration to the end of that declarative region; this part of the scope of a declaration is called the immediate scope. Furthermore, for any of the declarations listed below, the scope of the declaration extends beyond the immediate scope. In each of these cases, the given declaration occurs immediately within some enclosing declaration, so the scope of the given declaration extends to the end of the scope of the enclosing declaration.

Any declaration that occurs immediately within the visible part of a package declaration.

A component declaration.

A discriminant specification.

A parameter declaration.

Visibility of Identifiers and Declarations

The meaning of the occurance of an identifier at a given place in the text is defined by the visibility rules. The identifiers considered include any identifier other than a reserved word. The places considered are those where a lexical element can occur. A declaration is visible at a given place in the text when, according to the visibility rules, the declaration defines a possible meaning for this occurance.

In some cases more than one declaration of an object is visible at a particular use of that object. This is poor programming practice that may confuse the programmer. However the ambiguity is resolved by the compiler as follows:

first the innermost scope is checked, if the declaration is not found, successively ecnlosing scopes are checked until a declaration for the object is found.

if no declaration is found an error is reported

Import Clauses

Import clauses specify use of packages. Unlike Ada, each item within a package must be explicitly named. This allows separate compilation of packages and checking when those packages are linked.

<import_clause>::=<i_c1> <i_c2>
<i_c1>::=<i_c3> <i_c4>
<i_c3>::=<import><identifier_list>
<import>::="IMPORT"
<i_c4>::=<from> <package_name>
<i_c4>::=<from> <i_c5>
<i_c5>::=<package_name> <actual_parameter_part>
<from>::="FROM"
<i_c2>::=<end_import>
<i_c2>::=<r_clauses> <end_import>
<r_clauses>::=<rename_clause>
<r_clauses>::=<r_clauses> <r_clauses>
<end_import>::=<end> <import>

Use of a rename clause is encouraged. Otherwise each object from the package must have the package name and a period preceeding the object name.

<rename_clause>::=<rename_name> <as_id>
<rename_name>::=<rename> <name>
<rename>::="RENAME"
<as_id>::=<as> <identifier>
<as>::="as"

The following example imports the "Sort" package and supplies the necessary types and functions:

```
IMPORT sort --the procedure name
    FROM ParallelSort:Sort --the package name
        (   rt => employee_record,    --parameters required
            ar => employee_array,
            '<=' => (string <= string)
        )
    RENAME sort AS employee_sort
END IMPORT
```

Assertions

Assertions in DANCE programs support formal specification of behavior and proof of program correctness. A programming logic is a formal system that supports the assertional (axiomatic) approach to developing and analyzing programs. (Much of this section was borrowed from *Concurrent Programming*, Gregory R. Andrews, Benjanin/Cummings, 1991, chapter 1.) A programming logic includes predicates that characterize program states and relations that are the effect of program execution. This section summarizes relevant aspects of formal logical systems, propositional logic, and predicate calculus.

<assertion>::=<lbrace> <ass1 >
<ass1>::=<ass2> <rbrace>
<lbrace>::="{"
<rbrace>::="}"
<ass2>::=<predicate>
<ass2>::=<id_colon> <predicate>

Predicates

Predicates are the building blocks for assertions. Assertions use only first-order predicates.

<predicate>::=<true>
<predicate>::=<false>
<predicate>::=<lparen> <pred1>
<pred1>::=<pred2> <rparen>
<pred2>::=<predicate> <log_op_pred>
<log_op_pred>::=<logical_operator> <predicate>
<predicate>::=<not> <predicate>
<predicate>::=<logic_variable>
<predicate>::=<existential_quantifier>
<predicate>::=<universal_quantifier>
<predicate>::=<counting_quantifier>

```
<predicate>::=<summing_quantifier>
<predicate>::=<product_quantifier>
<predicate>::=<relational_expression>
<logic_variable>::=<deminame>
<logic_variable>::=<function_call>
```

When dealing with sets of values, we will often want to assert that some or all values of a set satisfy a property. We could do this informally, but quantified expressions provide a more precise amd compact method.

Existential Quantifier

The existential quantifier, EXISTS, allows one to assert that some element of a set satisfies a property. It appears in expressions of the form:

(EXISTS $b_1, \ldots, b_n$:R:P

The $b_1$ following the quantifier are new variables called bound variables; R is a formula that specifies the set of values (the range) of the bound variables; P is a predicate. The interpretation of existential quantification is true if for some combination of values of the bound variables (within range R), predicate P is true.

```
<existential_quantifier>::=<e_q1> <predicate>
<e_q1>::=<e_q2> <colon_p_r_colon>
<e_q2>::=<exists> <identifier_list>
<exists>::="EXISTS"
<colon_p_r_colon>::=<colon> <p_r_colon>
<p_r_colon>::=<p_range> <colon>
<p_range>::=<range>
<p_range>::=<relation>
```

Universal Quantifier

The universal quantifier, FORALL, allows one to assert that all elements of a set satisfy a property. Universal quantification takes the form:

FORALL $b_1, \ldots b_n$:R:P

Again, the $b_1$ are bound variables, R specifies the range of values of bound variables, and P is a predicate. The interpretation of universal quantification is true if P is true for a combinations of the values of tile bound variables.

```
<universal_quantifier>::=<u_q1> <predicate>
<u_q1>::=<u_q2><colon_p_r_colon>
<u_q2>::=<forall> <identifier_list>
```

The counting quantifier, NUM, returns the number of times the predicate is true for all combinations of bound variable values.

```
<counting_quantifier>::=<c_q1> <predicate>
<c_q1>::=<c_q2> <colon_p_r_colon>
<c_q2>::=<num> <identifier_list>
<num>::="NUM"
```

The summing quantifier adds the values of the expression for all combinations of bound variable values.

```
<summing_quantifier>::=<s_q1> <expression>
<s_q1>::=<s_q2> <colon_p_r_colon>
<s_q2>::=<sum> <identifier_list>
<Sum>::="SUM"
```

The product quantifier multiplies the values of the expression for all combinations of bound variable values.

```
<product_quantifier>::=<p_q1> <expression>
<p_q1>::=<p_q2> <colon_p_r_colon>
<p_q2>::=<prod> <identifier_list>
<prod>::="PROD"
```

In a quantified expression, the scope of a bound variable is the expression itself. Thus, a quantified expression is like a nested block. Many quantified expressions will also reference other variables. Thus, confusion could result if the name of a bound variable conflicts with that of another variable. Prof. Richter's mathematical logic class spent lots of energy exploring "free" and "bound" variables. Goofy things happen when a previously "free" variable is inadvertantly captured through stupid naming. For now, the "capture" problem will be avoided.

CONCLUSIONS, RAMIFICATIONS, AND SCOPE OF INVENTION

The model of computation of the DANCE programming language along with the special hardware features of the Multitude architecture allow efficient use of many computational elements. The scope of this invention is the process of state transformation that is DANCE/Multitude concurrent computation. Every execution of every DANCE program falls within the scope of this invention. The scope of the invention should be determined not by the embodiment espoused, but by the appended claims and their legal equivalents.

Though constructing state-lattices to satisfy temporal formulae is how the concurrency is accomplished, many other things must be done right to achieve efficiency. Logical systems for data types, domains, assertions, and correctness proofs must be integrated with the temporal logic. DANCE, programs will not run efficiently without the special features of the Multitude architecture. The operating system that allocates memory, sets and checks page and segment attributes, swaps pages for virtual memory, schedules and allocates work for processors, dynamically links and typechecks relocatable machine code, and handles input/output relys and supports on special features of the Multitude architcture, the DANCE language and its compiler.

The ramifications of cheap, scalable computing power will dramatically change modern society. People from advertising directors to radiologists will use their workstations or personal computers for information entry and display, relying on a "big machine" out on the net to do in a few minutes what would take days on a workstation. Computational power utilities will spring up, offering competitive and falling prices. Users will be able to set their priority level and pay accordingly. Programs will be proven correct and guaranteed not to have bugs.

What is claimed is:

1. A method of operating a plurality of computing means comprising the steps of:
   (a) transforming a temporal logic formula into machine executable form;
   (b) loading the machine executable form for the temporal logic formula and data to be manipulated into said plurality of computing means; and
   (c) constructing a lattice to satisfy said temporal logic formula, the lattice having a plurality of nodes, each node representing a state value that is a value of a program variable at a given moment, the plurality of nodes being interconnected by directed arcs, each directed arc representing a change in state affected by a computation associated with that arc.

2. The method of claim 1 wherein the state values are elements of strong types, including either constructed types or types defined using existential and bounded universal quantification.

3. The method of claim 1 wherein visibility of said program variables in a particular state is restricted to domains.

4. The method of claim 1 in which the state values may occupy computing means located in disparate geographical locations utilizing remote procedure call semantics.

5. The method of claim 1 and further including the step of proving correctness of the lattice construction automatically.

6. The method of claim 1 and further including the step of proving correctness of the lattice construction manually.

7. A computing system comprising:
   (a) a plurality of computing means operatively coupled by an interconnection network means for communicating with one another, the network means including means for performing global memory access routing, request combining and response decombining;
   (b) each of the computing means having an instruction set including combinable operations and write back capability;
   (c) the computing means further having a virtual memory address translation mechanism for enforcing access constraints for segments or pages of memory, said constraints being selected from the group consisting of:
   (i) memory shared, but no caching allowed,
   (ii) memory protected and temporary exclusive caching with processor indicated write back,
   (iii) discretionary memory access controls with exclusive demanded authorization user access rights,
   (iv) mandatory memory access controls in which a user may read values at an assigned security level or lower, write values at said assigned security level or higher, and only invoke combinable operations on values at the assigned security level.

* * * * *